US012546427B2

(12) United States Patent
Graves et al.

(10) Patent No.: US 12,546,427 B2
(45) Date of Patent: Feb. 10, 2026

(54) INSERT FITTING DEVICES, ASSEMBLIES AND COUPLINGS

(71) Applicant: MEGA FLUID SYSTEMS, INC., Tualatin, OR (US)

(72) Inventors: Todd Graves, Springfield, OR (US); Kevin Crain, Bothell, WA (US); David Kandiyeli, Mesa, AZ (US)

(73) Assignee: Mega Fluid Systems, Inc., Tualatin, OR (US)

( * ) Notice: Subject to any disclaimer, the term of this patent is extended or adjusted under 35 U.S.C. 154(b) by 785 days.

(21) Appl. No.: 17/366,805

(22) Filed: Jul. 2, 2021

(65) Prior Publication Data

US 2021/0332924 A1 Oct. 28, 2021

Related U.S. Application Data

(63) Continuation of application No. PCT/US2020/012214, filed on Jan. 3, 2020.

(60) Provisional application No. 62/788,136, filed on Jan. 3, 2019.

(51) Int. Cl.
*F16L 37/14* (2006.01)
*F16L 19/025* (2006.01)
*F16L 37/44* (2006.01)

(52) U.S. Cl.
CPC ............. *F16L 37/44* (2013.01); *F16L 19/025* (2013.01); *F16L 37/14* (2013.01)

(58) Field of Classification Search
CPC .............. F16L 19/0212; F16L 19/0231; F16L 19/0286; F16L 37/14; F16L 37/142; F16L 37/15; F16L 37/32; F16L 37/36
See application file for complete search history.

(56) References Cited

U.S. PATENT DOCUMENTS

| 2,453,389 A | 11/1948 | Thomas |
| 2,665,928 A | 1/1954 | Omon et al. |
| 3,994,317 A | 11/1976 | Miyazaki et al. |
| 4,260,184 A | 4/1981 | Greenawalt et al. |

(Continued)

FOREIGN PATENT DOCUMENTS

GB 591743 8/1947

OTHER PUBLICATIONS

International Search Report and Written Opinion of the International Searching Authority for PCT/US2020/012214, Apr. 9, 2020, 9 pages.

*Primary Examiner* — Reinaldo Sanchez-Medina
(74) *Attorney, Agent, or Firm* — Lando & Anastasi, LLP

(57) ABSTRACT

Insertion fitting/coupler devices for coupling to a flowpath, and methods of using such insertion fitting/coupler devices, are disclosed. The insertion fitting/coupler devices include a coupler that includes a through hole and a stem portion. The insertion fitting/coupler devices also include a nut that includes a through hole, a rim and a body portion. The insertion fitting/coupler devices further include a body member that includes a through hole and an outer flange. The body member extends into the through hole of the coupler such that an end of the stem portion of the coupler engages the outer flange of the body member. An inner side of the body portion of the nut engages with an outer surface of the stem portion of the coupler such that the flange is secured between the rim of the coupler and the end of the stem portion of the coupler.

13 Claims, 160 Drawing Sheets

(56) References Cited

U.S. PATENT DOCUMENTS

| | | | |
|---|---|---|---|
| 4,303,263 A | | 12/1981 | Legris |
| 4,313,828 A | | 2/1982 | Brownlee |
| 4,537,427 A | * | 8/1985 | Cooke ................... F16L 37/144 |
| | | | 285/305 |
| 4,881,573 A | | 11/1989 | Durant et al. |
| 5,316,041 A | * | 5/1994 | Ramacier, Jr. .......... F16L 37/32 |
| | | | 285/317 |
| 5,904,376 A | * | 5/1999 | Yuen .................... F16L 33/223 |
| | | | 285/39 |
| 6,019,348 A | | 2/2000 | Powell |
| 6,412,832 B1 | * | 7/2002 | Donoho .............. F16L 19/0656 |
| | | | 285/382.4 |
| 10,648,595 B2 | | 5/2020 | Williams et al. |
| 2002/0106920 A1 | | 8/2002 | Maldavs |
| 2010/0183361 A1 | | 7/2010 | Davis |
| 2011/0121562 A1 | * | 5/2011 | Swift ..................... F16L 41/14 |
| | | | 285/212 |
| 2013/0161941 A1 | | 6/2013 | Zulauf et al. |
| 2015/0008669 A1 | * | 1/2015 | Makino .................. F16L 15/04 |
| | | | 72/370.11 |
| 2015/0198273 A1 | | 7/2015 | Campbell et al. |
| 2018/0347731 A1 | * | 12/2018 | Kesler ................ F16L 19/0286 |

\* cited by examiner

ND COUPLINGS

INSERT FITTING DEVICES, ASSEMBLIES AND COUPLINGS

CROSS REFERENCE TO RELATED APPLICATION

This application is a continuation of PCT International Patent Appl. No. PCT/US2020/012214, filed Jan. 3, 2020, and entitled Insert Fitting Devices, Assemblies and Couplings, which claims priority benefit to U.S. Provisional Patent Application No. 62/788,136, filed Jan. 3, 2019, and entitled Insertion Devices and Methods for Using the Insertion Devices, which are both hereby incorporated herein by reference in their entireties.

FIELD OF THE DISCLOSURE

The present disclosure relates generally to insertion fittings for providing a transitional connection to existing fitting structures. More specifically, but not exclusively, the present disclosure concerns insertion fittings for use with high purity and ultrahigh purity existing piping and tubing applications.

BACKGROUND

Currently, if a designer wants to convert from a fluoro polymer (such as perfluoroalkoxy polymer (PFA), polyvinylidene fluoride/difluoride (PVDF), fluorinated ethylene propylene (FEP) or another fluorinated polymer) native material process fitting system (Flare, Pillar, Primelock, and others) to another system structure there are limited options available. Some such options take up considerable space, and other such options breach the original design integrity that the other fittings provide (e.g., NPT transitions). In many cases, even if a transition fitting has already been designed, the lead time to get the specialty part made is prohibitive.

Thus, insert fittings that provide a transitional connection structure for existing fittings without modifying the structure of the existing fittings are desirable.

SUMMARY

In one aspect, an insertion fitting device for coupling to a flowpath is provided. The insertion fitting device comprises a first fitting assembly. The first fitting assembly comprises: a first coupler that includes a first through hole and a stem portion, the first through hole extending through the stem portion; a first nut that includes a second through hole, a rim portion and a body portion; and a first body member that includes a third through hole and an outer flange. The first body member is positioned at least partially in the first through hole of the first coupler with an end of the stem portion engaging the outer flange. The first body member and the stem portion of the first coupler are positioned at least partially in the second through hole of the body portion of the first nut. An inner side of the body portion of the first nut engages with an outer side of the stem portion of the first coupler such that the outer flange is secured between the rim portion of the first nut and the end of the stem portion of the first coupler.

In some embodiments, the end of the stem portion of the first coupler directly engages a first side of the outer flange of the first body member, and the rim portion of the first nut directly engages a second side of the flange of the first body member.

In some embodiments, the a connection portion of the first body member extends through and past the second through hole of the rim portion of the first nut, and the third through hole of the first body member extends through the connection portion. In some such embodiments, the connection portion of the first body member includes at least one first locking slot extending therethrough from an exterior surface thereof to the third through hole. In some such embodiments, the first fitting assembly further comprises a lock clip configured to extend through the at least one first locking slot and into the third through hole. In some such embodiments, the first fitting assembly further comprises a lock grip member extending at least partially about the connection portion of the first body member and including at least one second locking slot extending therethrough, the lock clip extends through first and second at least one locking slots in a first position of the lock grip member with respect to the connection portion, and the lock clip extends through at least one second locking slot but not the at least one first locking slot in a second position of the lock grip member with respect to the connection portion that differs from the first position thereof.

In some such embodiments, the device further comprises a second fitting assembly, comprising: a second coupler that includes a fourth through hole and a stem portion; a second nut that includes a fifth through hole, a rim portion and a body portion; and a second body member that includes a sixth through hole and an outer flange. The second body member is positioned at least partially in the fourth through hole of the first coupler with an end of the stem portion engaging the outer flange of the second body member. The second body member and the stem portion of the second coupler are positioned at least partially in the sixth through hole of the body portion of the second nut. An inner side of the body portion of the second nut engages with an outer side of the stem portion of the second coupler such that the outer flange of the second body member is secured between the rim portion of the second nut and the end of the stem portion of the second coupler. A connection portion of the second body member extends through and past the fifth through hole of the rim portion of the second nut, and the sixth through hole of the second body member extends through the connection portion of the second body member.

In some such embodiments, an outer surface of the connection portion of the second body member includes at least one locking groove therein, and the third through hole of the first body member is configured to accept the connection portion of the second body member therein such that the at least one locking groove is aligned with the at least one first locking slot of the connection portion of the first body member, the lock clip being configured to extend through the at least one first locking slot and into the at least one locking groove to couple the first and second assemblies together. In some such embodiments, the end of the stem portion of the second coupler directly engages a first side of the outer flange of the second body member, and the rim portion of the second nut directly engages a second side of the flange of the second body member. In some other such embodiments, the connection portion of the second body member extends from a reducer portion of the second body member, the sixth through hole of the second body member extends through the reducer portion of the second body member, and the sixth through hole includes a first diameter in the connection portion of the second body and a second diameter that is less than the first diameter in the reducer portion of the second body. In some other such embodiments, the connection portion of the second body member extends into the third through hole of the first body, the first body member includes an inner narrow portion in the third through hole that defines an annular groove, and an end of the connection portion of the second body member includes an annular protrusion that mates within the annular groove of the first body member.

In some other such embodiments, the first fitting assembly further comprises first check member positioned within the third through hole of the first body member that is naturally resiliently biased into engagement with a first seat portion within the third through hole of the first body member, and the third through hole is closed off by the first check member and the first seat portion when the first check member engages the first seat portion. In some such embodiments, the first check member is naturally resiliently biased into engagement with the first seat portion via a first spring captured between a first spring retainer and the first check member within the third through hole of the first body member. In some such embodiments, the second fitting assembly further comprises second check member positioned within the sixth through hole of the second body member that is naturally resiliently biased into engagement with a second seat portion within the sixth through hole of the second body member, and the sixth through hole is closed off by the second check member and the second seat portion when the second check member engages the second seat portion. In some such embodiments, the second check member is naturally resiliently biased into engagement with the second seat portion via a second spring captured between a second spring retainer and the second check member within the sixth through hole of the first body member. In some other such embodiments, the first check member extends past the first seat portion and an end of the first body member, and the first check member engages with the second check member when the connection portion of the second body member is positioned into the third through hole of the first body such the first check member is moved into a spaced arrangement from the first seat portion and the second check member is moved into a spaced arrangement from the second seat portion.

In some embodiments, the outer flange of the first body member extends angularly outward from an exterior surface portion of the first body member. In some embodiments, the inner side of the body portion of the first nut and the outer side of the stem portion of the first coupler are threadably engaged.

In some embodiments, the first fitting assembly further comprises a tube member that includes a medial portion, a first expanded end portion, a first transition portion that extends outwardly from the medial portion to the first expanded end portion, and a fourth through hole that extends through the medial portion, the first expanded end portion and the first transition portion. In some such embodiments, at least a proximal portion of the first body member that includes the outer flange and a proximal portion of the stem portion of the first coupler that includes the end of the stem portion is positioned within the fourth through hole of the tube member. In some such embodiments, the end of the stem portion of the first coupler directly engages a first side of the outer flange of the first body member, an inner side of the first transition portion of the tube member directly engages a second side of the outer flange, and the rim portion of the first nut directly engages an outer side of the first transition portion.

In some such embodiments, the medial portion of the tube member extends through and past the rim portion of the first nut, and the tube member further includes a second expanded end portion and a second transition portion that extends outwardly from the medial portion to the second expanded end portion, the fourth through hole extending through the second expanded end portion and the second transition portion. In some other such embodiments, the first body member defines an orifice within the third through hole. In some other such embodiments, the first body member defines a tapered venturi portion within the third through hole. In some other such embodiments, the first coupler further includes a second stem portion that defines a fourth through hole that is in communication with the first through hole, and a third stem portion that defines a fifth through hole that is in communication with the first through hole, the fourth and fifth through holes being oriented at an angle therebetween.

In some other such embodiments, the first body member further includes a mixing device positioned within the third through hole. In some such embodiments, the mixing device comprises internal threads formed in an inner surface of the first body member. In some other such embodiments, the mixing device comprises a spiral spring.

In some embodiments, the first body member further includes a check member positioned within the third through hole of the first body member that is naturally resiliently biased into engagement with a first seat portion within the third through hole of the first body member, and the third through hole is closed off by the first check member and the first seat portion when the first check member engages the first seat portion. In some such embodiments, the check member is naturally resiliently biased into engagement with the first seat portion via a first spring captured between a first spring retainer and the check member within the third through hole of the first body member. In some other such embodiments, the first seat portion is positioned proximate to the outer flange, and the check member is naturally resiliently biased into engagement with the first seat portion in a direction extending from the first coupler to the tube member. In some other such embodiments, the first seat portion is positioned proximate to an end portion of the first body member, and the check member is naturally resiliently biased into engagement with the first seat portion in a direction extending from the tube member to the first coupler.

In some embodiments, the tube member comprises a compression adapter backing plate, the medial portion of the compression adapter backing plate extends partially over the third through hole of the first body member, and the first body member includes a compression sleeve positioned within a third through hole.

In another aspect, a method of coupling an insertion fitting device to a flowpath is provided. The method comprises obtaining an insertion fitting device as described above, and coupling the first through hole of the first coupler into fluid communication with an existing flowpath of a device.

These, and other objects, features and advantages of this disclosure will become apparent from the following detailed description of the various aspects of the disclosure taken in conjunction with the accompanying drawings.

BRIEF DESCRIPTION OF DRAWINGS

The accompanying drawings, which are incorporated in and constitute a part of the specification, illustrate embodiments of the inventions of the disclosure and together with the detailed description herein, serve to explain the principles of the inventions. The drawings are only for purposes of illustrating exemplary embodiments and are not to be construed as limiting the inventions of the disclosure. It is emphasized that, in accordance with the standard practice in the industry, various features may or may not be drawn to scale. For example, the dimensions of the various features may be arbitrarily increased or reduced for clarity of discussion. The foregoing and other objects, features and advantages of the present disclosure are apparent from the following detailed description taken in conjunction with the accompanying drawings in which:

FIG. 119 is a bottom view of the exemplary insertion fitting of FIG. 112, in accordance with an aspect of the present disclosure;

FIG. 120 is a right side cross-sectional view of the exemplary insertion fitting of FIG. 112, in accordance with an aspect of the present disclosure;

FIG. 121 is a front cross-sectional view of the exemplary insertion fitting of FIG. 112, in accordance with an aspect of the present disclosure;

FIG. 122 is a left side transparent view of the exemplary insertion fitting of FIG. 112, in accordance with an aspect of the present disclosure;

FIG. 123 is a front transparent view of the exemplary insertion fitting of FIG. 112, in accordance with an aspect of the present disclosure;

FIG. 124 is an elevational perspective exploded view of the exemplary insertion fitting of FIG. 112, in accordance with an aspect of the present disclosure;

FIG. 125 is a right side exploded view of the exemplary insertion fitting of FIG. 112, in accordance with an aspect of the present disclosure;

FIG. 126 is a front exploded view of the exemplary insertion fitting of FIG. 112, in accordance with an aspect of the present disclosure;

FIG. 127 is a left side exploded view of the exemplary insertion fitting of FIG. 112, in accordance with an aspect of the present disclosure;

FIG. 128 is a back exploded view of the exemplary insertion fitting of FIG. 112, in accordance with an aspect of the present disclosure;

FIG. 129 is an elevational perspective view of another exemplary insertion fitting, in accordance with an aspect of the present disclosure;

FIG. 130 is a front view of the exemplary insertion fitting of FIG. 129, in accordance with an aspect of the present disclosure;

Figure 129:
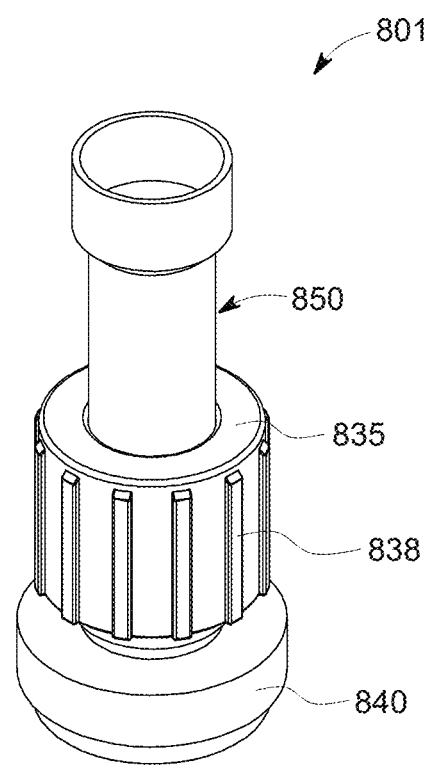
Figure 130:
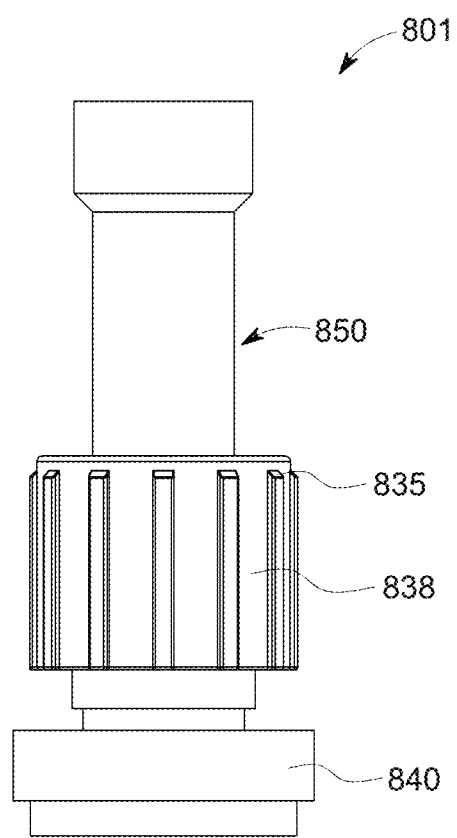
Figure 131:
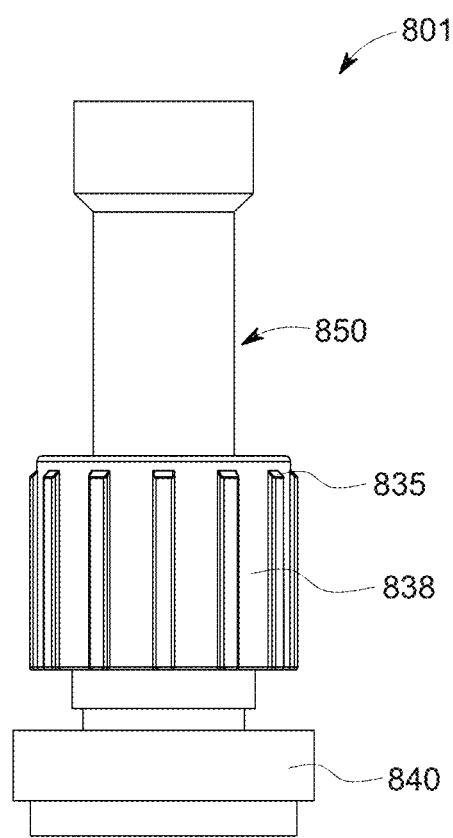
Figure 132:
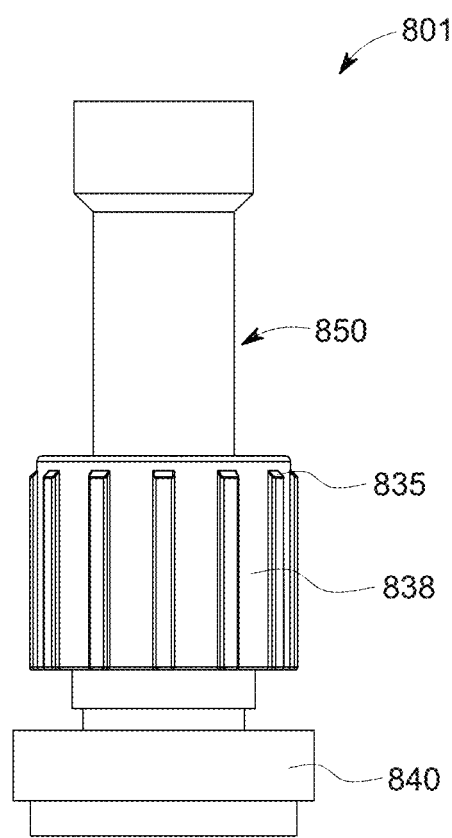
Figure 133:
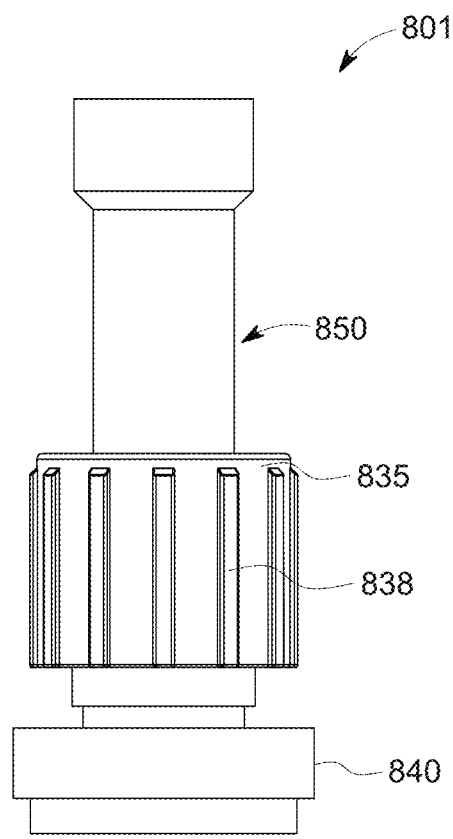
Figure 134:
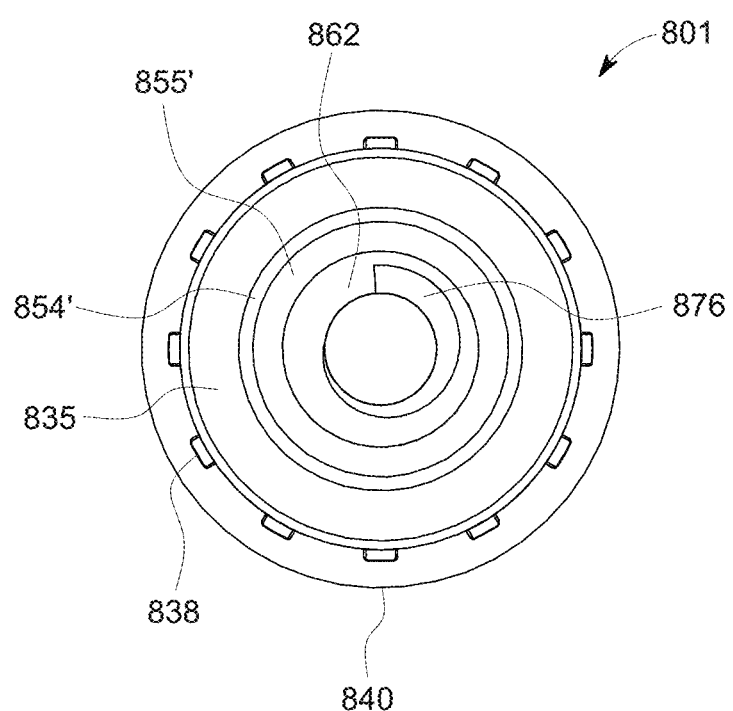
Figure 135:
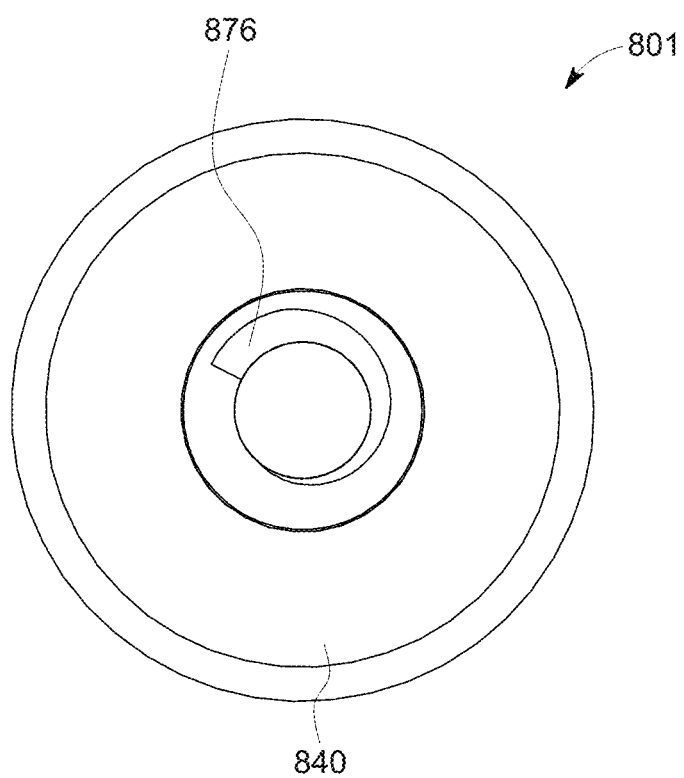
Figure 136:
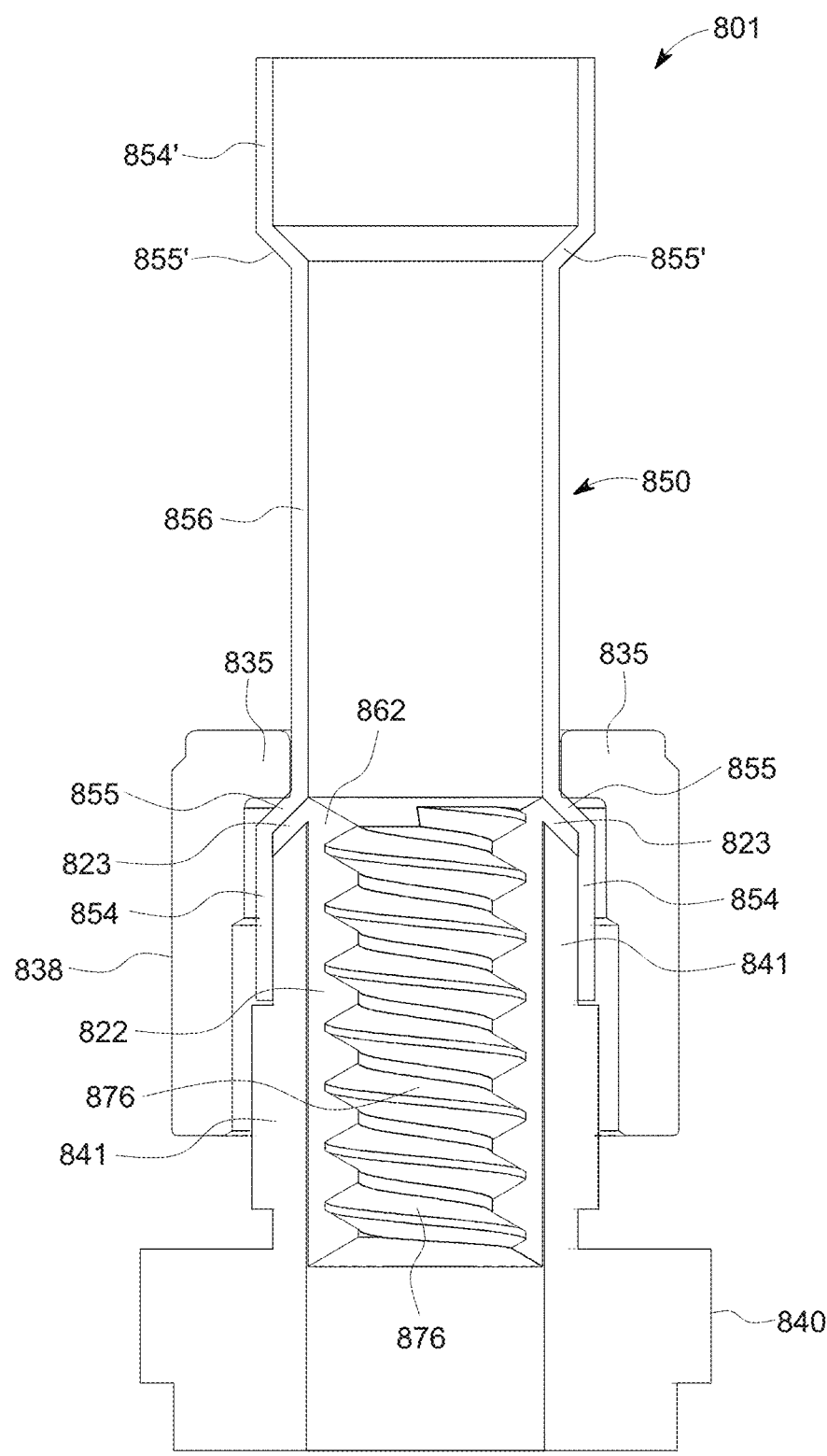
Figure 137:
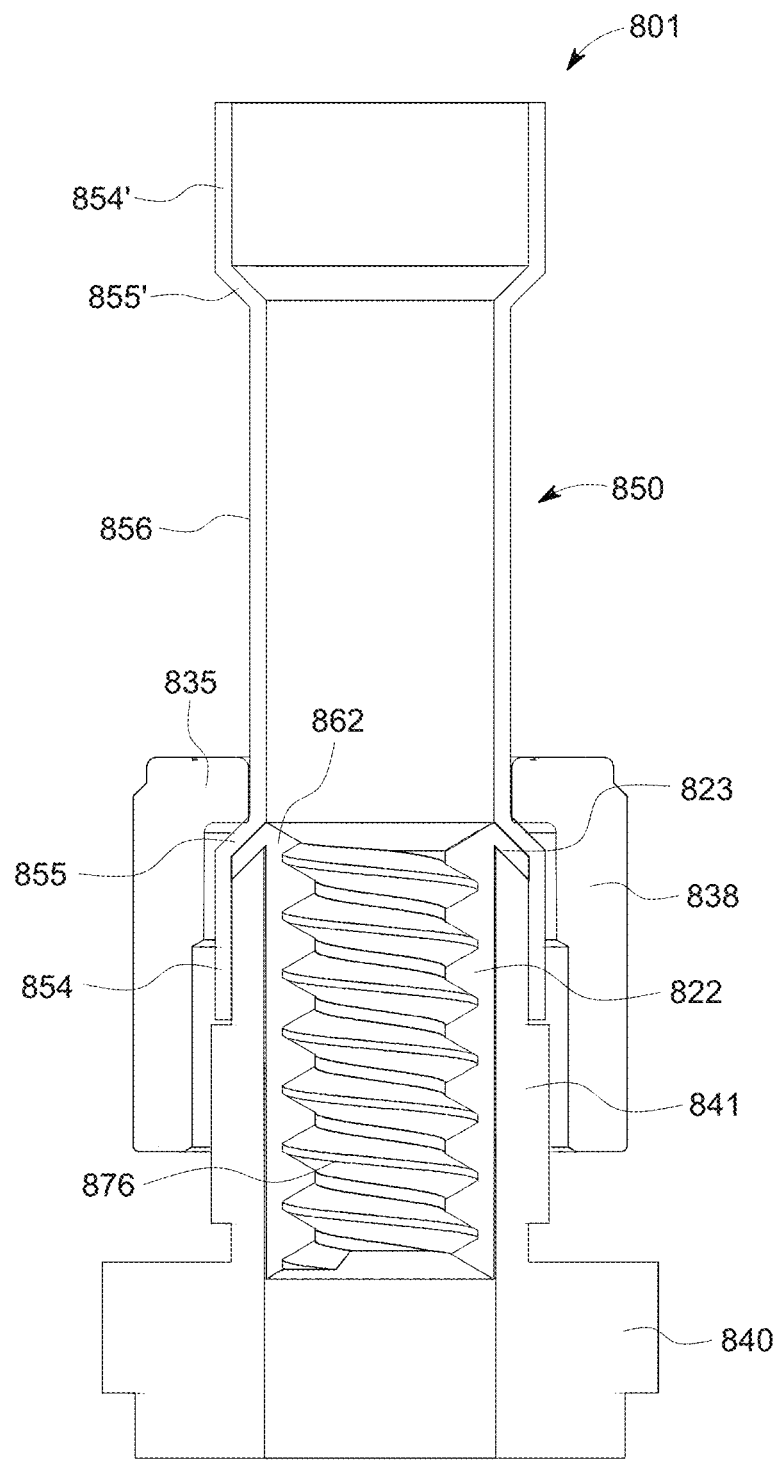
Figure 138:
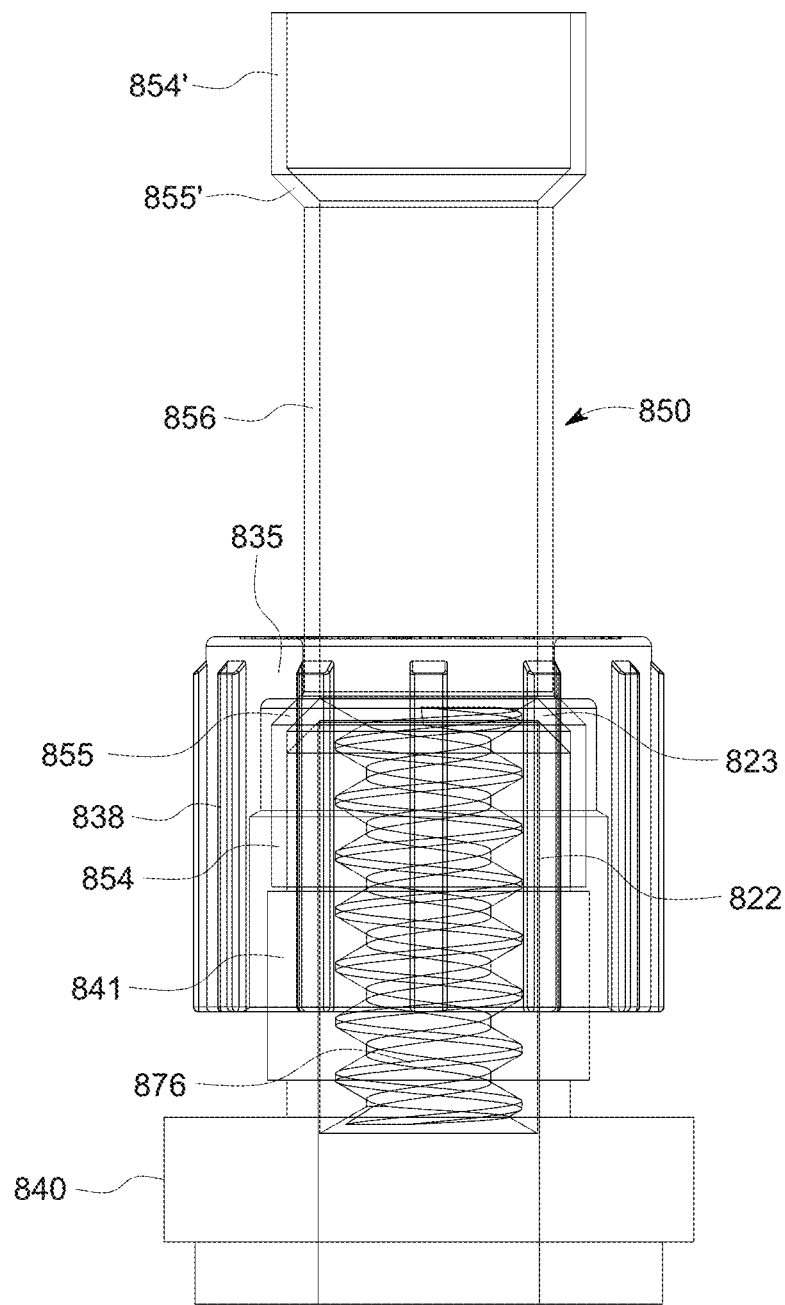
Figure 139:
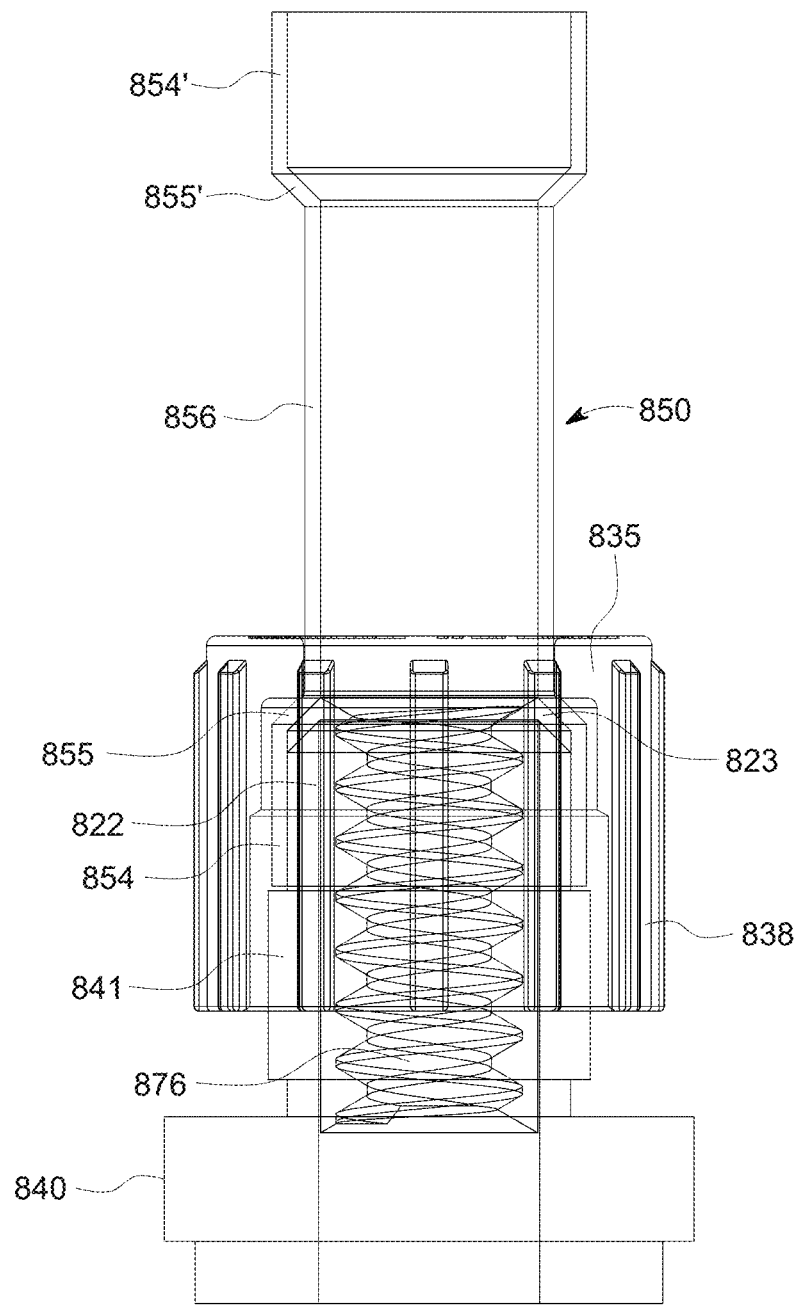
Figure 140:
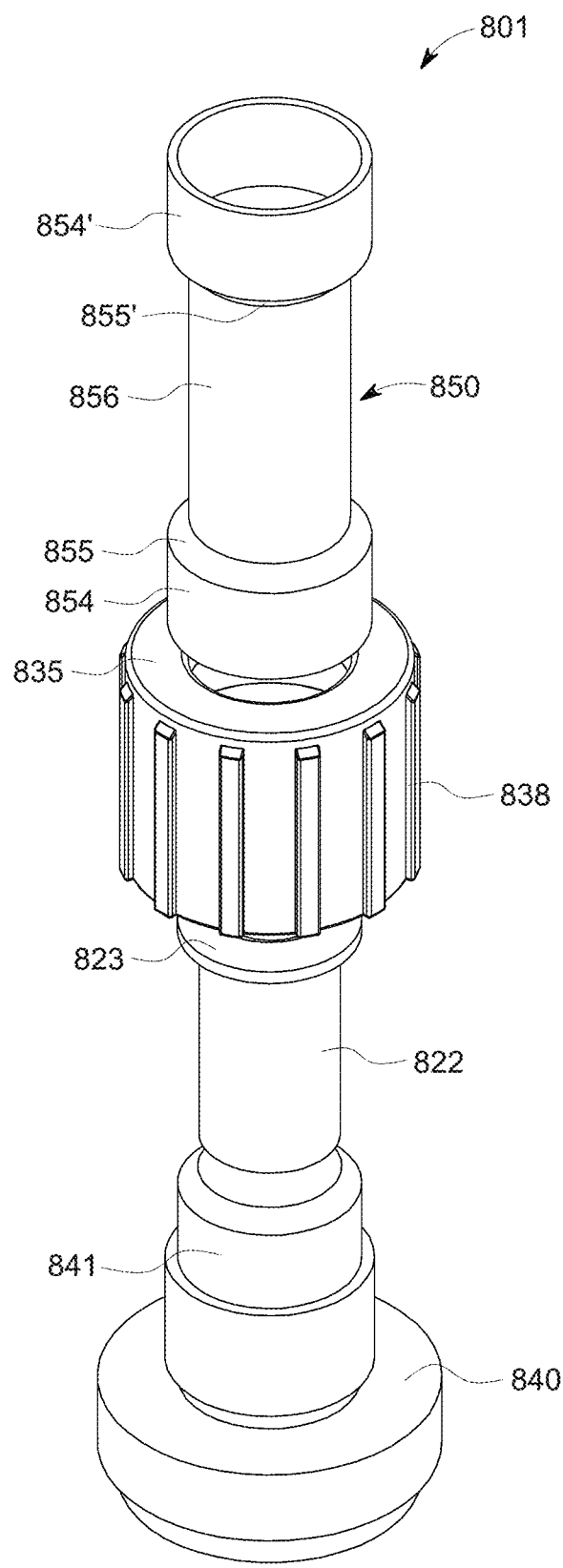
Figure 141:
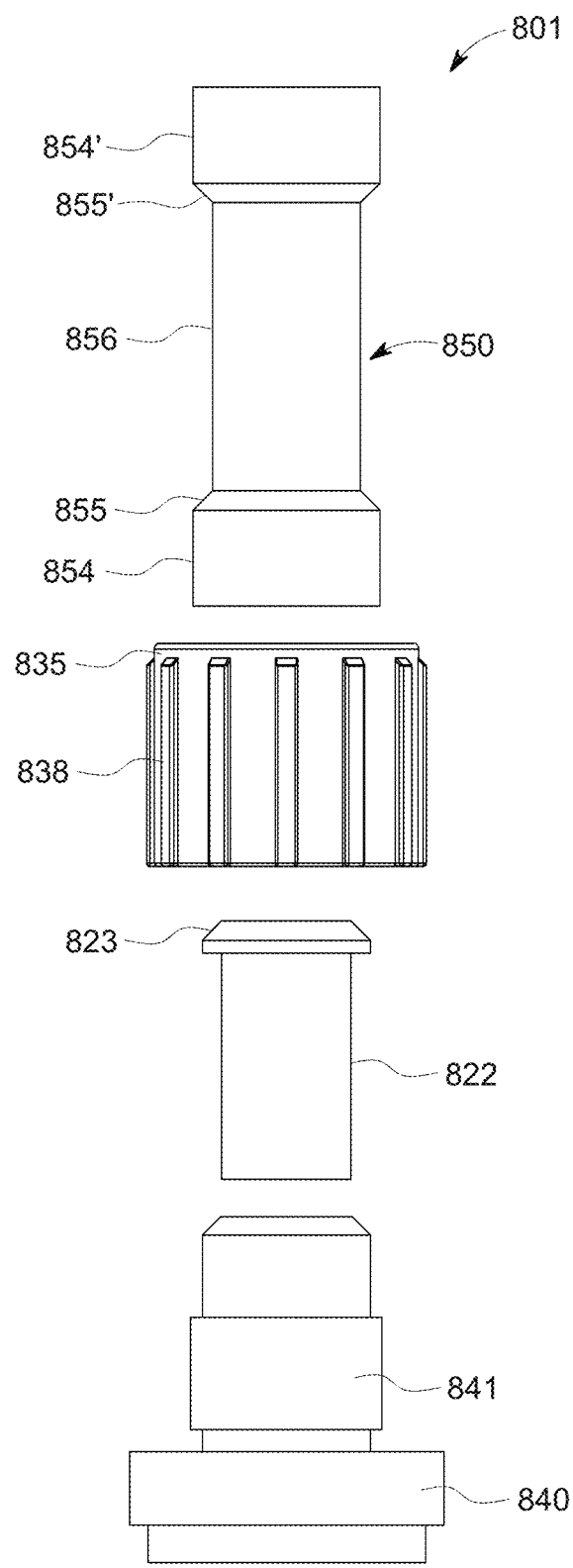
Figure 142:
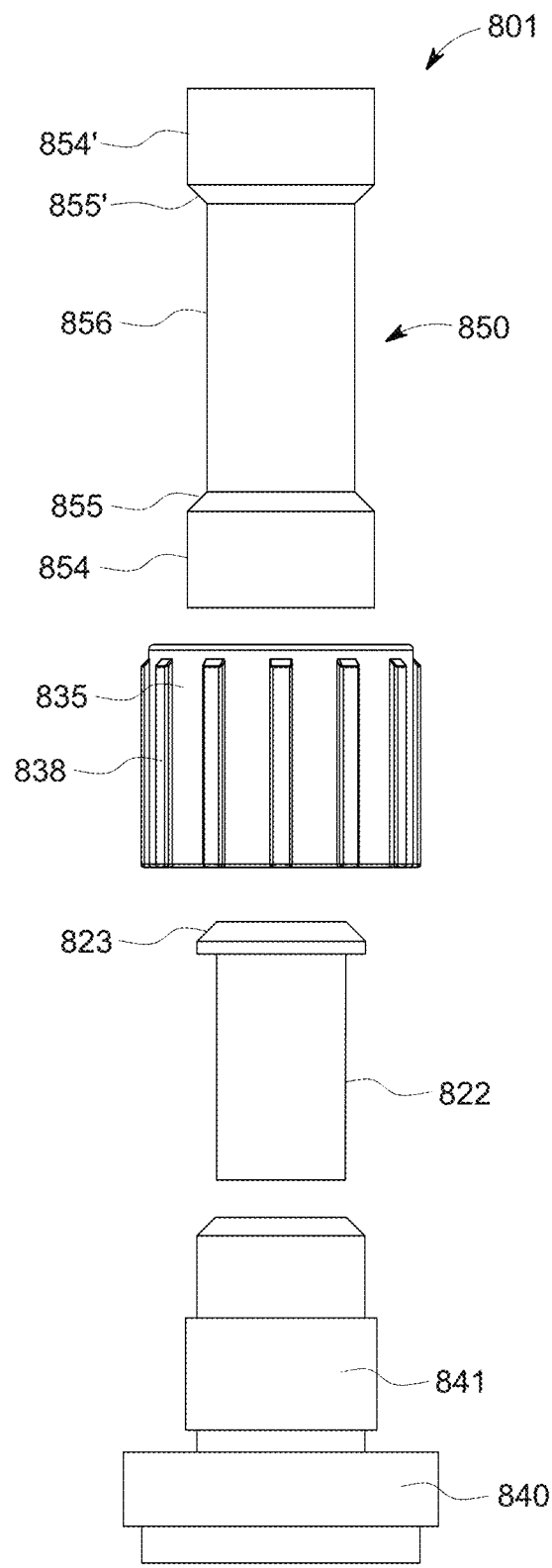
Figure 143:
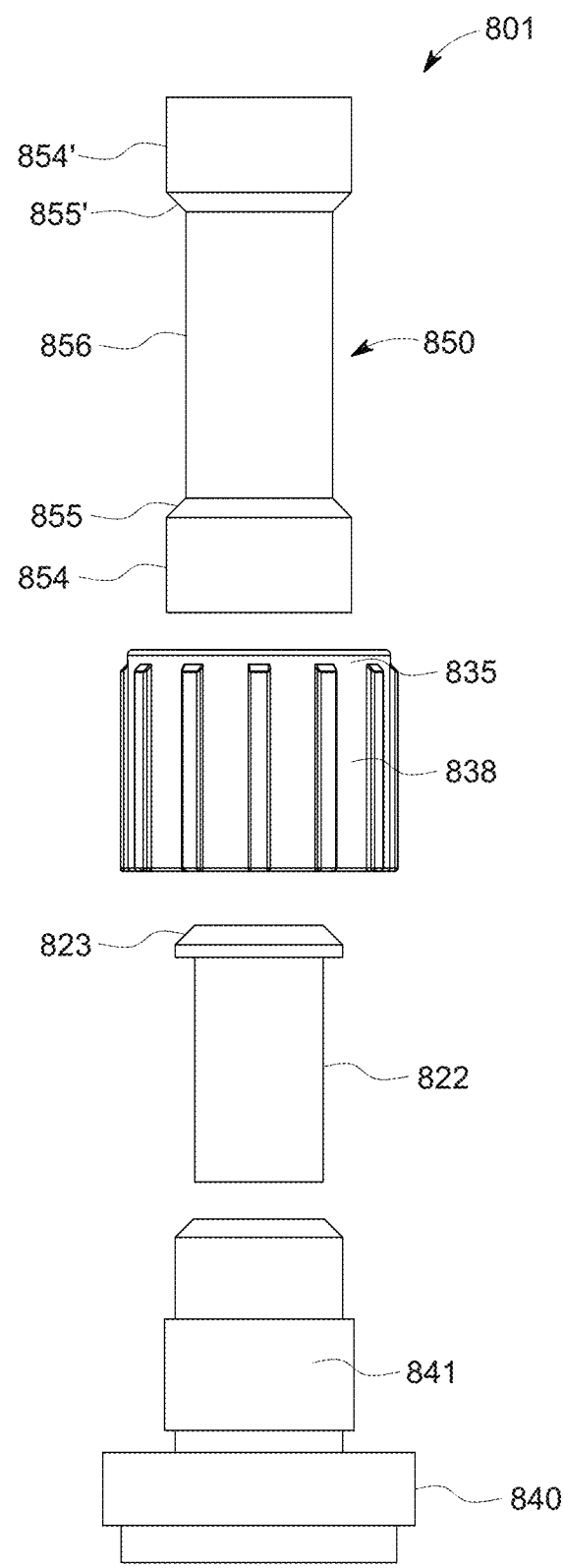
Figure 144:
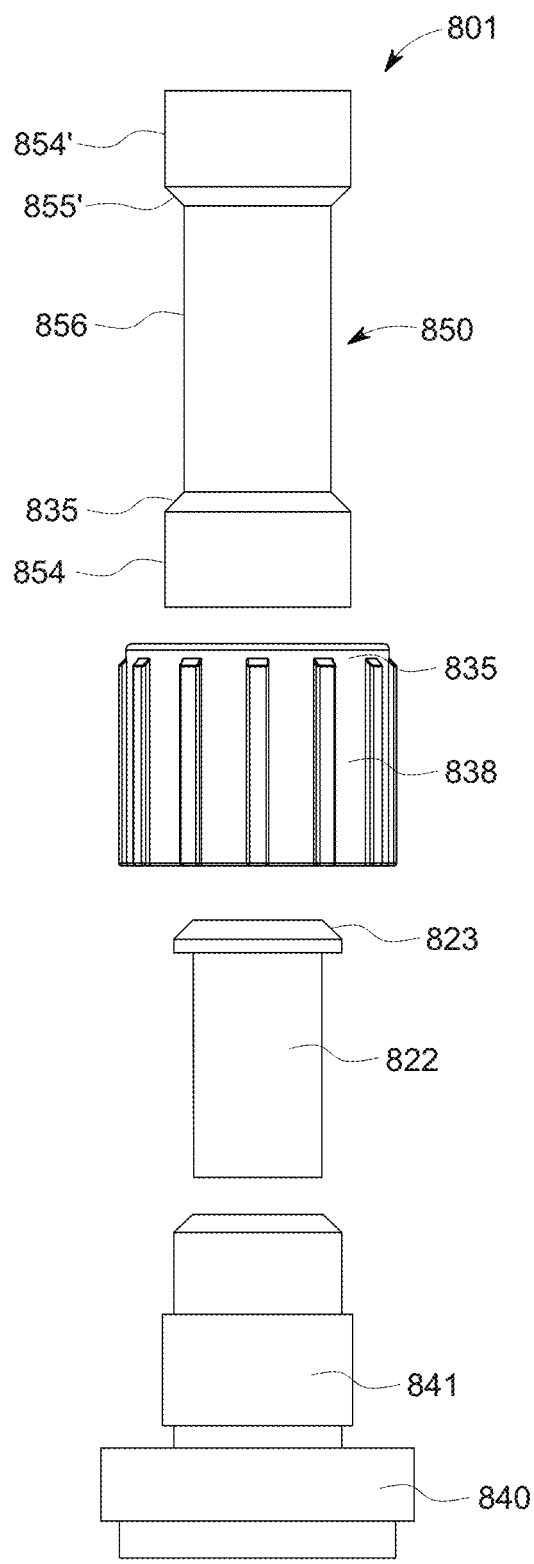
Figure 145:
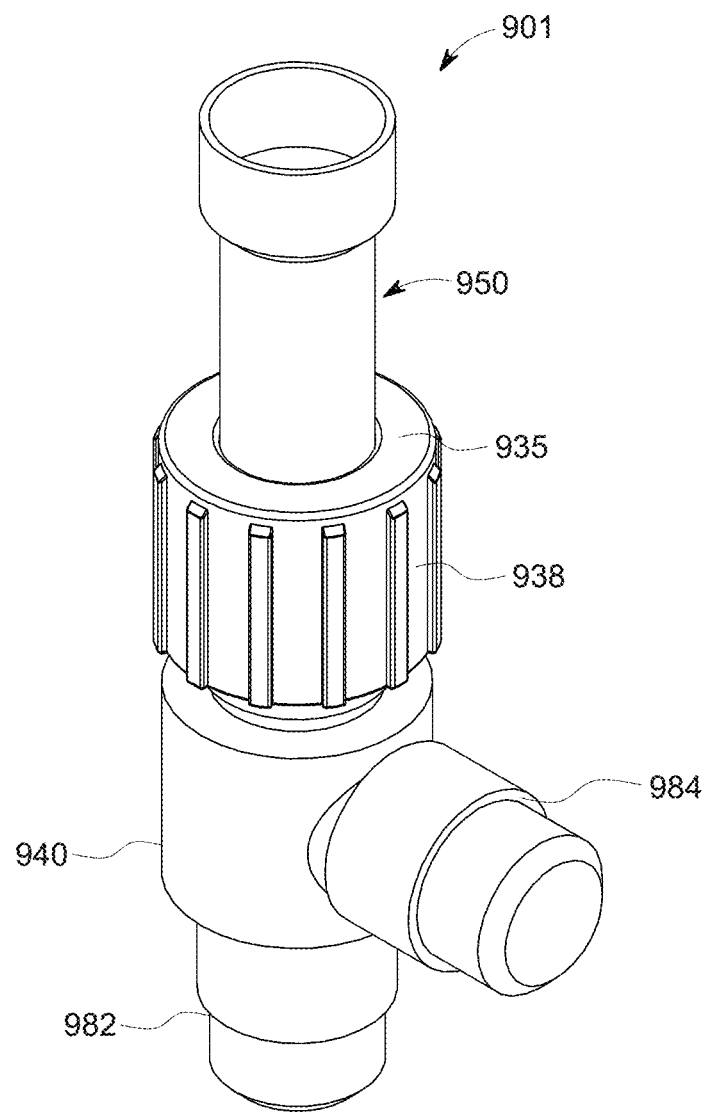
Figure 146:
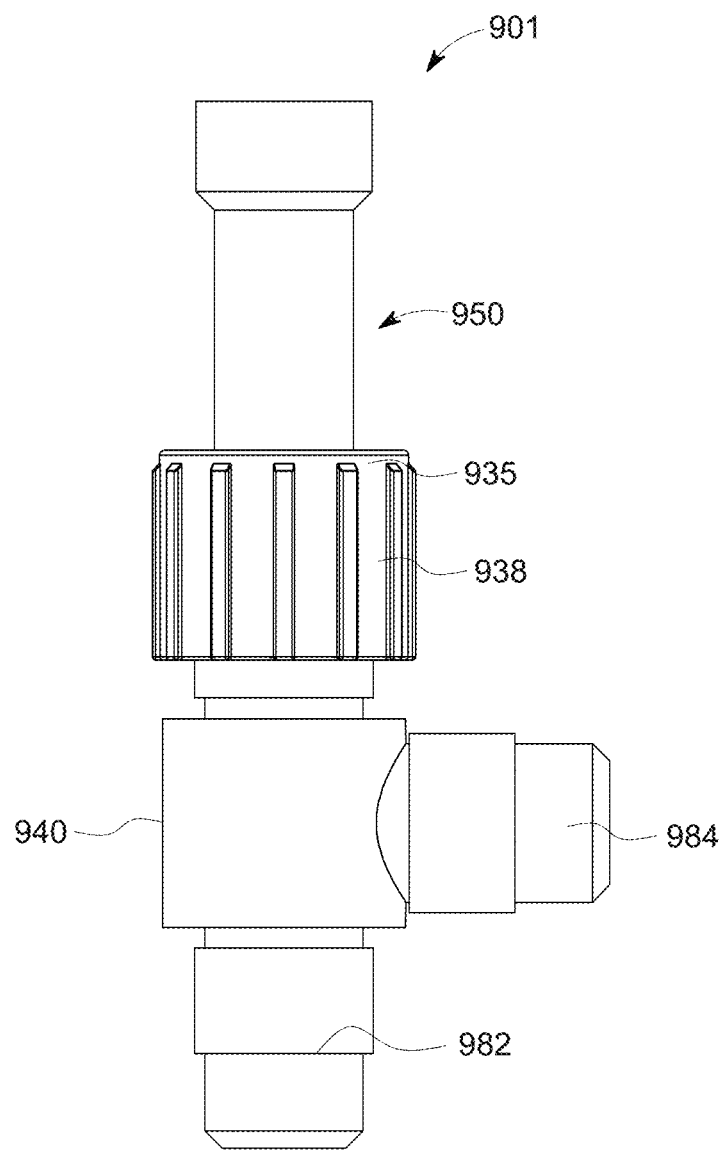
Figure 147:
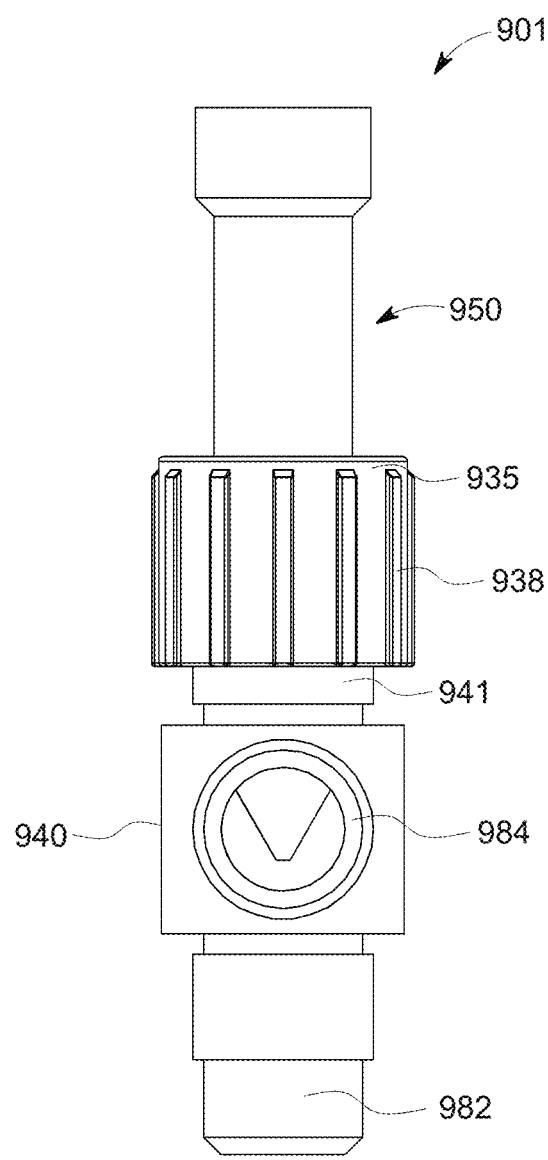
Figure 148:
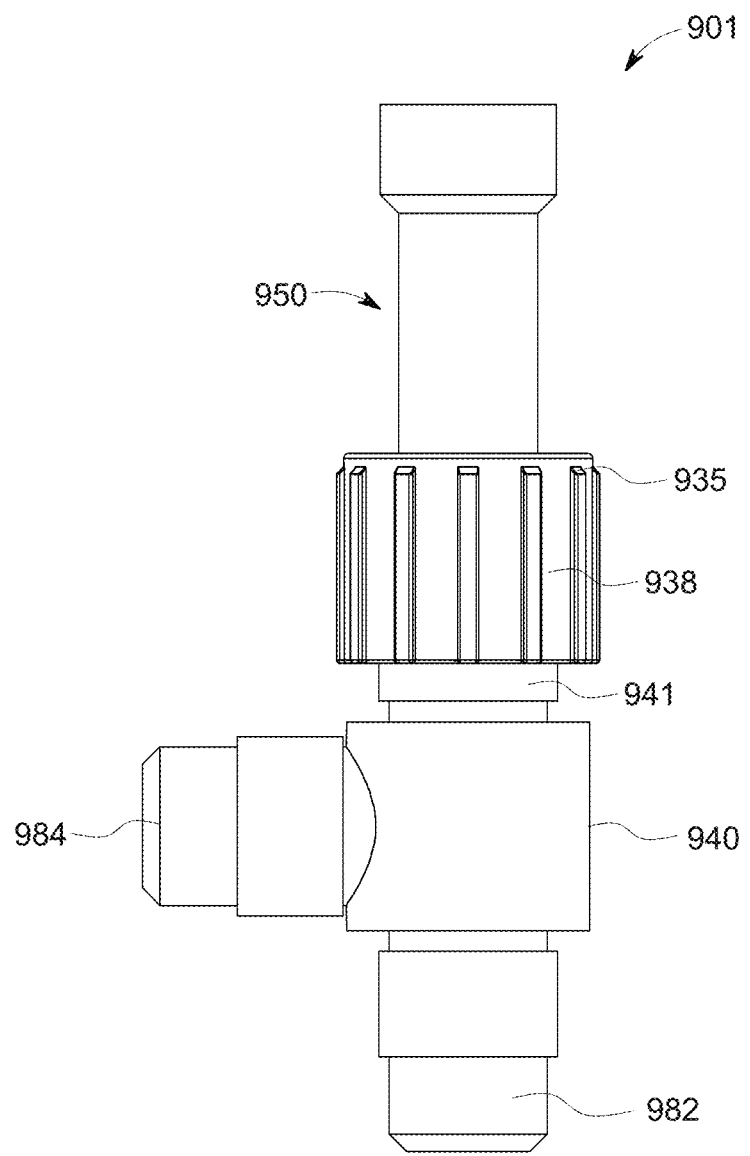
Figure 149:
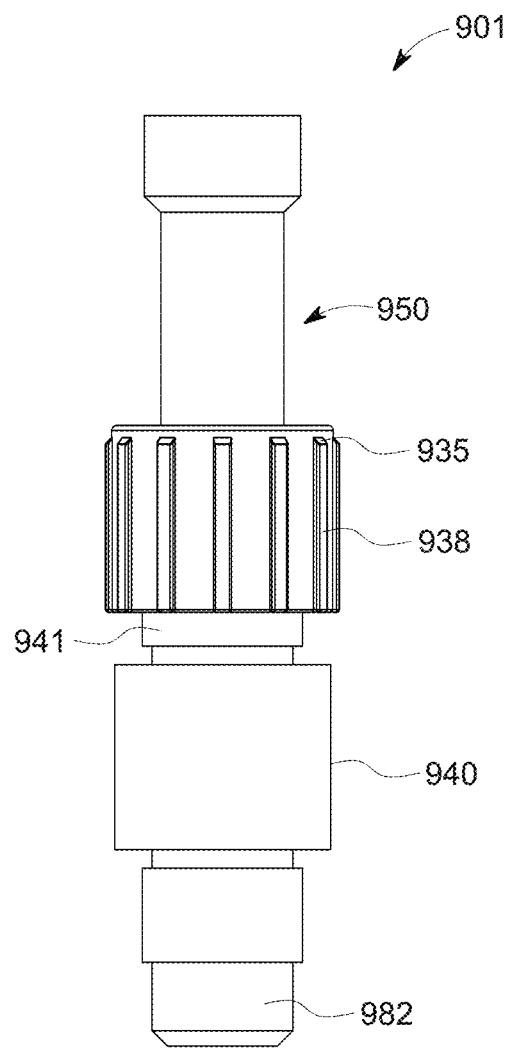
Figure 150:
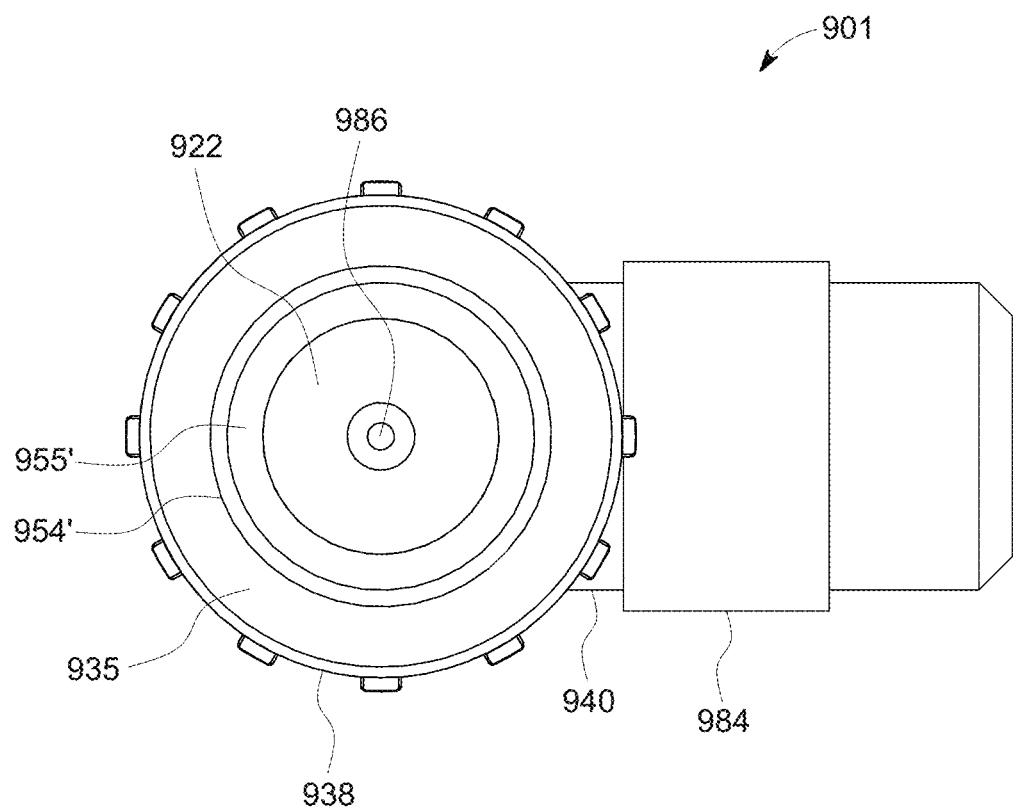
Figure 151:
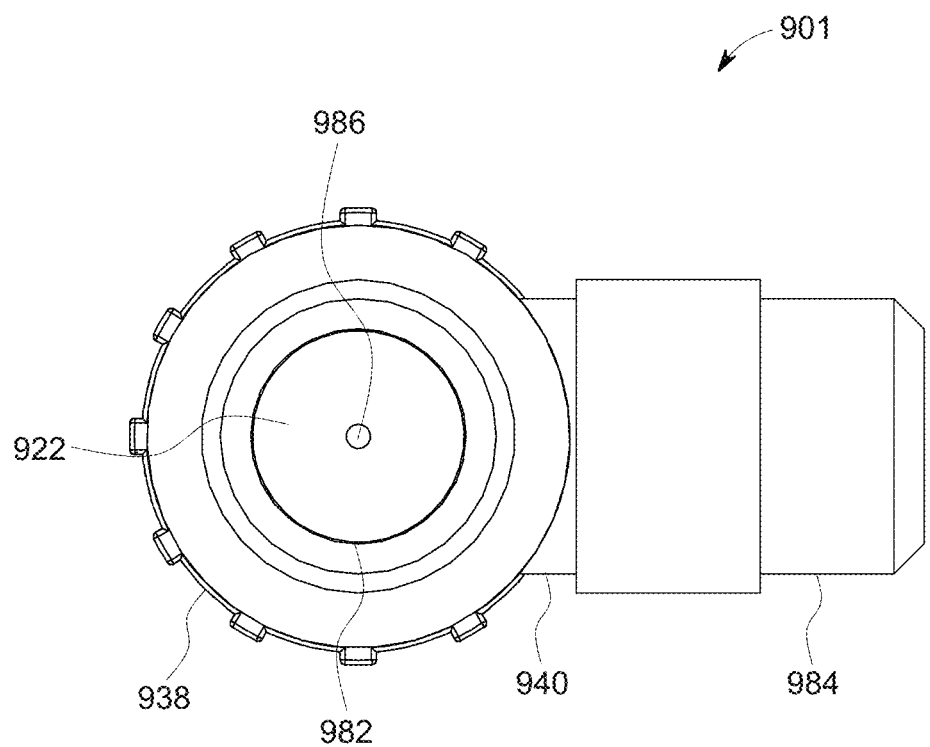
Figure 152:
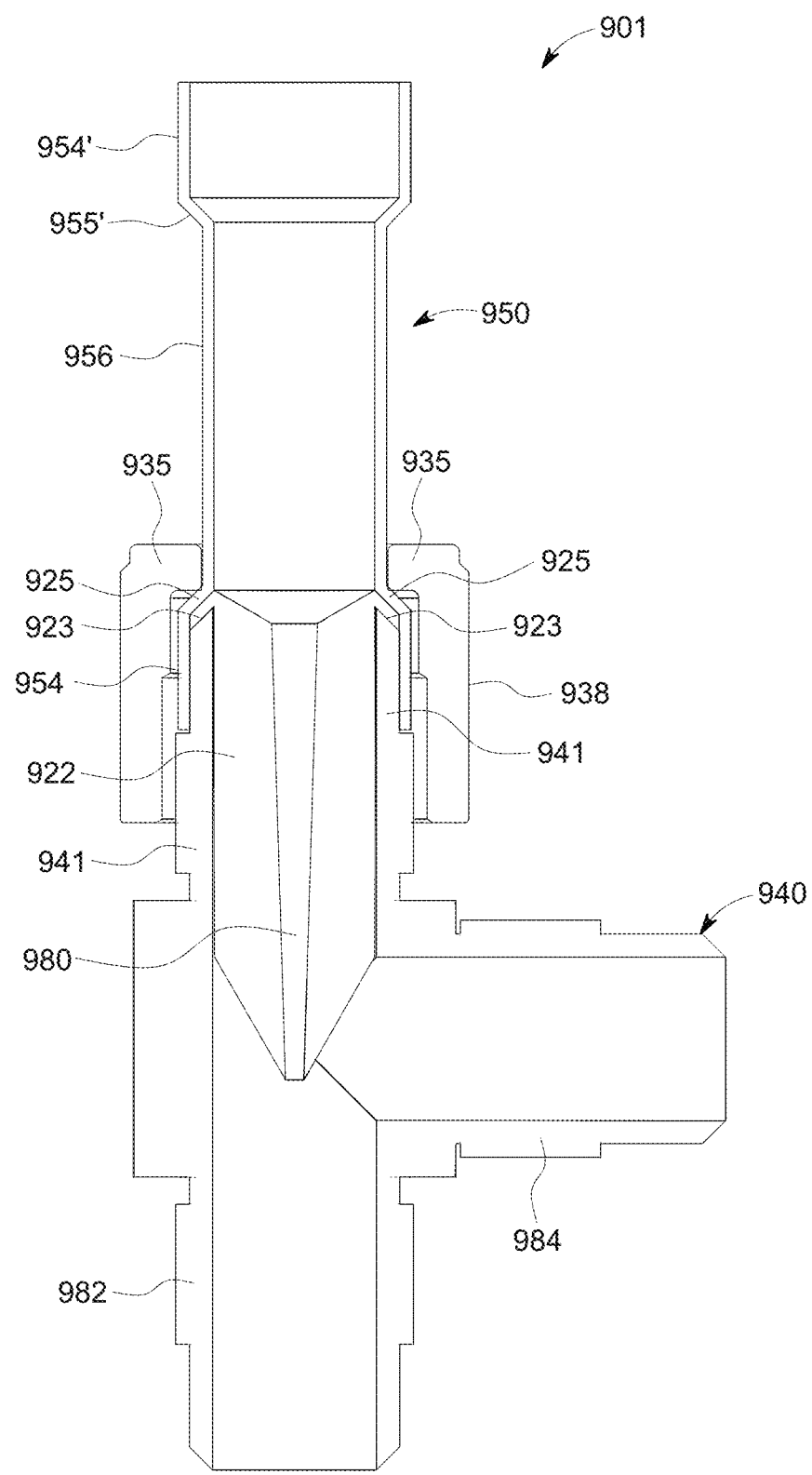
Figure 153:
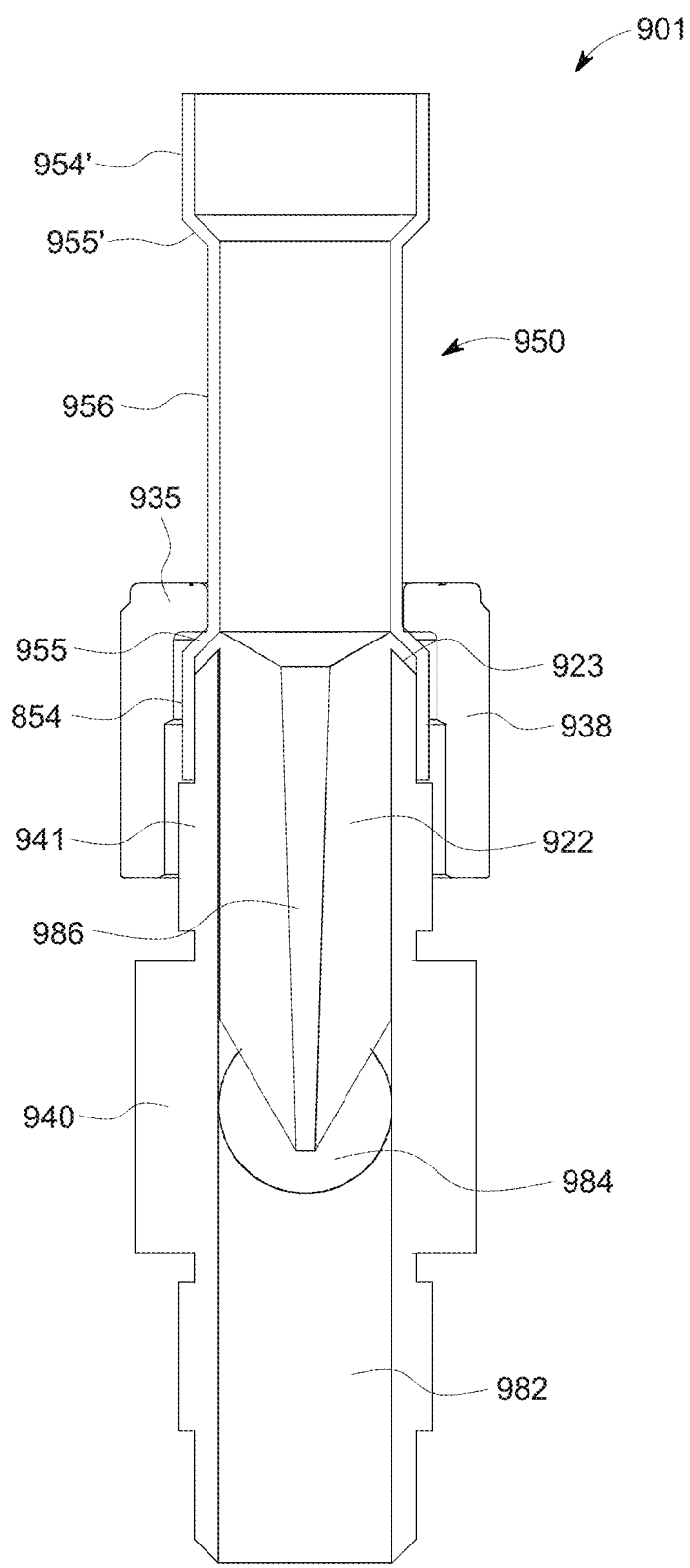
Figure 154:
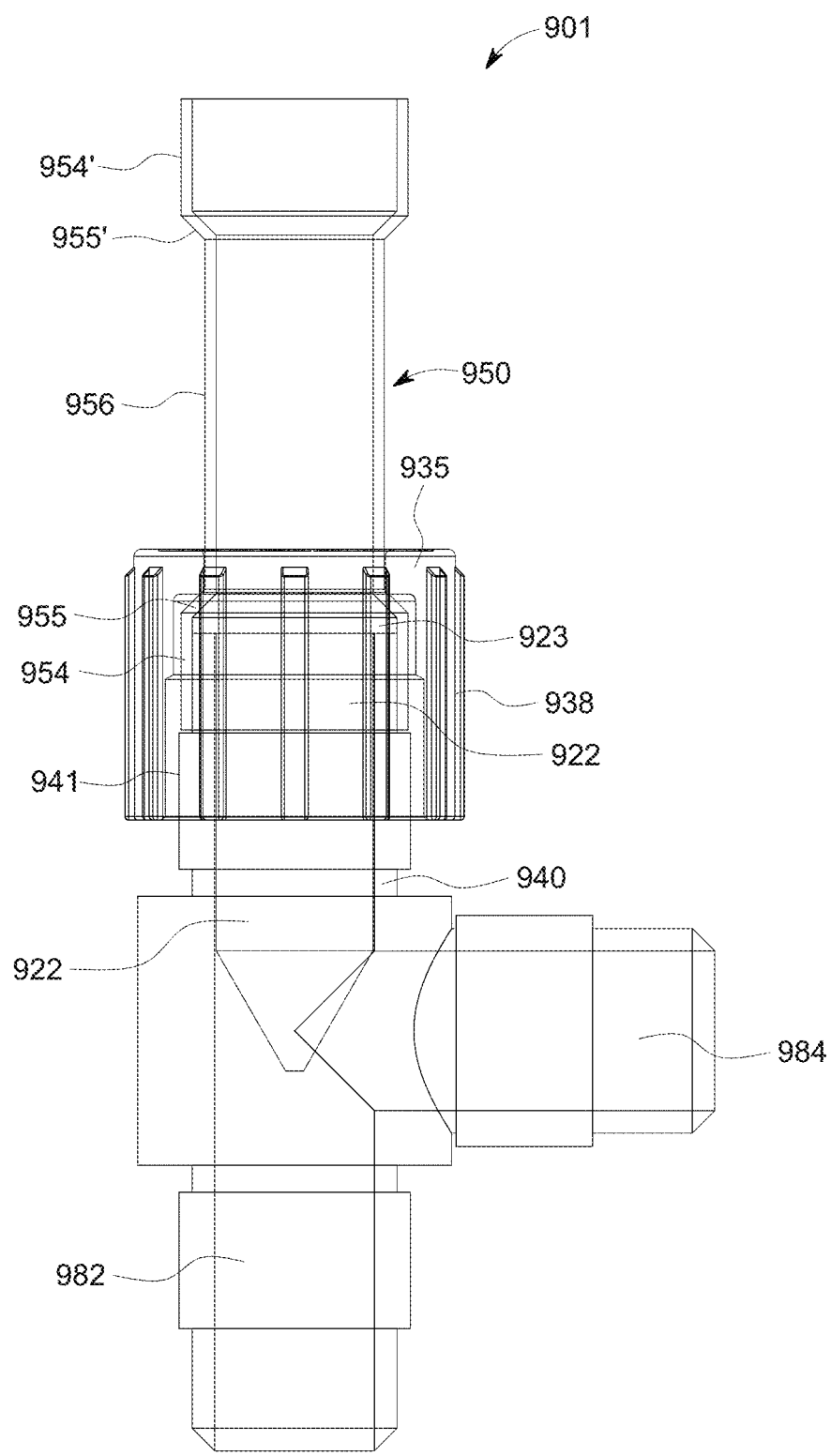
Figure 155:
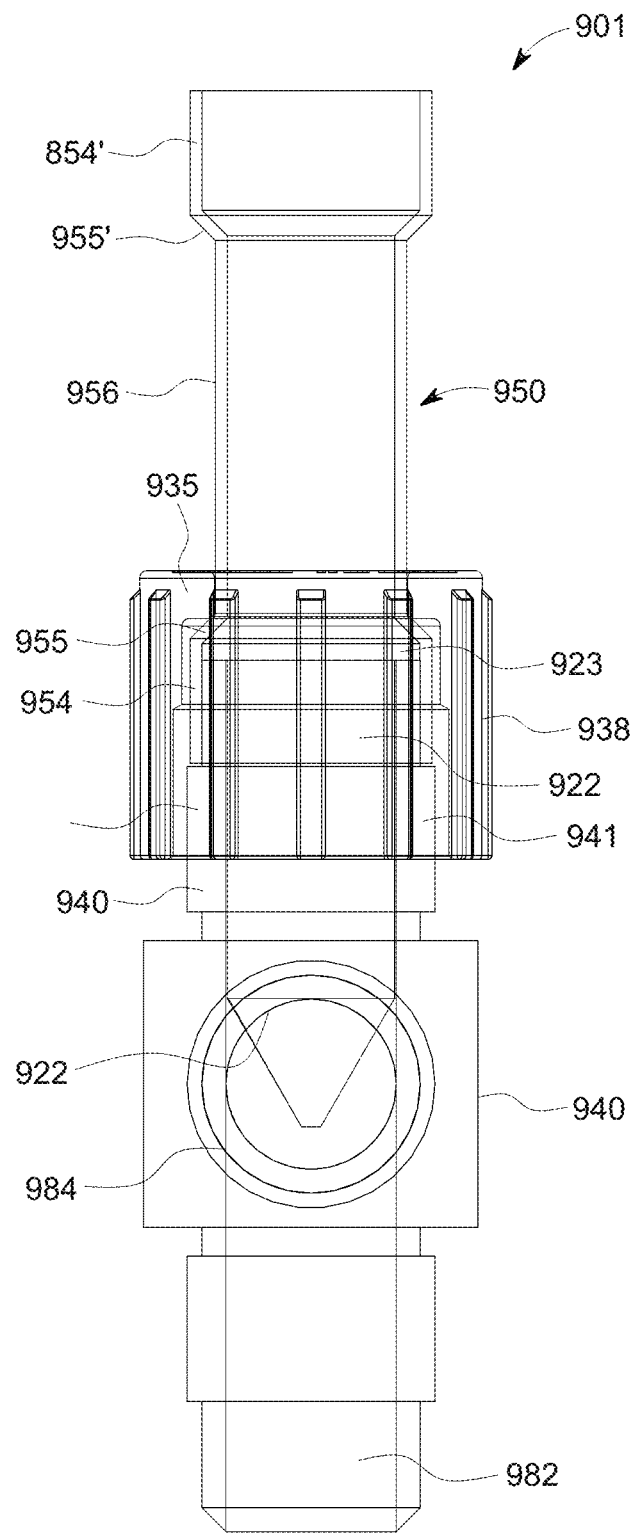
Figure 156:
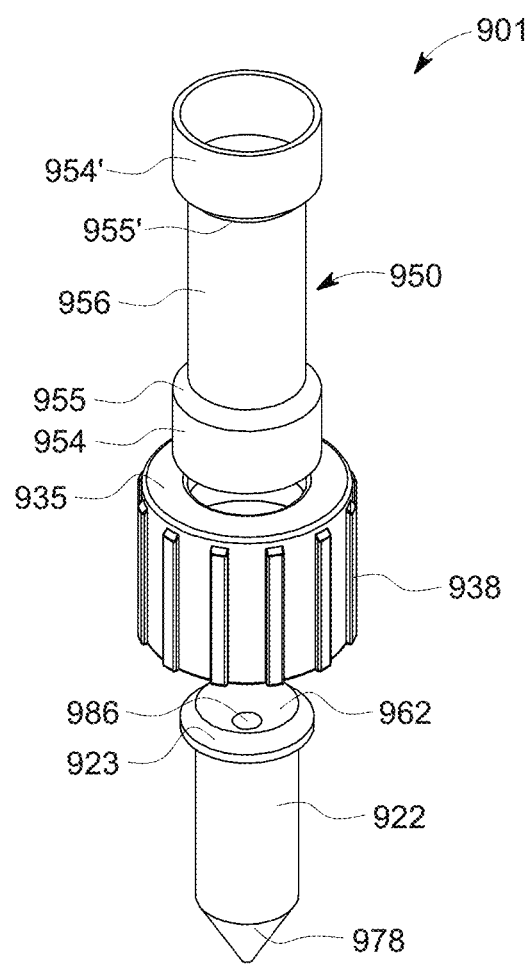
Figure 156:
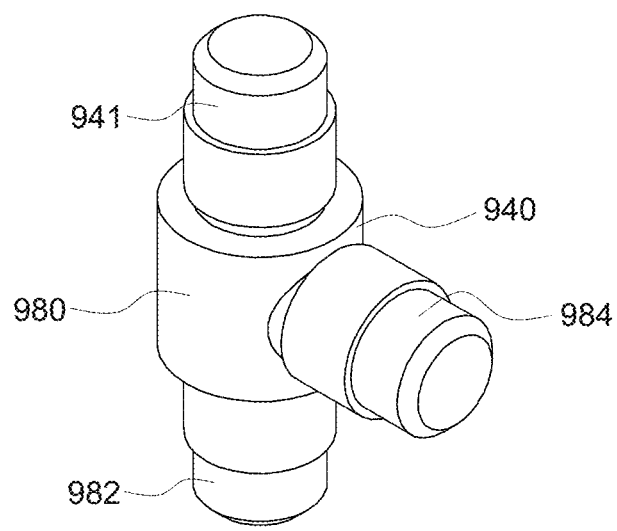
Figure 157:
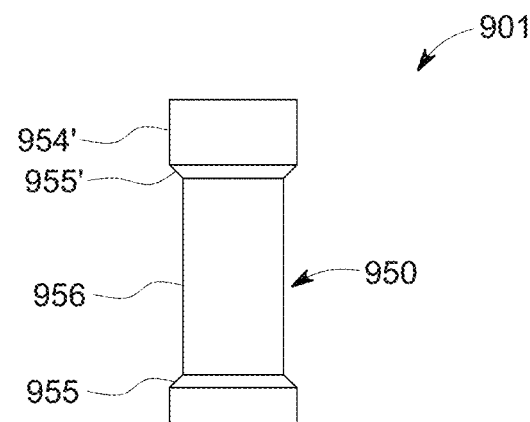
Figure 157:
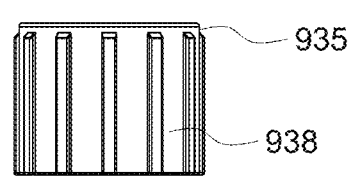
Figure 157:
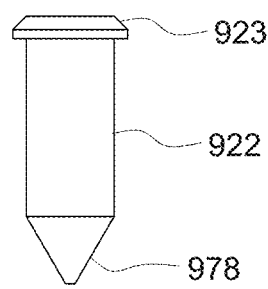
Figure 157:
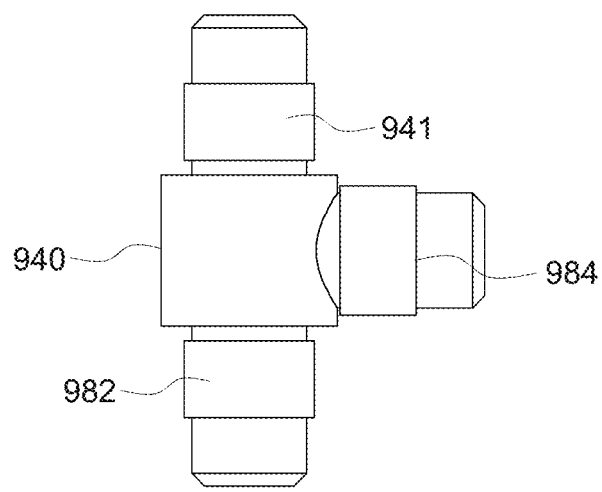
Figure 158:
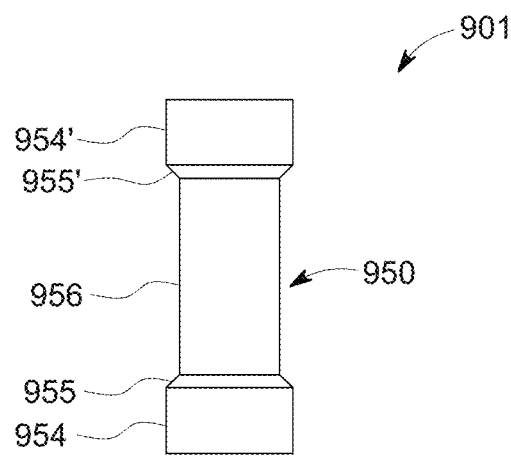
Figure 158:
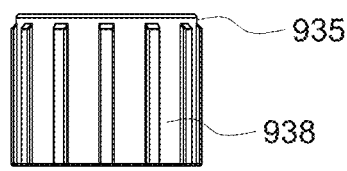
Figure 158:
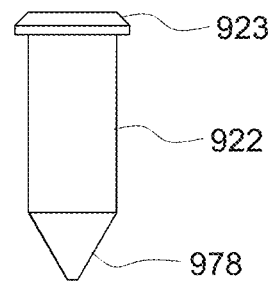
Figure 158:
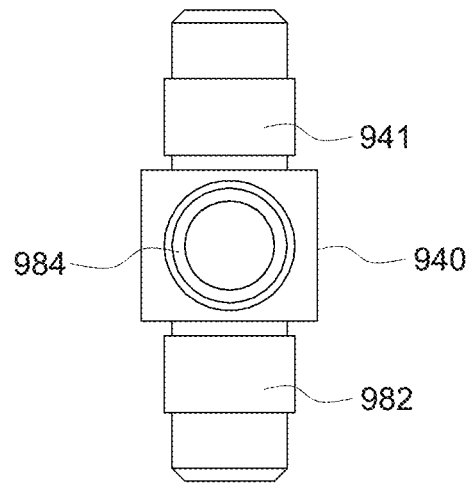
Figure 159:
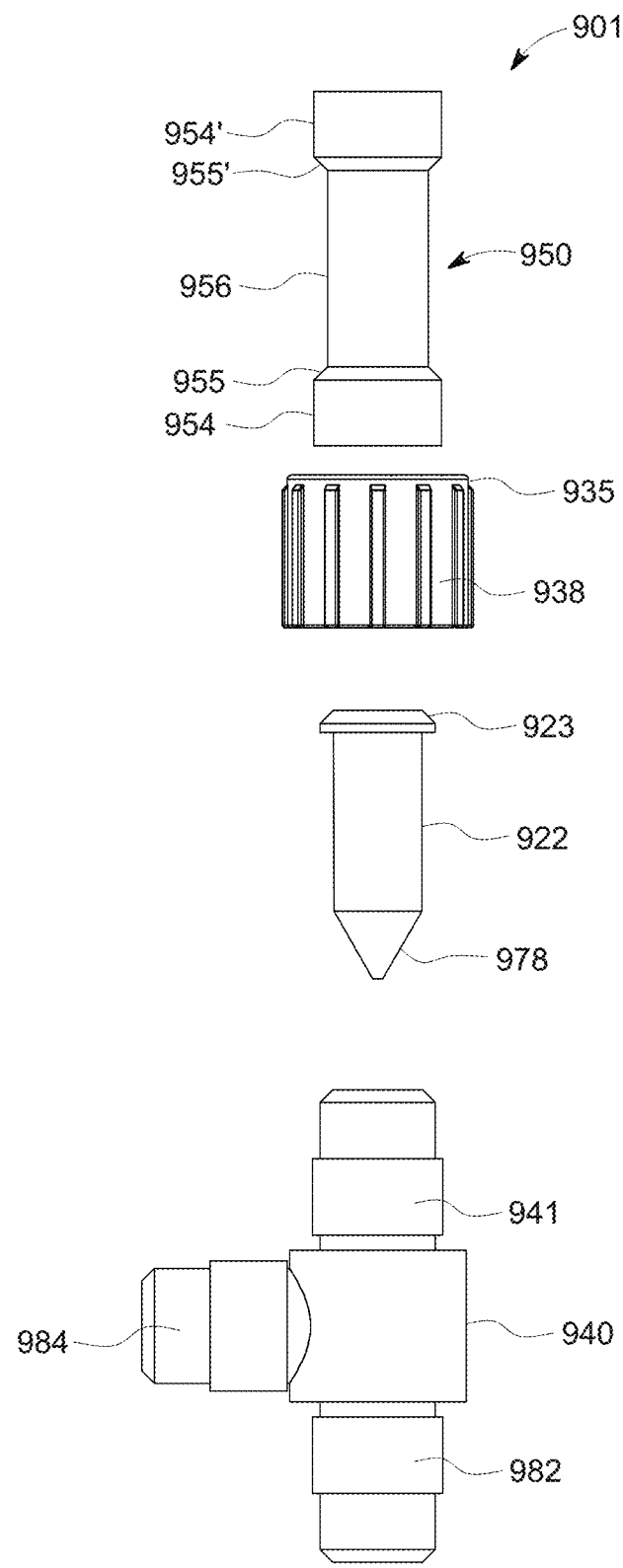
Figure 160:
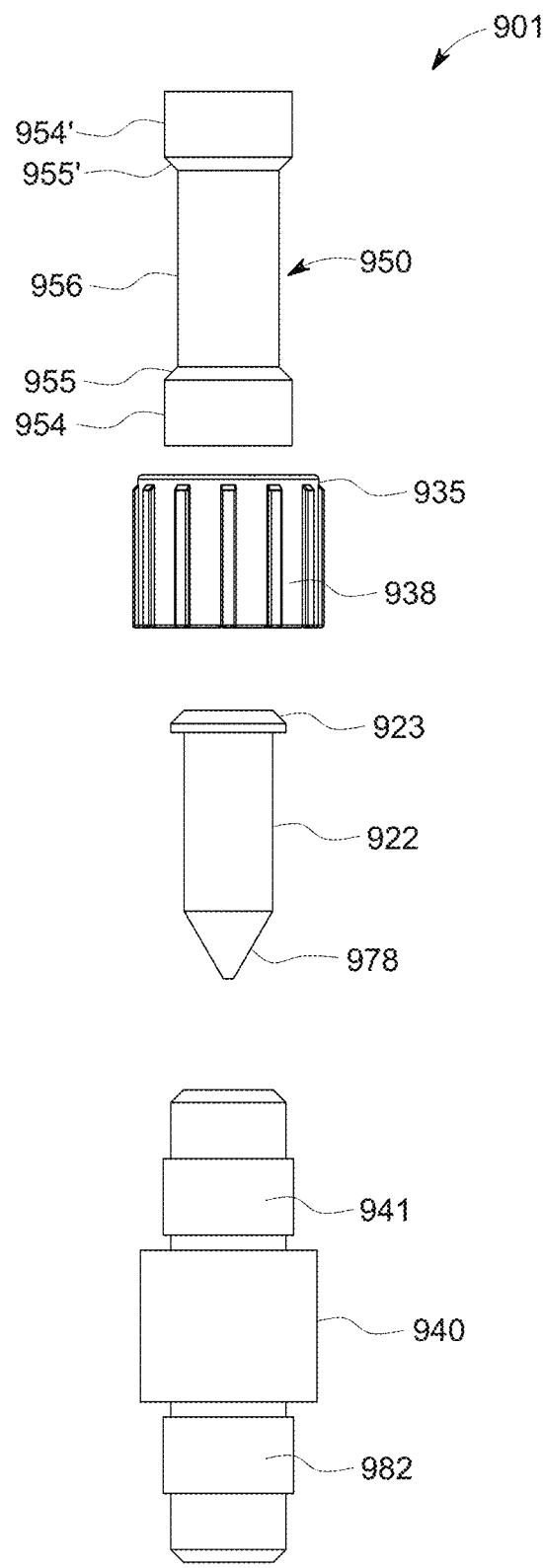

FIG. 131 is a right side view of the exemplary insertion fitting of FIG. 129, in accordance with an aspect of the present disclosure;

FIG. 132 is a back view of the exemplary insertion fitting of FIG. 129, in accordance with an aspect of the present disclosure;

FIG. 133 is a left side view of the exemplary insertion fitting of FIG. 129, in accordance with an aspect of the present disclosure;

FIG. 134 is a top view of the exemplary insertion fitting of FIG. 129, in accordance with an aspect of the present disclosure;

FIG. 135 is a bottom view of the exemplary insertion fitting of FIG. 129, in accordance with an aspect of the present disclosure;

FIG. 136 is a right side cross-sectional view of the exemplary insertion fitting of FIG. 129, in accordance with an aspect of the present disclosure;

FIG. 137 is a front cross-sectional view of the exemplary insertion fitting of FIG. 129, in accordance with an aspect of the present disclosure;

FIG. 138 is a left side transparent view of the exemplary insertion fitting of FIG. 129, in accordance with an aspect of the present disclosure;

FIG. 139 is a front transparent view of the exemplary insertion fitting of FIG. 129, in accordance with an aspect of the present disclosure;

FIG. 140 is an elevational perspective exploded view of the exemplary insertion fitting of FIG. 129, in accordance with an aspect of the present disclosure;

FIG. 141 is a right side exploded view of the exemplary insertion fitting of FIG. 129, in accordance with an aspect of the present disclosure;

FIG. 142 is a front exploded view of the exemplary insertion fitting of FIG. 129, in accordance with an aspect of the present disclosure;

FIG. 143 is a left side exploded view of the exemplary insertion fitting of FIG. 129, in accordance with an aspect of the present disclosure;

FIG. 144 is a back exploded view of the exemplary insertion fitting of FIG. 129, in accordance with an aspect of the present disclosure;

FIG. 145 is an elevational perspective view of another exemplary insertion fitting, in accordance with an aspect of the present disclosure;

FIG. 146 is a front view of the exemplary insertion fitting of FIG. 129, in accordance with an aspect of the present disclosure;

FIG. 147 is a right side view of the exemplary insertion fitting of FIG. 129, in accordance with an aspect of the present disclosure;

FIG. 148 is a back view of the exemplary insertion fitting of FIG. 129, in accordance with an aspect of the present disclosure;

FIG. 149 is a left side view of the exemplary insertion fitting of FIG. 129, in accordance with an aspect of the present disclosure;

FIG. 150 is a top view of the exemplary insertion fitting of FIG. 129, in accordance with an aspect of the present disclosure;

FIG. 151 is a bottom view of the exemplary insertion fitting of FIG. 129, in accordance with an aspect of the present disclosure;

FIG. 152 is a right side cross-sectional view of the exemplary insertion fitting of FIG. 129, in accordance with an aspect of the present disclosure;

FIG. 153 is a front cross-sectional view of the exemplary insertion fitting of FIG. 129, in accordance with an aspect of the present disclosure;

FIG. 154 is a left side transparent view of the exemplary insertion fitting of FIG. 129, in accordance with an aspect of the present disclosure;

FIG. 155 is a front transparent view of the exemplary insertion fitting of FIG. 129, in accordance with an aspect of the present disclosure;

FIG. 156 is an elevational perspective exploded view of the exemplary insertion fitting of FIG. 129, in accordance with an aspect of the present disclosure;

FIG. 157 is a right side exploded view of the exemplary insertion fitting of FIG. 129, in accordance with an aspect of the present disclosure;

FIG. 158 is a front exploded view of the exemplary insertion fitting of FIG. 129, in accordance with an aspect of the present disclosure;

FIG. 159 is a left side exploded view of the exemplary insertion fitting of FIG. 129, in accordance with an aspect of the present disclosure; and FIG. 160 is a back exploded view of the exemplary insertion fitting of FIG. 129, in accordance with an aspect of the present disclosure.

DETAILED DESCRIPTION

Generally stated, disclosed herein are insertion fitting devices for providing a transitional connection to existing fitting structures, such as for use in high purity and ultrahigh purity piping and tubing applications. Further, methods using the insertion fitting devices are discussed.

Referring to the drawings, wherein like reference numerals are used to indicate like or analogous components throughout the several views, and with particular reference to FIGS. 1-16, there is illustrated an exemplary embodiment of an insertion fitting device 1 (or simply an "insertion fitting") that is configured to provide a transitional connection structure to existing fittings (e.g., s Flare, Pillar, Primlock or other type of existing fittings) without modifying the structure of the base fitting and/or the fitting's designed process enhancements. The insertion fitting 1 creates an insertable transition to standard fittings. The insertion fitting 1 may be, for example, a fitting 1 for use with high purity and ultrahigh purity piping and tubing applications. The fitting 1 is configured to couple to fluoro polymer native material process fitting systems, if desired. The fluoro polymer may be, for example, PFA, PVDF, FEP or another fluorinated polymer.

As shown in FIGS. 1-16, the insertion fitting 1 is configured as a quick disconnect/connect check valve coupling. As shown, the coupling fitting 1 includes a pair of mating fitting assemblies that can be quickly and easily coupled (e.g., via insertion of one assembly into the other assembly) and decoupled, and that normally allow a fluid (liquid or gas) to flow through it when coupled together and potentially in only one direction.

A first assembly (which may be a male-type assembly) of the coupling fitting 1 may include a first (or male) check valve body 14 with an inner through hole/flowpath extending therethrough. In some embodiments, the inner diameter or size of the inner through hole/flowpath and/or the exterior surfaces(s) of a proximal portion of the first check valve body 14 may be the same or greater that of a distal portion of the first check valve body 14. The through hole/flowpath of the check valve body 14 includes a first check retainer 16, a first check spring 18 and a first check or closing member 20 coupled therein, as shown in FIGS. 1-16. The first check retainer 16 may be fixedly coupled within a proximal portion of the first check valve body 14, the first check spring 18 may abut and be positioned adjacent to the first check retainer 16 distally of the first check retainer 16 within the first check valve body 14, and the first check member 20 may abut and be positioned adjacent to the first check spring 18 distal of the first check spring 18 within the first check valve body 14. The first check retainer 16 and the first check spring 18 may be configured to normally resiliently bias the first check member 20 against a distal narrowed seat within an end portion of the flowpath of the first check valve body 14. In some embodiments, the first check member 20 may include an O-ring other sealing member coupled thereto that may abut the seat of the first check retainer 16. The first check spring 18 may thereby be trapped between the first check retainer 16 and the seat of the first check valve body 14 within the first check valve body 14. The first check spring 18 and the first check retainer 16 may be annular such that they define an opening or through hole that allows a fluid flowing through the flowpath of the first check retainer 16 to flow therethrough.

The seat of the first check valve body 14 and the first check member 20 are configured such that when the first check member 20 is seated against the seat of the first check valve body 14, the flowpath through the first check valve body 14 is blocked off or closed, and when the first check member 20 is moved or translated proximally within the flowpath of the first check valve body 14 against the first check spring 18 (thereby compressing the first check spring 18) a gap between the first check member 20 and the seat is created that allows a fluid to flow therebetween and between one or more spaces or gaps between the outer periphery of the first check member 20 and the inner side wall of the first check valve body 14 (and thus through the flowpath of the first check valve body 14). The first check member 20 may be forced proximally against the force of the first check spring 18 to "open" the first check member 20/flowpath of the first check valve body 14 via a flow of fluid flowing distally-to-proximally against the distal side of the first check member 20, and/or the insertion of the first check valve body 14 within a through opening of a second (or female) check valve body 22 (i.e., the two assemblies of the coupling fitting 1) as explained further below. The first check member 20 is configured such that it (e.g., a tapered portion thereof) extends past the distal end of the first check valve body 14 in the "closed" and "open" positions thereof, as shown in FIGS. 8-11.

The first check valve body 14 may further include an external flange or projection 15 extending radially outwardly from therefrom and at least partially circumferentially thereabout, as shown in FIGS. 1-16. In some embodiments, the external flange 15 may be circumferential and/or extend on a distal-to-proximal angle as it extends outwardly, as shown in FIGS. 1-16. In some other embodiments, the external flange 15 may extend straight outwardly perpendicular to the flowpath and axis of the first check valve body 14. In some embodiments, the flange 15 may extend from a rim or expanded outer portion of the first check valve body 14. The first check valve body 14 and the second check valve body 22 may be configured such that the rim or expanded outer portion of the first check valve body 14 mates against the proximal end of the second check valve body 22 when the first check valve body 14 is inserted within the opening of the second check valve body 22.

As also shown in FIGS. 1-16, the first assembly of the coupling fitting 1 may further include a first nut (or flare nut) 12 and a first coupler 10 coupled to the exterior of the first check valve body 14. The first nut 12 may include a through hole and a rim 13 at a distal end portion. The first nut 12 and the first check valve body 14 are configured such that first check valve body 14 extends through the through hole of the first nut 12, and the rim 13 of the first nut 12 engages or seats against the distal side of the flange 15 of the first check valve body 14. In some embodiments, an inner side wall of the rim 13 or another distal portion of the first nut 12 also engages or abuts the outer side wall of the first check valve body 14 distal to the flange 15. Further, a proximal portion of the first nut 12 may be spaced from the exterior surface of the first check valve body 14 such that a gap or opening is formed therebetween.

As further shown in FIGS. 1-16, the first coupler 10 may include a through hole that forms a flowpath, and a distal stem portion 11 that is configured to extend within the through hole of the first nut 12 and over the proximal portion of the first check valve body 14 (i.e., within the gap between the first nut 12 the first check valve body 14). The first coupler 10 and the first check valve body 14 are configured such a distal end of the stem portion 11 of the first coupler 10 engages or seats against the proximal side of the flange 15 of the first check valve body 14 when the stem portion 11 of the first coupler 10 is fully seated or positioned on the first check valve body 14. The distal end of the stem portion 11 of the first coupler 10 may be angled or perpendicular (or otherwise oriented) to match the orientation/configuration of the proximal side of the flange 15 of the first check valve body 14.

The inner side of the proximal portion of the first nut 12 and the exterior surface of the stem portion 11 of the first coupler 10 may be securely (and potentially removably) coupled together. In some embodiments (not shown), the inner side of the proximal portion of the first nut 12 may include interior threads, and the exterior surface of the stem portion 11 of the first coupler 10 may include exterior threads that threadably engage with the threads of the first nut 12 such that rotation of the first nut 12 (over/about the first check valve body 14) in a first rotational direction draws the distal end of the stem portion 11 of the first coupler 10 proximally against the proximal side of the flange 15 of the first check valve body 14 such that the flange 15 is retained and compressed between the rim 13 of the first nut 12 and the distal end of the stem portion of the first coupler 10. The first nut 12, the first coupler 10 and the first check valve body 14 may thereby be securely coupled together. In some other embodiments, the inner side of the proximal portion of the first nut 12 and the exterior surface of the stem portion 11 of the first coupler 10 may be configured to form a compression or friction fit to retain the flange 15 between the rim 13 and the distal end of the stem portion 11 to couple the first nut 12, the first coupler 10 and the first check valve body 14 together. In some other embodiments, the inner side of the proximal portion of the first nut 12 and the exterior surface of the stem portion 11 of the first coupler 10 may be otherwise securely (and potentially removably) coupled together.

The first coupler 10 may be configured to couple to a tube, pipe or other flowpath source member to couple the first assembly of the coupling fitting 1 thereto and direct a flow therefrom into the through hole of the first check valve body 14. In some embodiments, the source member may extend in and/or couple within the through hole of the proximal end portion of the first coupler 10. In some embodiments, the source member may extend in and/or couple with the exterior of the proximal end portion of the first coupler 10. In some embodiments, the first coupler 10 may form or comprise a portion of a pre-existing base fitting.

A second assembly (which may be a female-type assembly) of the coupling fitting 1 may include the second check valve body 22 with a flowpath extending therethrough that includes a second check retainer 28, a second check spring 36 and a second check or closing member 34 coupled therein, as shown in FIGS. 1-16. The second check retainer 28 may be fixedly coupled within a portion of the second check valve body 22, the second check spring 36 may abut and be positioned adjacent to a distal rim or narrow portion within the second check valve body 22 (distally of the second check retainer 28), and the second check member 34 may abut and be positioned between the second check spring 36 and the second check retainer 28 (proximally of the second check spring 36 and distally of the second check retainer 28) within the second check valve body 22. The second check valve body 22 and the second check spring 36 may be configured to normally resiliently bias the second check member 34 against the second check retainer 28 within the flowpath of the second check valve body 22. In some embodiments, the second check member 28 may include a first O-ring other sealing member 32 coupled to the distal side thereof that may abut the second check member 34. The second check spring 36 may thereby be trapped between the second check retainer 28/second check member 34 and the rim or narrow portion of within the second check valve body 22. The second check spring 36 and the second check retainer 28 may be annular such that they define an opening or through hole that allows a fluid flowing through the flowpath of the second check retainer 22 to flow therethrough.

The second check retainer 28 and the second check member 34 are configured such that when the second check member 34 is seated against the second check retainer 28 (e.g., the first O-ring or sealing member 32 thereof) within the second check valve body 22, the flowpath through the second check valve body 22 is blocked off or closed, and when the second check member 34 is moved or translated distally within the flowpath of the second check valve body 22 against the second check spring 36 (thereby compressing the second check spring 36) a gap between the second check member 34 and the seat is created that allows a fluid to flow therebetween and between one or more spaced or gaps between the outer periphery of the second check member 34 and the inner side wall of the first check valve body 14 (and thus through the flowpath of the second check valve body 22). The second check member 34 may be forced distally against the force of the second check spring 36 to "open" the flowpath of the second check valve body 22 via a flow of fluid flowing proximally-to-distally against the proximal side of the second check member 34, and/or the insertion of the first check valve body 14 within the through opening of the second check valve body 22.

The second check valve body 22 may further include an external flange or projection 23 extending radially outwardly from therefrom and at least partially circumferentially thereabout, as shown in FIGS. 1-16. In some embodiments, the external flange 23 may be circumferential and/or extend in a proximal-to-distal angle as it extends outwardly, as shown in FIGS. 1-16. In some other embodiments, the external flange 23 may extend straight outwardly perpendicular to the flowpath and axis of the second check valve body 22. In some embodiments, the flange 23 may extend from a rim or expanded outer portion of the second check valve body 22.

As also shown in FIGS. 1-16, the second assembly of the coupling fitting 1 may further include a second nut (or flare nut) 38 and a second coupler 40 coupled to the exterior of the second check valve body 22. The second nut 38 may include a through hole and a rim 35 at a proximal end portion. The second nut 38 and the second check valve body 22 are configured such that second check valve body 22 extends through the through hole of the second nut 38, and the rim 23 of the second nut 38 engages or seats against the proximal side of the flange 23 of the second check valve body 22. In some embodiments, an inner side wall of the rim 23 or another proximal portion of the second nut 38 also engages or abuts the outer side wall of the second check valve body 22 proximal to the flange 23. Further, a distal portion of the second nut 38 may be spaced from the exterior surface of the second check valve body 22 such that a gap or opening is formed therebetween.

As further shown in FIGS. 1-16, the second coupler 40 may include a through hole that forms a flowpath, and a proximal stem portion 41 that is configured to extend within the through hole of the second nut 38 and over the distal portion of the second check valve body 22 (i.e., within the gap between the second nut 38 the second check valve body 22). The second coupler 40 and the second check valve body 22 are configured such a proximal end of the stem portion 41 of the second coupler 40 engages or seats against the distal side of the flange 23 of the second check valve body 22 when the stem portion 41 of the second coupler 40 is fully seated or positioned on the second check valve body 22. The distal end of the stem portion 41 of the second coupler 10 may be angled or perpendicular (or otherwise oriented) to match the orientation/configuration of the proximal side of the flange 15 of the first check valve body 14.

The inner side of the proximal portion of the second nut 38 and the exterior surface of the stem portion 41 of the second coupler 40 may be securely (and potentially removably) coupled together. In some embodiments (not shown), the inner side of the distal portion of the second nut 38 may include interior threads, and the exterior surface of the stem portion 41 of the second coupler 40 may include exterior threads that threadably engage with the threads of the second nut 38 such that rotation of the second nut 38 (over/about the second check valve body 22) in a first rotational direction draws the proximal end of the stem portion 41 of the second coupler 40 distally against the distal side of the flange 23 of the second check valve body 22 such that the flange 23 is compressed between the rim 23 of the second nut 38 and the proximal end of the stem portion 41 of the second coupler 40. The second nut 38, the second coupler 40 and the second check valve body 22 may thereby be securely coupled together. In some other embodiments, the inner side of the distal portion of the second nut 38 and the exterior surface of the stem portion 41 of the second coupler 40 may be configured to form a compression or friction fit to couple the second nut 38, the second coupler 40 and the second check valve body 22 together. In some other embodiments, the inner side of the proximal portion of the second nut 38 and the exterior surface of the stem portion 41 of the second coupler 40 may be otherwise securely (and potentially removably) coupled together.

The second coupler 40 may be configured to couple to a tube, pipe or other flowpath source member to couple the first assembly of the coupling fitting 1 thereto and direct a flow therefrom into the through hole of the second check valve body 22. In some embodiments, the source member may extend in and/or couple within the through hole of the distal end portion of the second coupler 40. In some embodiments, the source member may extend in and/or couple with the exterior of the distal end portion of the second coupler 40. In some embodiments, the second coupler 40 may form or comprise a portion of a pre-existing base fitting.

In some embodiments, the inner diameter or size of the inner through hole/flowpath of the second coupler 40 (e.g., the entirety and/or at least the minimum diameter/size thereof) may be the same as that of the first coupler 40. Similarly, the inner diameter or size of the exterior of the second coupler 40 (e.g., the exterior of the proximal end portion and/or the stem portion 41) may be the same as that of the first coupler 40.

The first assembly of the coupling fitting 1 with the first check valve body 14 and the second assembly of the coupling fitting 1 with the second check valve body 22 may be coupled together via a lock grip or sleeve 24 and a lock clip or member 26, as shown in FIGS. 1-16. The lock sleeve 24 may include a through hole, and be positioned over/about the exterior of the second check valve body 22 proximally of the flange 23 thereof. The lock sleeve 24 may be freely rotatable and/or axially translatable over the exterior of the second check valve body 22. As shown in FIGS. 1-16, the lock sleeve 24 may include a lock slot or opening 25 that extends radially therethrough from the exterior surface to the through hole thereof. Similarly, the second check valve body 22 includes at least one lock slot or opening 21 that extends radially therethrough from the exterior surface to the through hole thereof (e.g., entirely through the side wall of the second check valve body 22) that is positioned proximally of the flange 23. The first check valve body 14 also includes at least one lock groove or opening 17 that extends radially partially therethrough from the exterior surface (e.g., partially through the side wall of the first check valve body 14) that is positioned distally of the flange 15. The lock clip 26 is configured to extend through the lock slot 25 of the lock sleeve 24, the one or more lock slot 21 of the second check valve body 22, and the at least one lock groove 17 of the first check valve body 14.

The lock sleeve 24, the second check valve body 22 and the first check valve body 14 are configured such that when the first check valve body 14 is fully/properly seated or positioned within the second check valve body 22, as shown in FIGS. 8-11, the lock slot 25 of the lock sleeve 24, the one or more lock slot 21 of the second check valve body 22, and the at least one lock groove 17 of the first check valve body 14 are axially aligned. When in such an aligned arrangement, the lock clip 26 may be positioned (such as via the rotational positioning lock sleeve 24) such that it extends through the lock slot 25 of the lock sleeve 24, through the one or more lock slot 21 of the second check valve body 22, and into the at least one lock groove 17 of the first check valve body 14 to securely couple the first and second assemblies of the coupling fitting 1 together.

In some embodiments, the lock clip 26 may comprise a ring portion that extends about the second check valve body 22, and the second check valve body 22 may include a pair of lock slots 21. The ring portion of the lock clip 26 may define at least one width that is less than the width of the exterior surface of the second check valve body 22. The oblong or irregular shape/configuration of the lock clip 26 may be configured such that the lock clip 26 can be rotated about/over the second check valve body 22, such as via rotation of the lock sleeve 24, such that the lock clip 26 extends through the pair of lock slots 21 of the second check valve body 22 and into the at least one lock groove 17 of the first check valve body 14 to securely couple the first and second assemblies of the coupling fitting 1 together, or rotated about/over the second check valve body 22, such as via rotation of the lock sleeve 24, such that the lock clip 26 does not extends through the pair of lock slots 21 of the second check valve body 22 and into the at least one lock groove 17 of the first check valve body 14 to decouple the first and second assemblies of the coupling fitting 1. In another embodiments, the ring portion may be shaped such that radial/lateral translation of the lock clip 26 moves the lock clip 26 into or out of the at least one lock groove 17 to selectively couple or decouple the first and second assemblies of the coupling fitting 1.

The first check valve body 14 and the second check valve body 22 may also be configured such that when the first check valve body 14 is fully/properly seated or positioned within the second check valve body 22, as shown in FIGS. 8-11, the first check member 20 and the second check member 34 engage and interact. This interaction of the first check member 20 and the second check member 34 moves the second check member 34 off the second check retainer 28 (to its "open" position) and moves the first check member 20 off the distal rim or narrow portion of the first check valve body 14 (to its "open" position). In this way, when the first check valve body 14 and the second check valve body 22 are fully/properly seated (and potentially locked via the lock clip 36), the first and second assemblies are "open" such that a fluid can flow through the flowpaths thereof and between the proximal end of the first coupler 10 and the distal end of the second coupler 40.

As shown in FIGS. 10-16, the exterior surface of a distal portion of the first check valve body 14 may include one or more seal grooves 19 that accept one or more O-rings or other sealing members 30 therein. The O-rings or other sealing members 30 may engage the interior surface of the through hole of the second check valve body 22 when the distal portion of the first check valve body 14 is positioned within through hole of the second check valve body 22 to seal the joint between the first check valve body 14 and the second check valve body 22. In some embodiments, the second check retainer 28 may include one or more seal grooves that accept one or more O-rings or other sealing members therein. For example, the proximal side of the second check retainer 28 may include at least one sealing member that engages the distal end of the first check valve body 14 when the first check valve body 14 is fully/properly seated or positioned within the second check valve body 22 to seal the joint therebetween. As another example, the distal side of the second check retainer 28 may include at least one sealing member that engages the second check member 34 when the second check member 34 is in the "closed" position to seal the joint therebetween.

Referring now to FIGS. 17-32, an exemplary embodiment of an insertion fitting device 101 is shown. The insertion fitting device 101 is similar to the insertion fitting device 1, and therefore like reference numerals preceded with "1" are used to indicate like components, portions, aspects, features and functions, and the description above directed thereto (including any alternative embodiments thereof) equally applies to the insertion fitting device 101 and is not repeated hereinbelow only for brevity sake.

As shown in FIGS. 17-32, the insertion fitting 101 is configured as a quick disconnect/connect check valve coupling. As shown, the coupling fitting 101 includes a pair of mating fitting assemblies that can be quickly and easily coupled (e.g., via insertion of one assembly into the other assembly) and decoupled, and that normally allow a fluid (liquid or gas) to flow through it when coupled together and potentially in only one direction.

Figure 1:
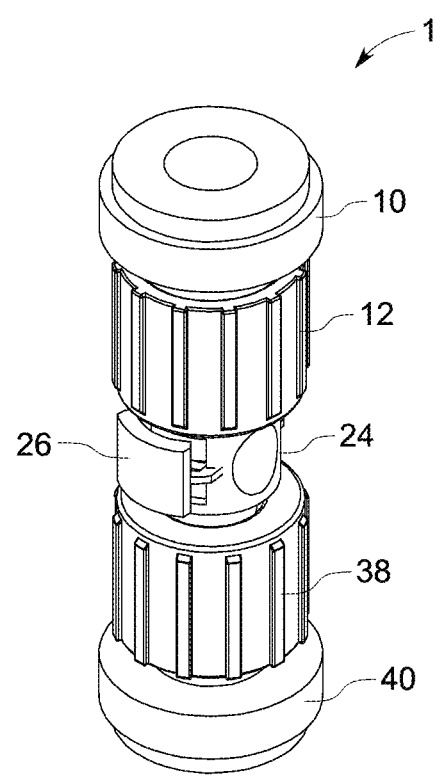
FIG. 1 is an elevational perspective view of an exemplary insertion coupling/fitting, in accordance with an aspect of the present disclosure.
Figure 2:
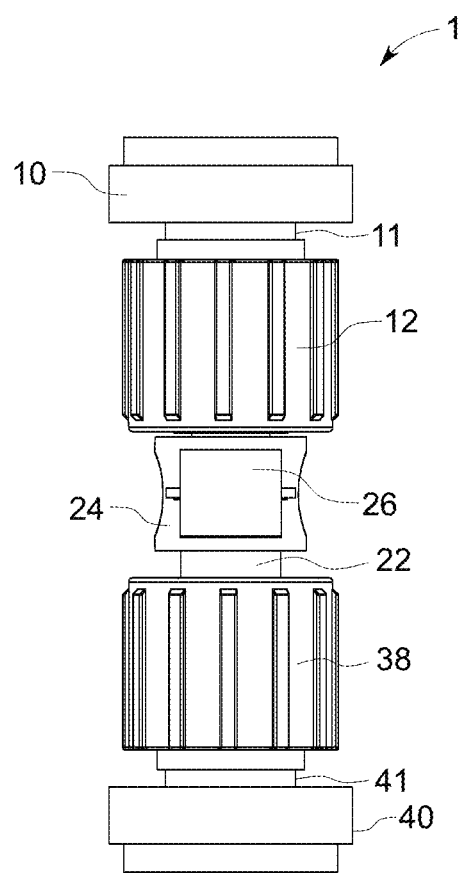
FIG. 2 is a front view of the exemplary insertion coupling/fitting of FIG. 1, in accordance with an aspect of the present disclosure.
Figure 3:
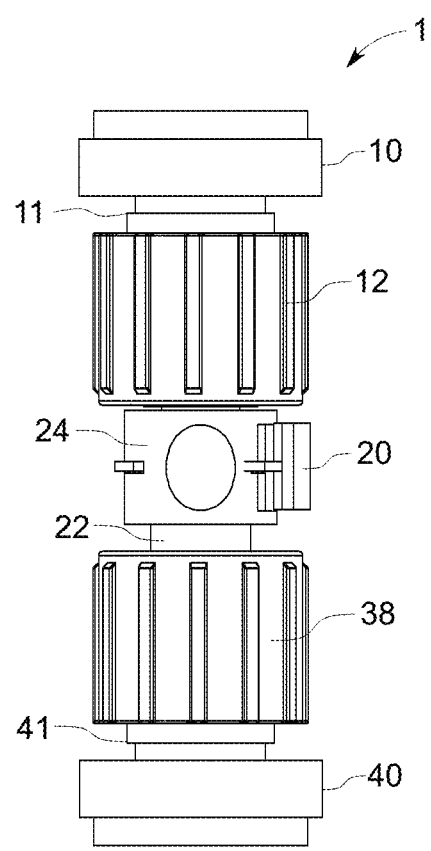
FIG. 3 is a right side view of the exemplary insertion coupling/fitting of FIG. 1, in accordance with an aspect of the present disclosure.
Figure 4:
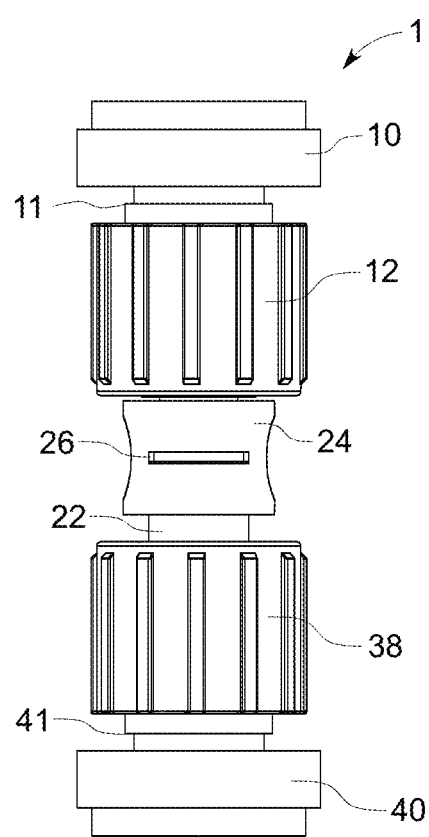
FIG. 4 is a back view of the exemplary insertion coupling/fitting of FIG. 1, in accordance with an aspect of the present disclosure.
Figure 5:
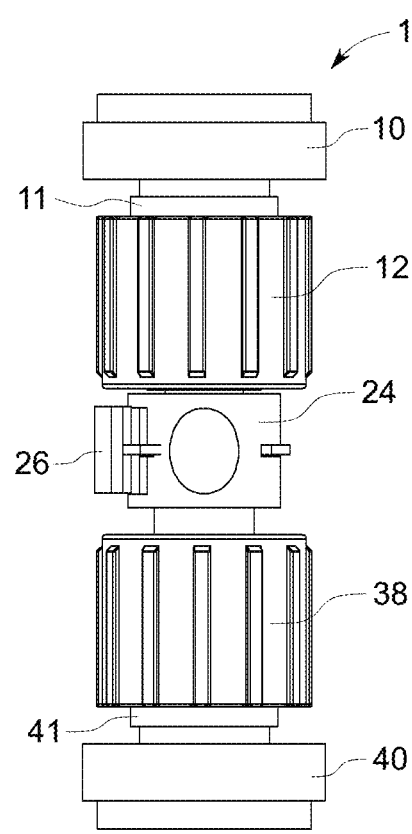
FIG. 5 is a left side view of the exemplary insertion coupling/fitting of FIG. 1, in accordance with an aspect of the present disclosure.
Figure 6:
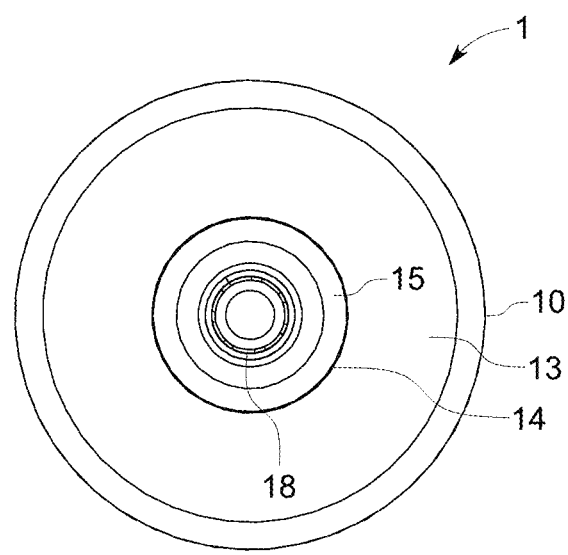
FIG. 6 is a top view of the exemplary insertion coupling/fitting of FIG. 1, in accordance with an aspect of the present disclosure.
Figure 7:
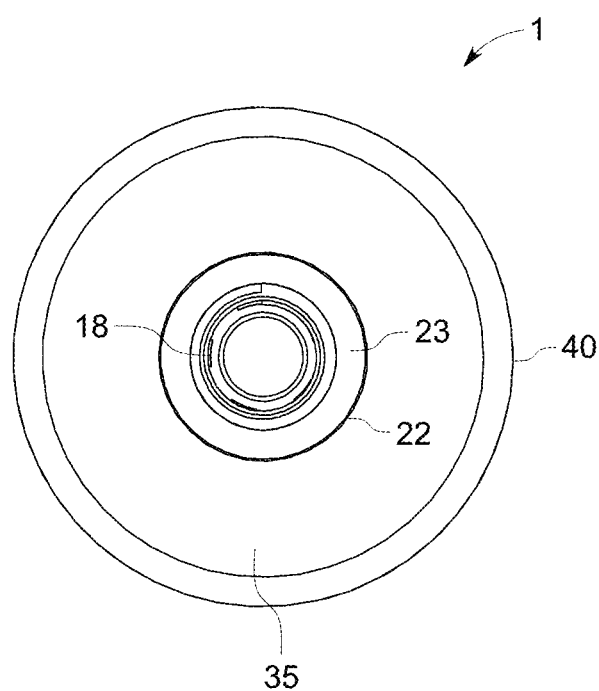
FIG. 7 is a bottom view of the exemplary insertion coupling/fitting of FIG. 1, in accordance with an aspect of the present disclosure.
Figure 8:
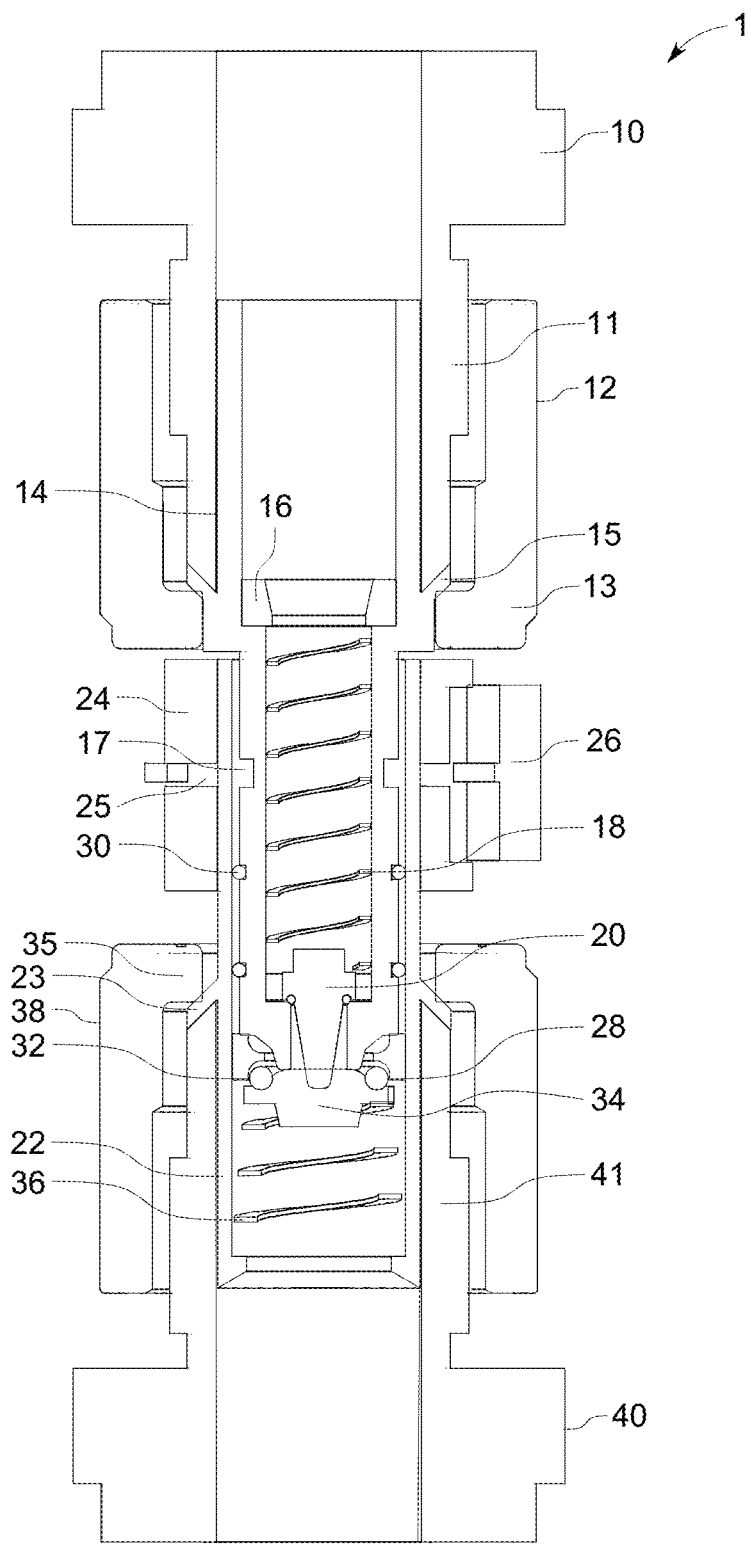
FIG. 8 is a right side cross-sectional view of the exemplary insertion coupling/fitting of FIG. 1, in accordance with an aspect of the present disclosure.
Figure 9:
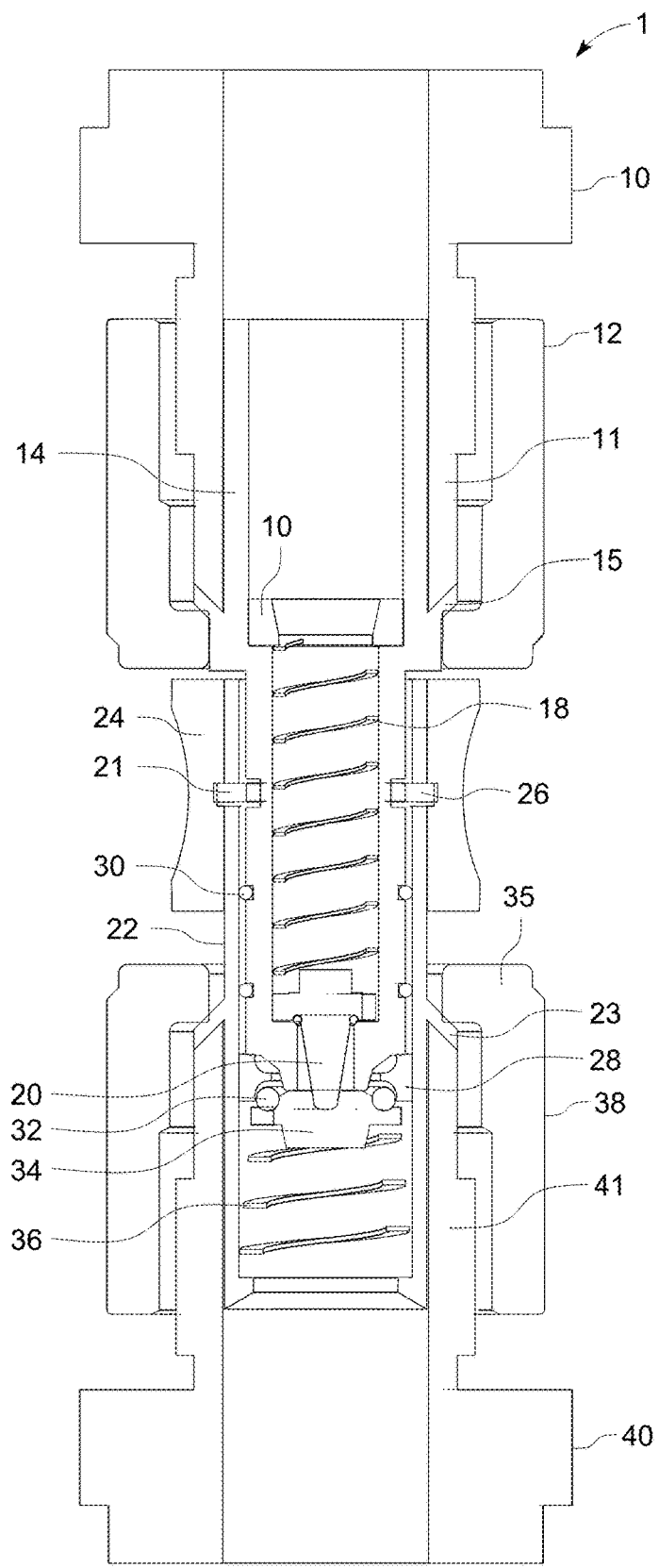
FIG. 9 is a front cross-sectional view of the exemplary insertion coupling/fitting of FIG. 1, in accordance with an aspect of the present disclosure.
Figure 10:
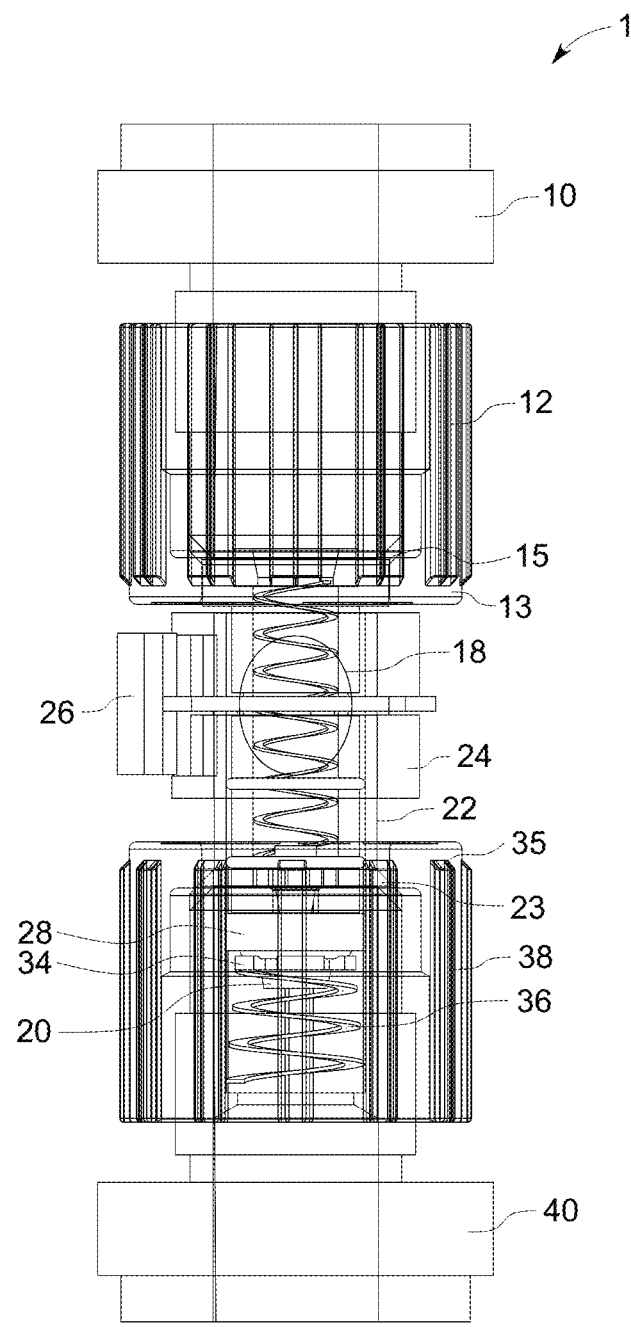
FIG. 10 is a left side transparent view of the exemplary insertion coupling/fitting of FIG. 1, in accordance with an aspect of the present disclosure.
Figure 11:
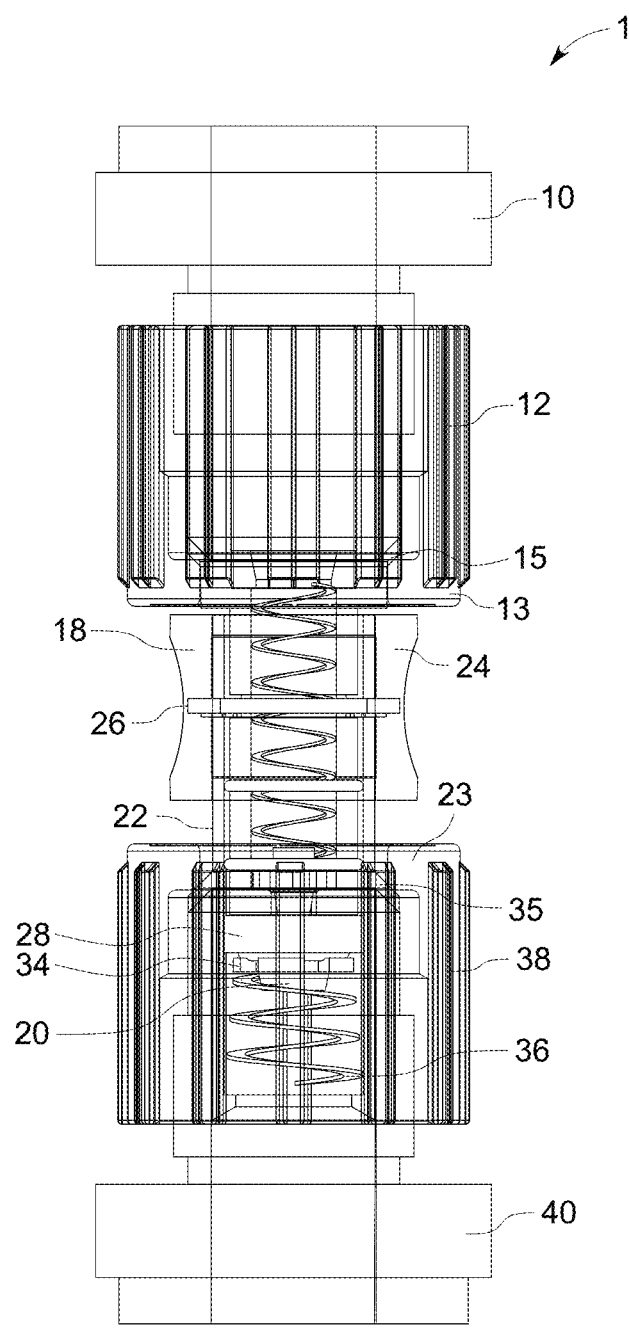
FIG. 11 is a front transparent view of the exemplary insertion coupling/fitting of FIG. 1, in accordance with an aspect of the present disclosure.
Figure 12:
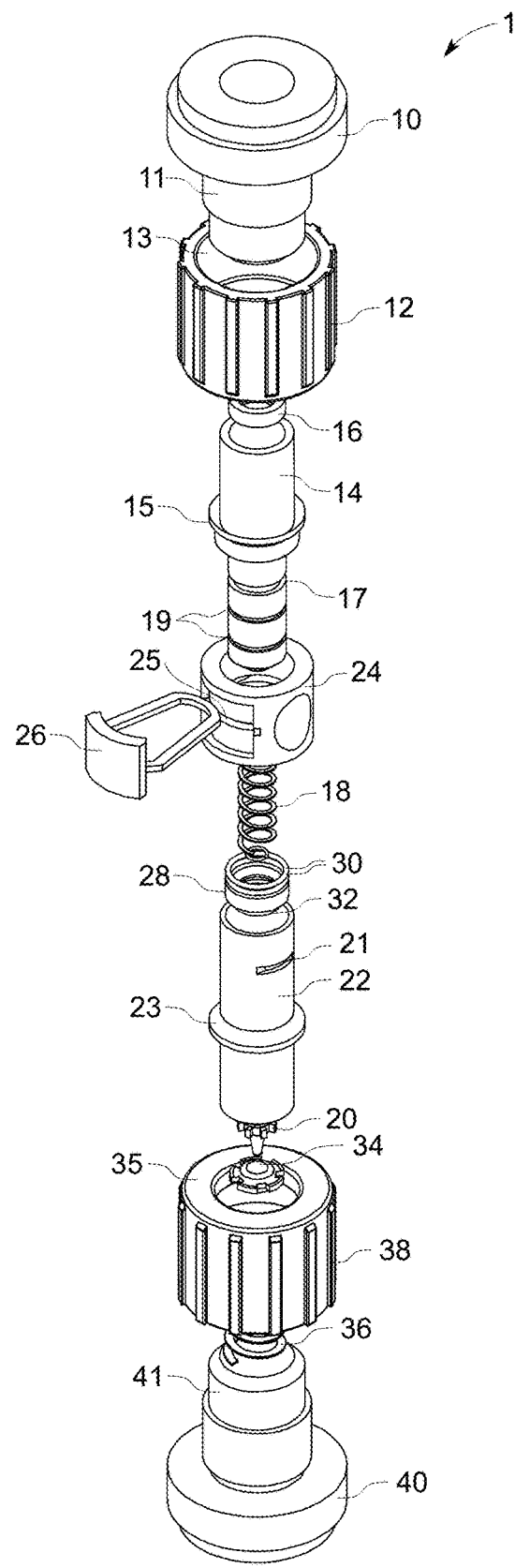
FIG. 12 is an elevational perspective exploded view of the exemplary insertion coupling/fitting of FIG. 1, in accordance with an aspect of the present disclosure.
Figure 13:
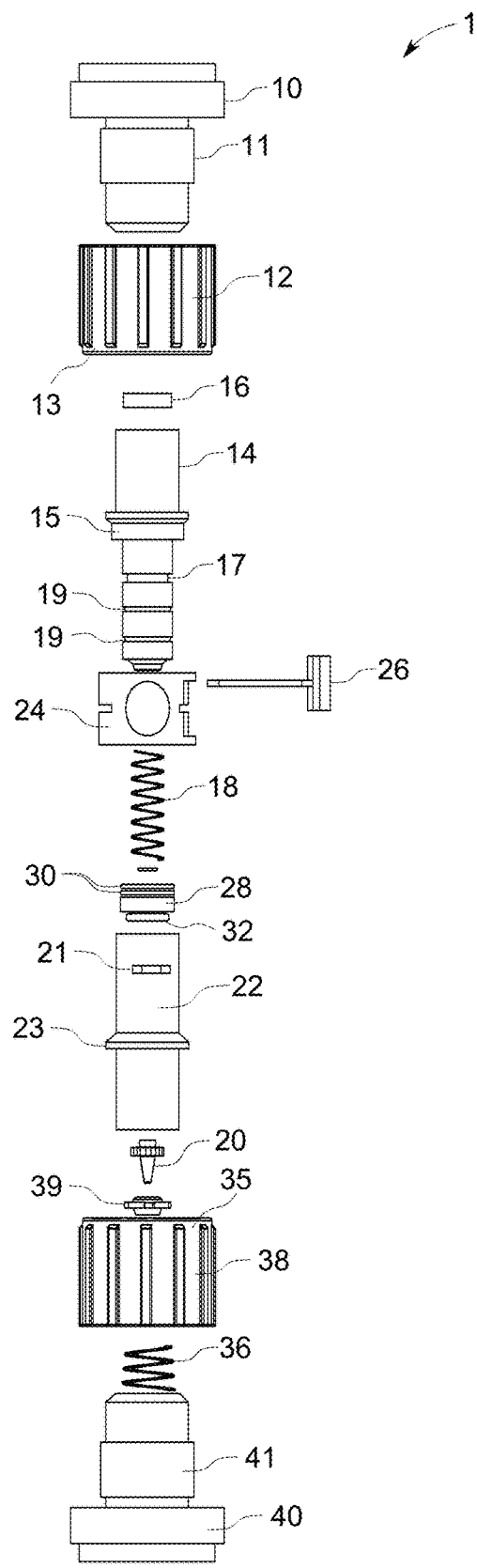
FIG. 13 is a right side exploded view of the exemplary insertion coupling/fitting of FIG. 1, in accordance with an aspect of the present disclosure.
Figure 14:
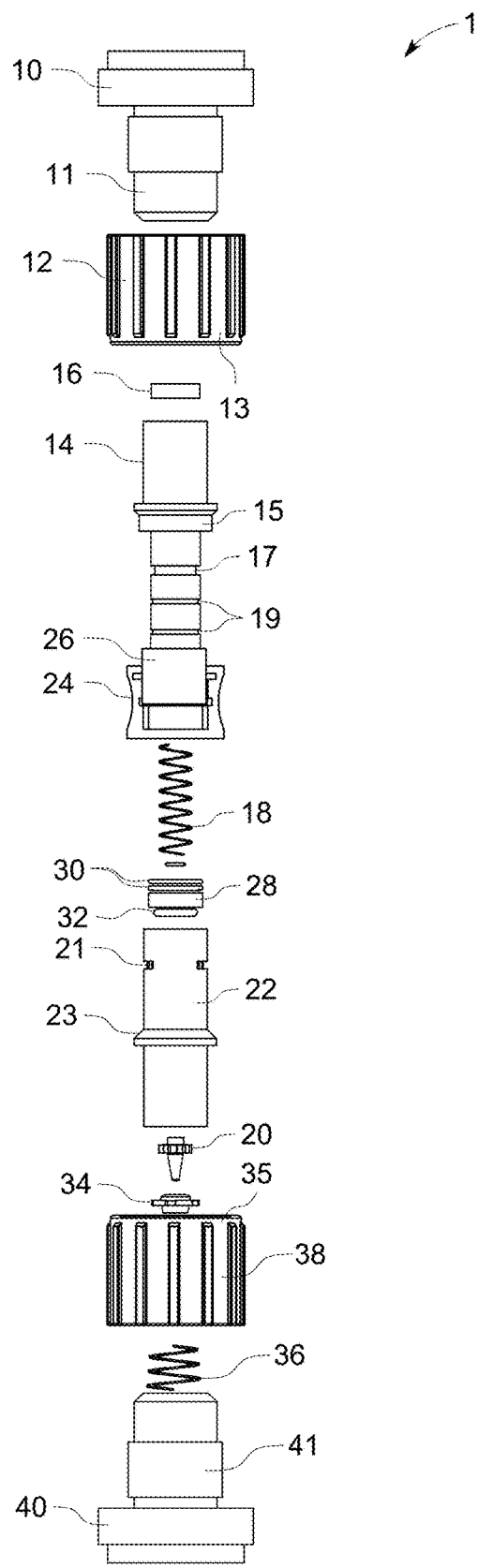
FIG. 14 is a front exploded view of the exemplary insertion coupling/fitting of FIG. 1, in accordance with an aspect of the present disclosure.
Figure 15:
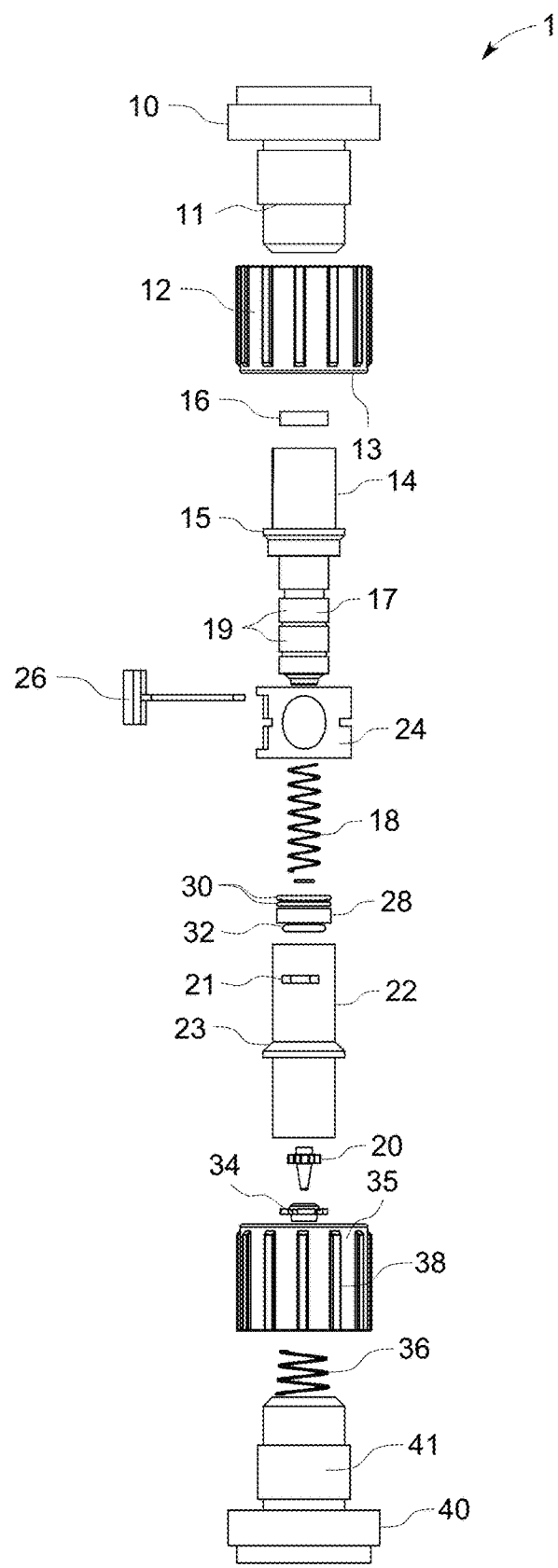
FIG. 15 is a left side exploded view of the exemplary insertion coupling/fitting of FIG. 1, in accordance with an aspect of the present disclosure.
Figure 16:
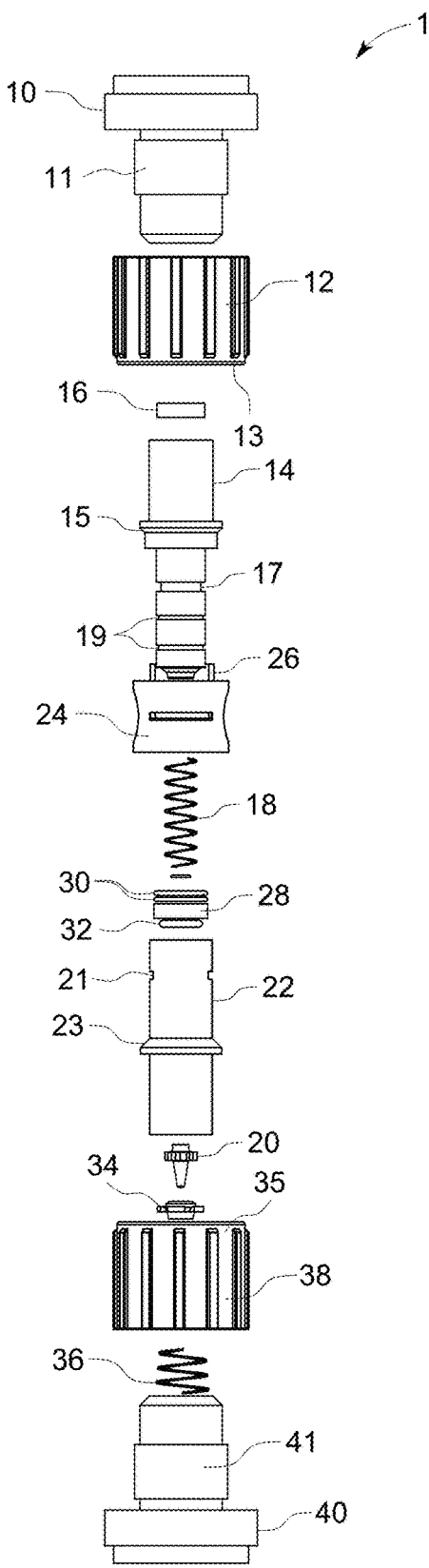
FIG. 16 is a back exploded view of the exemplary insertion coupling/fitting of FIG. 1, in accordance with an aspect of the present disclosure.
Figure 17:
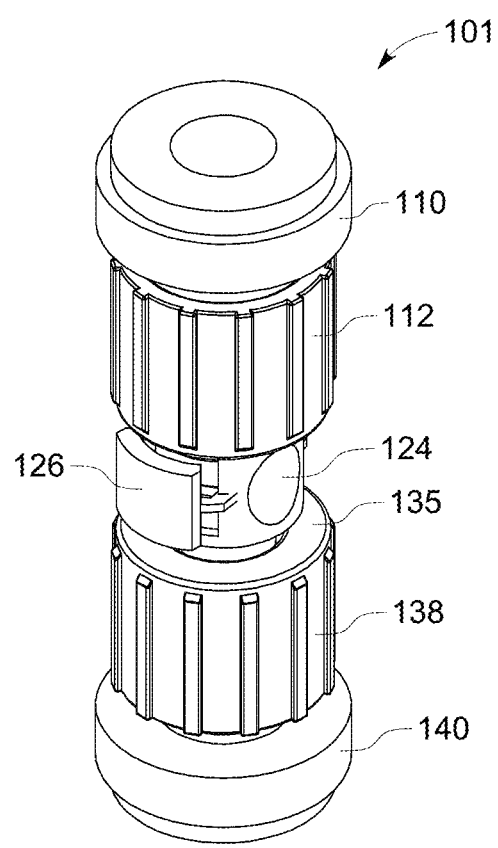
FIG. 17 is an elevational perspective view of another exemplary insertion coupling/fitting, in accordance with an aspect of the present disclosure.
Figure 18:
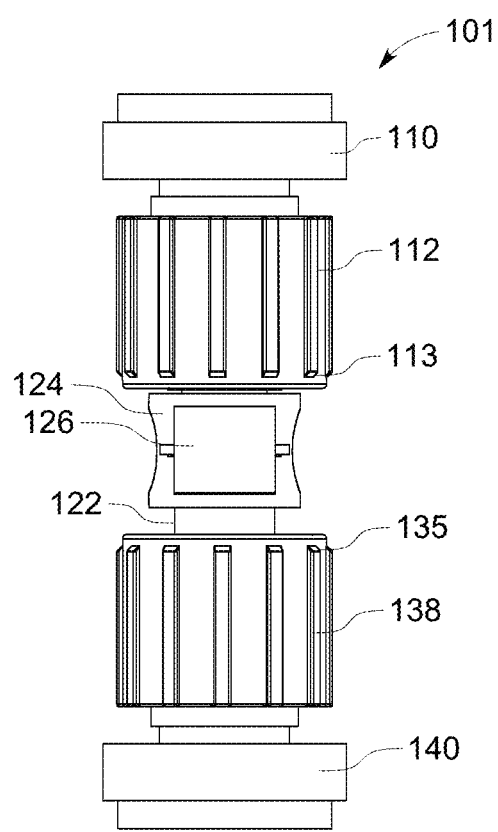
FIG. 18 is a front view of the exemplary insertion coupling/fitting of FIG. 17, in accordance with an aspect of the present disclosure.
Figure 19:
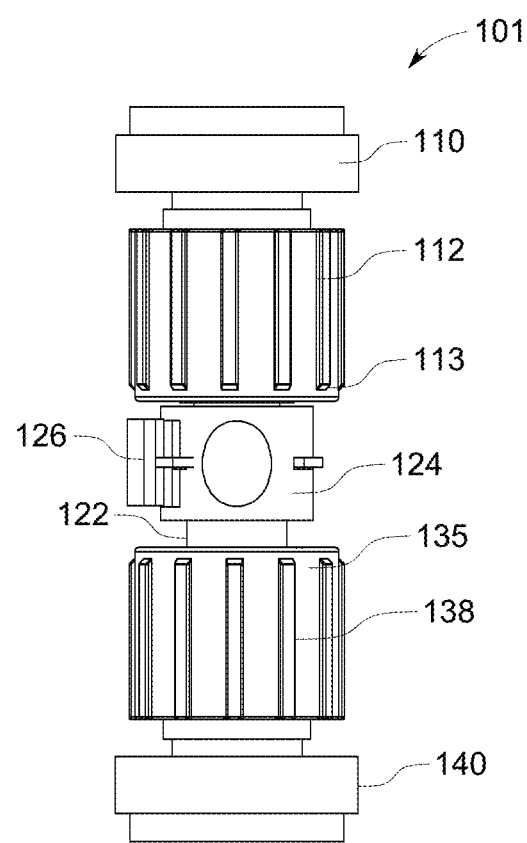
FIG. 19 is a right side view of the exemplary insertion coupling/fitting of FIG. 17, in accordance with an aspect of the present disclosure.
Figure 20:
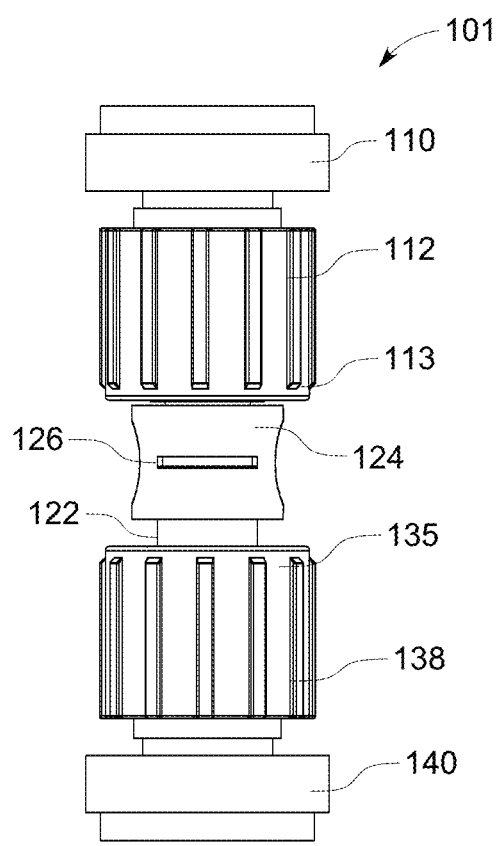
FIG. 20 is a back view of the exemplary insertion coupling/fitting of FIG. 17, in accordance with an aspect of the present disclosure.
Figure 21:
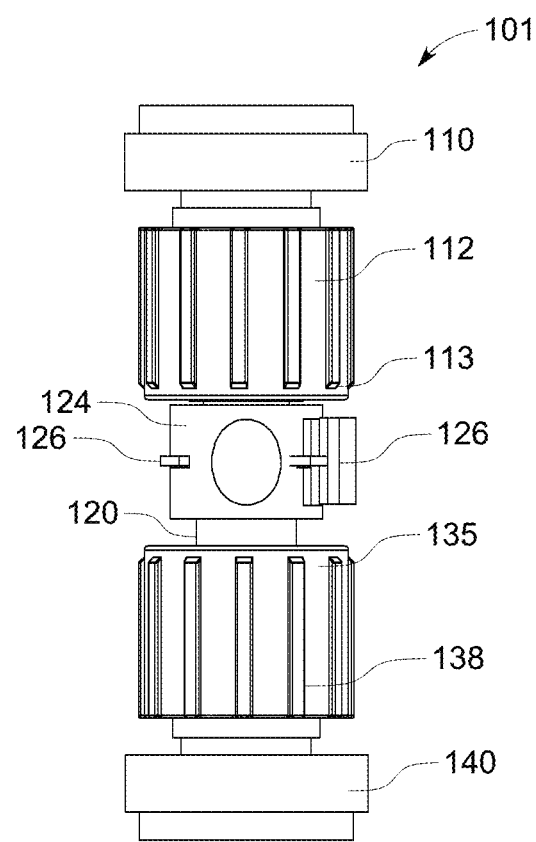
FIG. 21 is a left side view of the exemplary insertion coupling/fitting of FIG. 17, in accordance with an aspect of the present disclosure.
Figure 22:
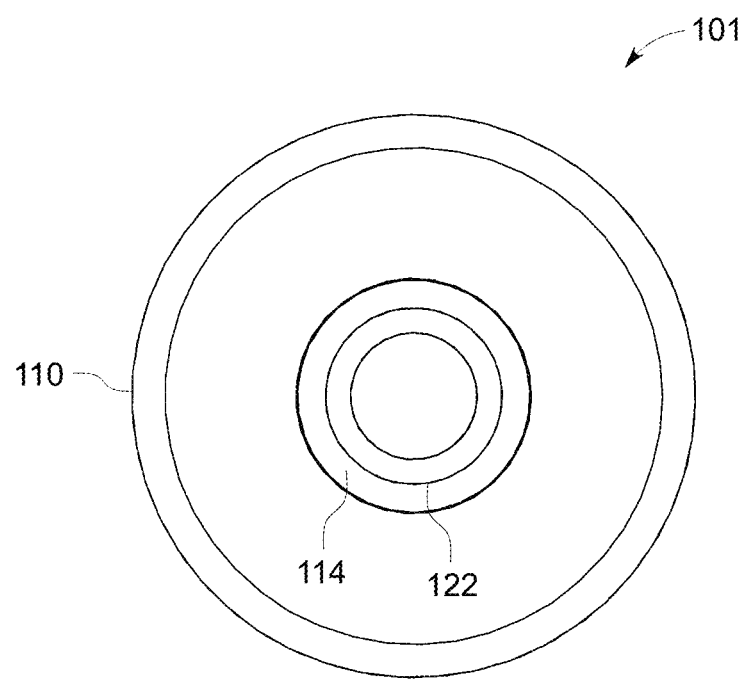
FIG. 22 is a top view of the exemplary insertion coupling/fitting of FIG. 17, in accordance with an aspect of the present disclosure.
Figure 23:
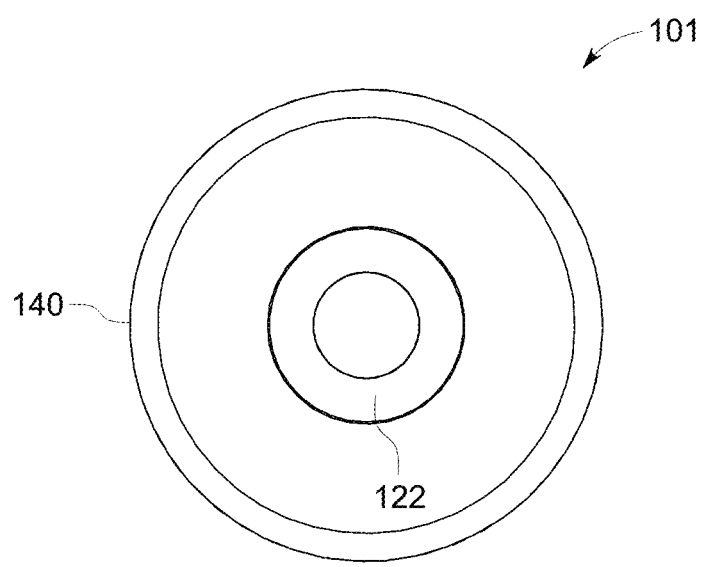
FIG. 23 is a bottom view of the exemplary insertion coupling/fitting of FIG. 17, in accordance with an aspect of the present disclosure.
Figure 24:
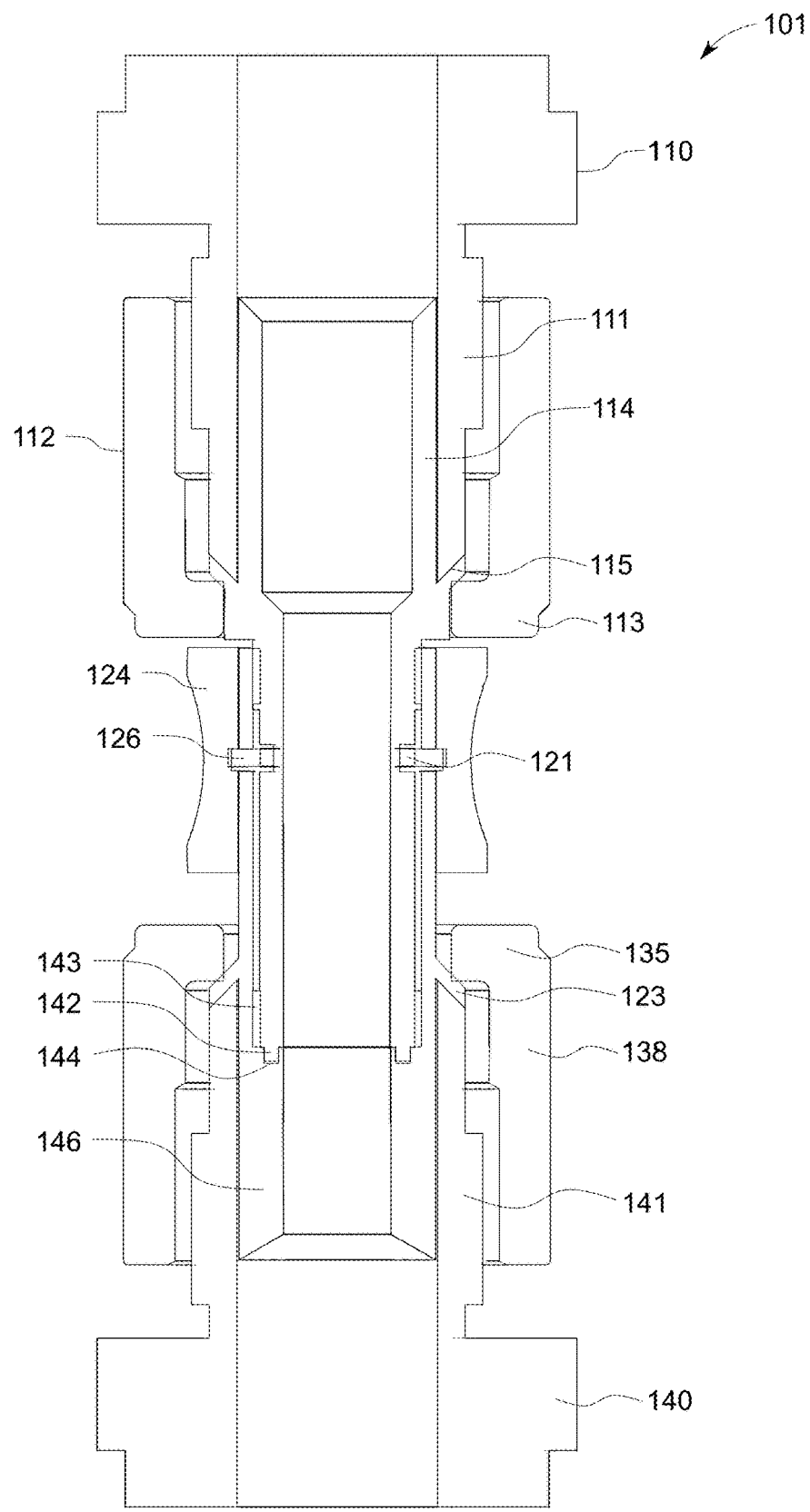
FIG. 24 is a right side cross-sectional view of the exemplary insertion coupling/fitting of FIG. 17, in accordance with an aspect of the present disclosure.
Figure 25:
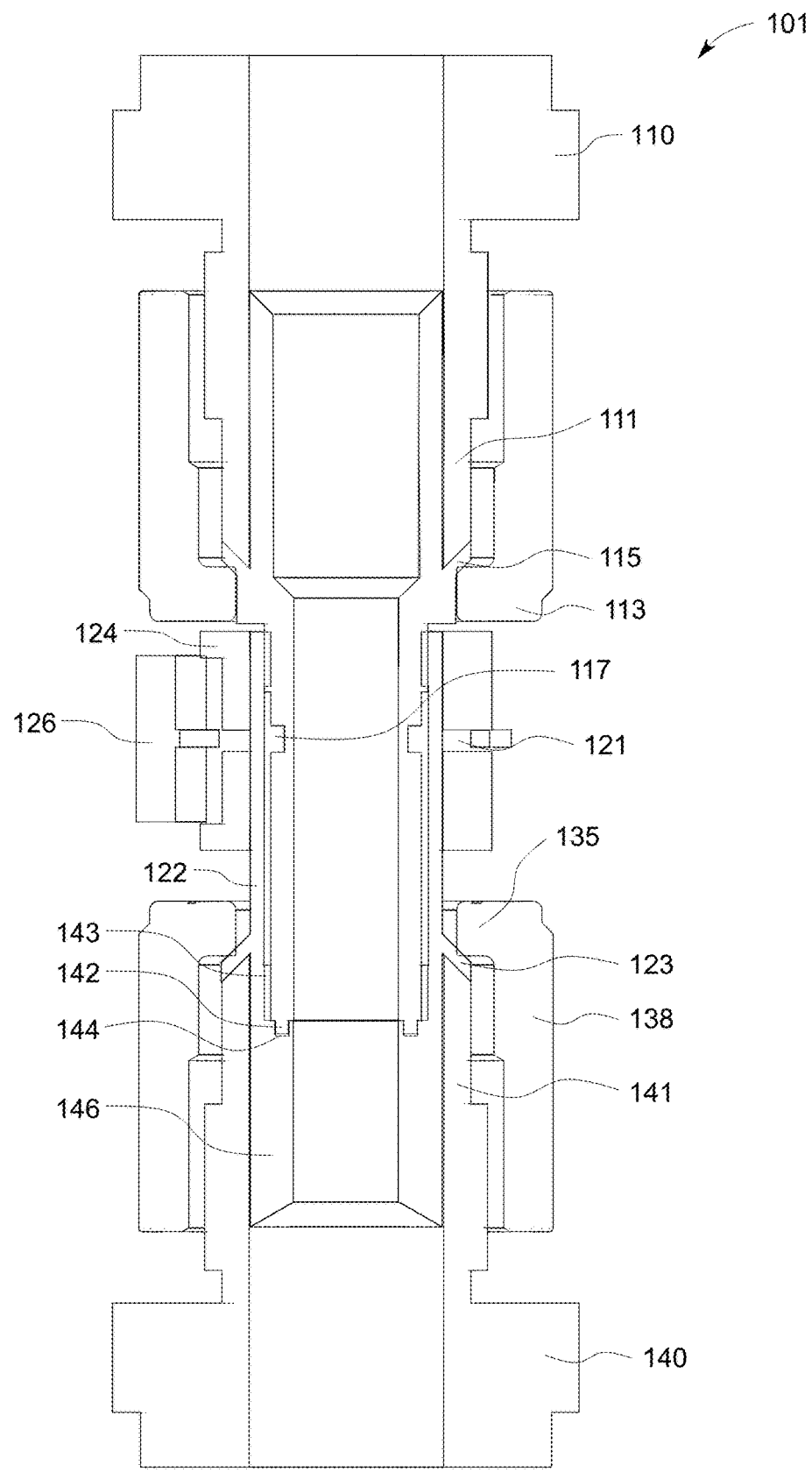
FIG. 25 is a front cross-sectional view of the exemplary insertion coupling/fitting of FIG. 17, in accordance with an aspect of the present disclosure.
Figure 26:
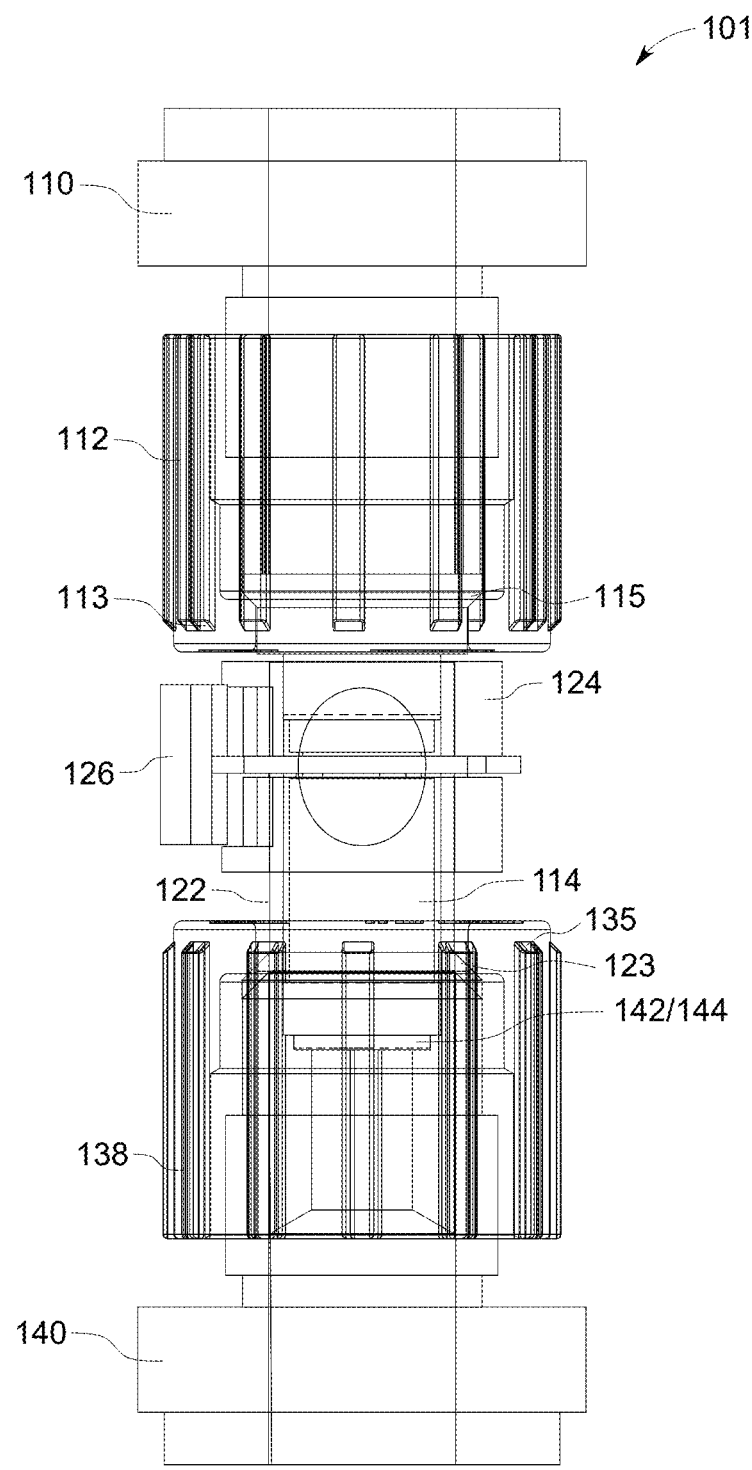
FIG. 26 is a left side transparent view of the exemplary insertion coupling/fitting of FIG. 17, in accordance with an aspect of the present disclosure.
Figure 27:
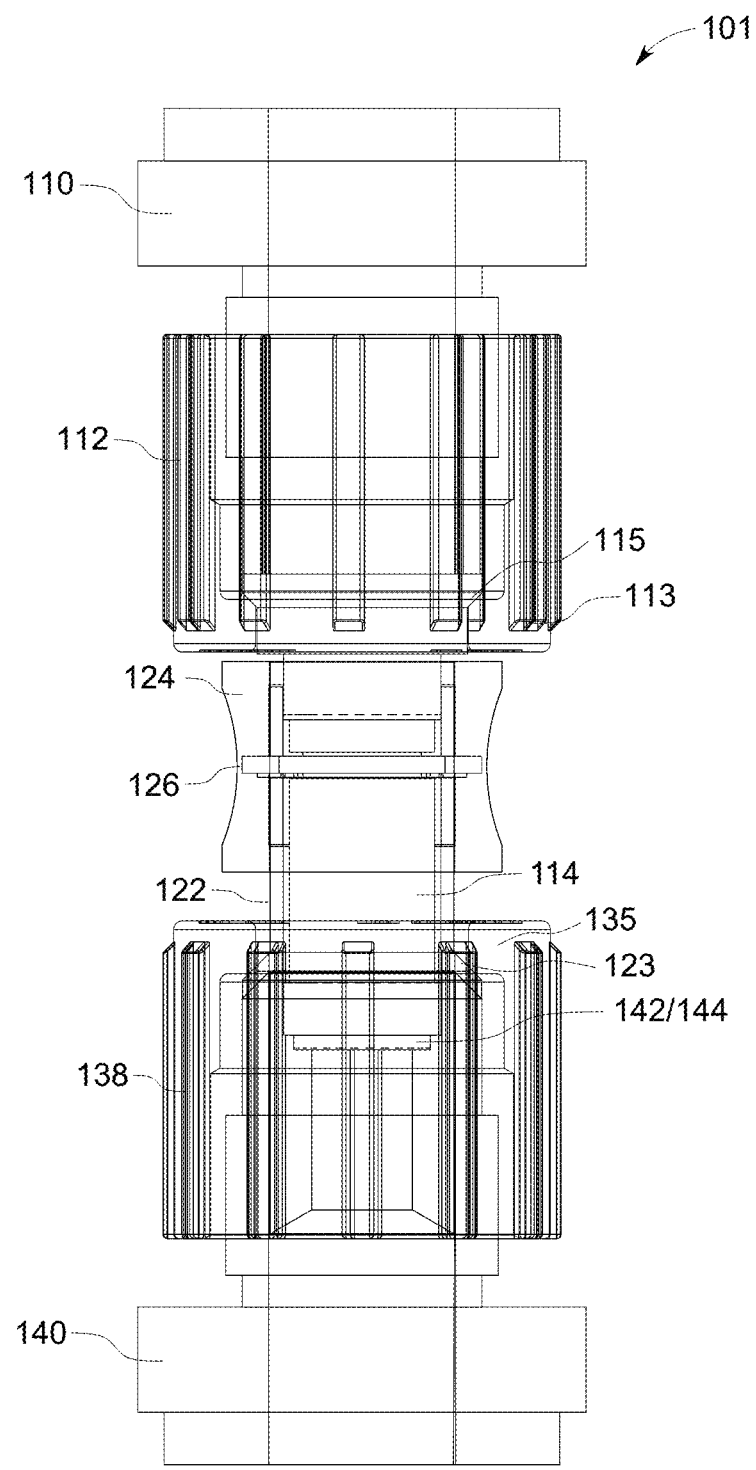
FIG. 27 is a front transparent view of the exemplary insertion coupling/fitting of FIG. 17, in accordance with an aspect of the present disclosure.
Figure 28:
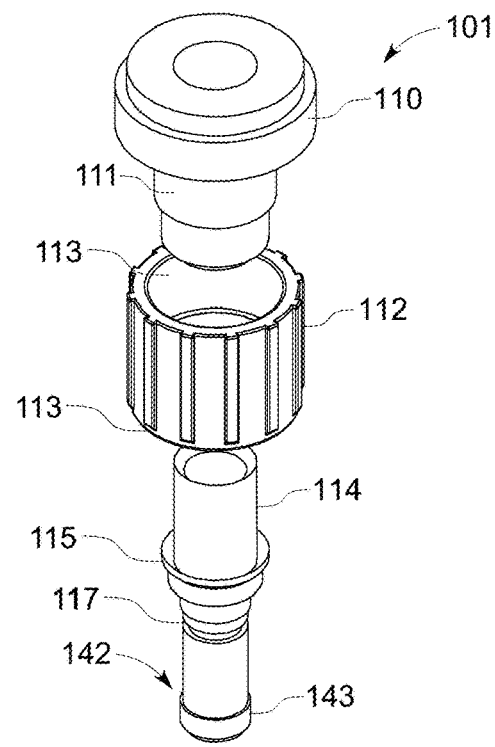
FIG. 28 is an elevational perspective exploded view of the exemplary insertion coupling/fitting of FIG. 17, in accordance with an aspect of the present disclosure.
Figure 28:
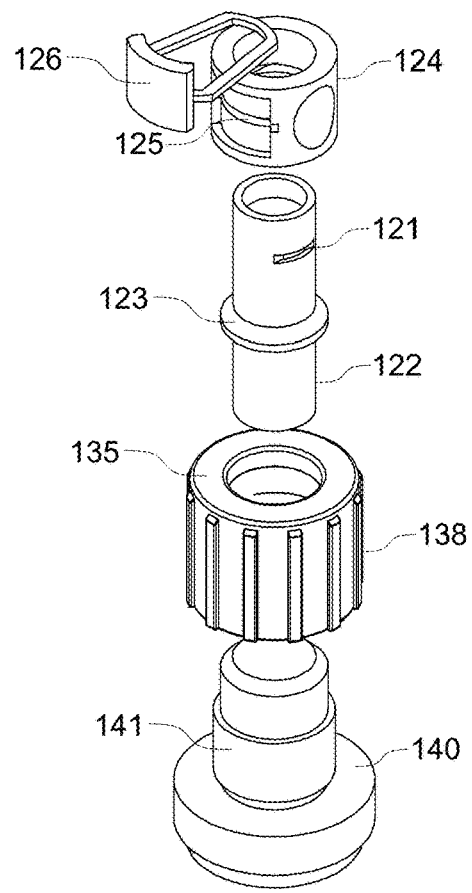
Figure 29:
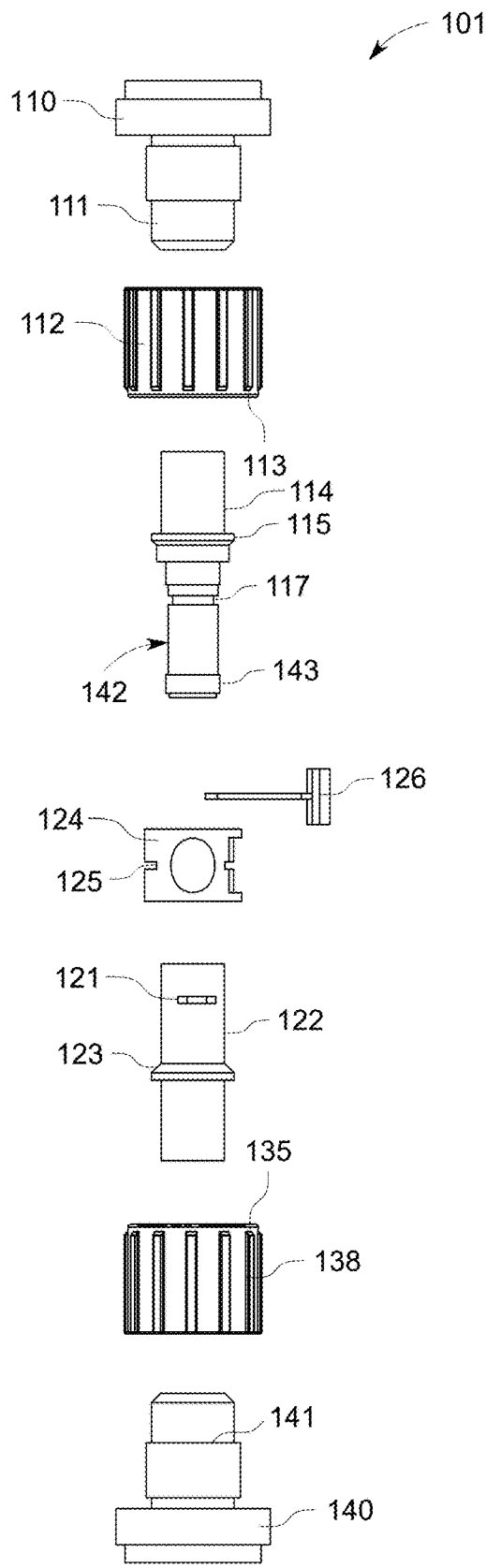
FIG. 29 is a right side exploded view of the exemplary insertion coupling/fitting of FIG. 17, in accordance with an aspect of the present disclosure.
Figure 30:
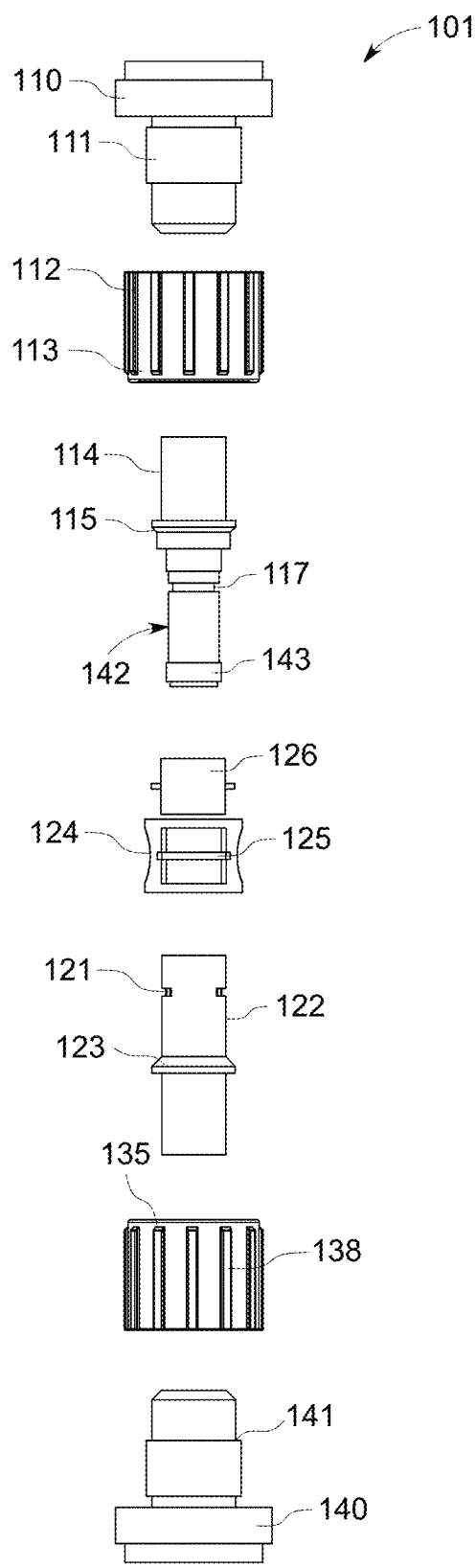
FIG. 30 is a front exploded view of the exemplary insertion coupling/fitting of FIG. 17, in accordance with an aspect of the present disclosure.
Figure 31:
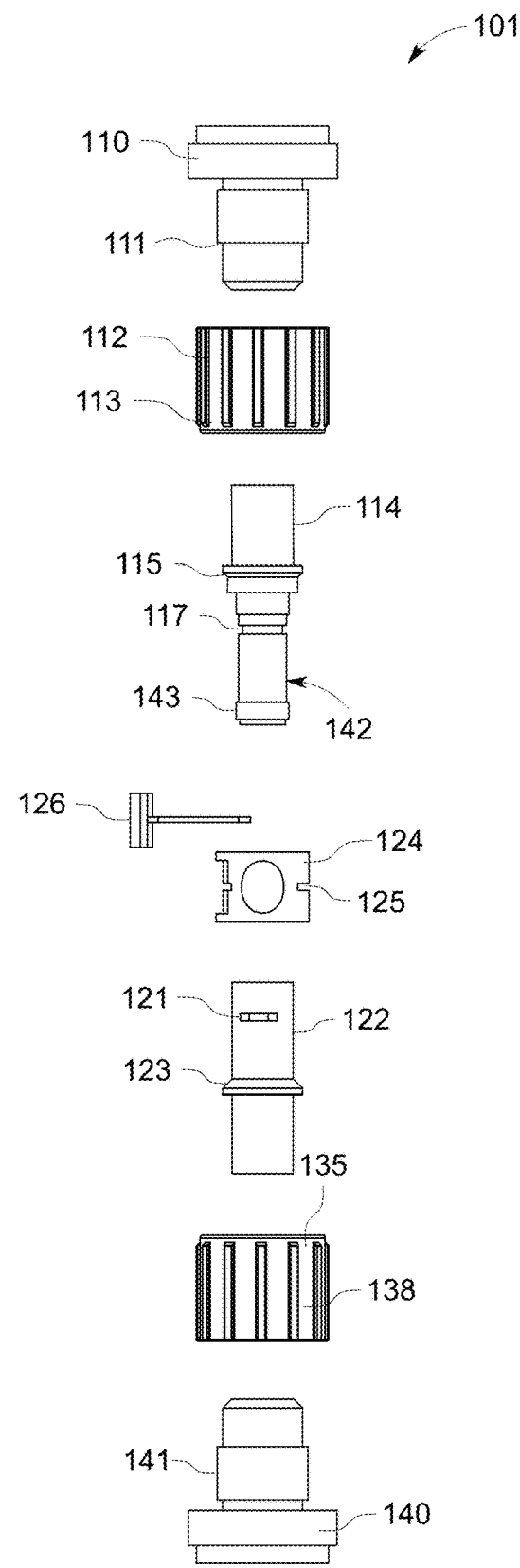
FIG. 31 is a left side exploded view of the exemplary insertion coupling/fitting of FIG. 17, in accordance with an aspect of the present disclosure.
Figure 32:
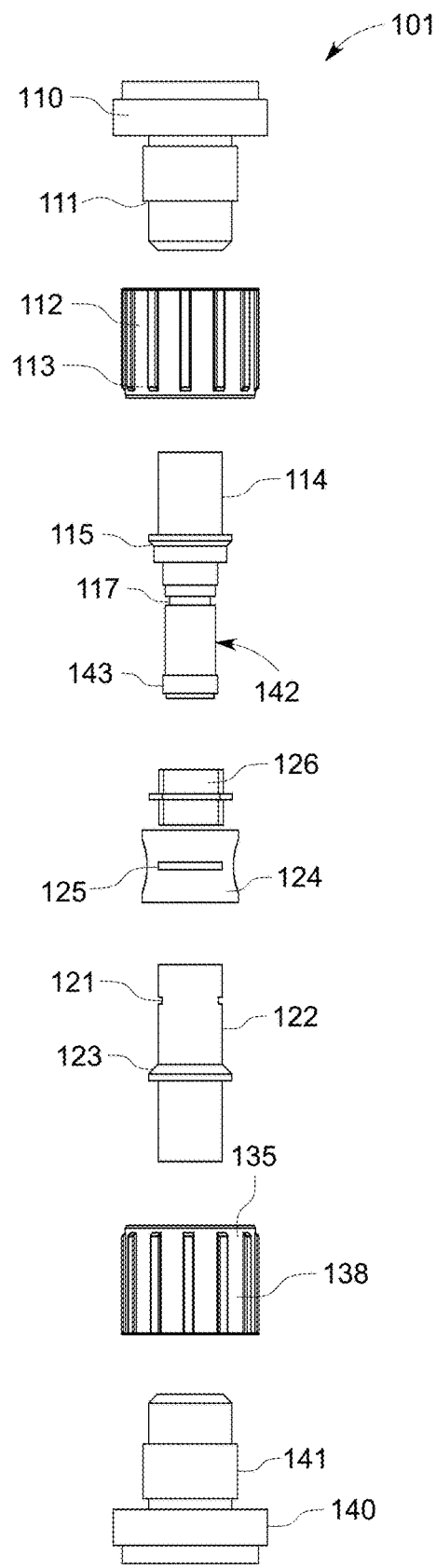
FIG. 32 is a back exploded view of the exemplary insertion coupling/fitting of FIG. 17, in accordance with an aspect of the present disclosure.
Figure 33:
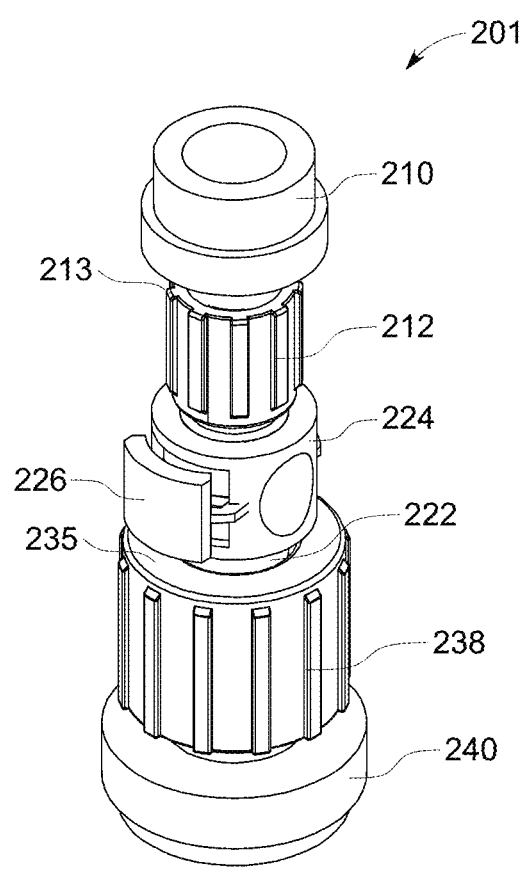
FIG. 33 is an elevational perspective view of another exemplary insertion fitting, in accordance with an aspect of the present disclosure.
Figure 34:
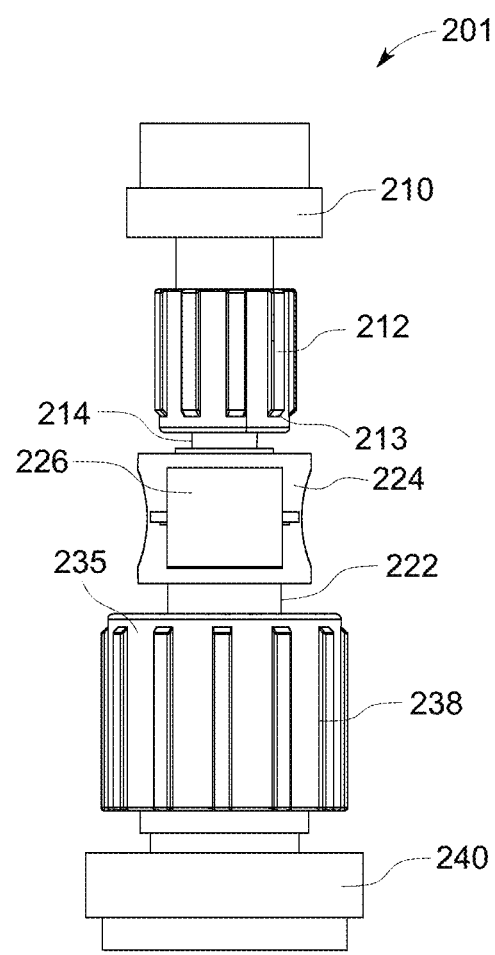
FIG. 34 is a front view of the exemplary insertion coupling/fitting of FIG. 33, in accordance with an aspect of the present disclosure.
Figure 35:
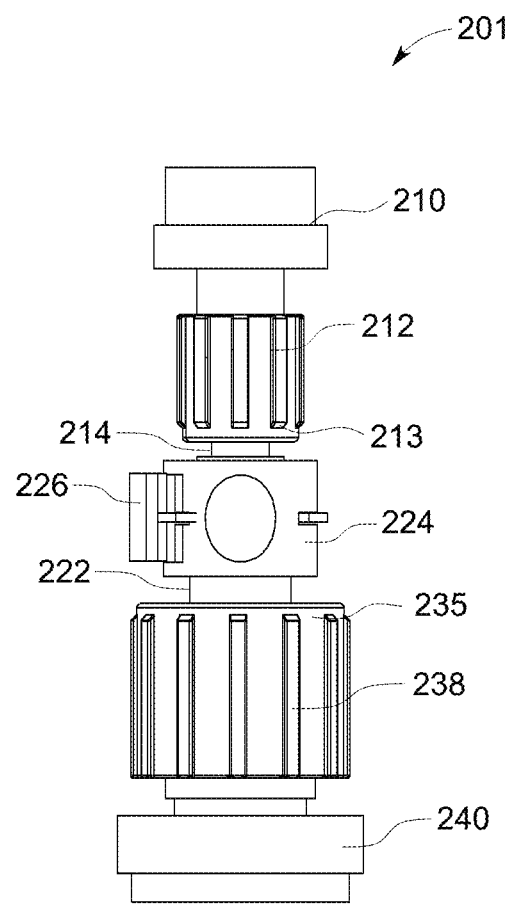
FIG. 35 is a right side view of the exemplary insertion coupling/fitting of FIG. 33, in accordance with an aspect of the present disclosure.
Figure 36:
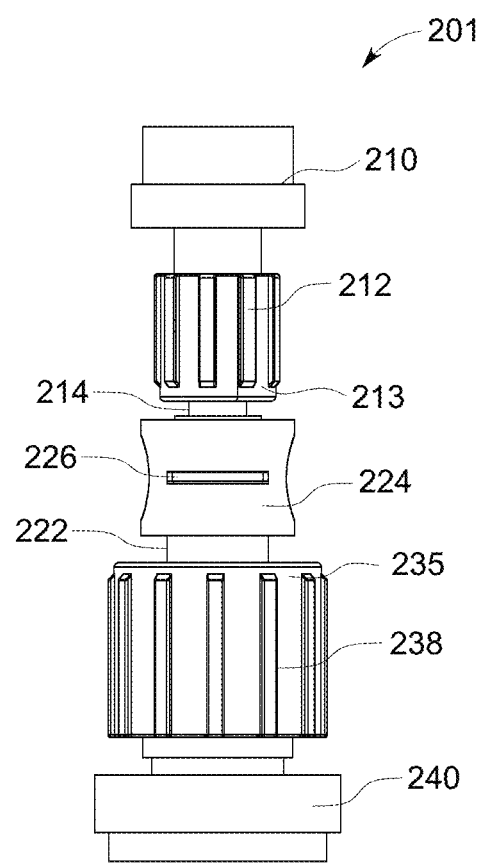
FIG. 36 is a back view of the exemplary insertion coupling/fitting of FIG. 33, in accordance with an aspect of the present disclosure.
Figure 37:
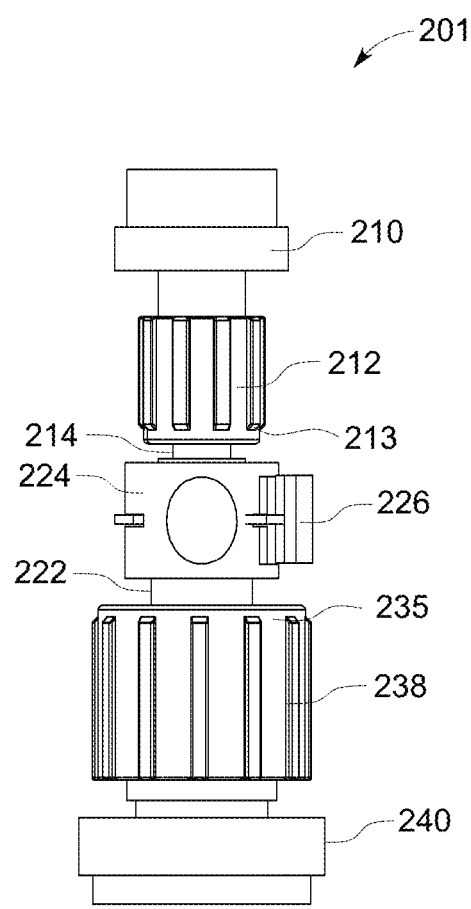
FIG. 37 is a left side view of the exemplary insertion coupling/fitting of FIG. 33, in accordance with an aspect of the present disclosure.
Figure 38:
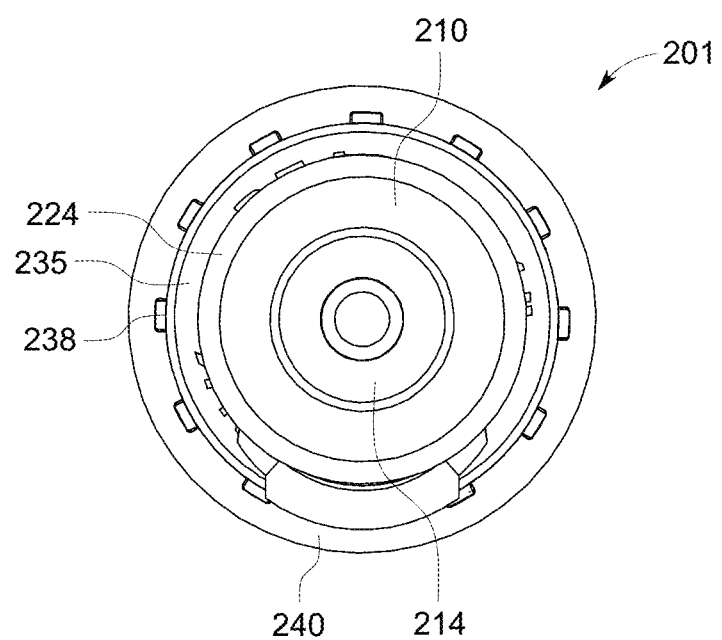
FIG. 38 is a top view of the exemplary insertion coupling/fitting of FIG. 33, in accordance with an aspect of the present disclosure.
Figure 39:
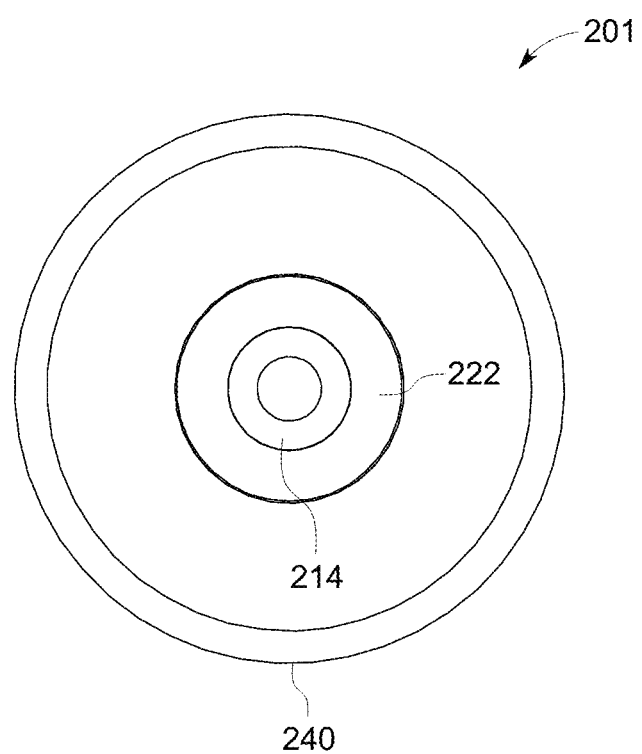
FIG. 39 is a bottom view of the exemplary insertion coupling/fitting of FIG. 33, in accordance with an aspect of the present disclosure.
Figure 40:
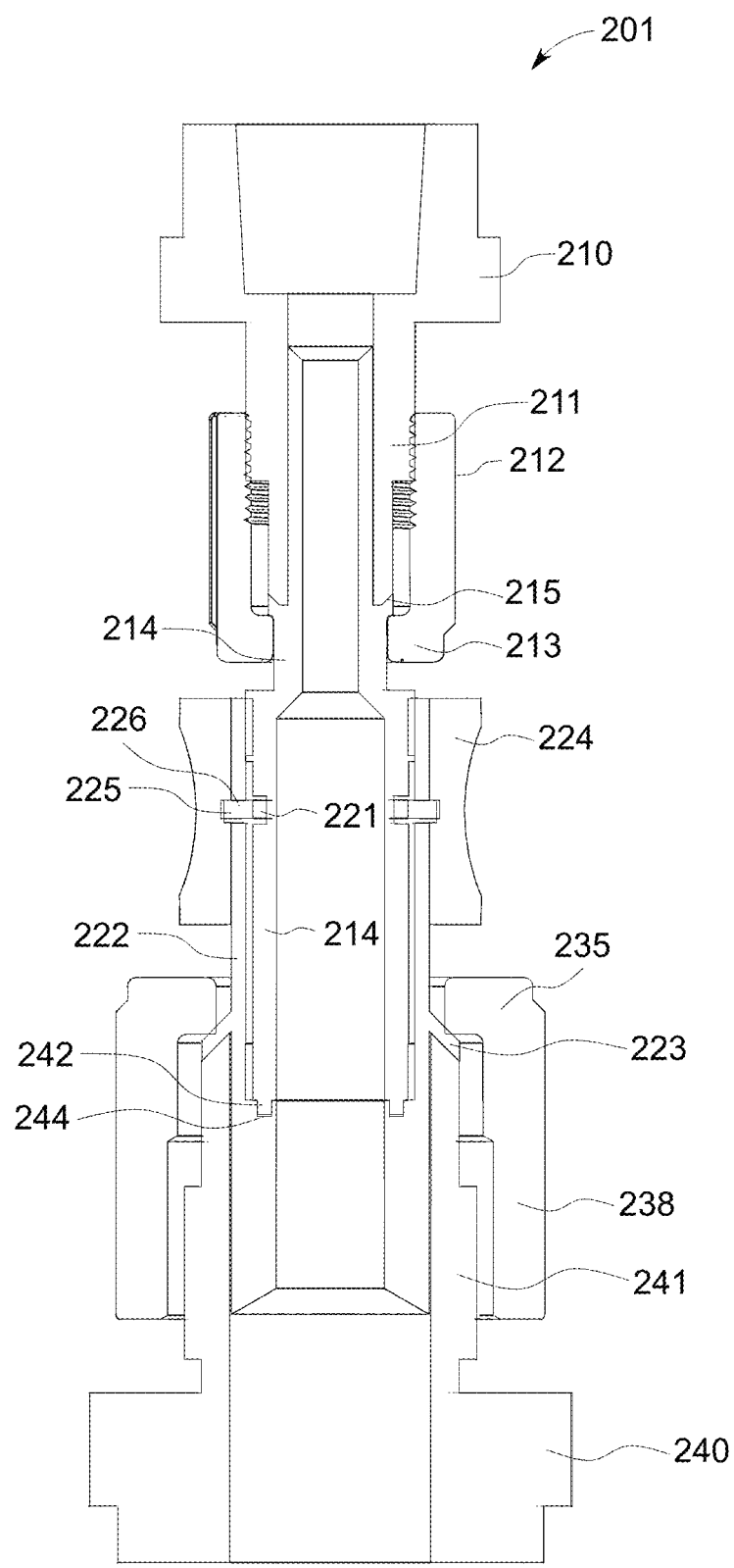
FIG. 40 is a right side cross-sectional view of the exemplary insertion coupling/fitting of FIG. 33, in accordance with an aspect of the present disclosure.
Figure 41:
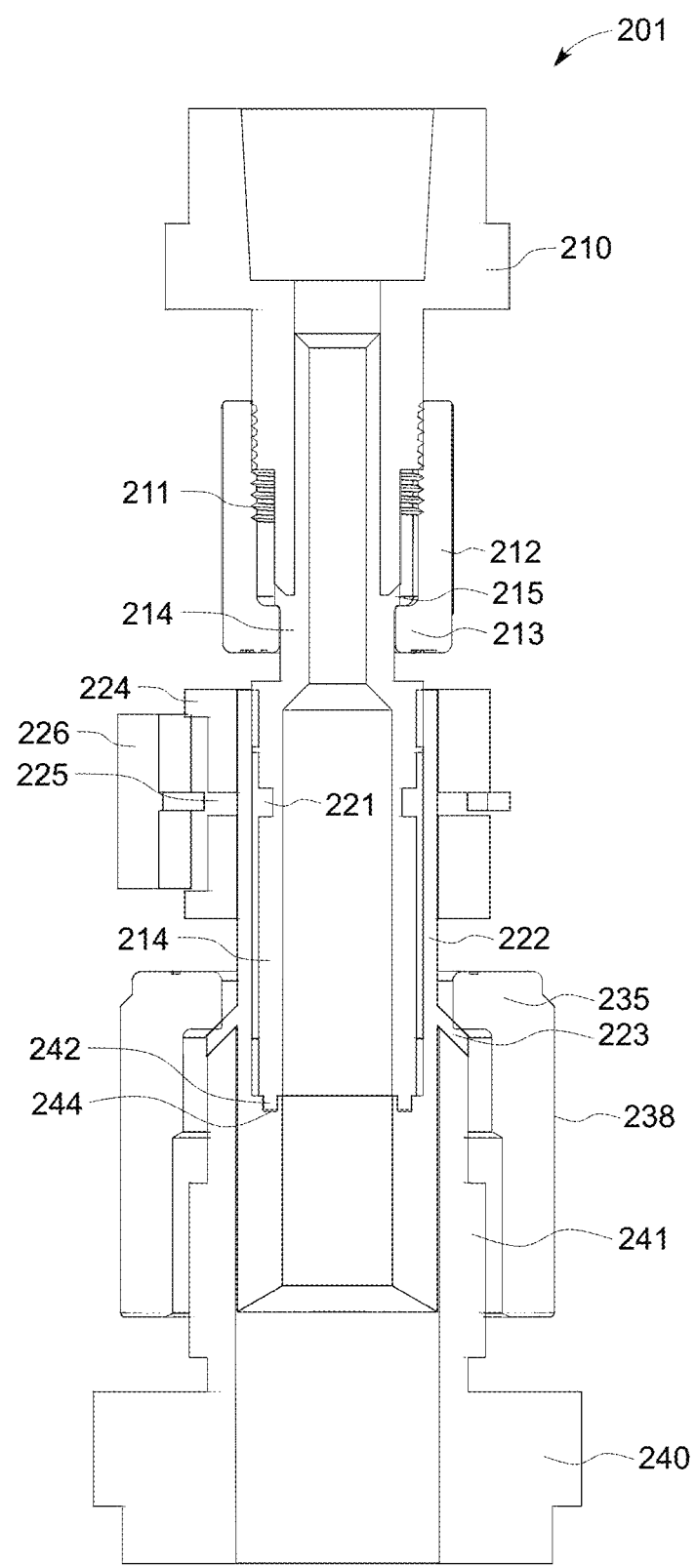
FIG. 41 is a front cross-sectional view of the exemplary insertion coupling/fitting of FIG. 33, in accordance with an aspect of the present disclosure.
Figure 42:
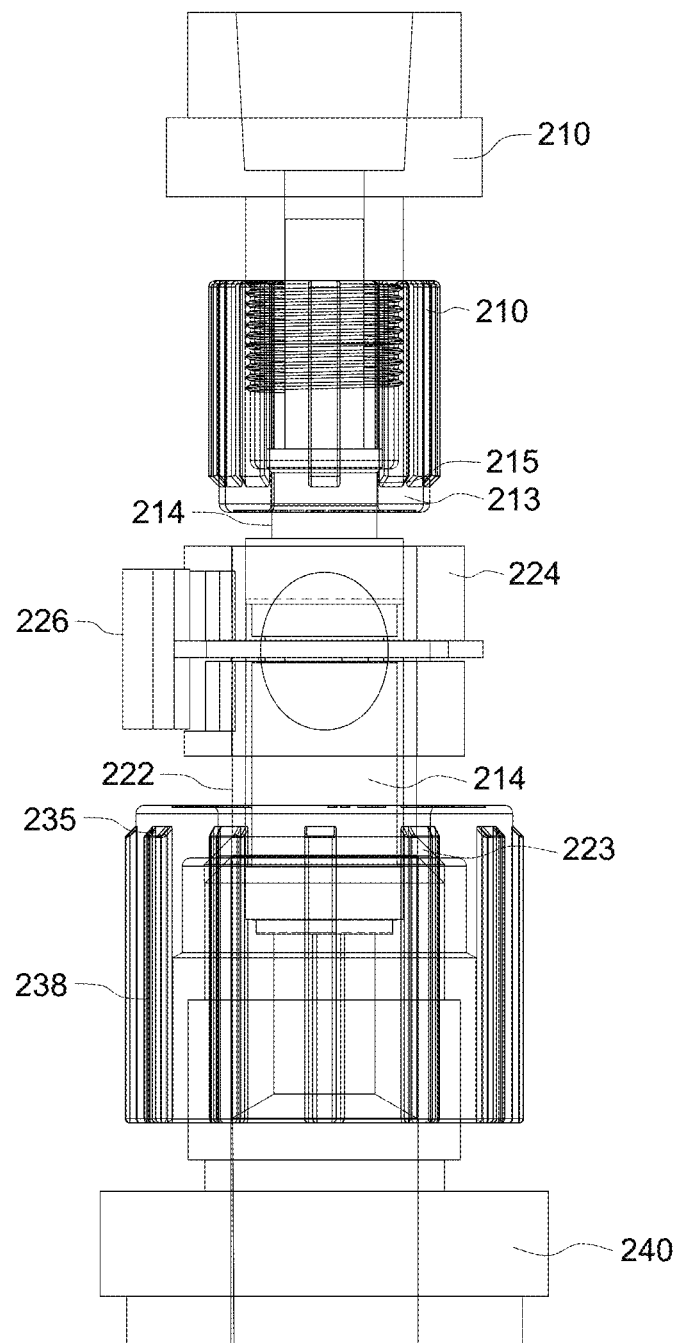
FIG. 42 is a left side transparent view of the exemplary insertion coupling/fitting of FIG. 33, in accordance with an aspect of the present disclosure.
Figure 43:
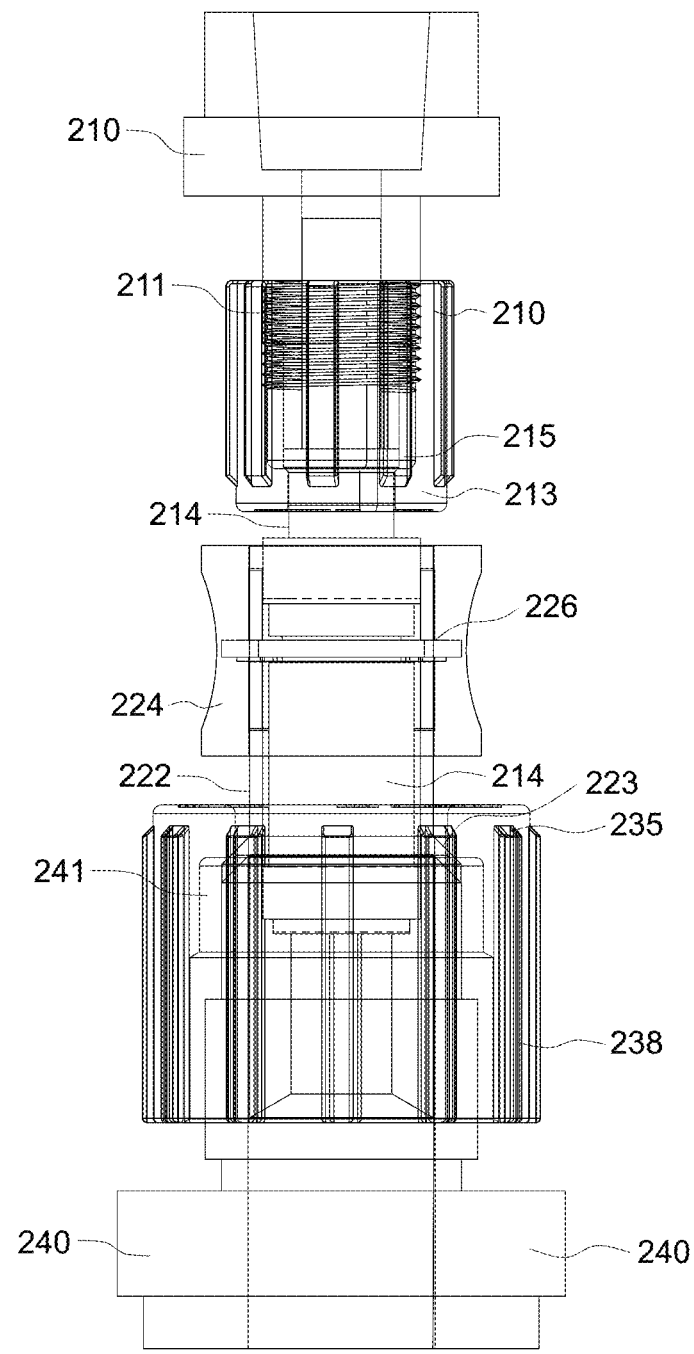
FIG. 43 is a front transparent view of the exemplary insertion coupling/fitting of FIG. 33, in accordance with an aspect of the present disclosure.
Figure 44:
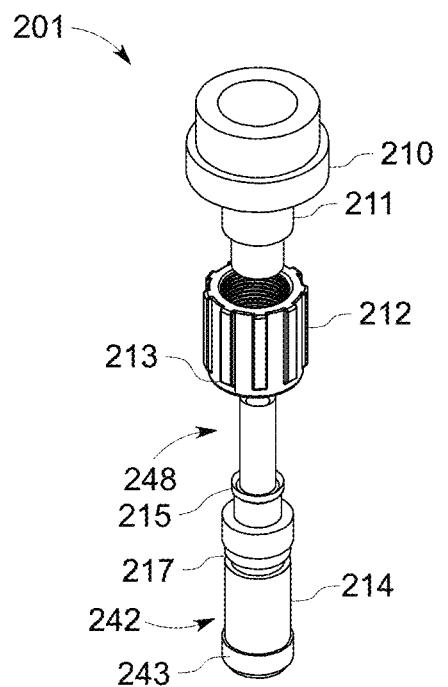
FIG. 44 is an elevational perspective exploded view of the exemplary insertion coupling/fitting of FIG. 33, in accordance with an aspect of the present disclosure.
Figure 44:
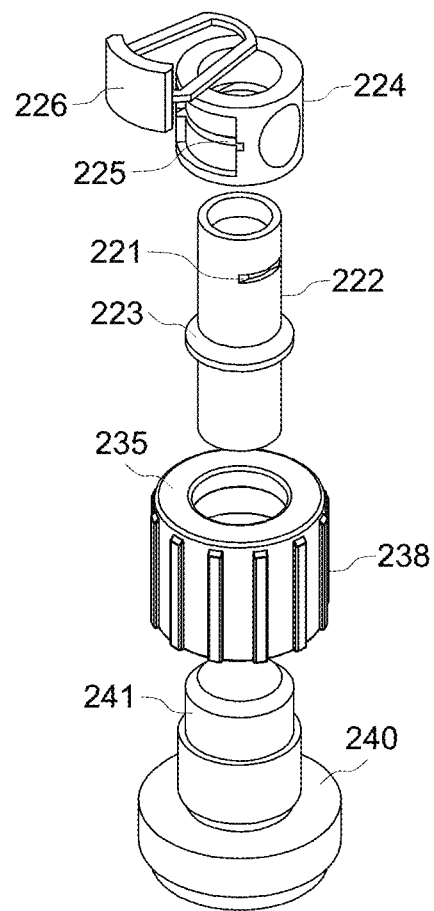
Figure 45:
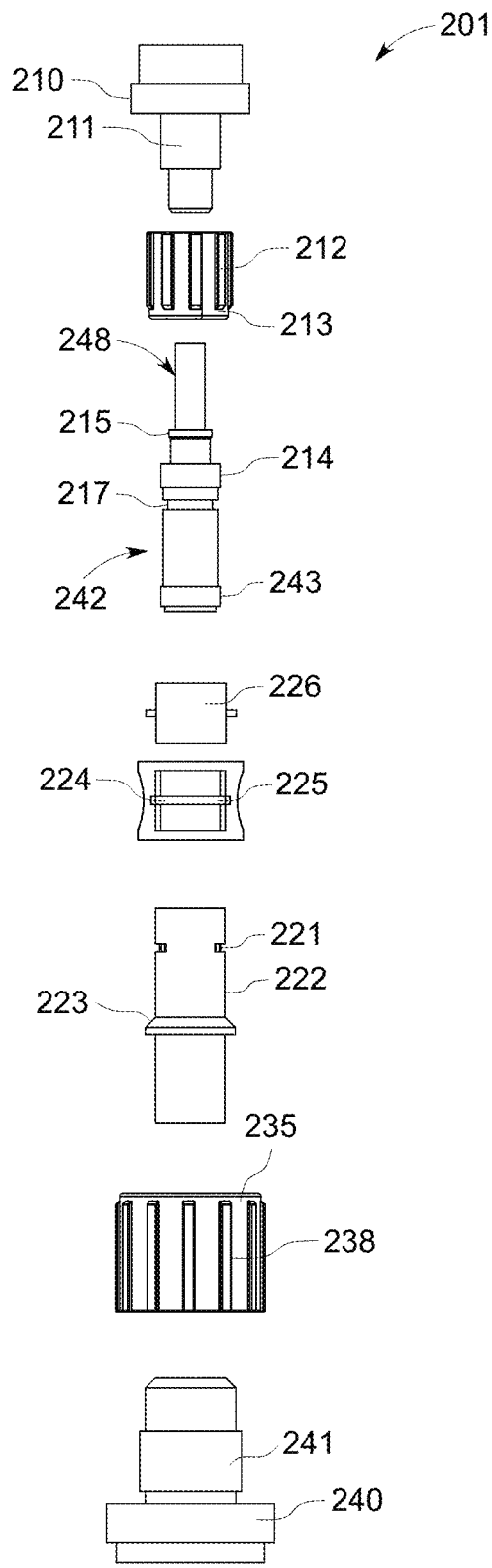
FIG. 45 is a right side exploded view of the exemplary insertion coupling/fitting of FIG. 33, in accordance with an aspect of the present disclosure.
Figure 46:
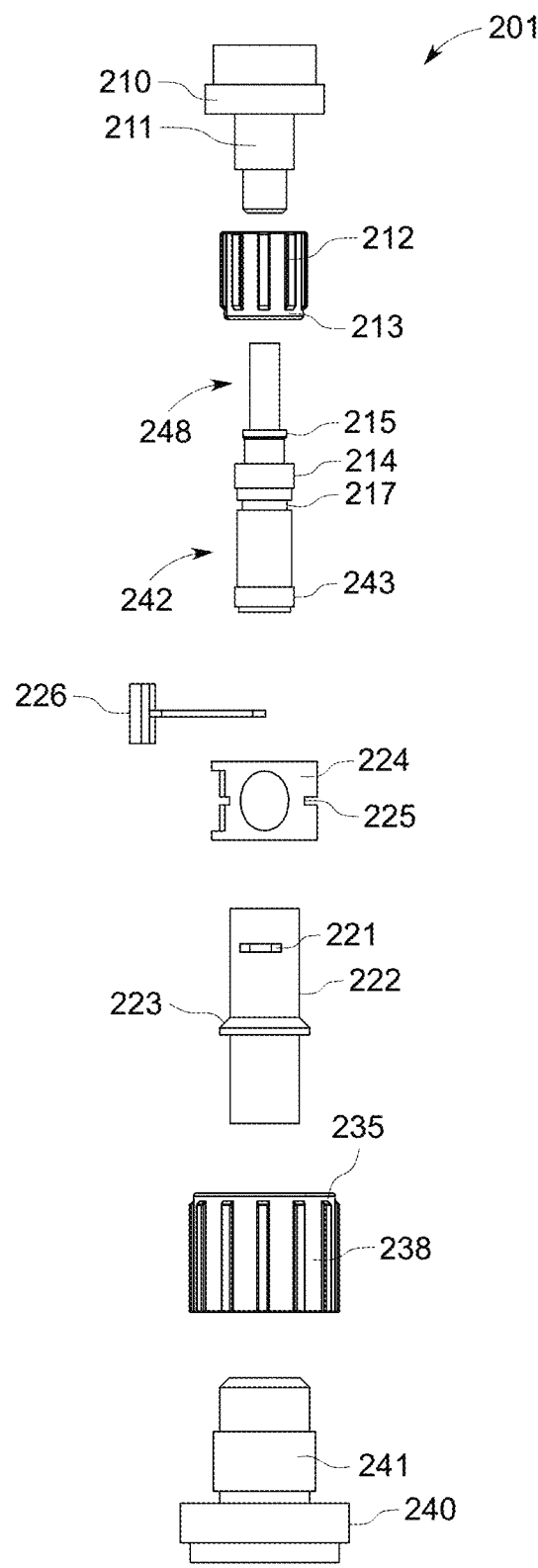
FIG. 46 is a front exploded view of the exemplary insertion coupling/fitting of FIG. 33, in accordance with an aspect of the present disclosure.
Figure 47:
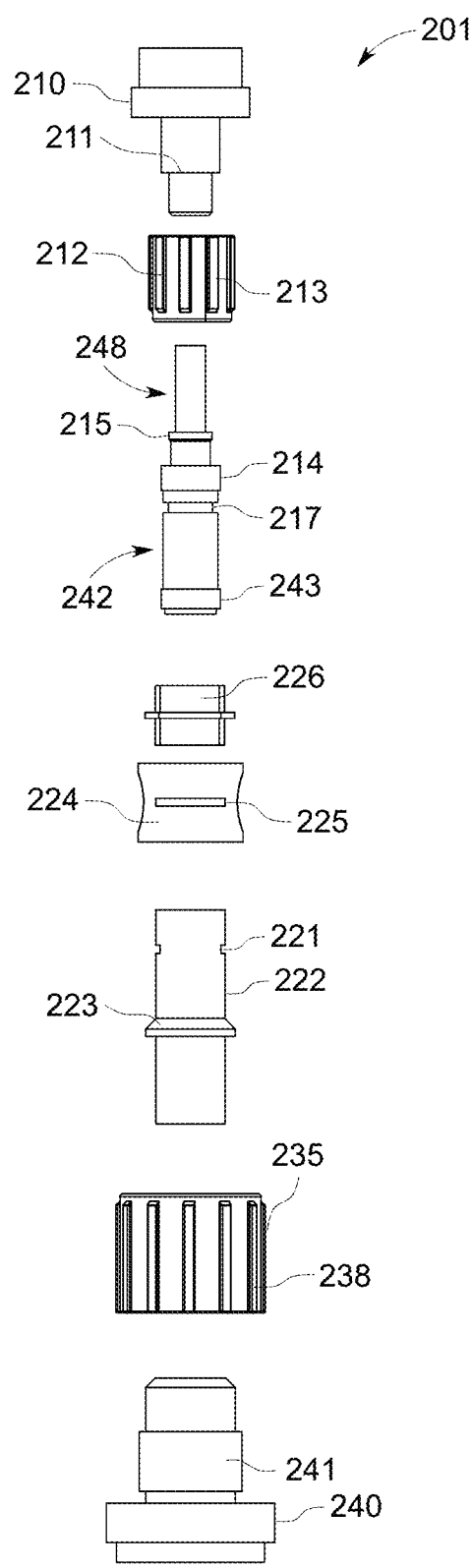
FIG. 47 is a left side exploded view of the exemplary insertion coupling/fitting of FIG. 33, in accordance with an aspect of the present disclosure.
Figure 48:
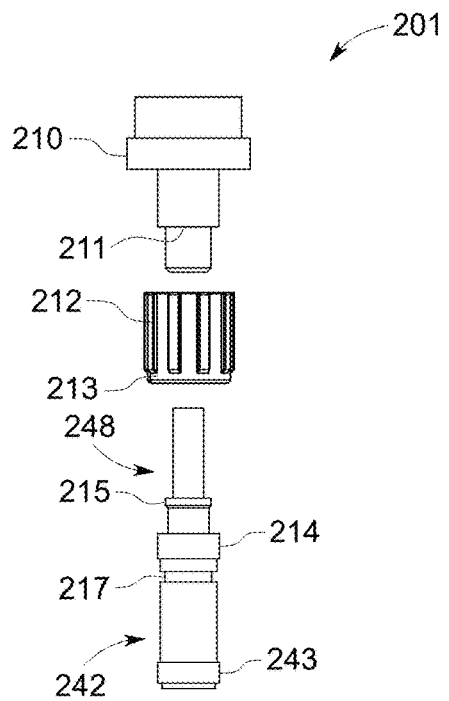
FIG. 48 is a back exploded view of the exemplary insertion coupling/fitting of FIG. 33, in accordance with an aspect of the present disclosure.
Figure 48:
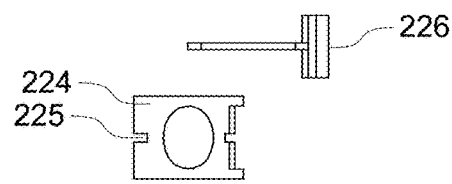
Figure 48:
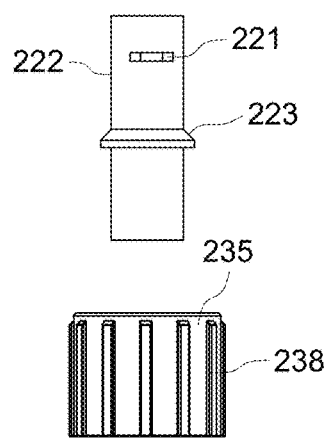
Figure 48:
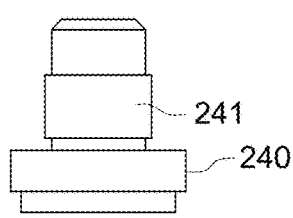
Figure 49:
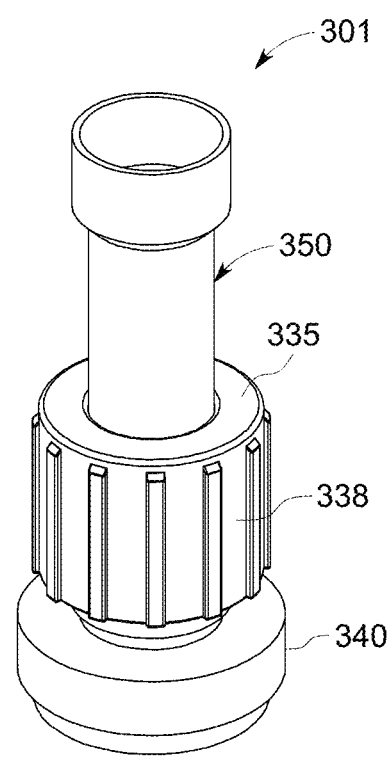
FIG. 49 is an elevational perspective view of another exemplary insertion fitting, in accordance with an aspect of the present disclosure.
Figure 50:
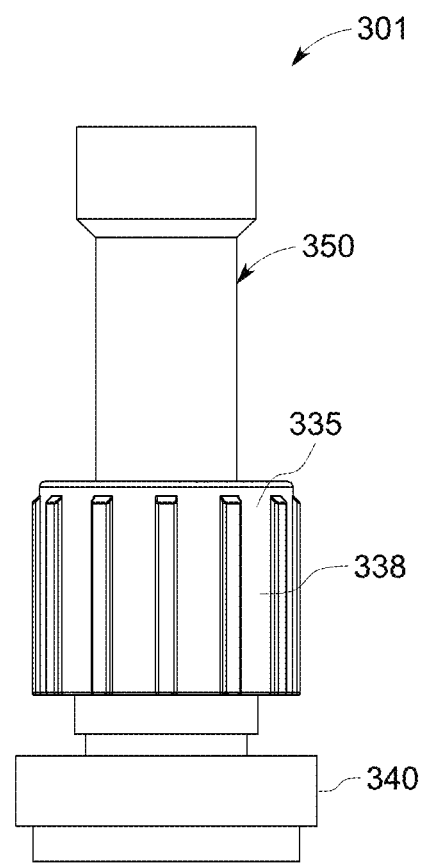
FIG. 50 is a front view of the exemplary insertion fitting of FIG. 49, in accordance with an aspect of the present disclosure.
Figure 51:
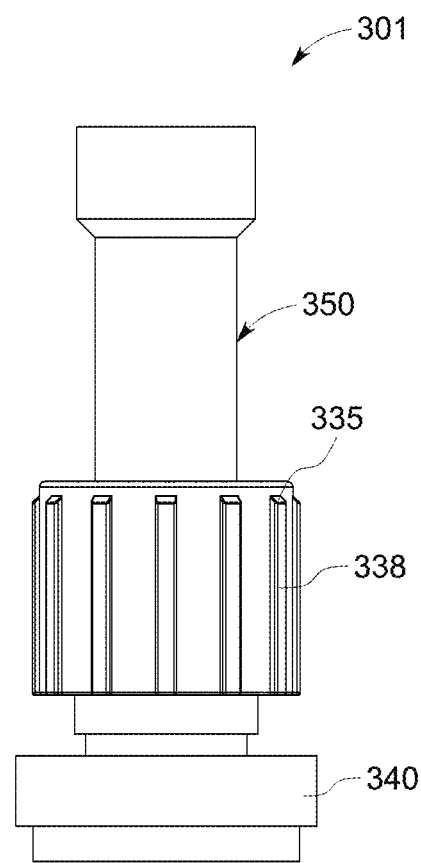
FIG. 51 is a right side view of the exemplary insertion fitting of FIG. 49, in accordance with an aspect of the present disclosure.
Figure 52:
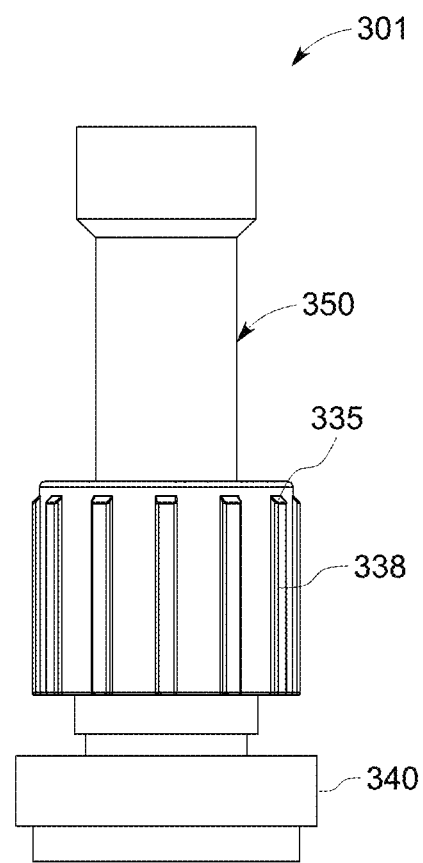
FIG. 52 is a back view of the exemplary insertion fitting of FIG. 49, in accordance with an aspect of the present disclosure.
Figure 53:
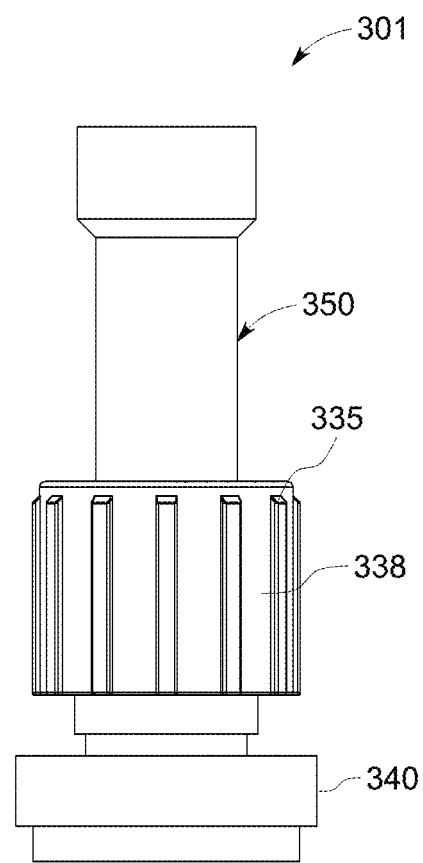
FIG. 53 is a left side view of the exemplary insertion fitting of FIG. 49, in accordance with an aspect of the present disclosure.
Figure 54:
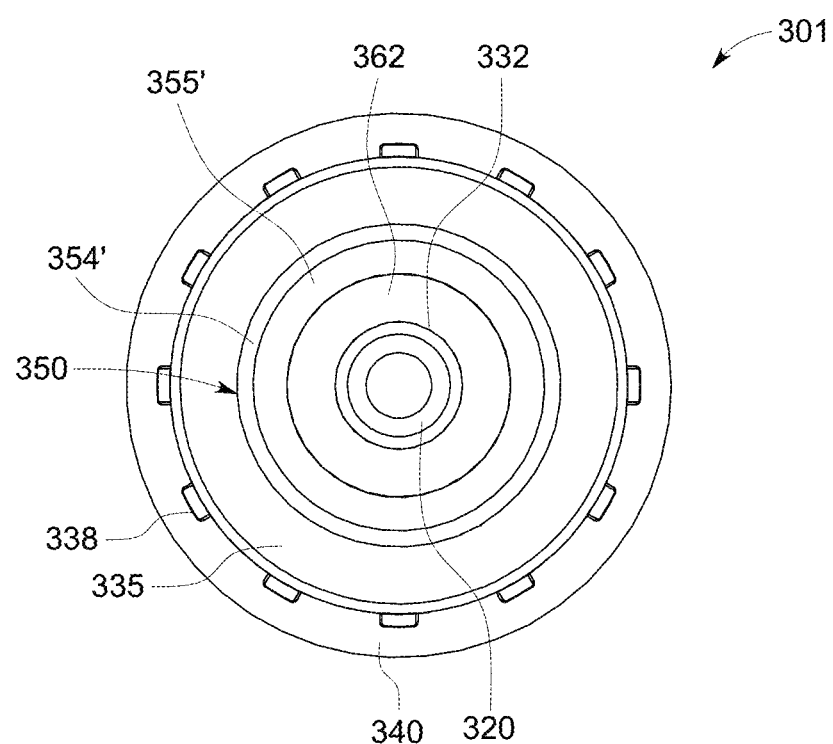
FIG. 54 is a top view of the exemplary insertion fitting of FIG. 49, in accordance with an aspect of the present disclosure.
Figure 55:
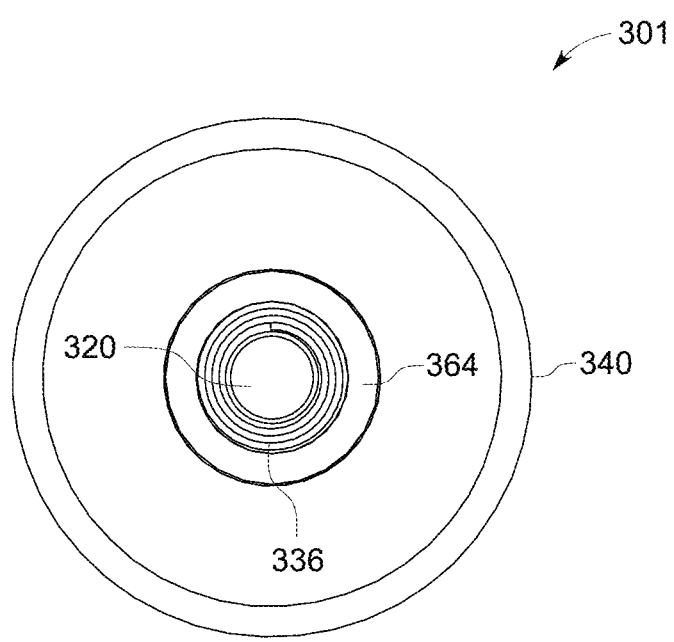
FIG. 55 is a bottom view of the exemplary insertion fitting of FIG. 49, in accordance with an aspect of the present disclosure.

As shown in FIGS. 17-32, the insertion fitting 101 differs from the coupling fitting 1 in that it does not include the check or backflow features provided by the first and second check members (at least partially) within the first and second bodies 114, 122, respectively. As such, rather than the distal end of the first body 114 engaging a retainer when fully seated within the through hole of the second body 122, the distal end of the first body 114 engages a rim or narrow portion 146 within the flowpath or through hole of the second body 122 when fully seated within the through hole of the second body 122, as shown in FIGS. 24-27. As shown in FIGS. 24 and 25, the distal end of the distal end portion 142 of the first body 114 forms an axially-extending projection or tongue 142, and the proximal end/side of the rim or narrow portion 146 within the flowpath or through hole of the second body 122 forms a groove 144 that is configured to accept the projection or tongue 142 therein when the when the first body 114 is fully/properly seated or positioned within the second body 122. The distal end portion 142 of the first body 114 may also include a sleeve or wider portion that engages the inner side wall of the flowpath or through hole of the second body 122 to seal and/or coaxially-center/align the first body 114 and the second body 122, as shown in FIGS. 24, 25 and 28-32.

Referring now to FIGS. 33-48, an exemplary embodiment of an insertion fitting device 201 is shown. The insertion fitting device 201 is similar to the insertion fitting device 1 and the insertion fitting device 101, and therefore like reference numerals preceded with "2" are used to indicate like components, portions, aspects, features and functions, and the description above directed thereto (including any alternative embodiments thereof) equally applies to the insertion fitting device 201 and is not repeated hereinbelow only for brevity sake.

As shown in FIGS. 33-48, the insertion fitting 201 is configured as a quick disconnect/connect check valve coupling. As shown, the coupling fitting 201 includes a pair of mating fitting assemblies that can be quickly and easily coupled (e.g., via insertion of one assembly into the other assembly) and decoupled, and that normally allow a fluid (liquid or gas) to flow through it when coupled together and potentially in only one direction.

As also shown in FIGS. 33-48, the coupling fitting 201 differs from the coupling fitting 101 in that the first body 214 and the first coupler 210 are configured as a flowpath reducer which reduced the diameter or other size of the flowpath through the coupling fitting 201. As shown in FIGS. 40-48, the first body 214 includes a proximal narrow portion 248 and a distal wide portion 242. The inner surfaces and outer surfaces of the proximal narrow portion 248 define smaller diameters/cross-sections of that of the distal wide portion 242. As such, the flowpath of the narrow portion 248 of the first body 214 includes a smaller diameter/cross-section than that of the flowpath of the distal wide portion 242 of the first body 214.

As shown in FIGS. 40-48, the proximal narrow portion 248 of the first body 214 includes the flange 215. As such, the first nut 212 defines a smaller diameter/width than that of the second nut 235 that is configured to engage the flange 215 (and potentially the exterior surface) of the narrow portion 248 of the first body 214. Similarly, the stem portion 211 of the first coupler 210 is configured to engage the exterior of the narrow portion 248 of the first body 214, and thereby defines a smaller diameter/width than that of the second coupler 240. The proximal end portion of the first coupler 210 may similarly be configured to engage a smaller existing tube, pipe, fitting or other or other flowpath source member as described above.

Referring now to FIGS. 49-64, an exemplary embodiment of an insertion fitting device 301 is shown. The insertion fitting device 301 is similar to the fitting device 1, the insertion fitting device 101 and the insertion fitting device 201, and therefore like reference numerals preceded with "3" are used to indicate like components, portions, aspects, features and functions, and the description above directed thereto (including any alternative embodiments thereof) equally applies to the insertion fitting device 301 and is not repeated hereinbelow only for brevity sake.

As shown in FIGS. 49-64, the fitting or insert 301 includes a flowpath tube 350, a nut (or flare nut) 338, an insert body member 322 and a coupler 340. The flowpath tube 350 includes a through hole that forms a flowpath therethrough. As shown in FIGS. 56, 57 and 60-65, the fitting or insert 301 further includes an O-ring or other sealing member 320, an insert check member 320 and an insert spring 336 positioned within a through hole/flowpath of the body member 322. As shown in FIGS. 49-64, the insertion fitting 301 is configured as a check valve fitting to prevent flow therethrough in a direction extending from the coupler 340 to the tube member 350 (i.e., distally-proximally or in a distal-to-proximal direction).

The flowpath tube 350 also includes a medial portion 356, an expanded distal end portion 354 extending distally from the medial portion 356, and an expanded proximal end portion 354' extending proximally from the medial portion 356. The medial portion 356 defines first inner and outer diameter/cross-sectional sizes that are greater than that of the expanded distal end portion 354 and the expanded proximal end portion 354'. The outer surface and the inner surface of the medial portion is arcuately convex about the axis of the flowpath/through hole, and straight/linear in the axial direction and aligned (parallel) to the axis of the flowpath/through hole (e.g., is a cylindrical portion). Similarly, the outer and inner surfaces of the expanded distal end portion 354 and the expanded proximal end portion 354' are arcuately convex about the axis of the flowpath/through hole, and are straight/linear in the axial direction and aligned (parallel) to the axis of the flowpath/through hole (e.g., are cylindrical portions). The flowpath tube 350 further includes a distal transition portion 355 that extends between the medial portion 356 and the expanded distal end portion 354, and a proximal transition portion 355' that extends between the medial portion 356 and the proximal distal end portion 354'. The outer surfaces and the inner surfaces of the distal transition portion 355 and the proximal distal end portion 354' extend linearly axially and outwardly from the medial portion, and are arcuately convex about the axis of the flowpath/through hole (e.g., are conical portions).

Figure 56:
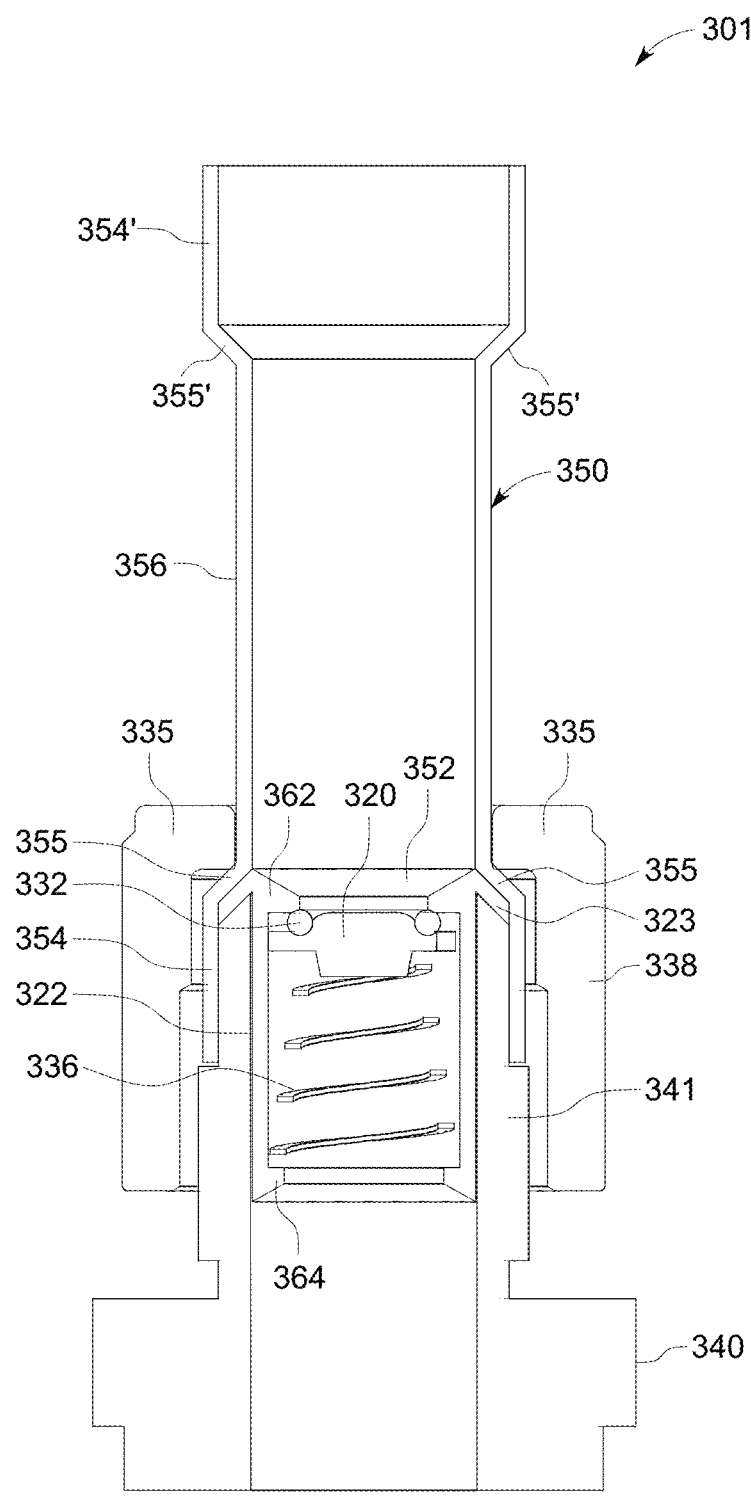
FIG. 56 is a right side cross-sectional view of the exemplary insertion fitting of FIG. 49, in accordance with an aspect of the present disclosure.
Figure 57:
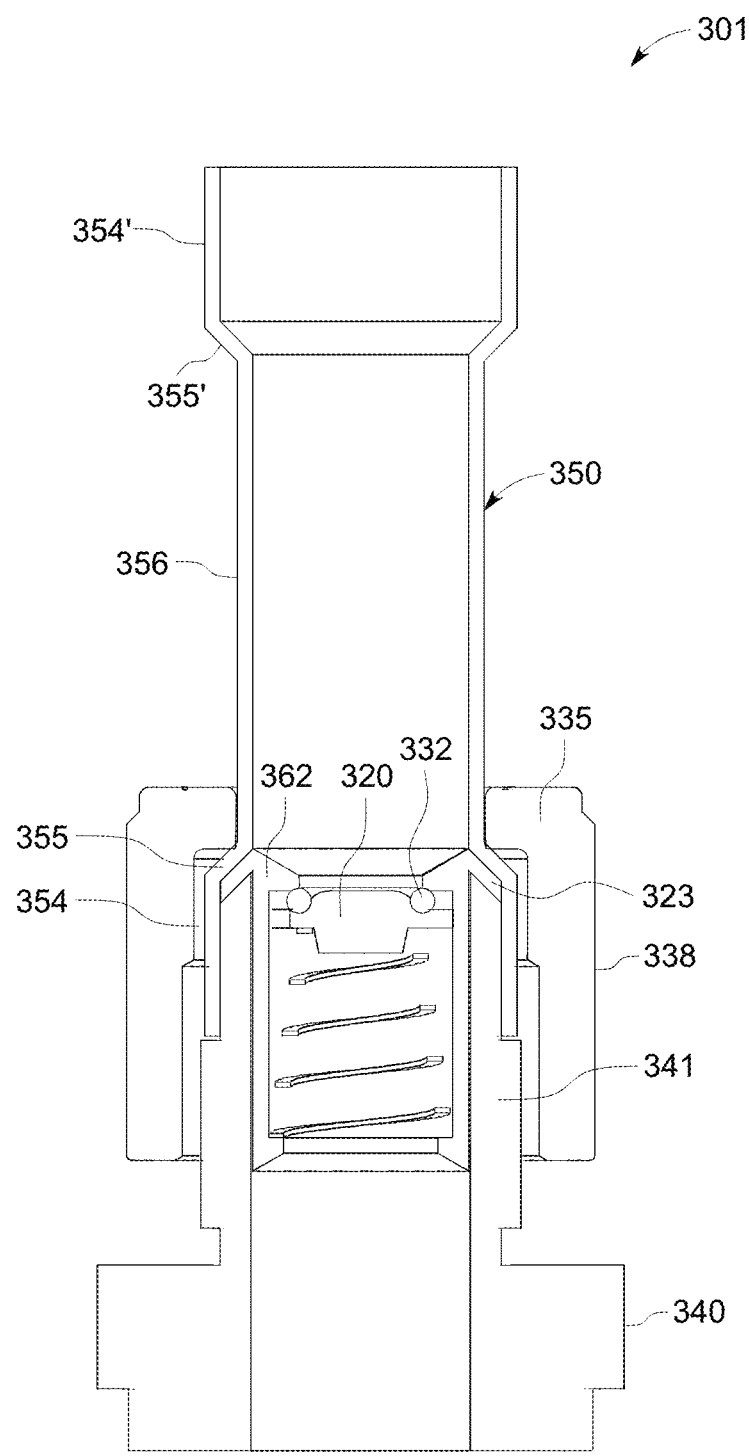
FIG. 57 is a front cross-sectional view of the exemplary insertion fitting of FIG. 49, in accordance with an aspect of the present disclosure.
Figure 58:
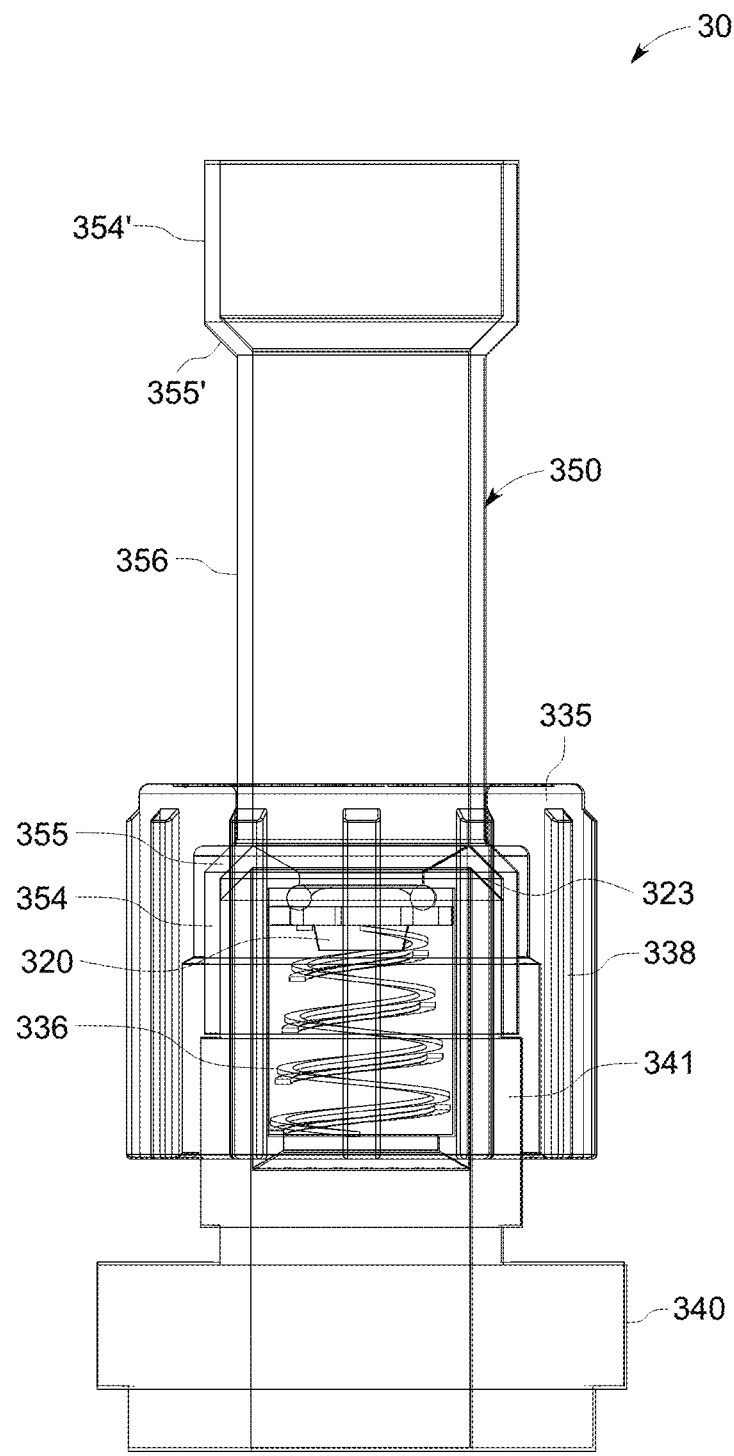
FIG. 58 is a left side transparent view of the exemplary insertion fitting of FIG. 49, in accordance with an aspect of the present disclosure.
Figure 59:
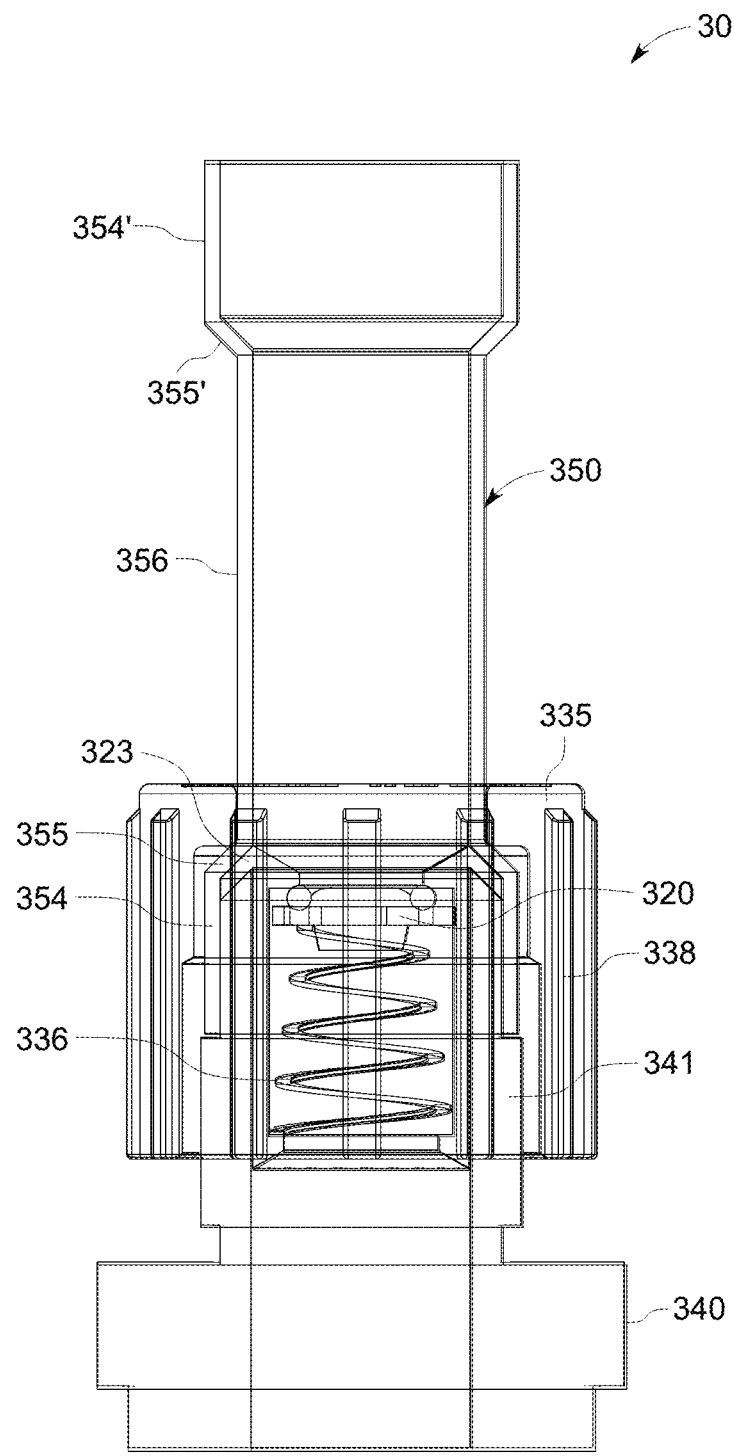
FIG. 59 is a front transparent view of the exemplary insertion fitting of FIG. 49, in accordance with an aspect of the present disclosure.
Figure 60:
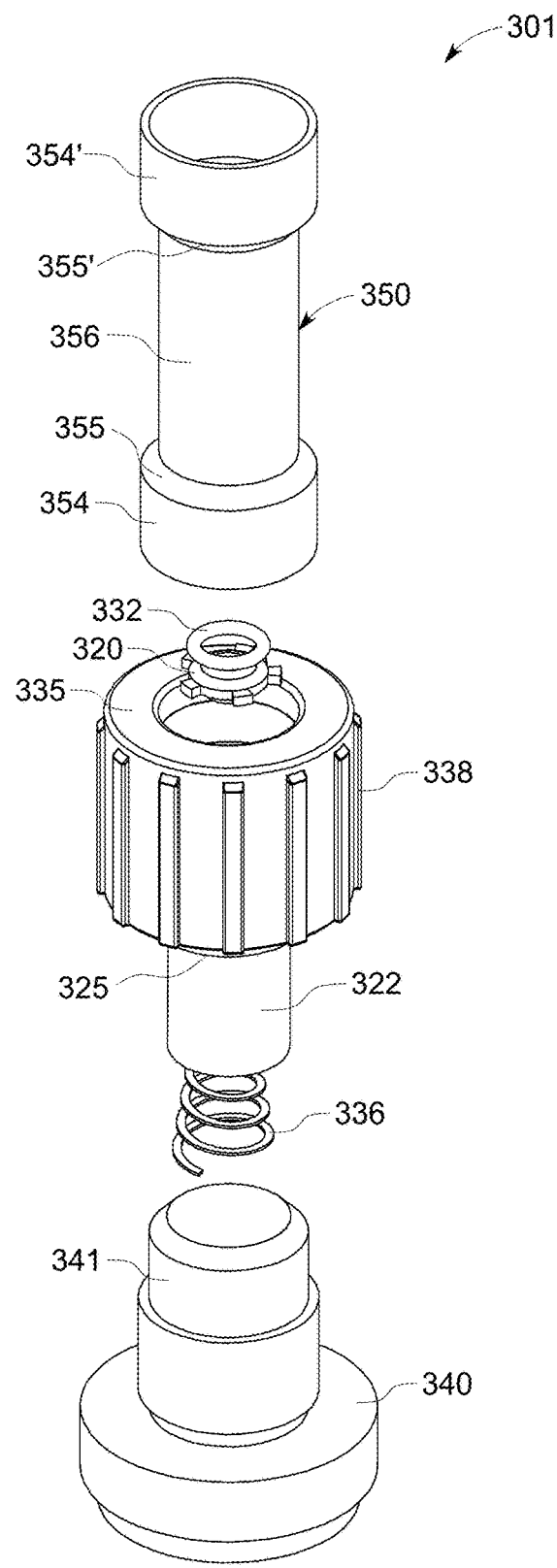
FIG. 60 is an elevational perspective exploded view of the exemplary insertion fitting of FIG. 49, in accordance with an aspect of the present disclosure.
Figure 61:
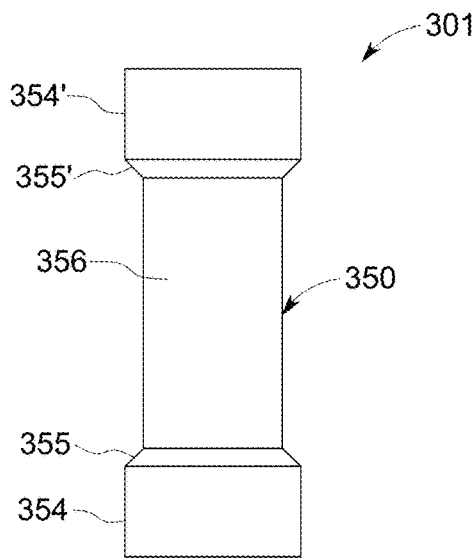
FIG. 61 is a right side exploded view of the exemplary insertion fitting of FIG. 49, in accordance with an aspect of the present disclosure.
Figure 61:
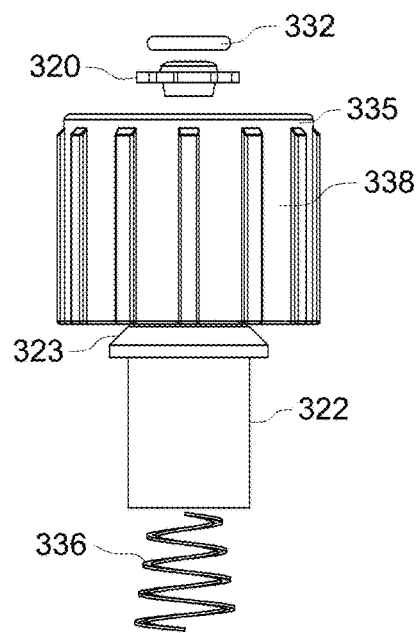
Figure 61:
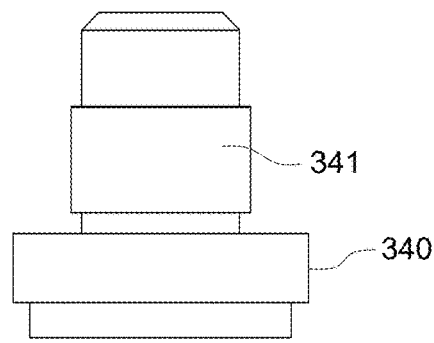
Figure 62:
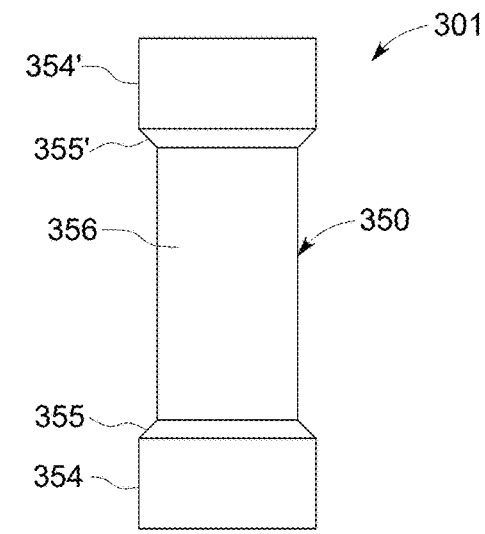
FIG. 62 is a front exploded view of the exemplary insertion fitting of FIG. 49, in accordance with an aspect of the present disclosure.
Figure 62:
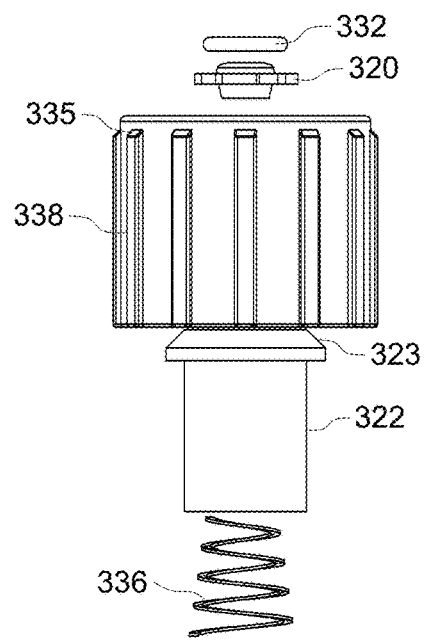
Figure 62:
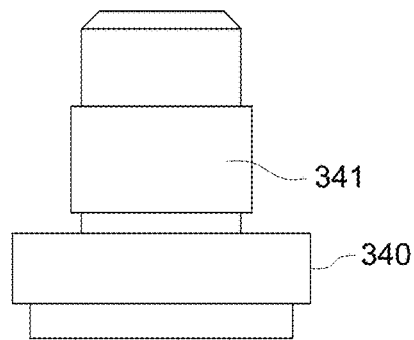
Figure 63:
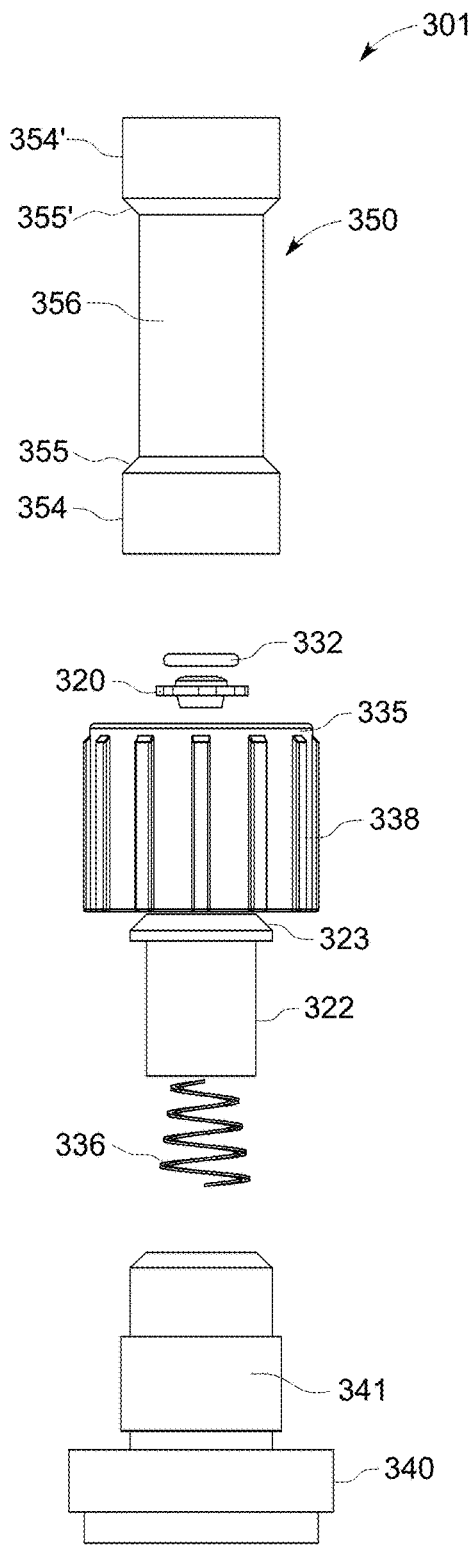
FIG. 63 is a left side exploded view of the exemplary insertion fitting of FIG. 49, in accordance with an aspect of the present disclosure.
Figure 64:
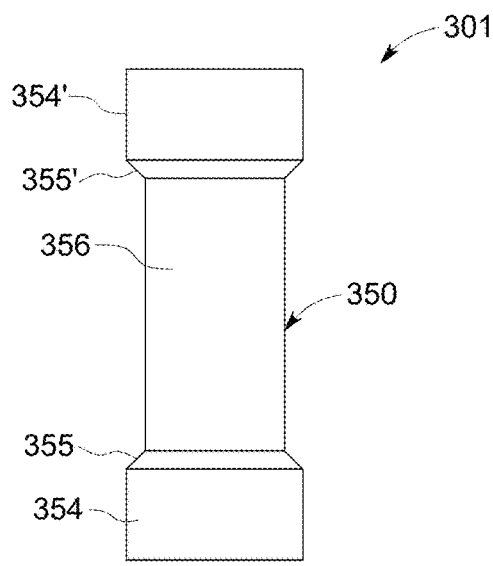
FIG. 64 is a back exploded view of the exemplary insertion fitting of FIG. 49, in accordance with an aspect of the present disclosure.
Figure 64:
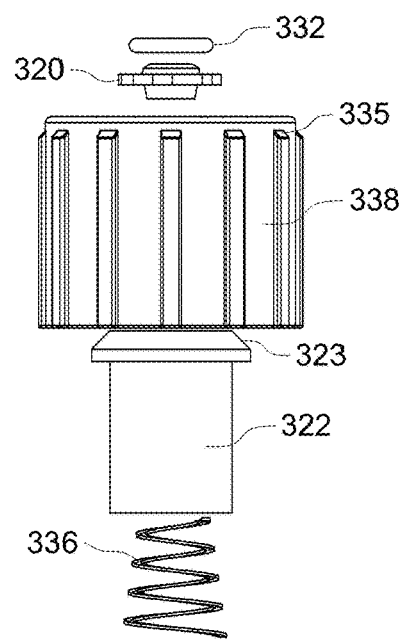
Figure 64:
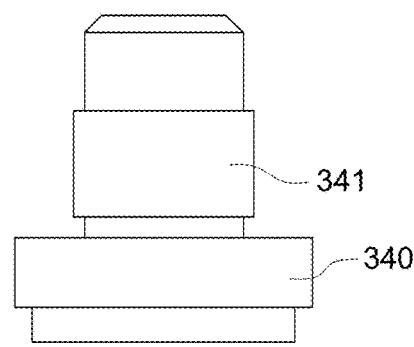
Figure 65:
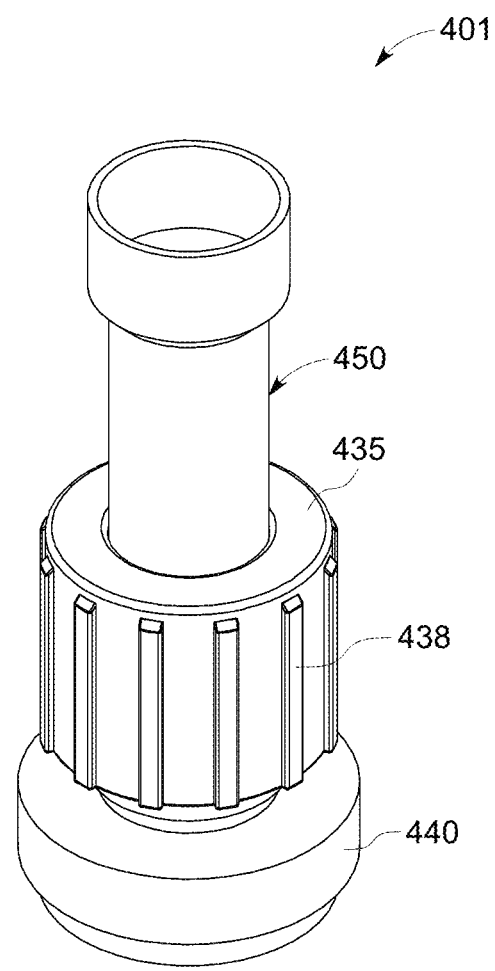
FIG. 65 is an elevational perspective view of another exemplary insertion fitting, in accordance with an aspect of the present disclosure.
Figure 66:
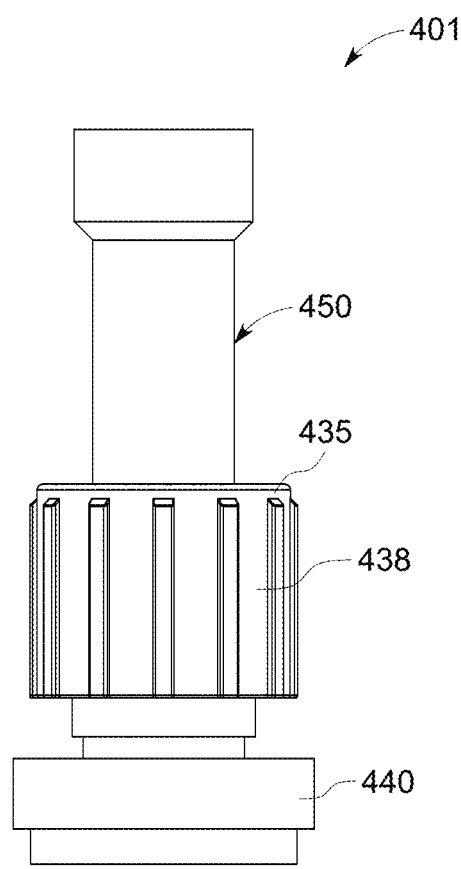
FIG. 66 is a front view of the exemplary insertion fitting of FIG. 65, in accordance with an aspect of the present disclosure.
Figure 67:
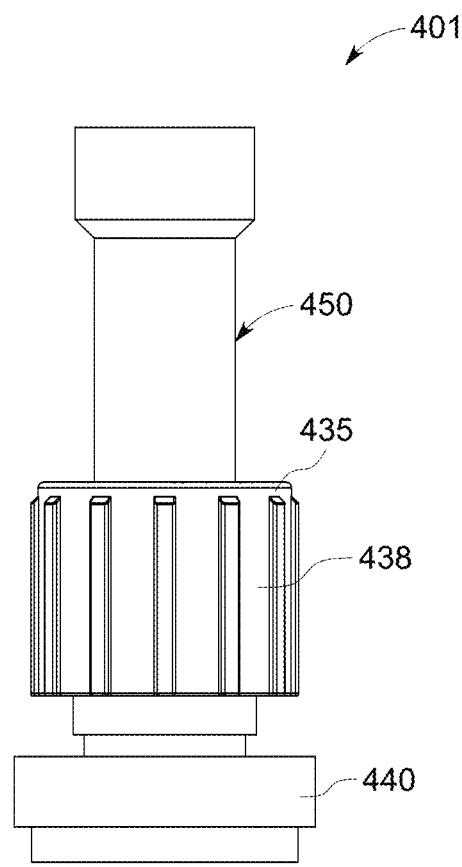
FIG. 67 is a right side view of the exemplary insertion fitting of FIG. 65, in accordance with an aspect of the present disclosure.
Figure 68:
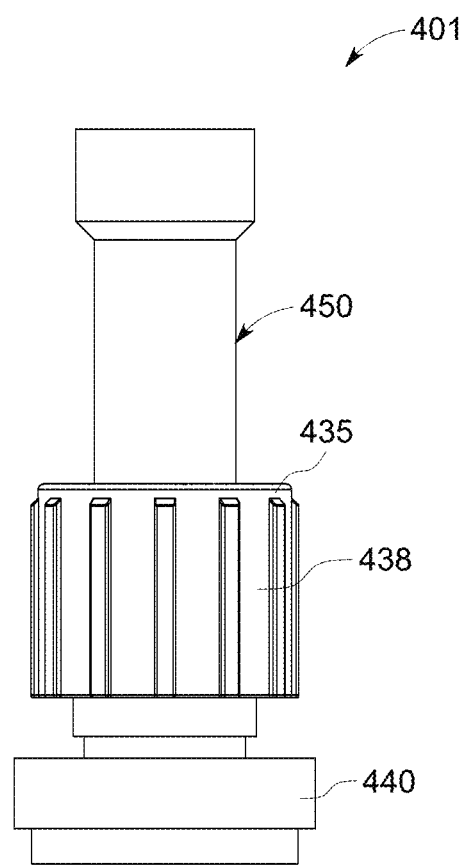
FIG. 68 is a back view of the exemplary insertion fitting of FIG. 65, in accordance with an aspect of the present disclosure.
Figure 69:
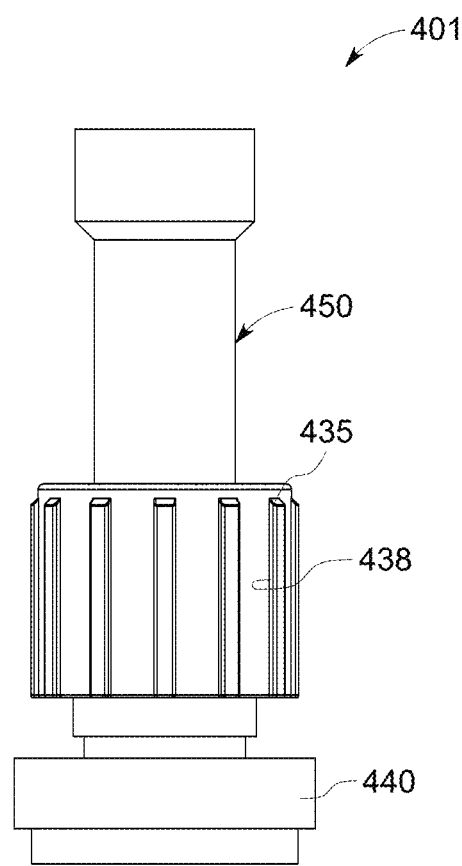
FIG. 69 is a left side view of the exemplary insertion fitting of FIG. 65, in accordance with an aspect of the present disclosure.
Figure 70:
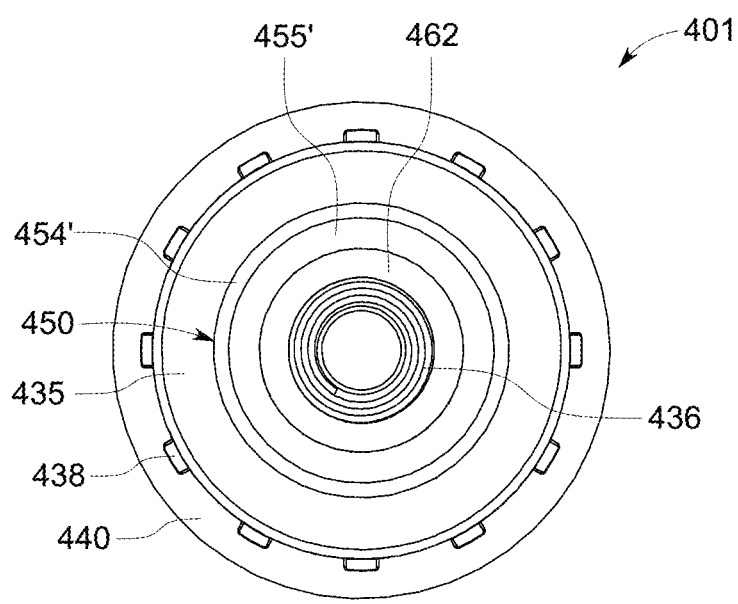
FIG. 70 is a top view of the exemplary insertion fitting of FIG. 65, in accordance with an aspect of the present disclosure.
Figure 71:
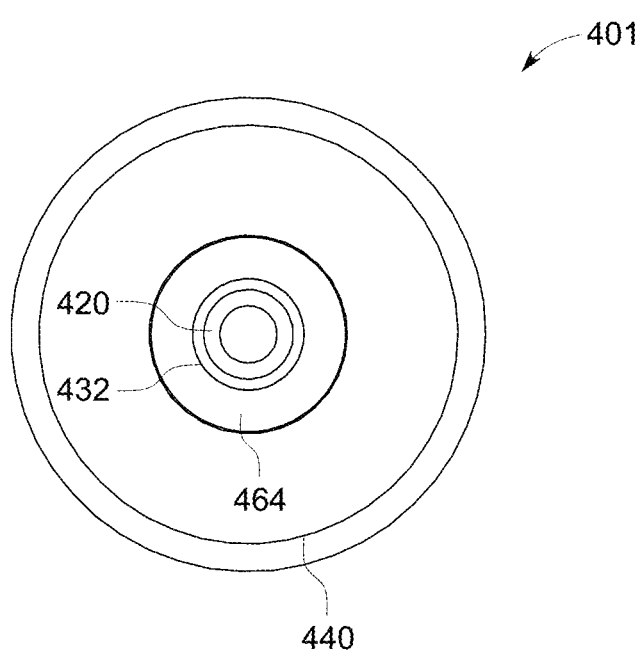
FIG. 71 is a bottom view of the exemplary insertion fitting of FIG. 65, in accordance with an aspect of the present disclosure.
Figure 72:
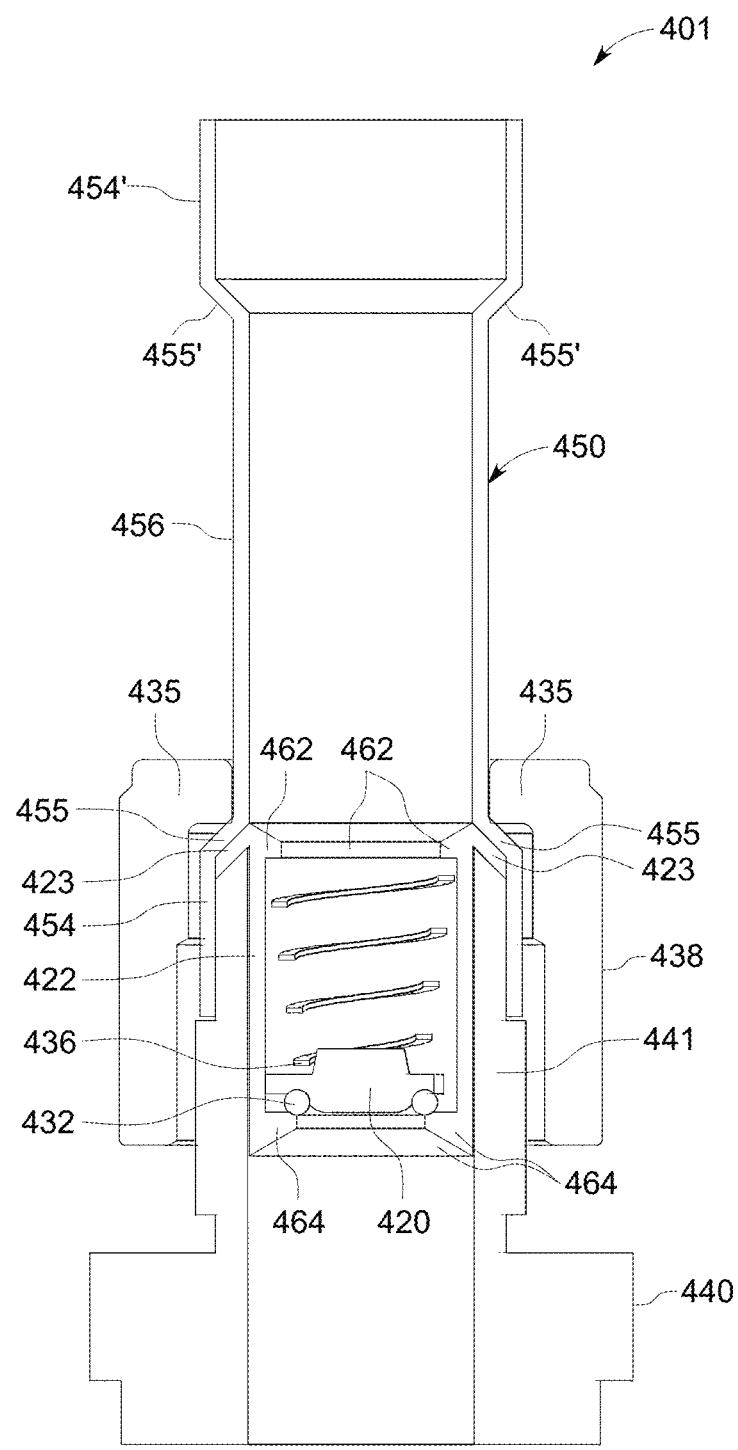
FIG. 72 is a right side cross-sectional view of the exemplary insertion fitting of FIG. 65, in accordance with an aspect of the present disclosure.
Figure 73:
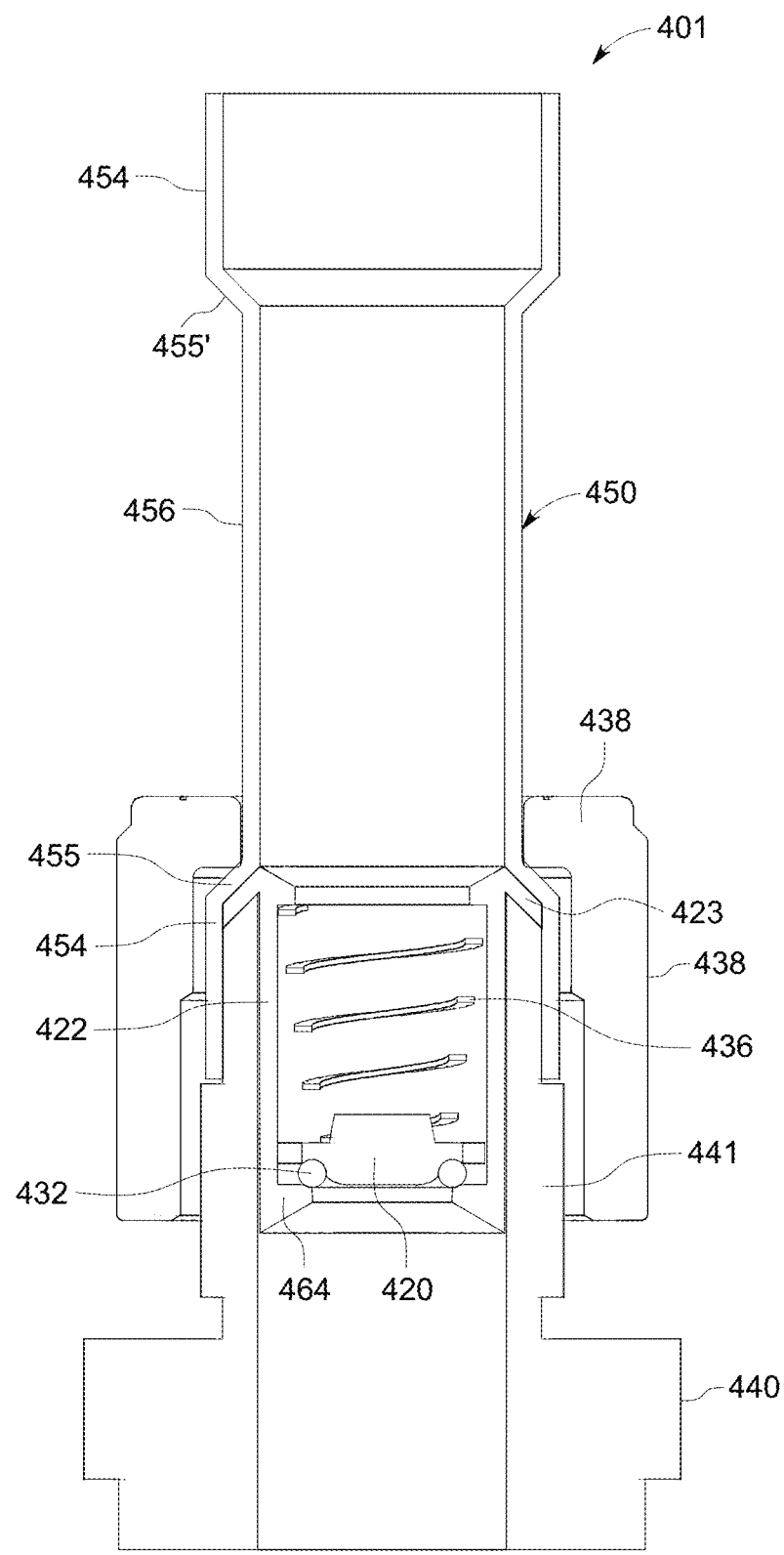
FIG. 73 is a front cross-sectional view of the exemplary insertion fitting of FIG. 65, in accordance with an aspect of the present disclosure.
Figure 74:
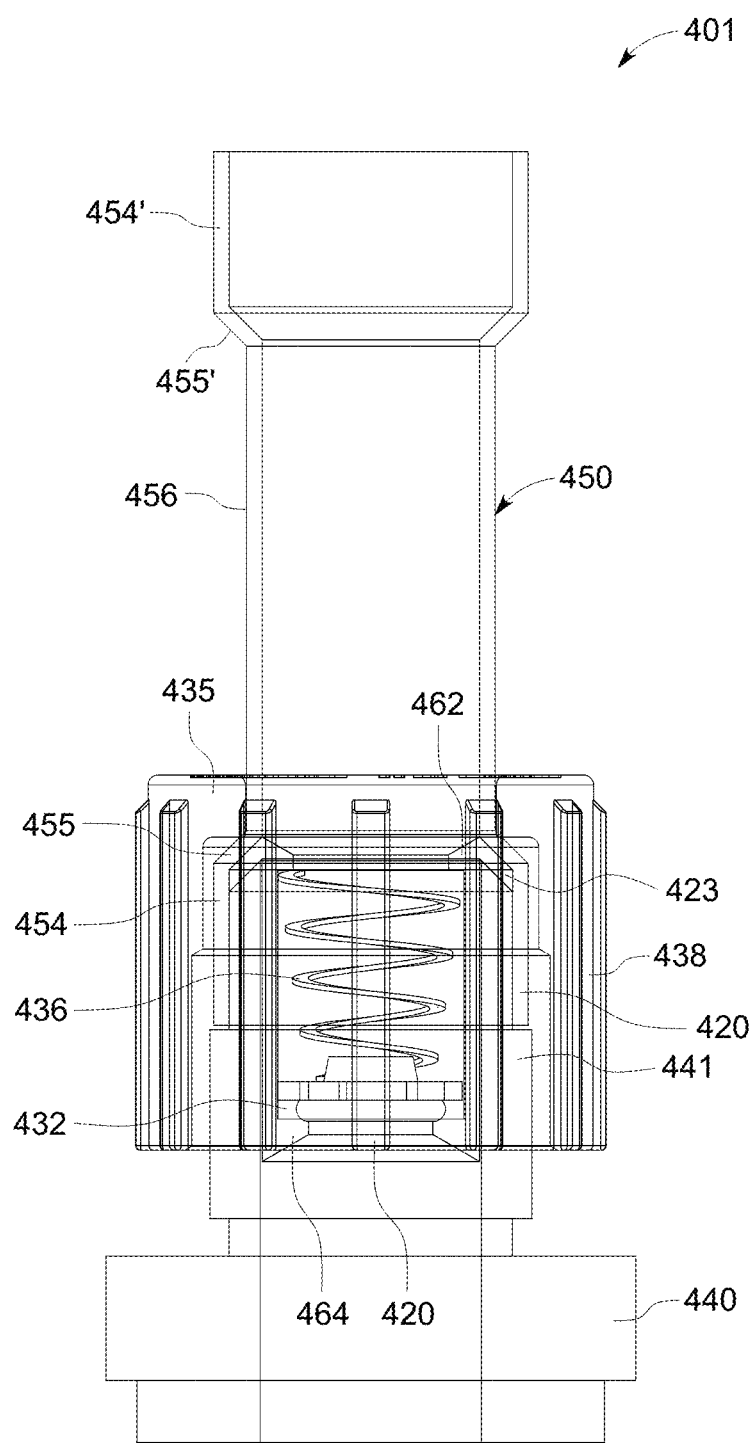
FIG. 74 is a left side transparent view of the exemplary insertion fitting of FIG. 65, in accordance with an aspect of the present disclosure.
Figure 75:
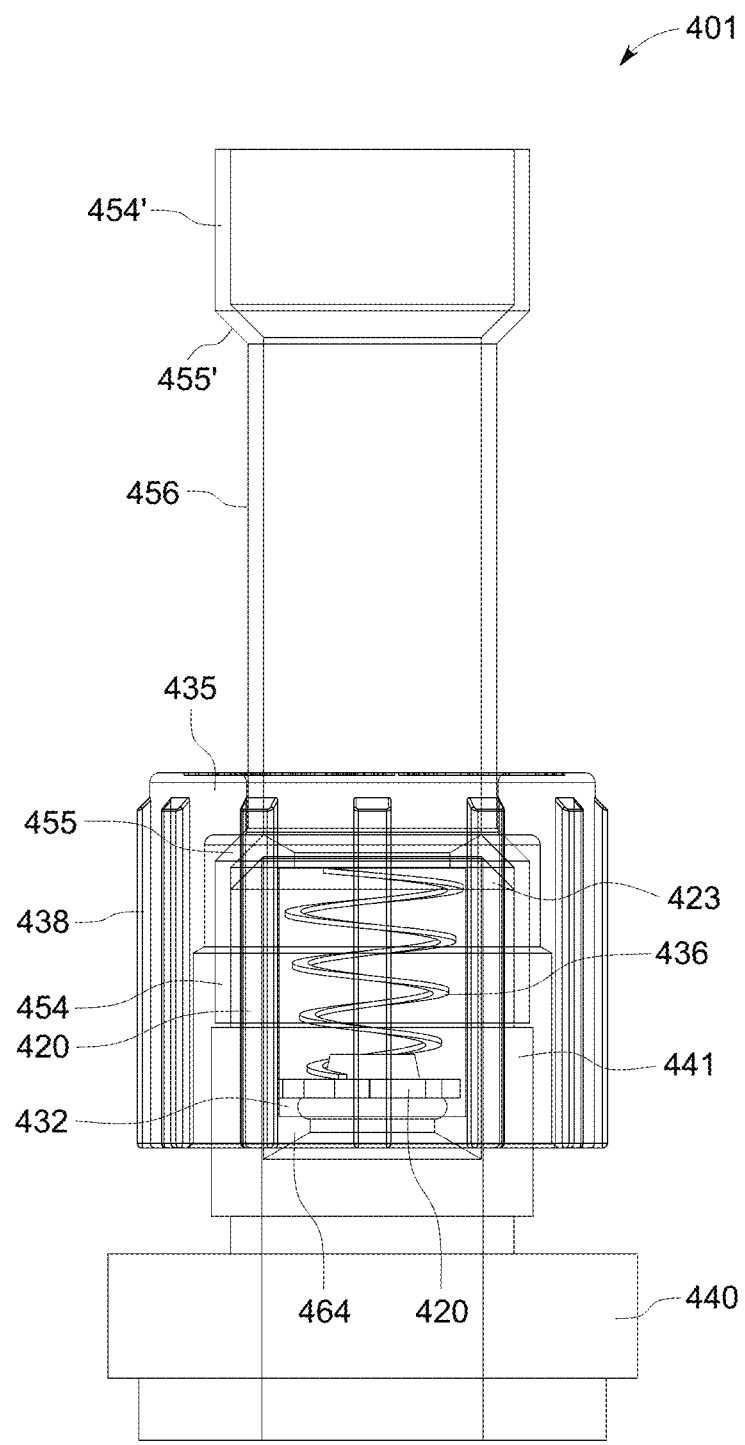
FIG. 75 is a front transparent view of the exemplary insertion fitting of FIG. 65, in accordance with an aspect of the present disclosure.
Figure 76:
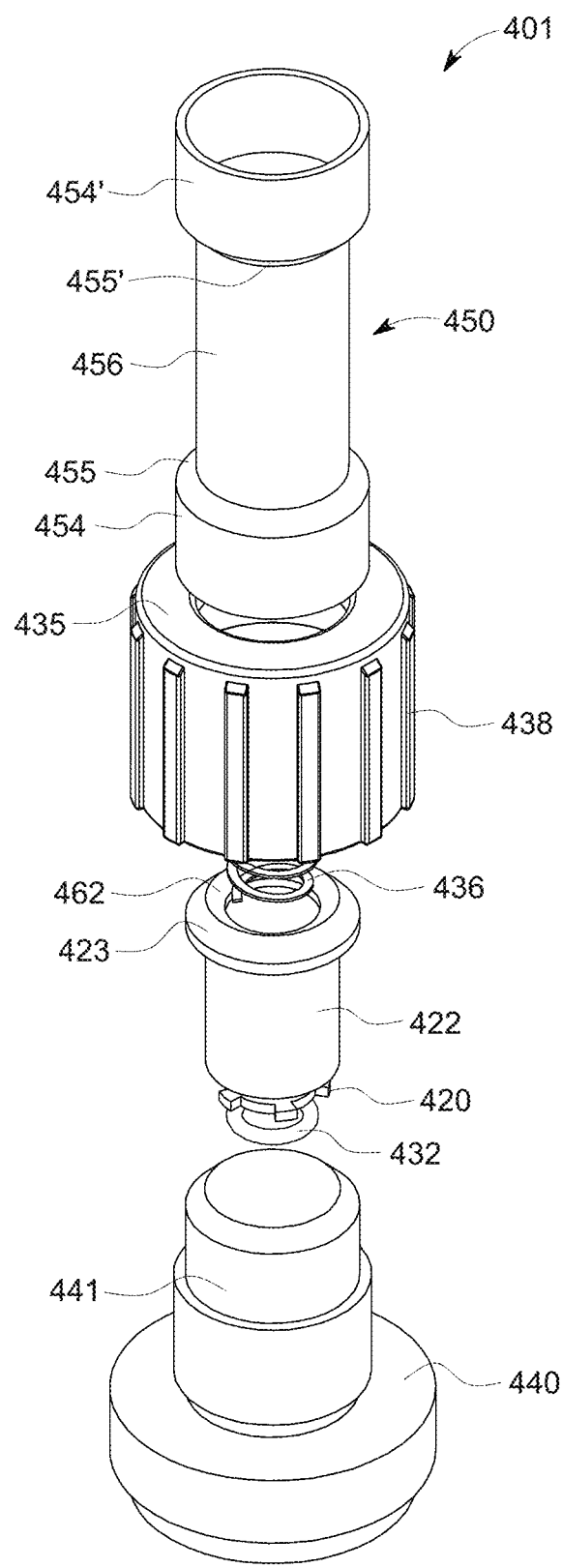
FIG. 76 is an elevational perspective exploded view of the exemplary insertion fitting of FIG. 65, in accordance with an aspect of the present disclosure.
Figure 77:
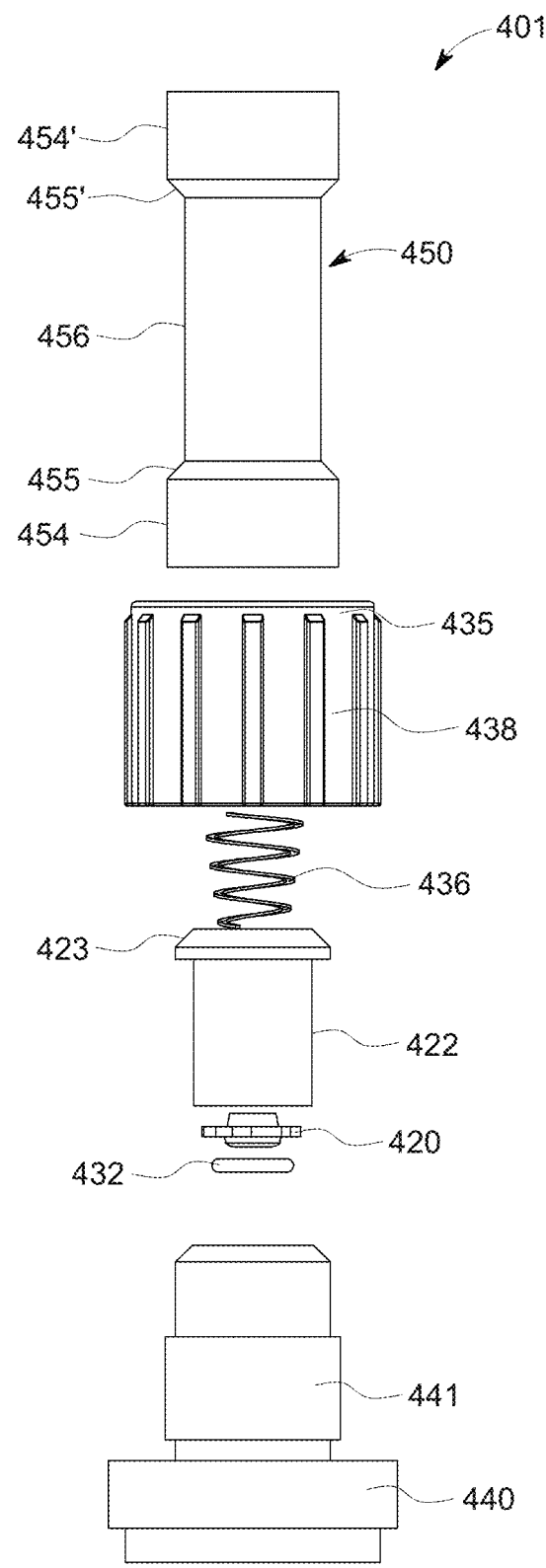
FIG. 77 is a right side exploded view of the exemplary insertion fitting of FIG. 65, in accordance with an aspect of the present disclosure.
Figure 78:
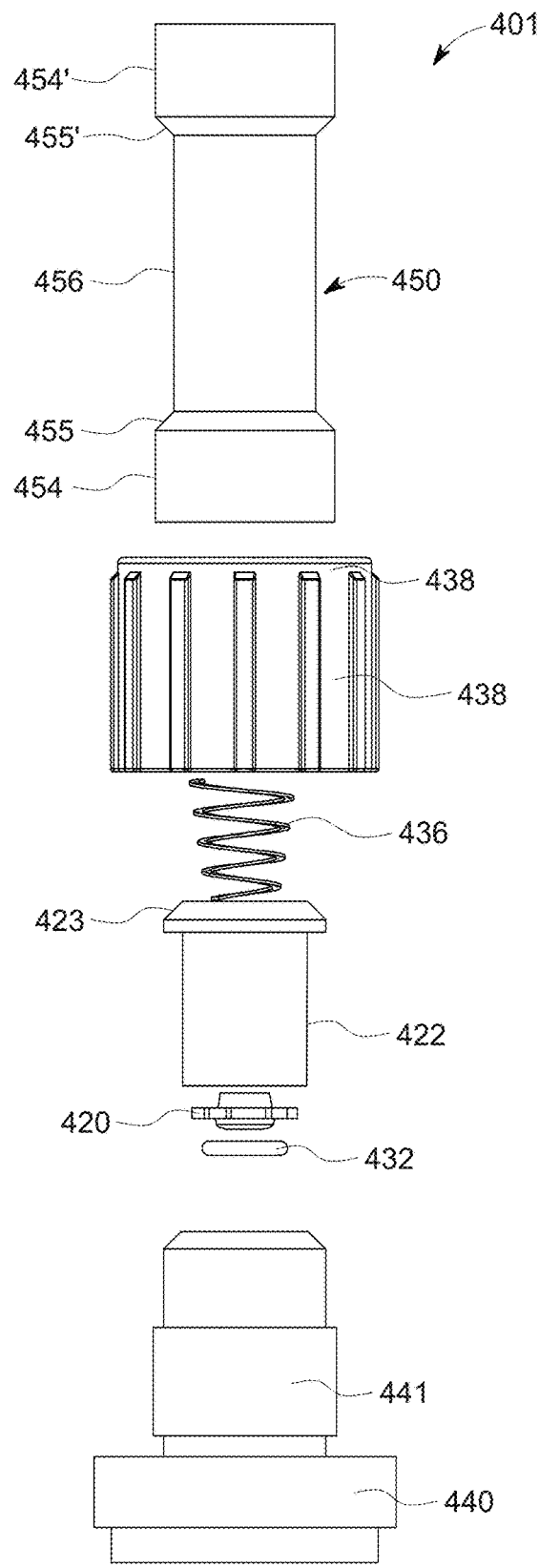
FIG. 78 is a front exploded view of the exemplary insertion fitting of FIG. 65, in accordance with an aspect of the present disclosure.
Figure 79:
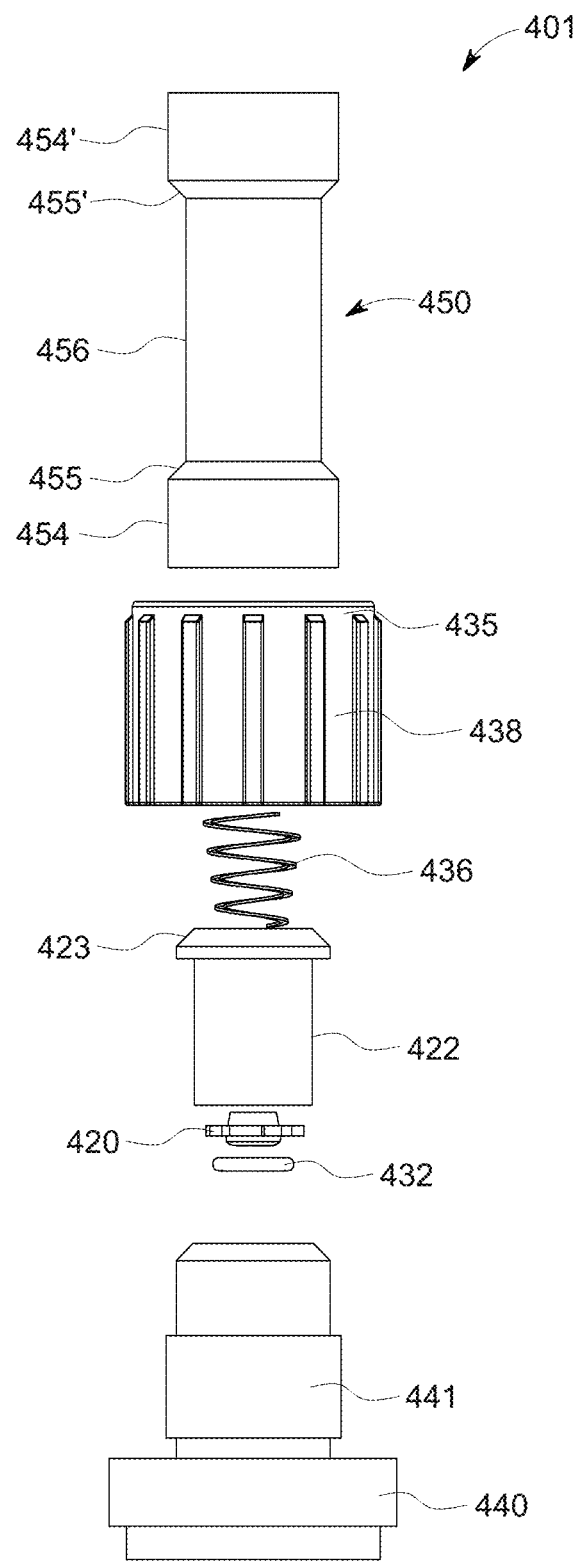
FIG. 79 is a left side exploded view of the exemplary insertion fitting of FIG. 65, in accordance with an aspect of the present disclosure.
Figure 80:
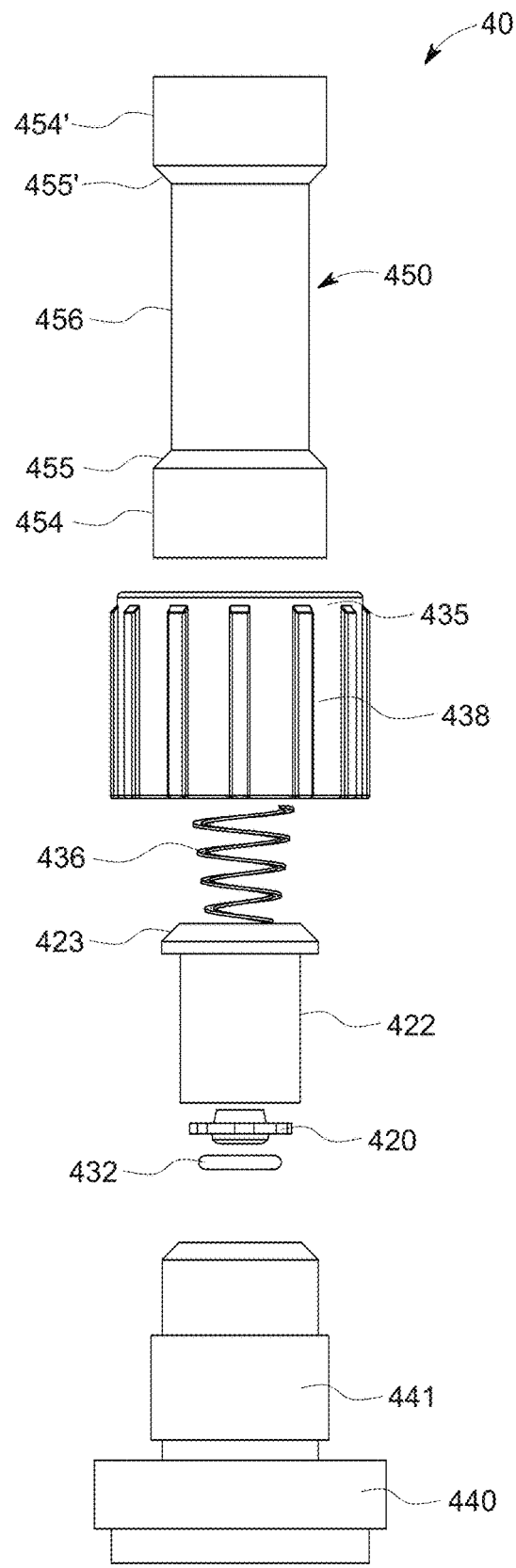
FIG. 80 is a back exploded view of the exemplary insertion fitting of FIG. 65, in accordance with an aspect of the present disclosure.
Figure 81:
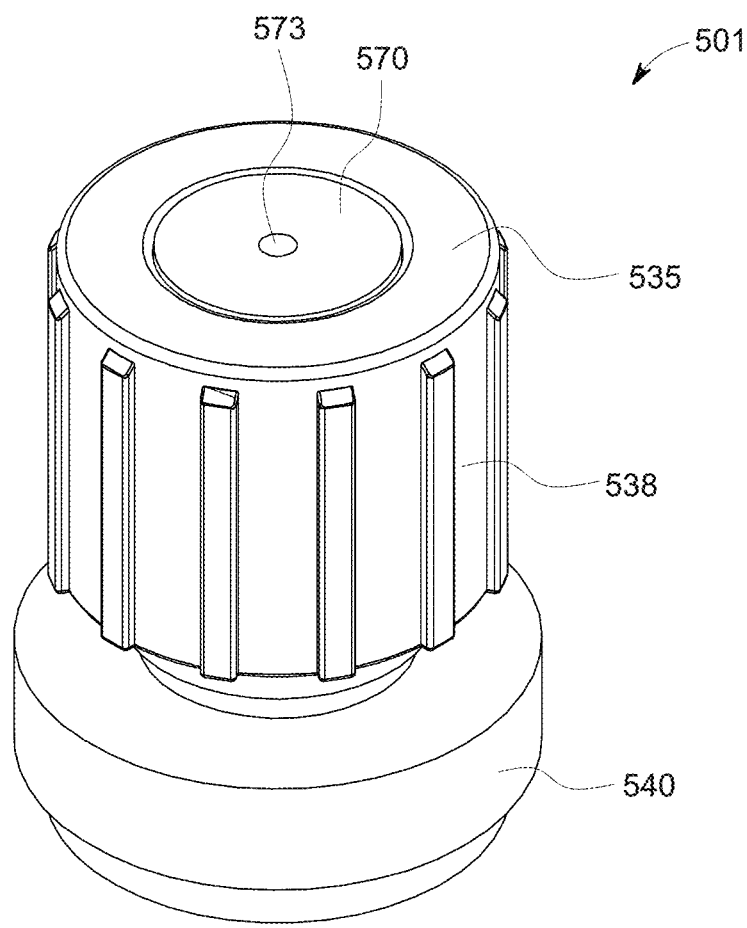
FIG. 81 is an elevational perspective view of another exemplary insertion fitting, in accordance with an aspect of the present disclosure.
Figure 82:
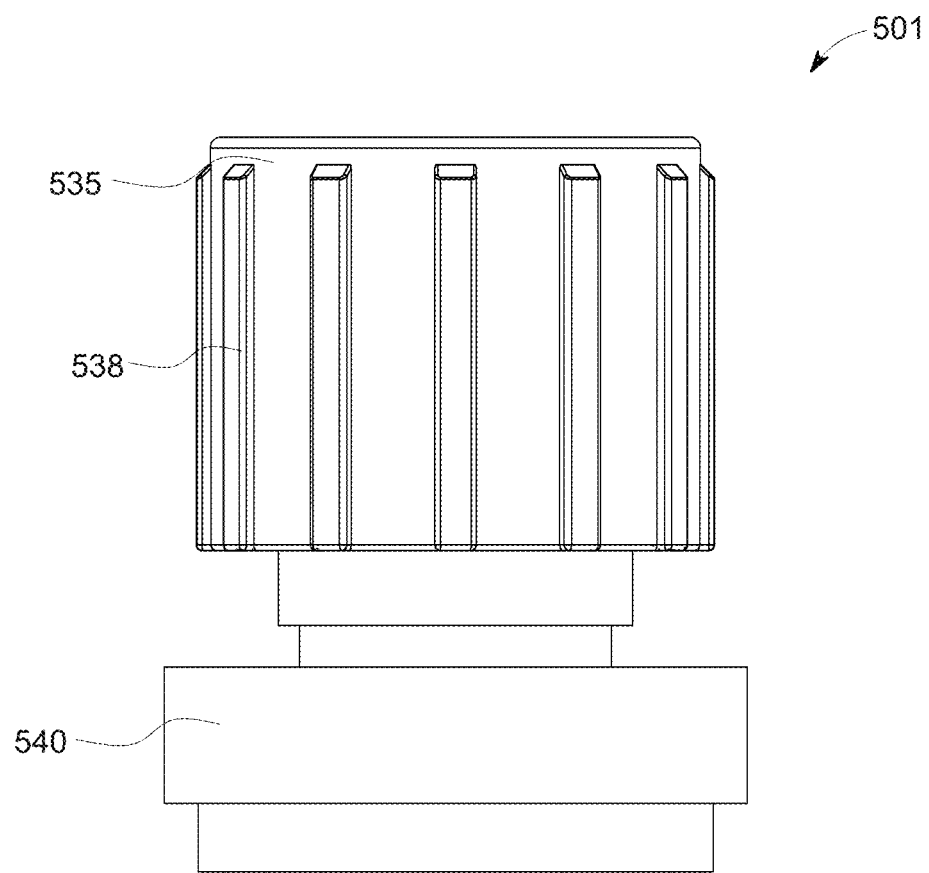
FIG. 82 is a front view of the exemplary insertion fitting of FIG. 81, in accordance with an aspect of the present disclosure.
Figure 83:
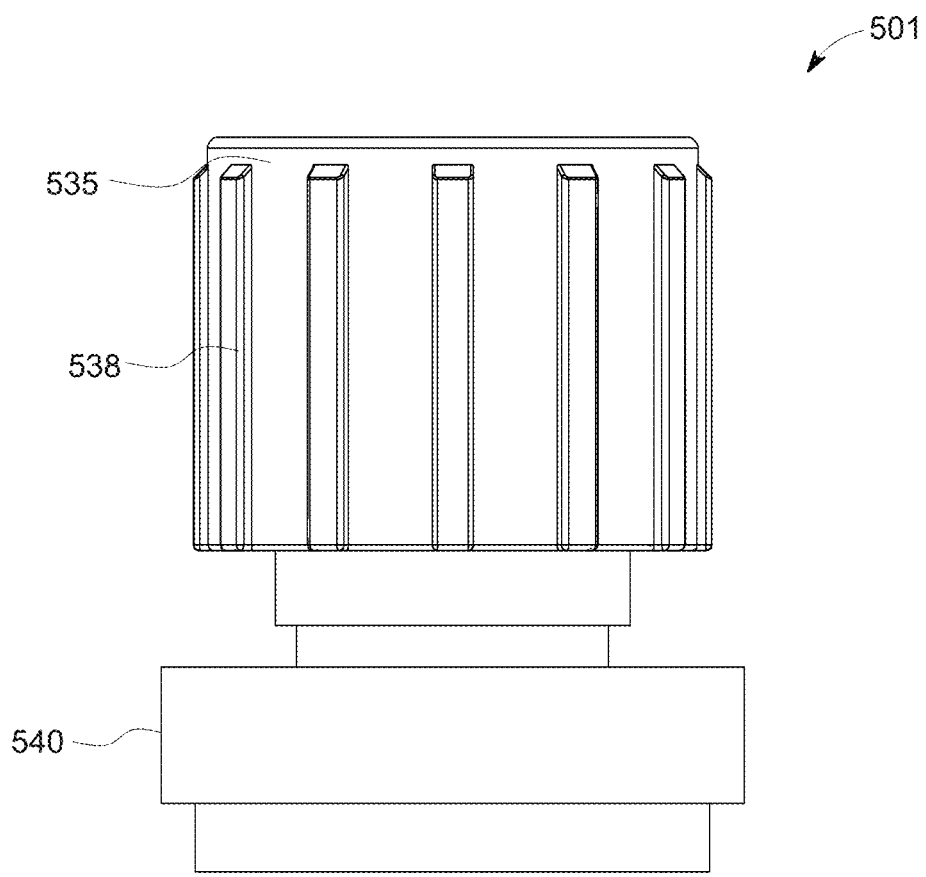
FIG. 83 is a right side view of the exemplary insertion fitting of FIG. 81, in accordance with an aspect of the present disclosure.
Figure 84:
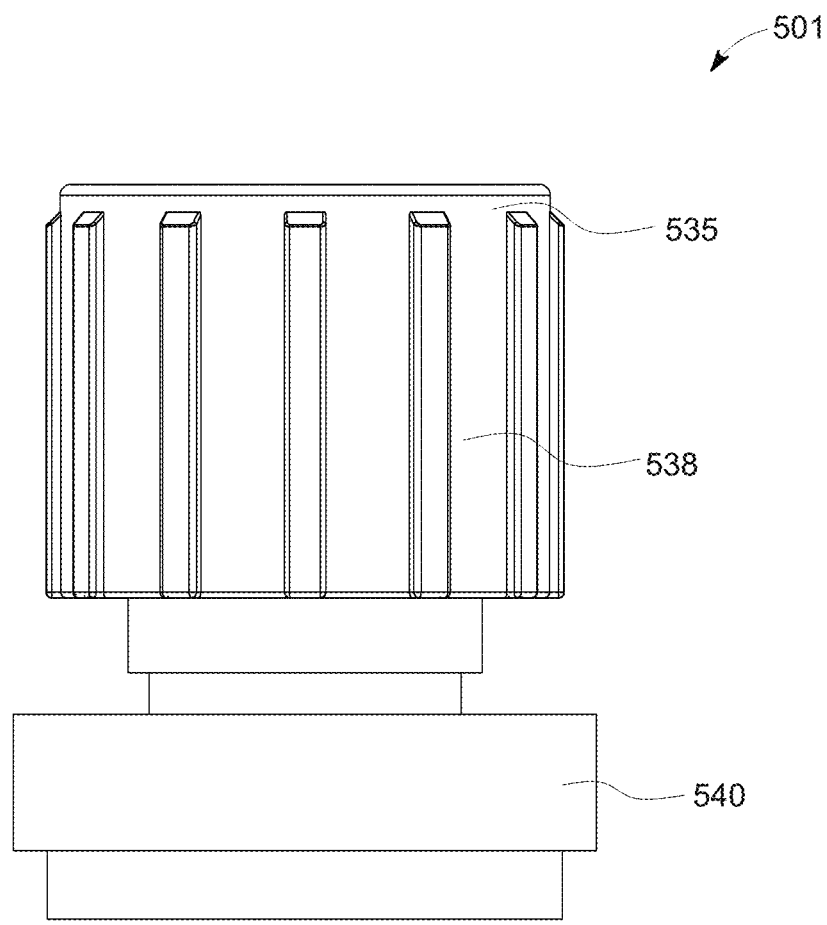
FIG. 84 is a back view of the exemplary insertion fitting of FIG. 81, in accordance with an aspect of the present disclosure.
Figure 85:
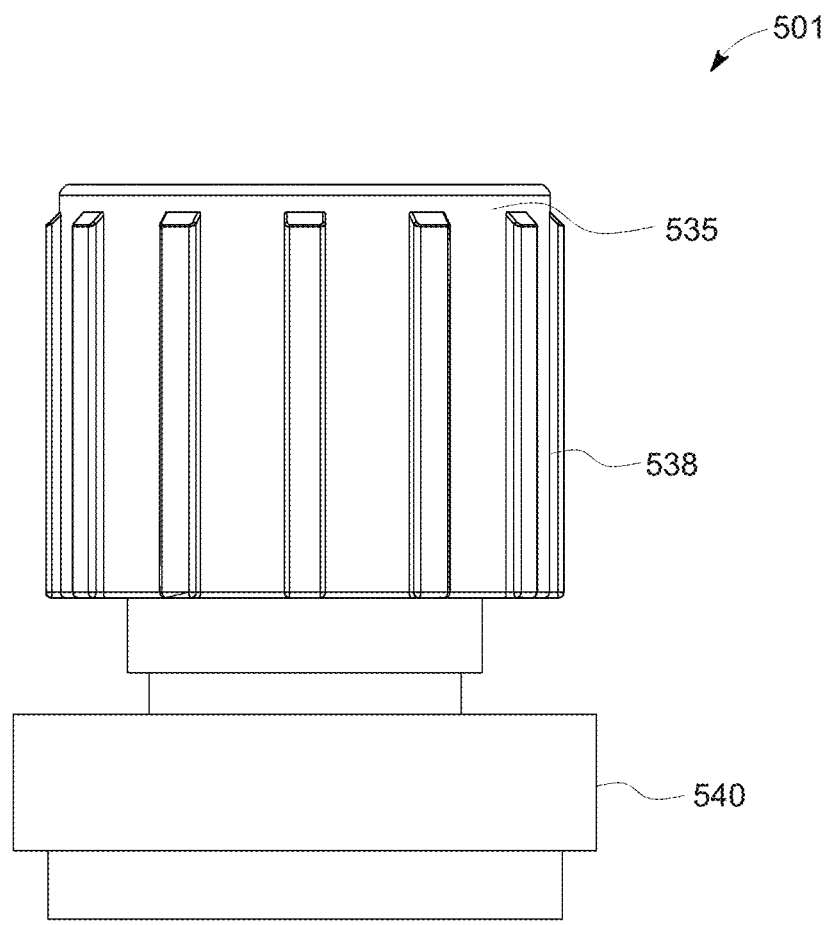
FIG. 85 is a left side view of the exemplary insertion fitting of FIG. 81, in accordance with an aspect of the present disclosure.
Figure 86:
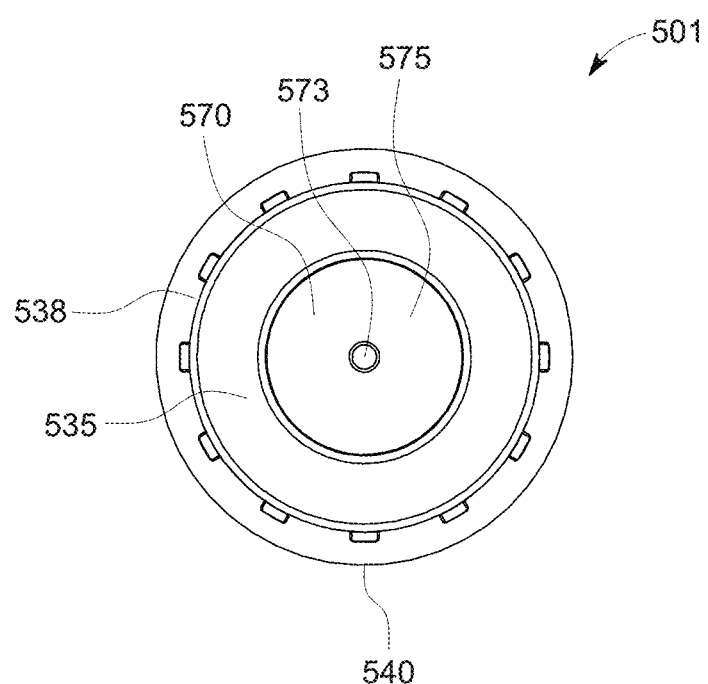
FIG. 86 is a top view of the exemplary insertion fitting of FIG. 81, in accordance with an aspect of the present disclosure.
Figure 87:
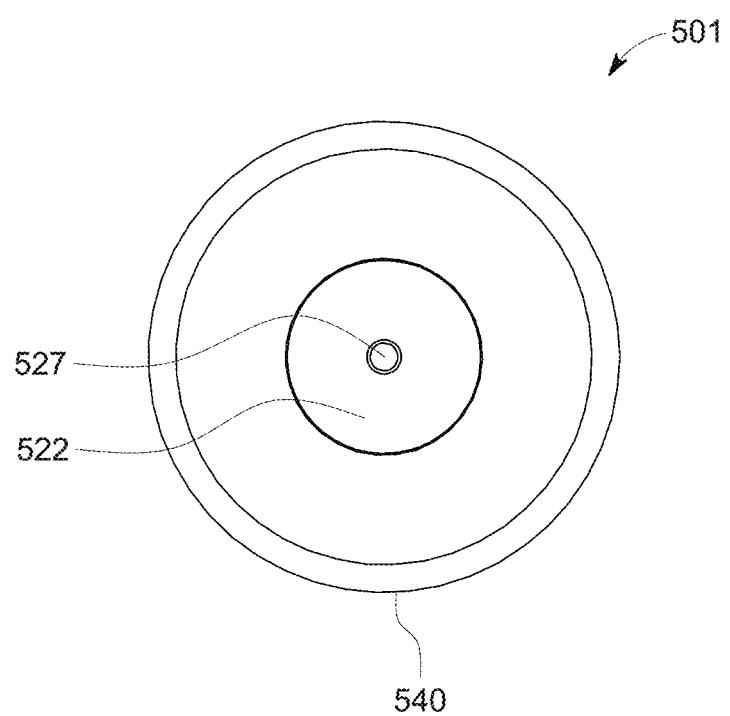
FIG. 87 is a bottom view of the exemplary insertion fitting of FIG. 81, in accordance with an aspect of the present disclosure.

As shown in FIGS. 56, 57 and 60-65, a proximal end portion of the body member 322 includes a proximal annular radially-inwardly extending rim or portion 362 and a distal end portion of the body member 322 includes a distal annular radially-inwardly extending rim or portion 364. The spring member 336 is positioned within the flowpath/through hole of the body member 322 between the proximal rim 362 and the distal rim 364, and the distal end of the spring member 336 engages the distal rim 364, as shown in FIGS. 56 and 57. The check member 320 is also positioned between the within the flowpath/through hole of the body member 322 between the proximal rim 362 and the distal rim 364. Specifically, the check member 320 engages the proximal end of the spring member 336, which resiliently biases the check member 320 against the proximal rim 362. As shown in FIGS. 56, 57 and 60-65, the O-ring or other sealing member 320 may be coupled to the distal side of the proximal rim 362 or the proximal side of the check member 320 such that the O-ring or other sealing member 320 is positioned between the proximal rim 362 and the check member 320, and engages the proximal rim 362 and the check member 320 when the check member 320 is its naturally "closed" position within the flowpath/through hole of the body member 322 to seal the joint therebetween.

In the naturally "closed" position, the proximal rim 362, the check member 320 and sealing member 320 act to close-off or seal the flowpath/through hole of the body member 322. As a fluid flows through the fitting in a direction extending from the flowpath tube 350 to the body member 322 (i.e., proximally-distally or proximal-to-distal), the fluid acts against the proximal side of the check member 320 and forces/translates the check member 320 distally/axially through the flowpath/through hole (deflecting the spring member 336) to an "open position" that forms/creates a gap between radially-outward edges of the check member 320 and the inner surface of the body member 322 that allows the fluid to flow therethrough and, thereby, through the fitting or insert 301.

The body member 322 may further include an external flange or projection 323 extending radially outwardly from therefrom and at least partially circumferentially thereabout, as shown in FIGS. 56, 57 and 60-65. In some embodiments, the external flange 323 may be circumferential and/or extend on a distal-to-proximal angle as it extends outwardly, as shown in FIGS. 56, 57 and 60-65. In some other embodiments, the external flange 323 may extend straight outwardly perpendicular to the flowpath and axis of the body member 322. The body member 322 and the flowpath tube 350 are configured such that at least the proximal portion of the body member 322 is positioned within the flowpath/through hole of the distal flowpath tube 350 with the proximal side/surface external flange 323 of the body member 322 configured to engage or mate against the inner surface of the distal transition portion 355 of the flowpath tube 350, as shown in FIGS. 56-59.

As shown in FIGS. 56, 57 and 60-65, the nut 338 may include a through hole and a rim 335 at a proximal end portion. The nut 338 and the tube member 350 are configured such that medial portion 356 of the tube member 350 extends at least partially through the through hole of the nut 338, and the rim 335 of the nut 338 engages or seats against the outer surface of the distal transition portion 355 of the tube member 350. In some embodiments, an inner side wall of the rim 335 or another proximal portion of the nut 338 also engages or abuts the outer surface of the medial portion 356 of the tube member 350.

As further shown in FIGS. 56, 57 and 60-65, the coupler 340 may include a through hole that forms a flowpath, and a distal stem portion 341 that is configured to extend within the through hole of the distal expanded portion 354 of the tube member 350 and the distal portion of the nut 338 and over a distal portion of the body member 322 (i.e., within a gap between outer surface of the body member 322 and the inner surface of the distal expanded portion 354 of the tube member 350). The coupler 340 and the body member 322 are configured such a distal end of the stem portion 341 of the coupler 340 engages or seats against the distal side/surface of the outer flange 323 of the body member 322 when the stem portion 341 of the coupler 340 is fully seated or positioned on the body member 322. The distal end of the stem portion 341 of the coupler 340 may thereby be angled or perpendicular (or otherwise oriented) to match the orientation/configuration of the proximal side of the flange 323 of the body member 322.

In some embodiments (not shown), the inner side of the distal portion of the nut 338 may include interior threads, and the exterior surface of the stem portion 341 of the coupler 340 may include exterior threads that threadably engage with the threads of the nut 338 such that rotation of the nut 338 (over/about the body member 322) in a first rotational direction draws the distal end of the stem portion 341 of the coupler 340 proximally against the distal side of the outer flange 323 of the body member 322 such that the outer flange 323 and the distal transition portion 355 of the tube member 350 is compressed between the rim 335 of the nut 338 and the distal end of the stem portion of the coupler 340. The nut 338, the coupler 340, the body member 322 and the tube member 350 may thereby be securely coupled together. In some other embodiments, the inner side of the proximal portion of the nut 338 and the exterior surface of the stem portion 341 of the coupler 340 may be configured to form a compression or friction fit to couple the nut 338, the coupler 340, the body member 322 and the tube member 350 together.

The coupler 340 may be configured to couple to a tube, pipe or other flowpath source member to couple the first assembly of the coupling fitting 301 thereto and direct a flow therefrom into the through hole of the body member 322 and the tubing 350. In some embodiments, the source member may extend in and/or couple within the through hole of the distal end portion of the coupler 340. In some embodiments, the source member may extend in and/or couple with the exterior of the distal end portion of the coupler 340. In some embodiments, the coupler 340 may form or comprise a portion of a pre-existing base fitting.

It is noted that the proximal end portion of the tube member 350 includes the proximal expanded portion 354' and the proximal transition portion 355' that are the same or substantially similar to the distal expanded portion 354 and the distal transition portion 355. As such, the proximal end portion of the tube member 350 can also be utilized with a body member, nut and coupler (and/or other fitting components) in the same or substantially similar fashion as discussed above with respect to the distal end portion of the tube member 350 to form a coupling fitting, for example.

Referring now to FIGS. 65-80, an exemplary embodiment of an insertion fitting device 401 is shown. The insertion fitting device 401 is similar to the fitting device 1, the insertion fitting device 101, the insertion fitting device 201 and the insertion fitting device 301, and therefore like reference numerals preceded with "4" are used to indicate like components, portions, aspects, features and functions, and the description above directed thereto (including any alternative embodiments thereof) equally applies to the insertion fitting device 401 and is not repeated hereinbelow only for brevity sake.

Insertion fitting device 401 is substantially similar to insertion fitting device 301, but differs in the configuration of the "check" or one-way flow feature provided by the check member 420. As shown in FIGS. 65-80, the insertion fitting 401 is configured to prevent flow therethrough in a direction extending from the tube member 450 to the coupler 440 (i.e., proximally-distally or in a proximal-to-distal direction).

As such, the proximal end of the spring member 436 engages/abuts the proximal rim 462 and naturally biases the check member 420 against the distal rim 464. The distal rim 464 and/or the distal side of the check member 420 may thereby include the O-ring or sealing member 432 to seal the joint between the distal side of the check member 420 and the proximal side of the distal rim 464 when the check member is in the naturally "closed" position. As a fluid flows through the insertion fitting 401 in a direction extending from the coupler 420 to the flowpath tube 450 (i.e., (i.e., proximally-distally or in a proximal-to-distal direction), the fluid acts against the distal side of the check member 420 and forces/translates the check member 420 axially proximally through the flowpath/through hole (deflecting the spring member 436) to an "open position" that forms/creates a gap between radially-outward edges of the check member 420 and the inner surface of the body member 422 that allows the fluid to flow therethrough and, thereby, through the insertion fitting 401.

Referring now to FIGS. 81-96, an exemplary embodiment of an insertion fitting device 501 is shown. The insertion fitting device 501 is similar to the insertion coupling/fitting device 1, the insertion coupling/fitting device 101, the insertion coupling/fitting device 201, the insertion fitting device 301 and the insertion fitting device 401, and therefore like reference numerals preceded with "5" are used to indicate like components, portions, aspects, features and functions, and the description above directed thereto (including any alternative embodiments thereof) equally applies to the insertion fitting device 501 and is not repeated hereinbelow only for brevity sake.

As shown in FIGS. 81-96, the fitting or insert 501 includes a compression adapter backing member 570, a compression sleeve 574, a nut (or flare nut) 538, an insert body member 522 and a coupler 540. The flowpath tube 350 includes a through hole that forms a flowpath therethrough. As shown in FIGS. 81-96, the insertion fitting 501 is thereby configured as an insert compression adapter, such as for sensors (other uses may equally be employed), to provide access to the flow/flowpath coupled to the coupler 540. As shown in FIGS. 81-96, the coupler 540 may be coupled to the insert body member 522 via the nut 538, and the compression adapter backing member 570 and the compression sleeve 574 may be coupled to the proximal end portion of the insert body member 522 via the nut 538.

As described above and shown in FIGS. 88 and 89, the proximal stem portion 541 of the coupler 540 may extend over the exterior over a distal portion of the insert body member 522 (i.e., a distal portion of the insert body member 522 may extend into the through hole or flowpath of the stem portion 541 of the coupler 540). The proximal end of the stem portion 541 of the coupler 540 may engage/abut the distal side/surface of the flange 523 when the coupler 540 is fully coupled/engaged with the insert body member 522. As described above, the nut 538 may retain and/or compress the flange 523 of the insert body member 522 between the rim 535 of the nut 538 and the end of the stem portion 541 of the coupler 540.

Figure 88:
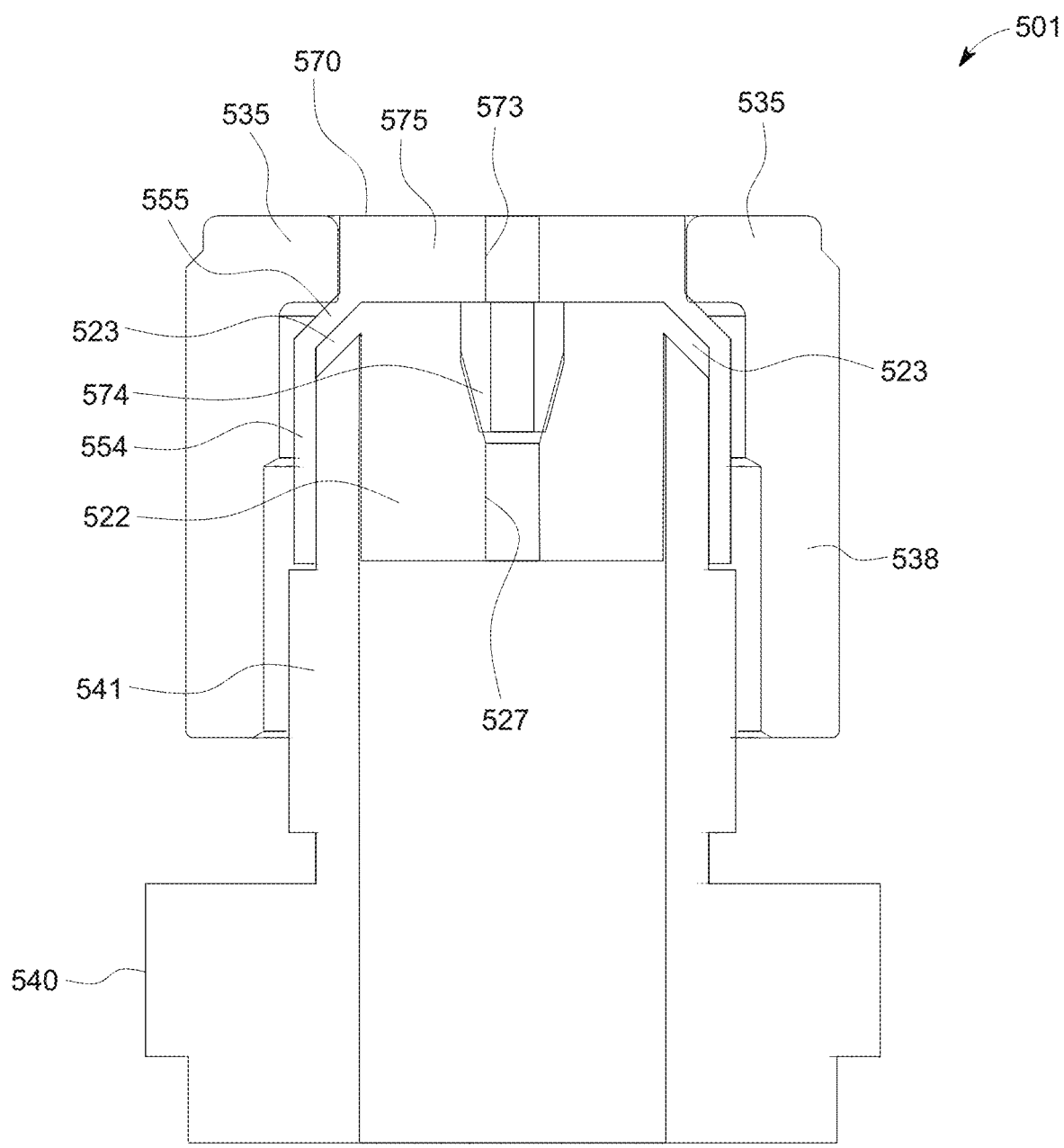
FIG. 88 is a right side cross-sectional view of the exemplary insertion fitting of FIG. 81, in accordance with an aspect of the present disclosure.
Figure 89:
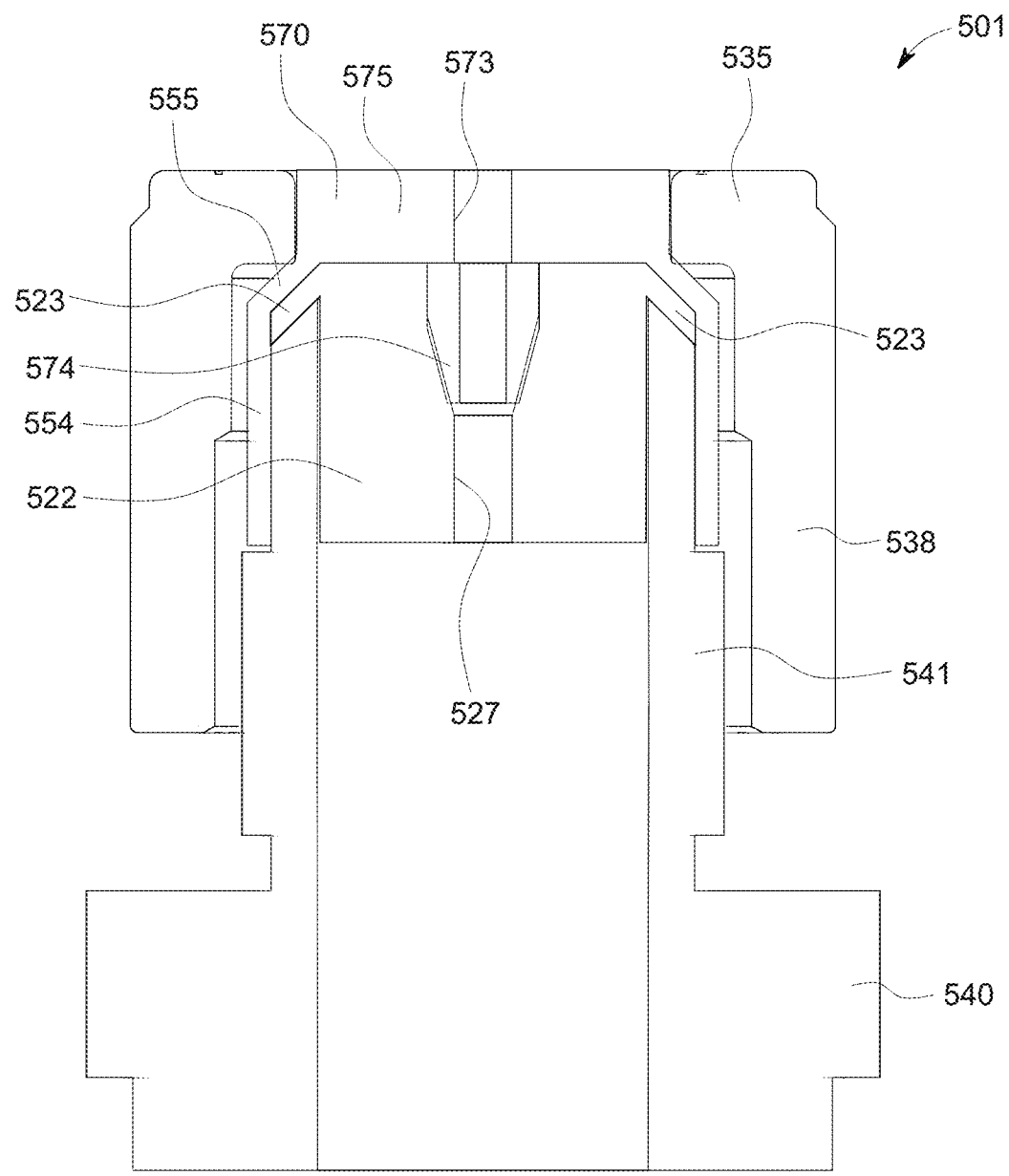
FIG. 89 is a front cross-sectional view of the exemplary insertion fitting of FIG. 81, in accordance with an aspect of the present disclosure.
Figure 90:
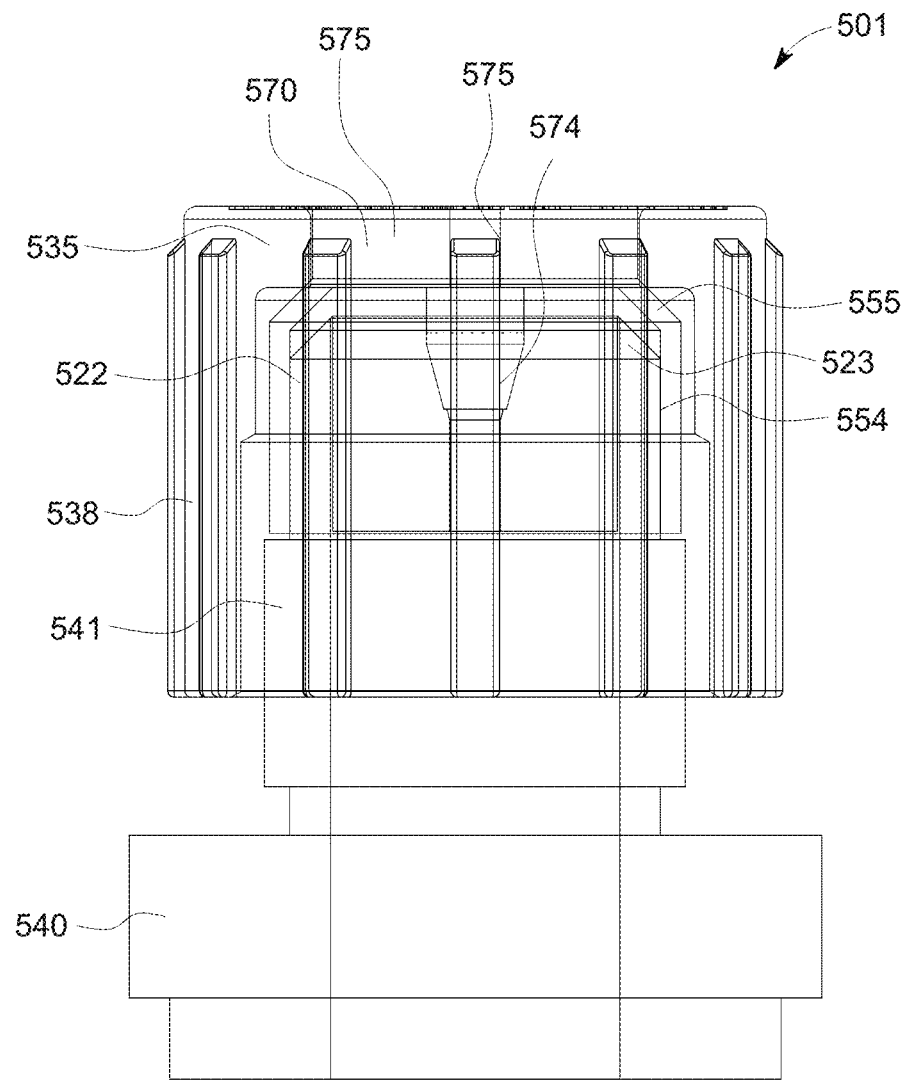
FIG. 90 is a left side transparent view of the exemplary insertion fitting of FIG. 81, in accordance with an aspect of the present disclosure.
Figure 91:
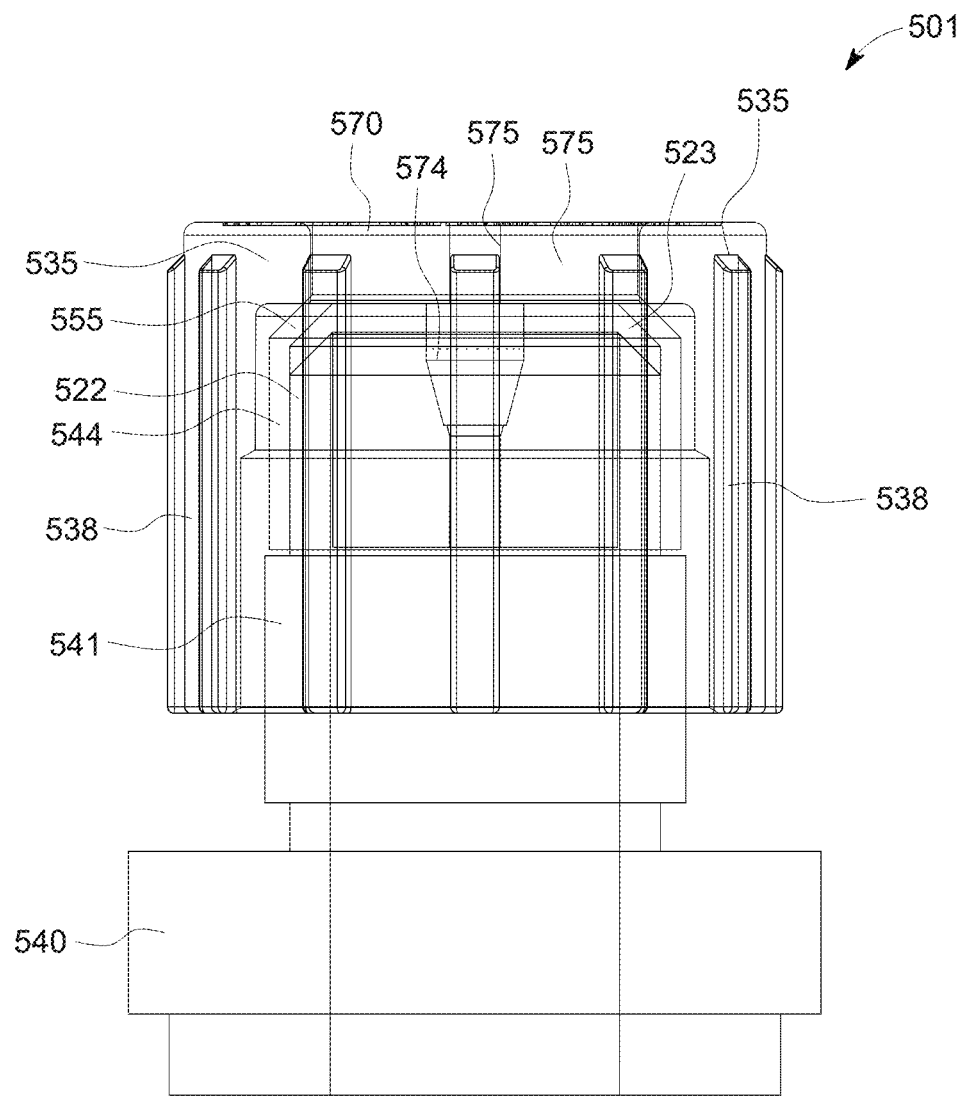
FIG. 91 is a front transparent view of the exemplary insertion fitting of FIG. 81, in accordance with an aspect of the present disclosure.
Figure 92:
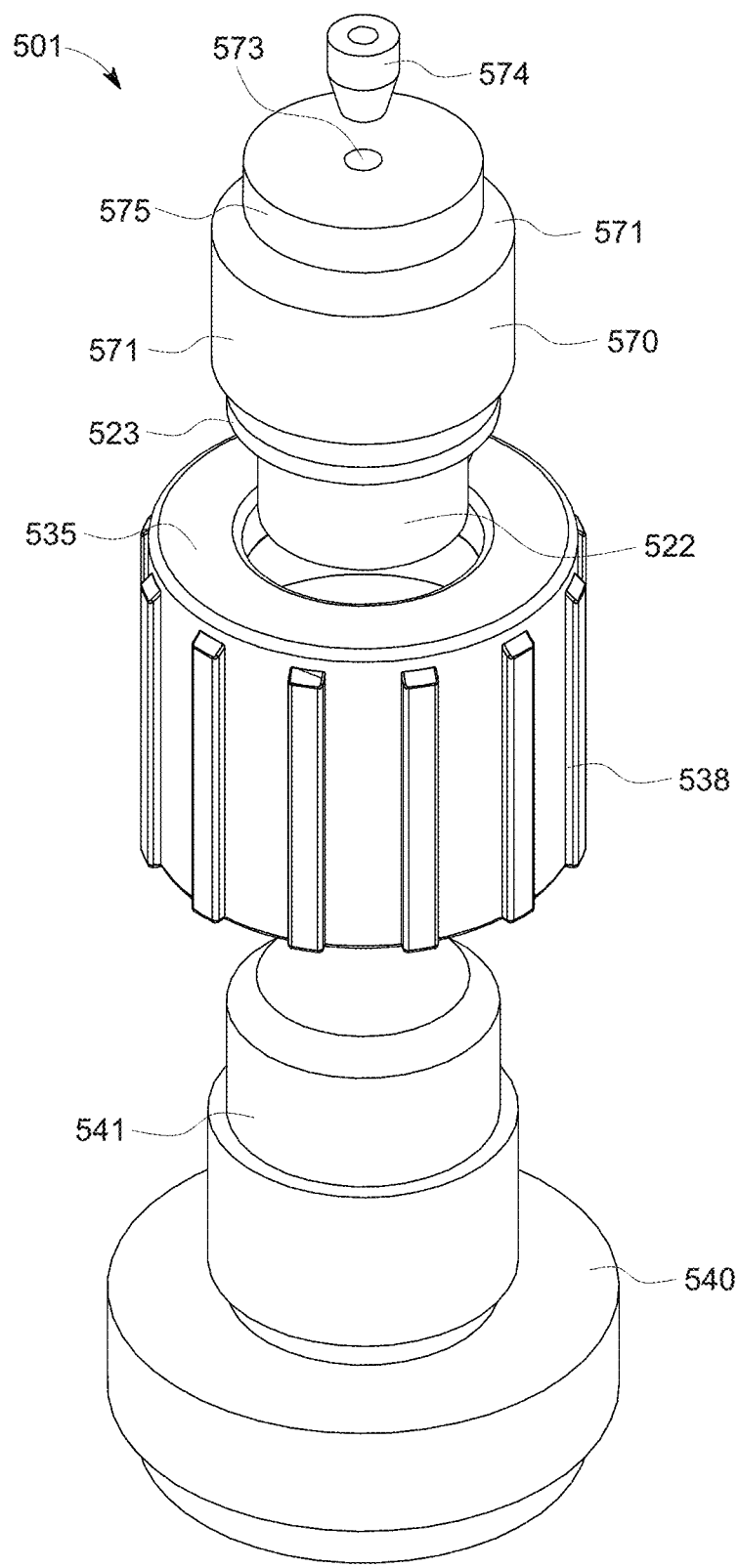
FIG. 92 is an elevational perspective exploded view of the exemplary insertion fitting of FIG. 81, in accordance with an aspect of the present disclosure.
Figure 93:
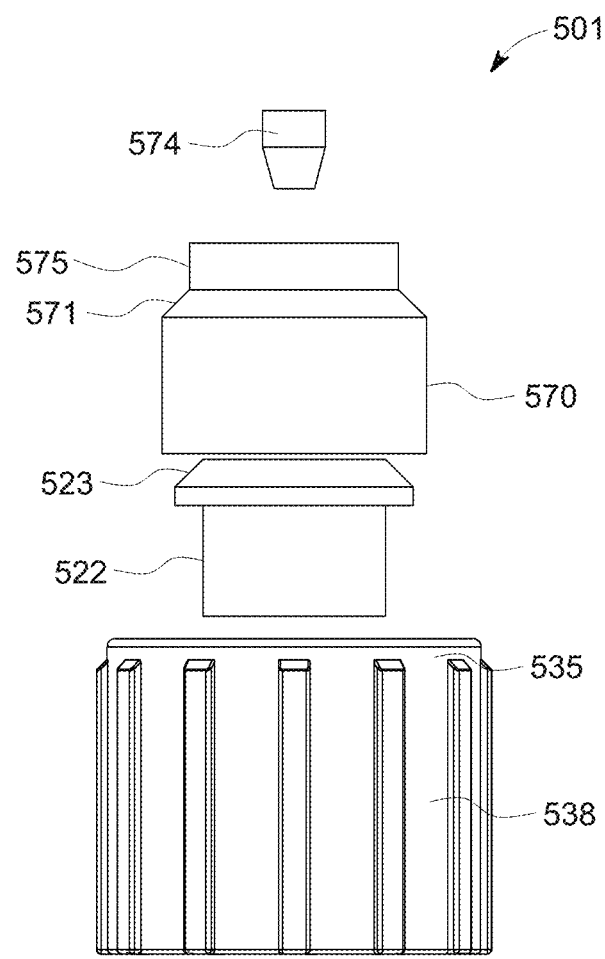
FIG. 93 is a right side exploded view of the exemplary insertion fitting of FIG. 81, in accordance with an aspect of the present disclosure.
Figure 93:
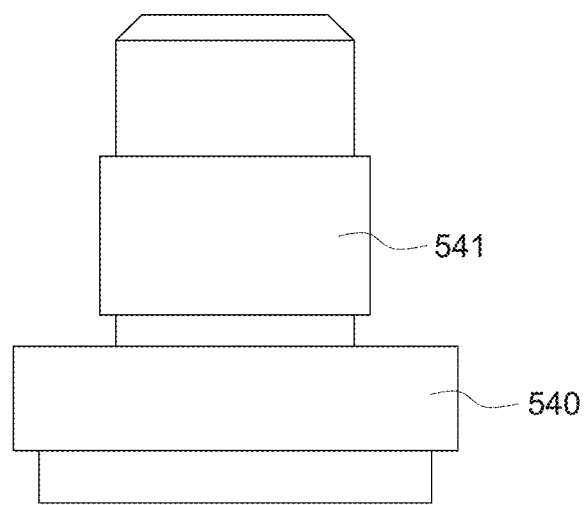
Figure 94:
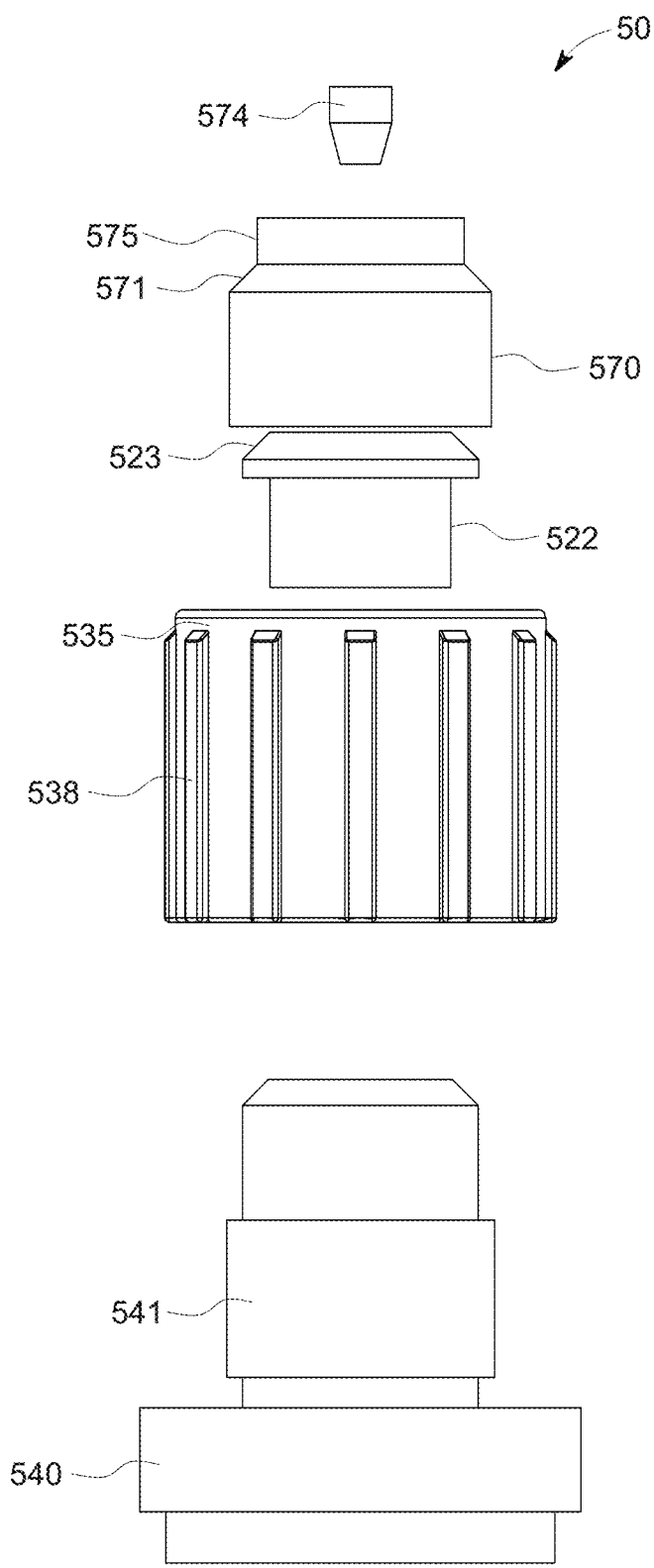
FIG. 94 is a front exploded view of the exemplary insertion fitting of FIG. 81, in accordance with an aspect of the present disclosure.
Figure 95:
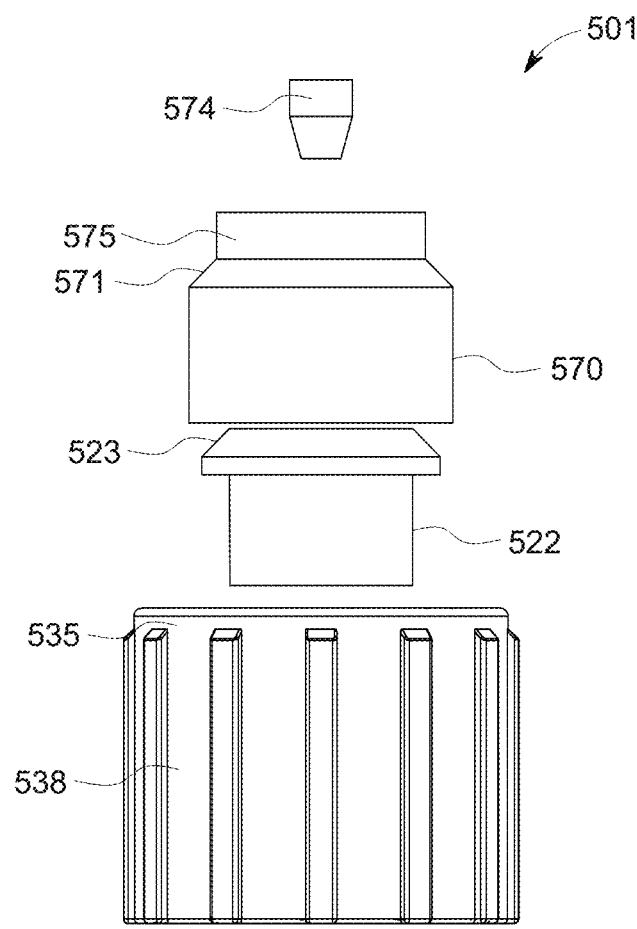
FIG. 95 is a left side exploded view of the exemplary insertion fitting of FIG. 81, in accordance with an aspect of the present disclosure.
Figure 95:
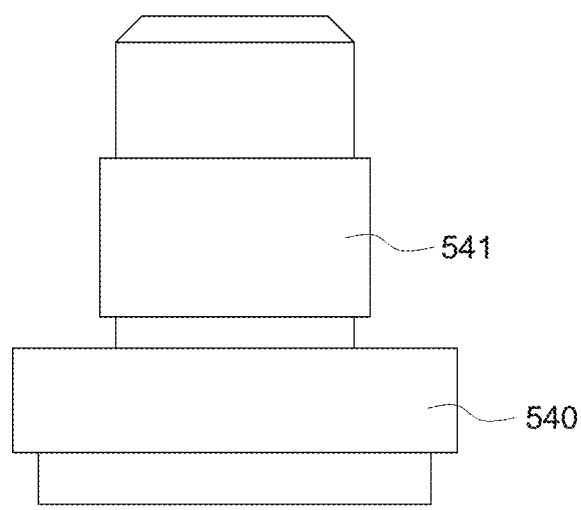
Figure 96:
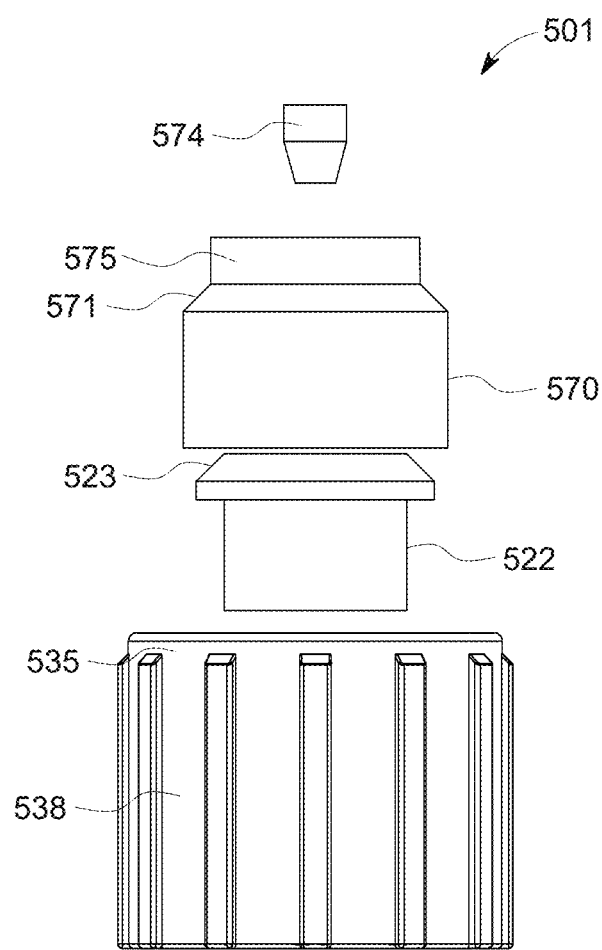
FIG. 96 is a back exploded view of the exemplary insertion fitting of FIG. 81, in accordance with an aspect of the present disclosure.
Figure 96:
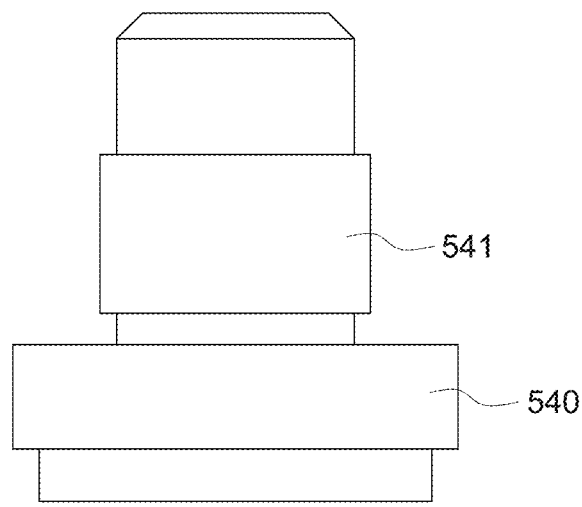
Figure 97:
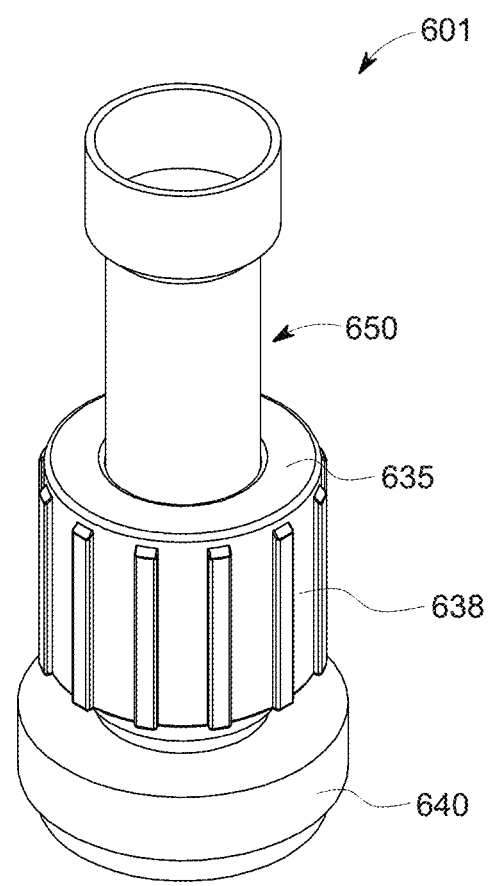
FIG. 97 is an elevational perspective view of another exemplary insertion fitting, in accordance with an aspect of the present disclosure.
Figure 98:
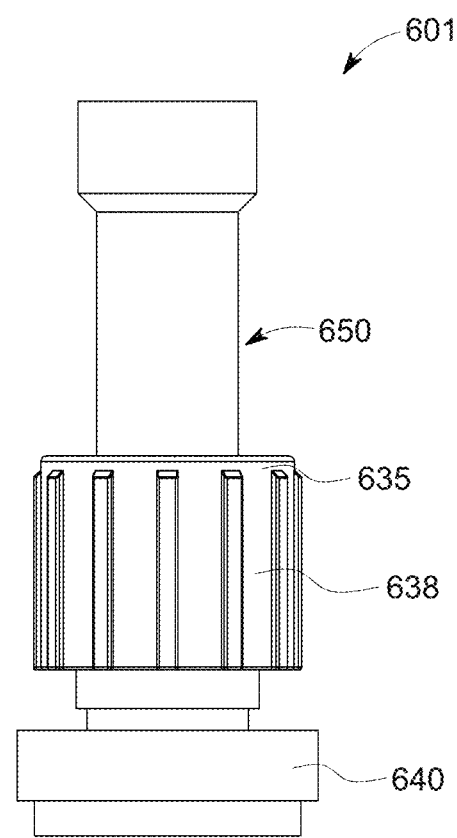
FIG. 98 is a front view of the exemplary insertion fitting of FIG. 97, in accordance with an aspect of the present disclosure.
Figure 99:
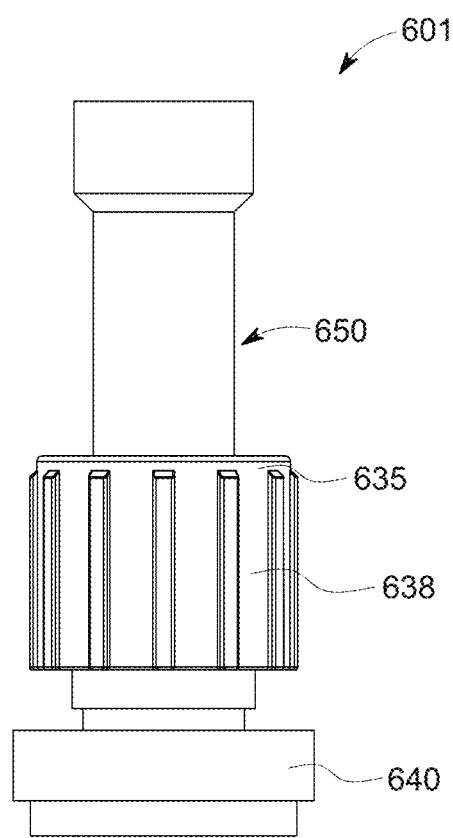
FIG. 99 is a right side view of the exemplary insertion fitting of FIG. 97, in accordance with an aspect of the present disclosure.
Figure 100:
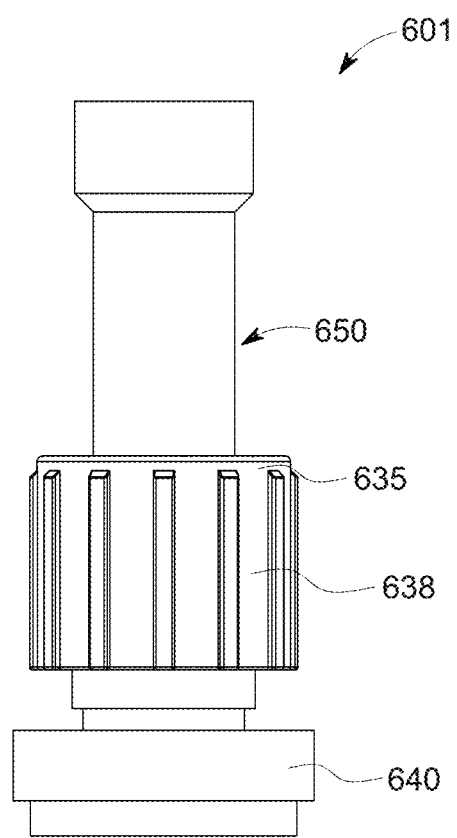
FIG. 100 is a back view of the exemplary insertion fitting of FIG. 97, in accordance with an aspect of the present disclosure.
Figure 101:
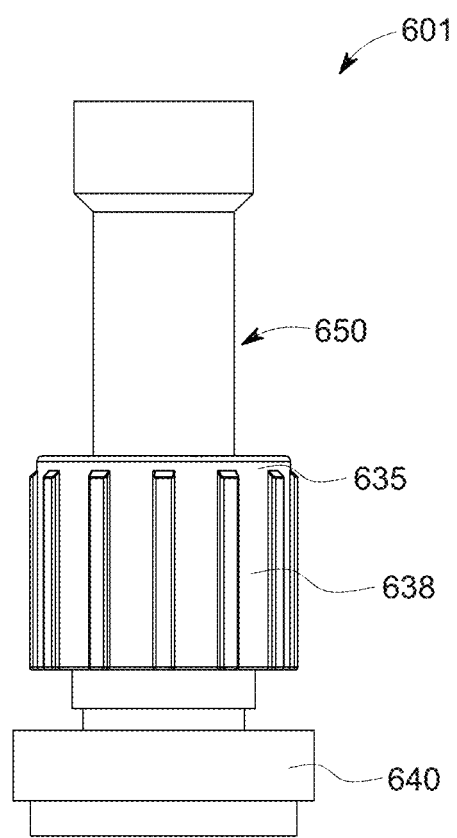
FIG. 101 is a left side view of the exemplary insertion fitting of FIG. 97, in accordance with an aspect of the present disclosure.
Figure 102:
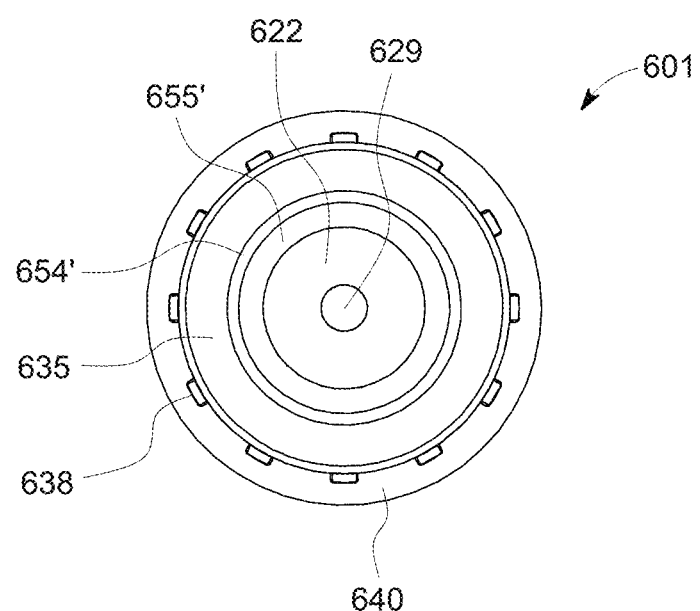
FIG. 102 is a top view of the exemplary insertion fitting of FIG. 97, in accordance with an aspect of the present disclosure.
Figure 103:
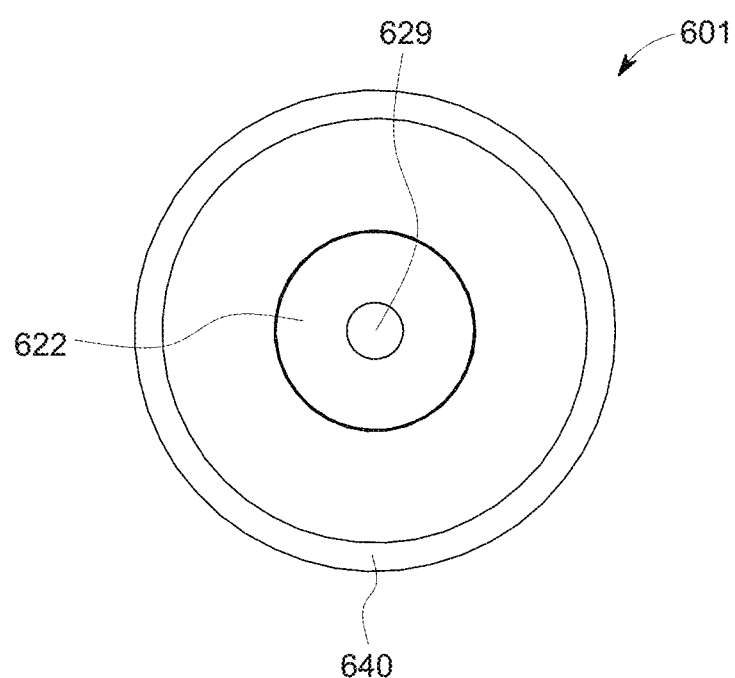
FIG. 103 is a bottom view of the exemplary insertion fitting of FIG. 97, in accordance with an aspect of the present disclosure.

As shown in FIGS. 88 and 89, the insert body member 522 includes a through hole or inner aperture/cavity 527 extending axially therethrough. The through hole 527 of the insert body member 522 may include a distal portion and proximal portion that houses or contains the compression sleeve 574. The proximal portion of the through hole 527 of the insert body 522 may member 522 define a larger diameter or other size than that of the distal portion thereof. The compression sleeve 574 may be compressed and/or tightly retained within the through hole 527 of the insert body member 522. In some embodiments, the compression sleeve 574 may include an axially-extending through hole that may be naturally open or naturally closed.

As shown in FIGS. 88, 89 and 92-96, the compression adapter backing member 570 may include a proximal end portion 575 that is configured to extend at least partially through the through hole of the rim portion 535 of the nut 538, and a distal portion comprising a distal expanded portion 554 and a transition portion 555 extending at least partially between the expanded portion 554 and the proximal end portion 575. As shown in FIGS. 88 and 89, the distal portion of the compression adapter backing member 570 includes an inner aperture or cavity extending axially proximally from the distal end thereof. The inner aperture or cavity of the distal portion of the compression adapter backing member 570 is configured to extend over or receive the insert body 522 and the proximal end portion of the stem portion 541 of the coupler 540 therein, as shown in FIGS. 88 and 89. The proximal end portion 575 includes a through aperture 573 that is at least partially aligned with the through hole 527 of the insert body member 522, and thereby the compression sleeve 574, when the distal portion of the compression adapter backing member 570 extend overs or receives the insert body 522 and the proximal end portion of the stem portion 541 of the coupler 540.

The outer and inner surfaces of the expanded distal end portion 554 may be arcuately convex about the axis of the flowpath/through hole thereof, and are straight/linear in the axial direction and aligned (parallel) to the axis of the flowpath/through hole (e.g., are cylindrical portions). The transition portion 555 may extends between the proximal end portion 575 and the expanded distal end portion 554. The outer surfaces and the inner surfaces of the transition portion 555 may extend linearly distally axially and radially outwardly from the transition portion 555, and are arcuately convex about the axis of the flowpath/through hole (e.g., a conical portion). The transition portion 555 is thereby configured to engage/abut the outer proximal side/surface of the flange 523 of the insert body 522, and the expanded distal end portion 554 is configured to extend about the proximal end portion of the stem portion 541 of the coupler 540 and within the proximal portion of the through hole of the nut 538. The nut 538 and coupler 540 may thereby compress and/or retain the transition portion 555 of the compression adapter backing member 570 and the flange 523 of the insert body 522 between the rim portion 535 of the nut 538 and the proximal end of the stem portion 541 of the coupler 540.

Referring now to FIGS. 97-112, an exemplary embodiment of an insertion fitting device 601 is shown. The insertion fitting device 601 is similar to the insertion coupling/fitting device 1, the insertion coupling/fitting device 101, the insertion coupling/fitting device 201, the insertion fitting device 301, the insertion fitting device 401 and the insertion fitting device 501, and therefore like reference numerals preceded with "6" are used to indicate like components, portions, aspects, features and functions, and the description above directed thereto (including any alternative embodiments thereof) equally applies to the insertion fitting device 601 and is not repeated hereinbelow only for brevity sake.

Insertion fitting device 601 is substantially similar to insertion fitting device 301 and the insertion fitting device 401, but differs in that it does not include a check member and thereby does not provide a "check" or one-way flow feature provided by the check member. As shown in FIGS. 97-112, the insertion fitting 601 is configured as a fixed orifice fitting that includes a particularly sized orifice 629 that defines a minimum size (and shape) of the flowpath extending through the insertion fitting 601.

Figure 104:
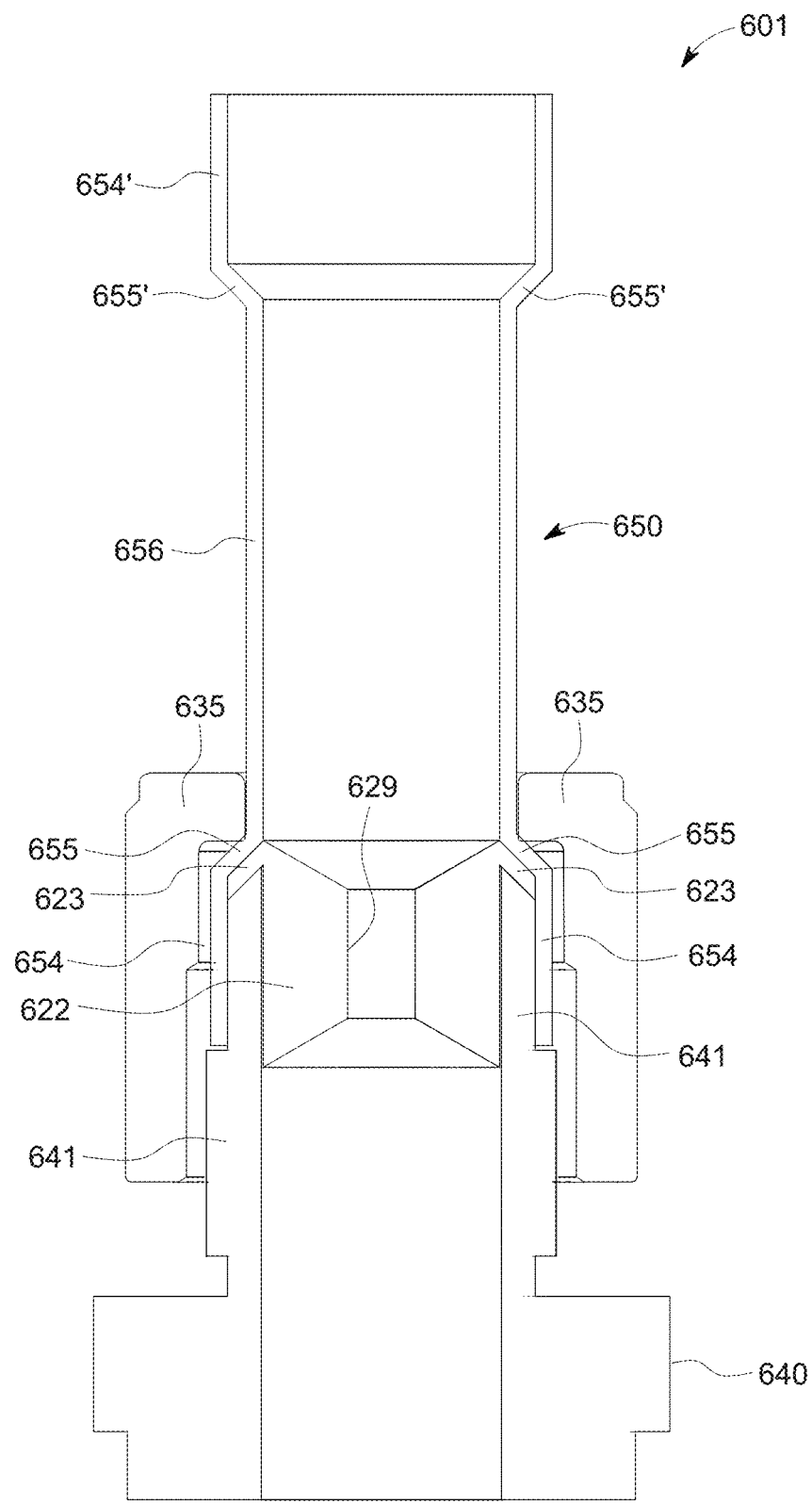
FIG. 104 is a right side cross-sectional view of the exemplary insertion fitting of FIG. 97, in accordance with an aspect of the present disclosure.
Figure 105:
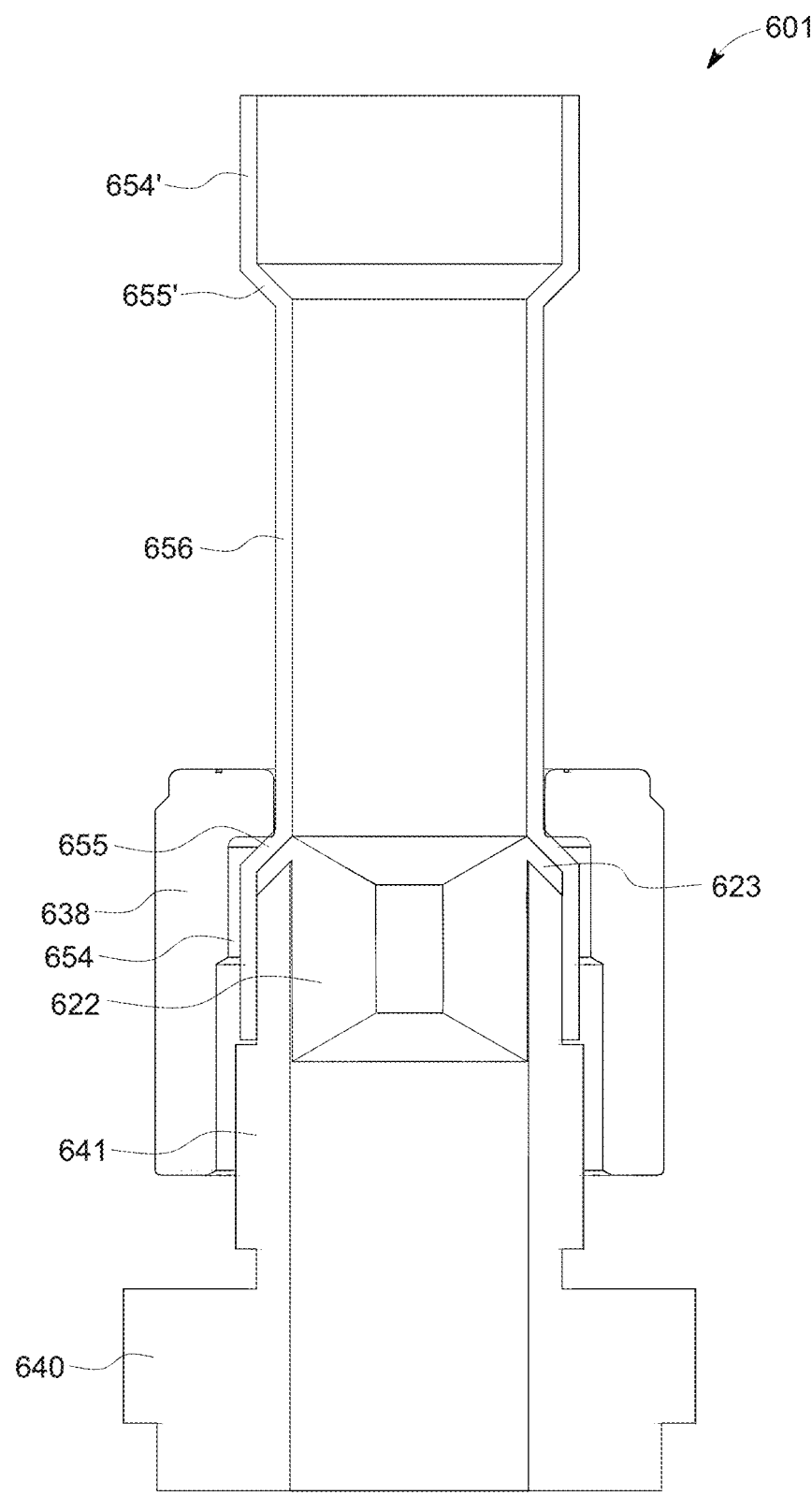
FIG. 105 is a front cross-sectional view of the exemplary insertion fitting of FIG. 97, in accordance with an aspect of the present disclosure.
Figure 106:
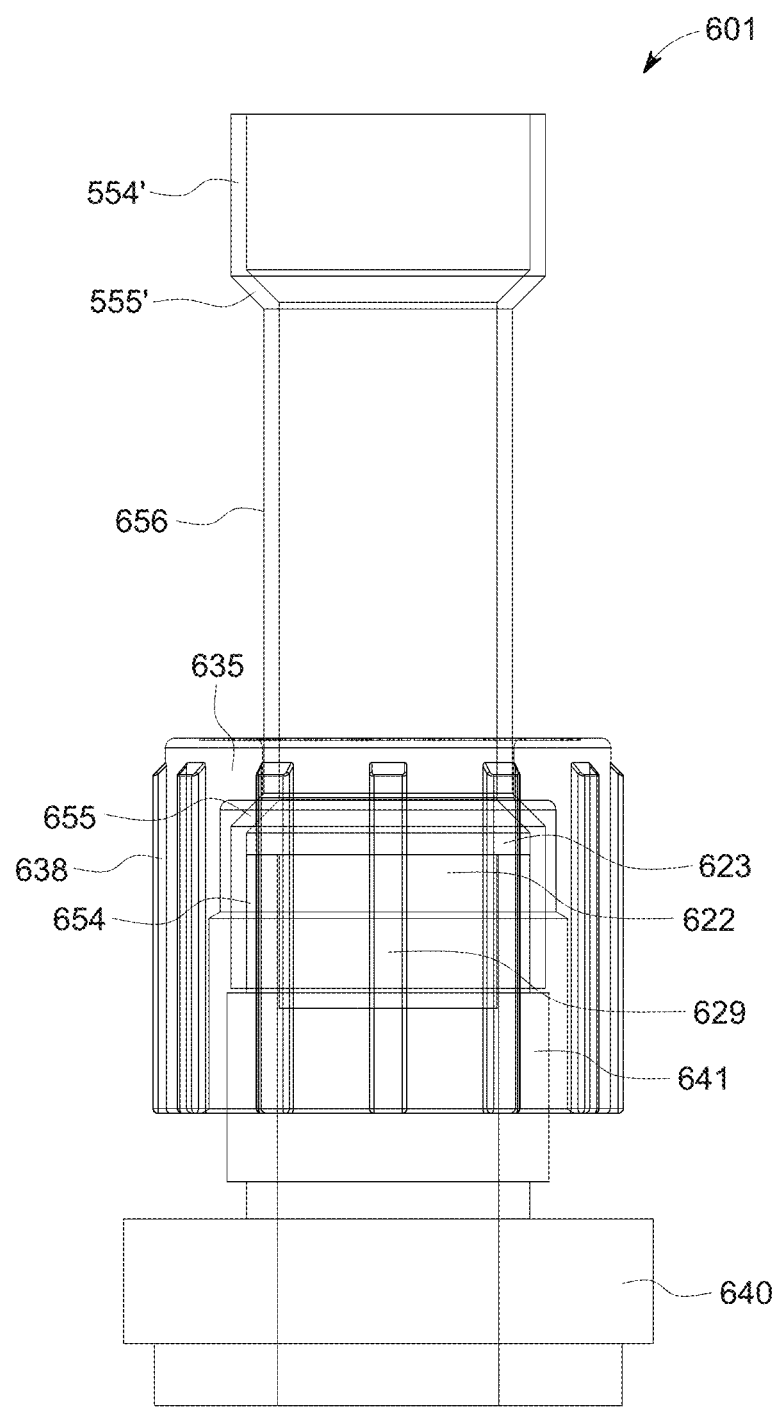
FIG. 106 is a left side transparent view of the exemplary insertion fitting of FIG. 97, in accordance with an aspect of the present disclosure.
Figure 107:
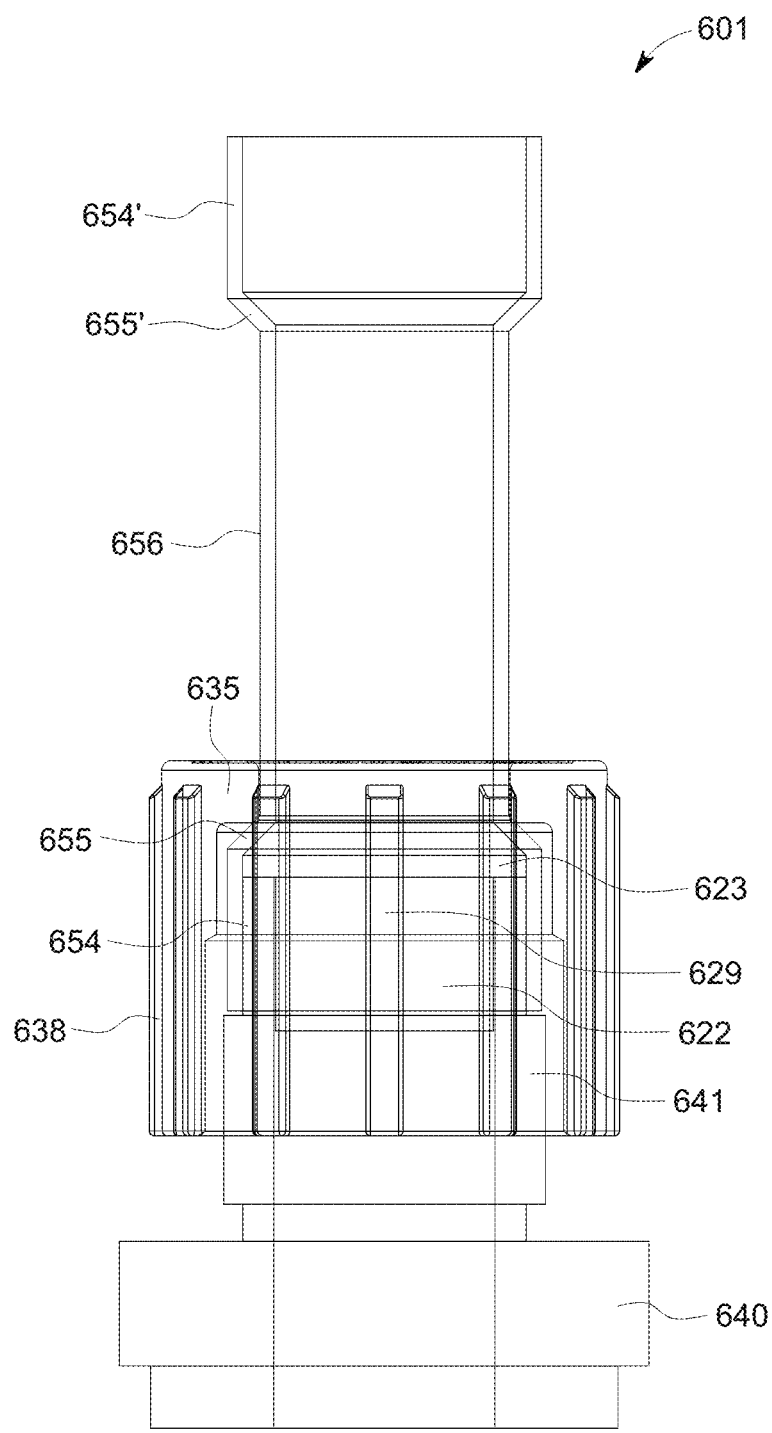
FIG. 107 is a front transparent view of the exemplary insertion fitting of FIG. 97, in accordance with an aspect of the present disclosure.
Figure 108:
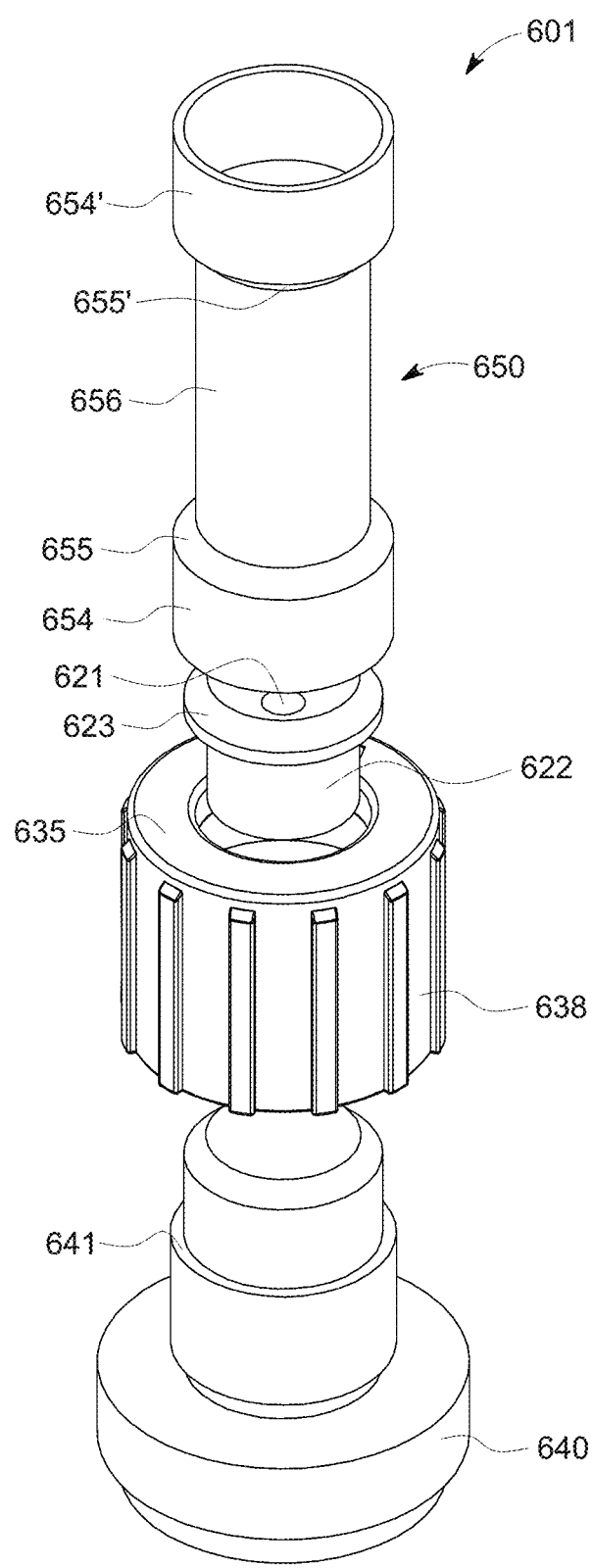
FIG. 108 is an elevational perspective exploded view of the exemplary insertion fitting of FIG. 97, in accordance with an aspect of the present disclosure.
Figure 109:
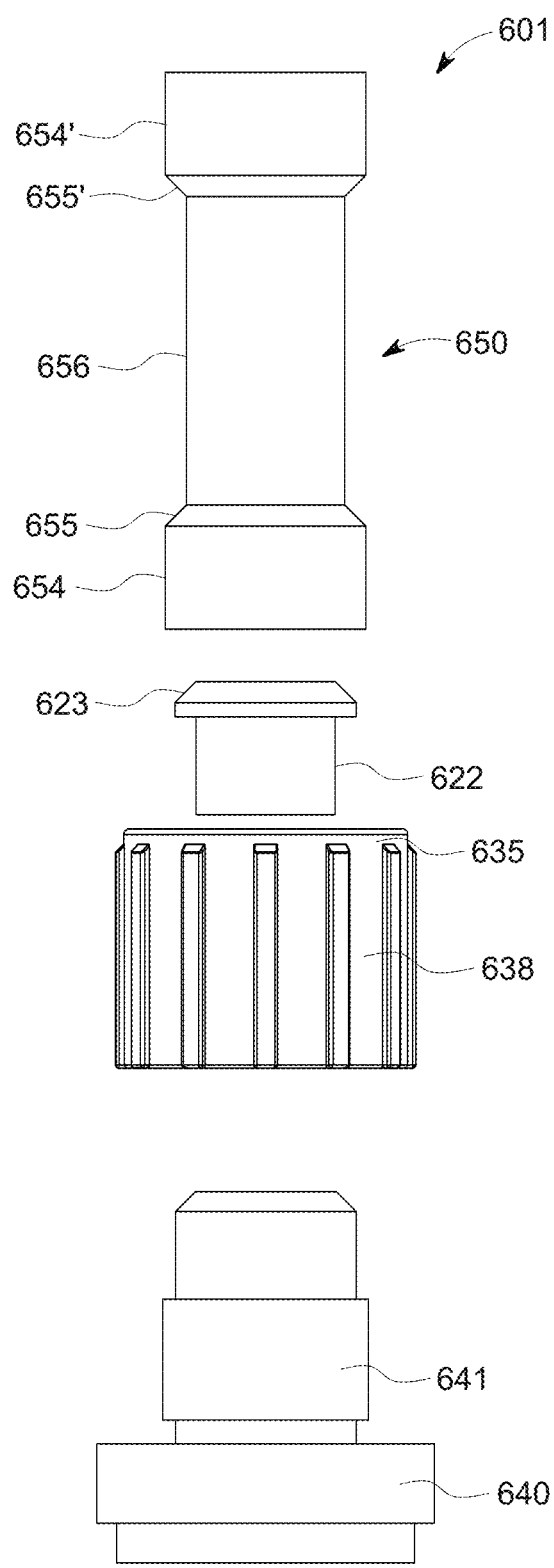
FIG. 109 is a right side exploded view of the exemplary insertion fitting of FIG. 97, in accordance with an aspect of the present disclosure.
Figure 110:
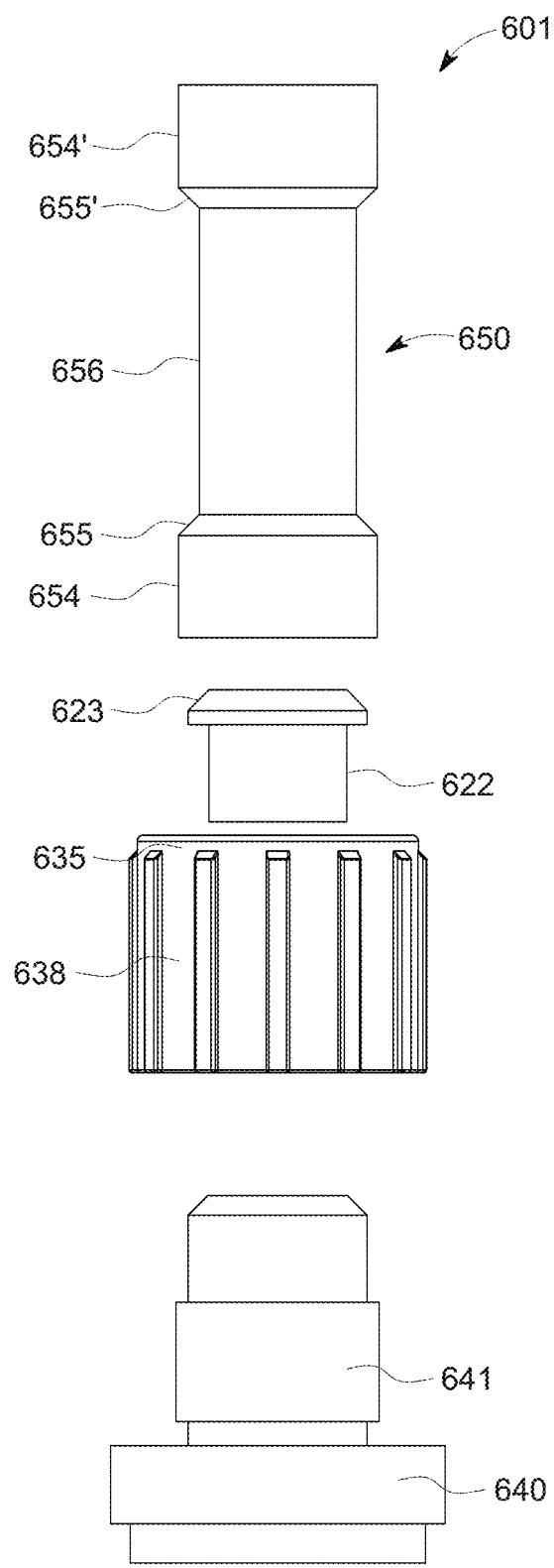
FIG. 110 is a front exploded view of the exemplary insertion fitting of FIG. 97, in accordance with an aspect of the present disclosure.
Figure 111:
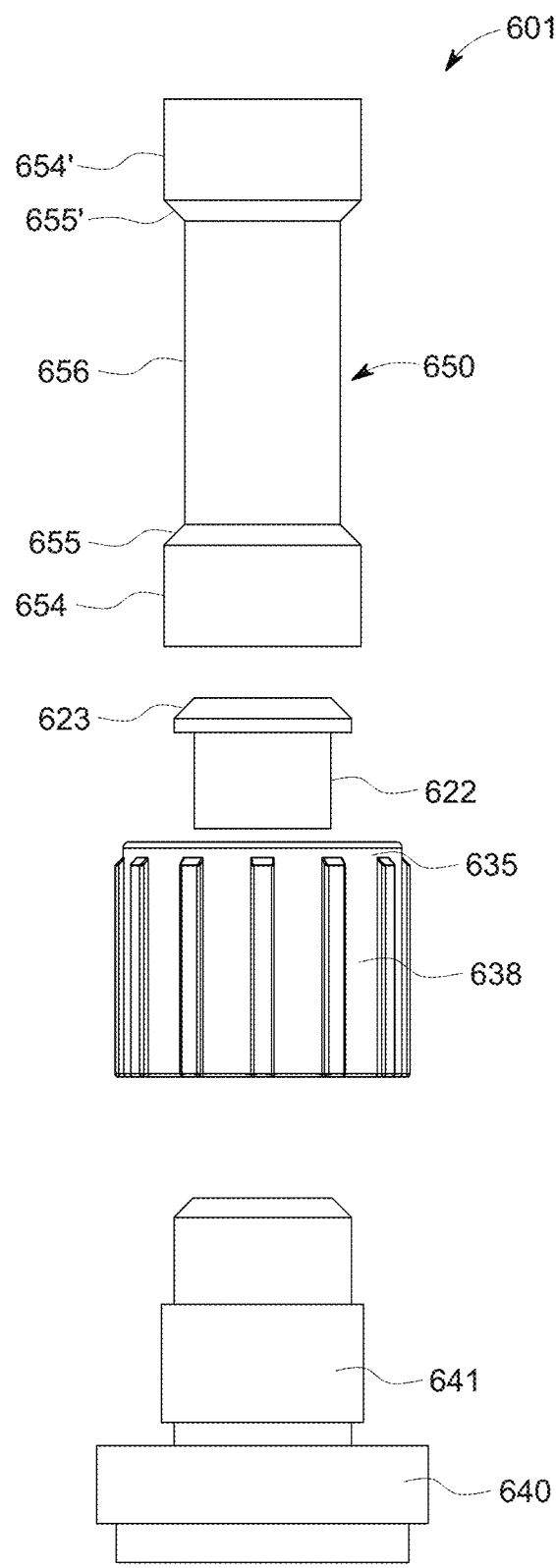
FIG. 111 is a left side exploded view of the exemplary insertion fitting of FIG. 97, in accordance with an aspect of the present disclosure.
Figure 112:
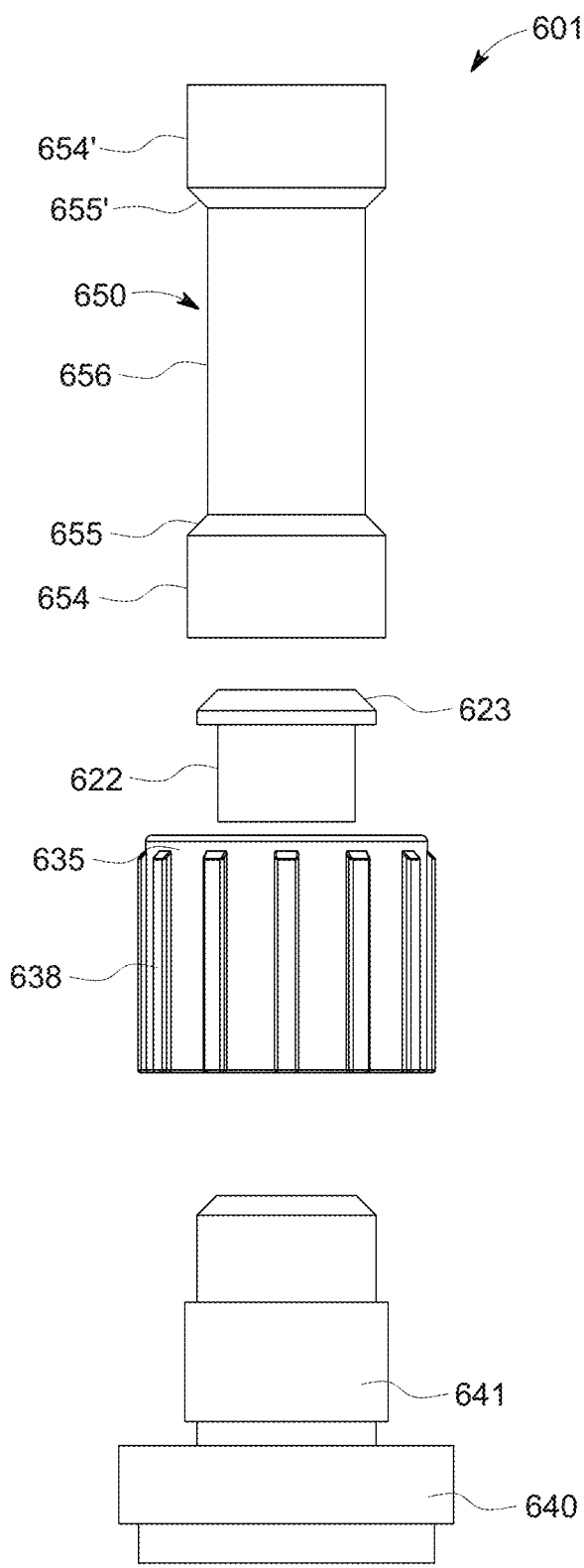
FIG. 112 is a back exploded view of the exemplary insertion fitting of FIG. 97, in accordance with an aspect of the present disclosure.
Figure 113:
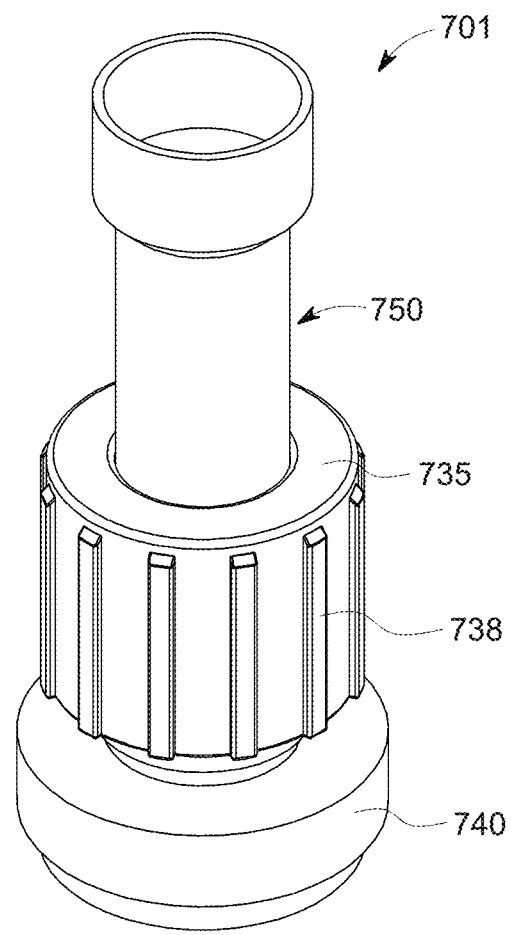
FIG. 113 is an elevational perspective view of another exemplary insertion fitting, in accordance with an aspect of the present disclosure.
Figure 114:
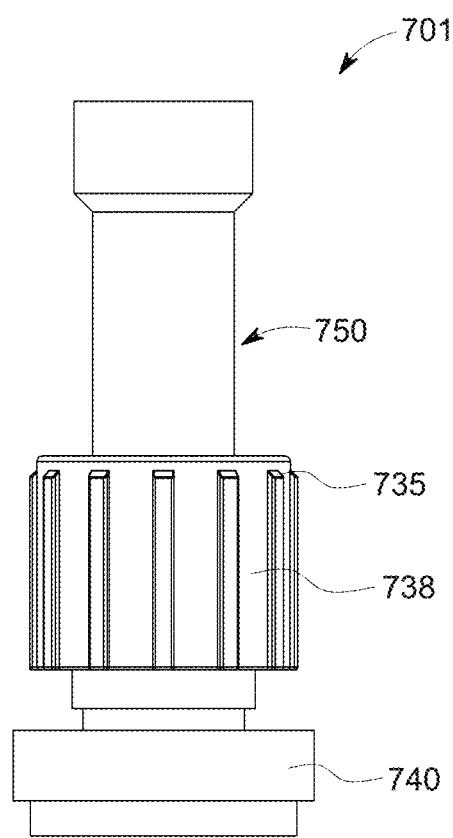
FIG. 114 is a front view of the exemplary insertion fitting of FIG. 112, in accordance with an aspect of the present disclosure.
Figure 115:
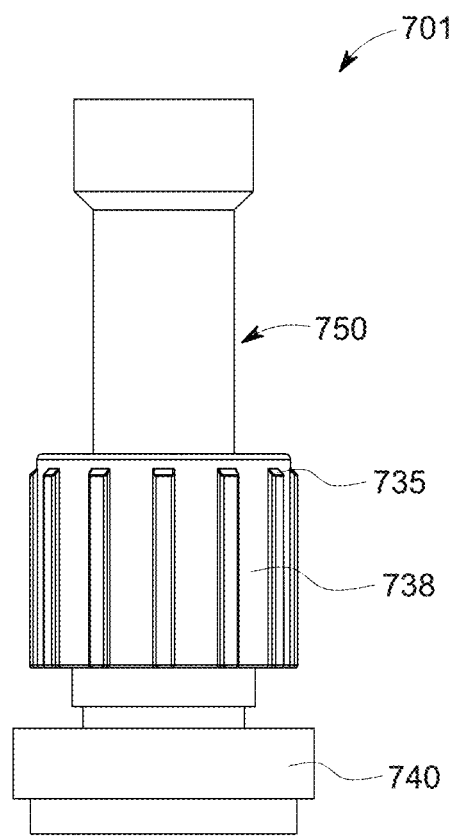
FIG. 115 is a right side view of the exemplary insertion fitting of FIG. 112, in accordance with an aspect of the present disclosure.
Figure 116:
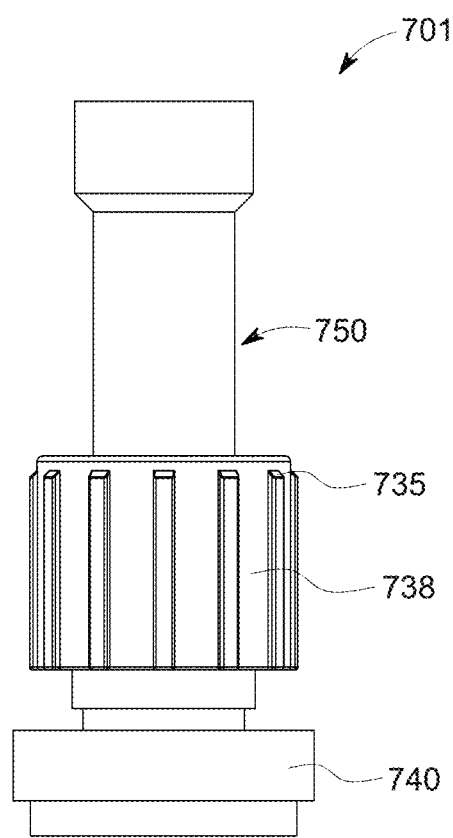
FIG. 116 is a back view of the exemplary insertion fitting of FIG. 112, in accordance with an aspect of the present disclosure.
Figure 117:
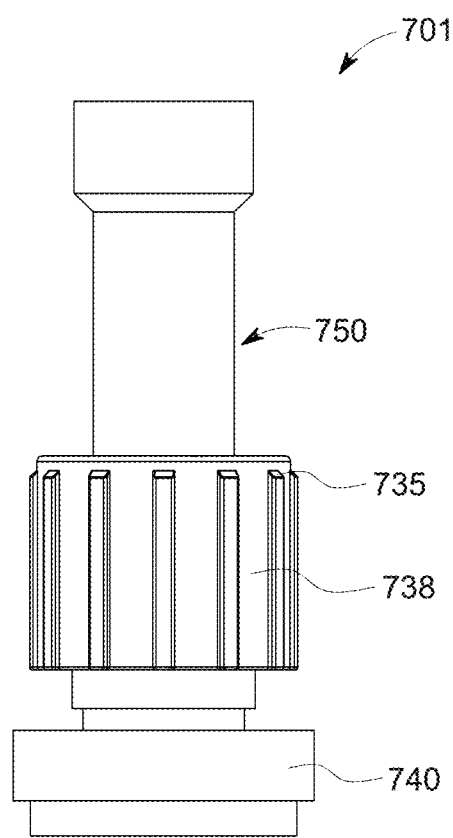
FIG. 117 is a left side view of the exemplary insertion fitting of FIG. 112, in accordance with an aspect of the present disclosure.
Figure 118:
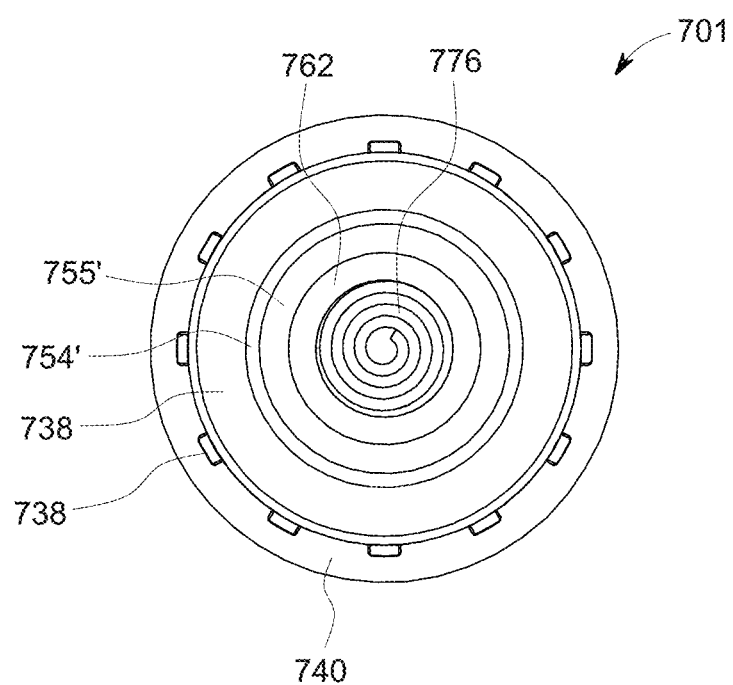
FIG. 118 is a top view of the exemplary insertion fitting of FIG. 112, in accordance with an aspect of the present disclosure.
Figure 119:
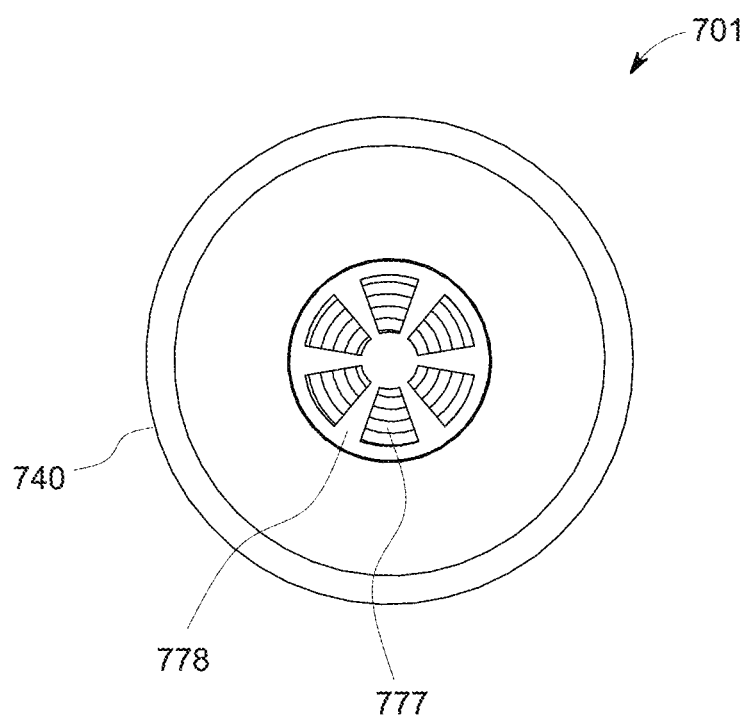

As shown in FIGS. 104-112, the insert body 622 is solid but for an orifice or through hole 629 extending axially therethrough from the proximal end to the distal end thereof. In in the illustrated embodiment, the orifice 629 may by cylindrical, but other shapes may equally be employed. As shown in FIGS. 104 and 105, in some embodiments, the proximal side/surface of the insert body 622 may at least partially include or define a sloped or conical concave shape that narrows gradually as it extends axially to the orifice 629. Similarly, in some embodiments, the distal side/surface of the insert body 622 may at least partially include or define a sloped or conical concave shape that narrows gradually as it extends axially to the orifice 629, as also shown in FIGS. 104 and 105.

Referring now to FIGS. 113-128, an exemplary embodiment of an insertion fitting device 701 is shown. The insertion fitting device 701 is similar to the insertion coupling/fitting device 1, the insertion coupling/fitting device 101, the insertion coupling/fitting device 201, the insertion fitting device 301, the insertion fitting device 401, the insertion fitting device 501 and the insertion fitting device 601, and therefore like reference numerals preceded with "7" are used to indicate like components, portions, aspects, features and functions, and the description above directed thereto (including any alternative embodiments thereof) equally applies to the insertion fitting device 701 and is not repeated hereinbelow only for brevity sake.

Insertion fitting device 701 is substantially similar to insertion fitting device 301 and the insertion fitting device 401, but differs in that it does not include a check member and thereby does not provide a "check" or one-way flow feature provided by the check member. Insertion fitting device 701 is also substantially similar to insertion fitting device 601, but differs in that it does not include a linear orifice. Rather, as shown in FIGS. 118-128, the insertion fitting device 701 includes a mixing device or member 776 positioned within the insert body 722 configured to provide turbulence to and/or otherwise mix up the flow of fluid through the flowpath of the fitting 701 from the coupler 750 to the tube member 750 (i.e., proximally).

Figure 120:
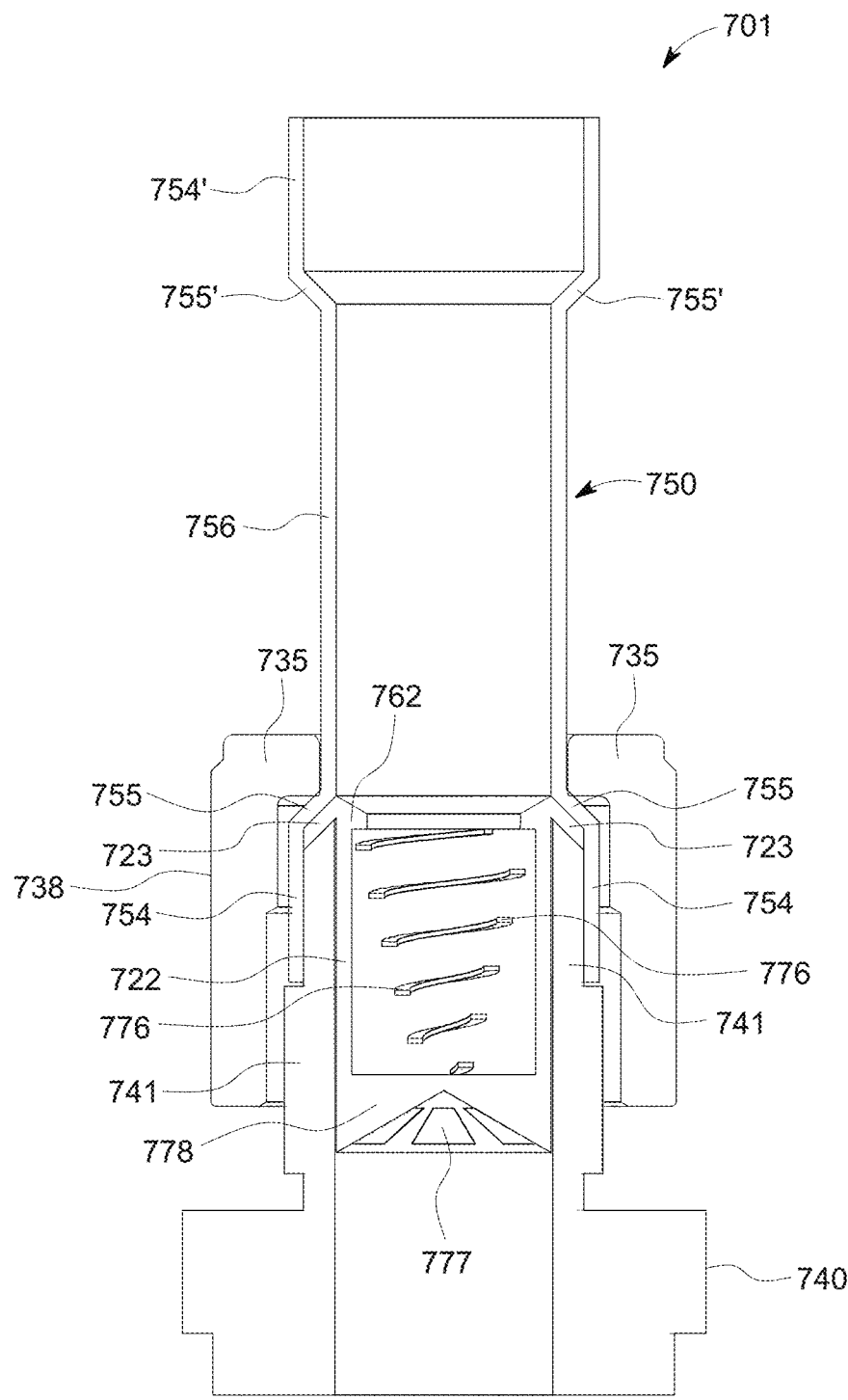
Figure 121:
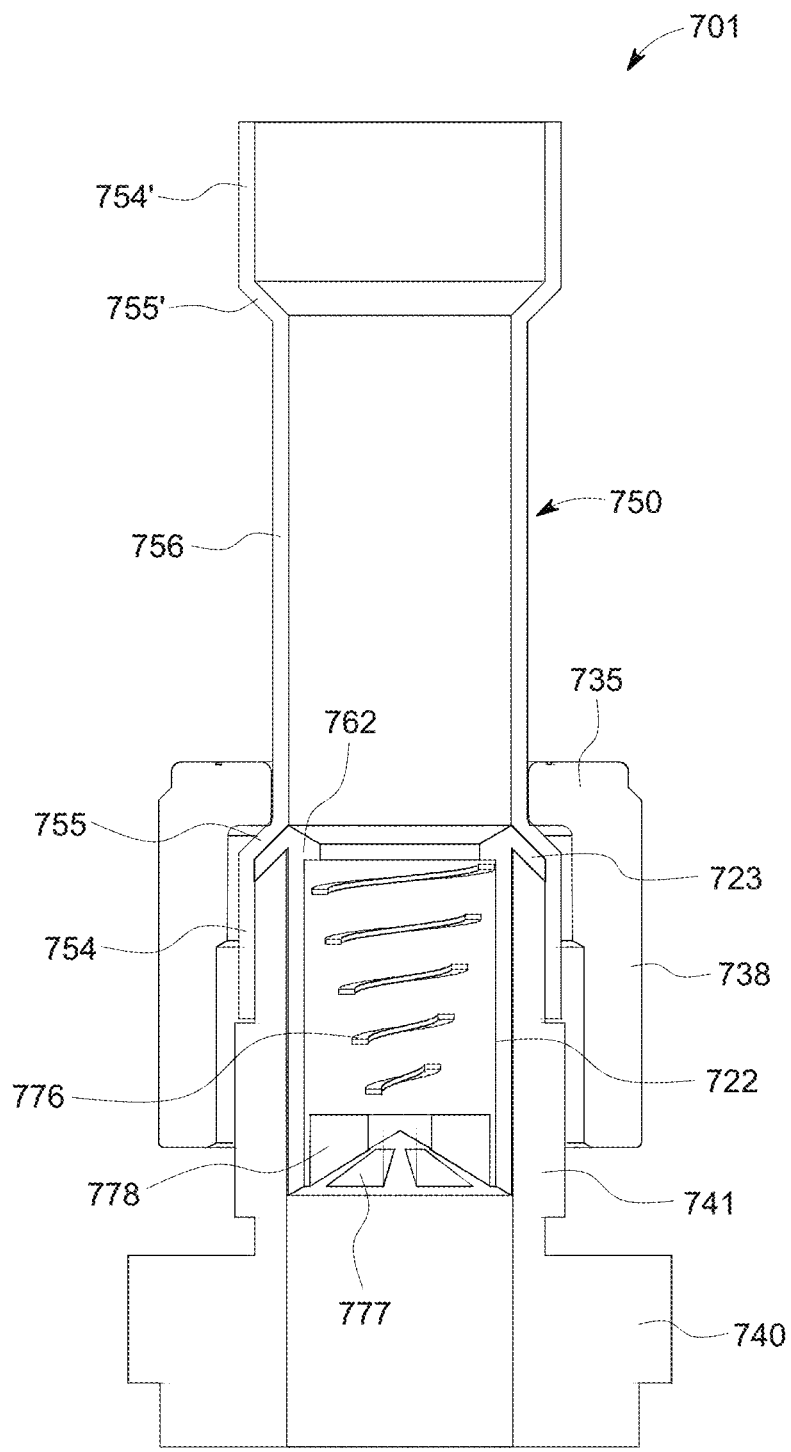
Figure 122:
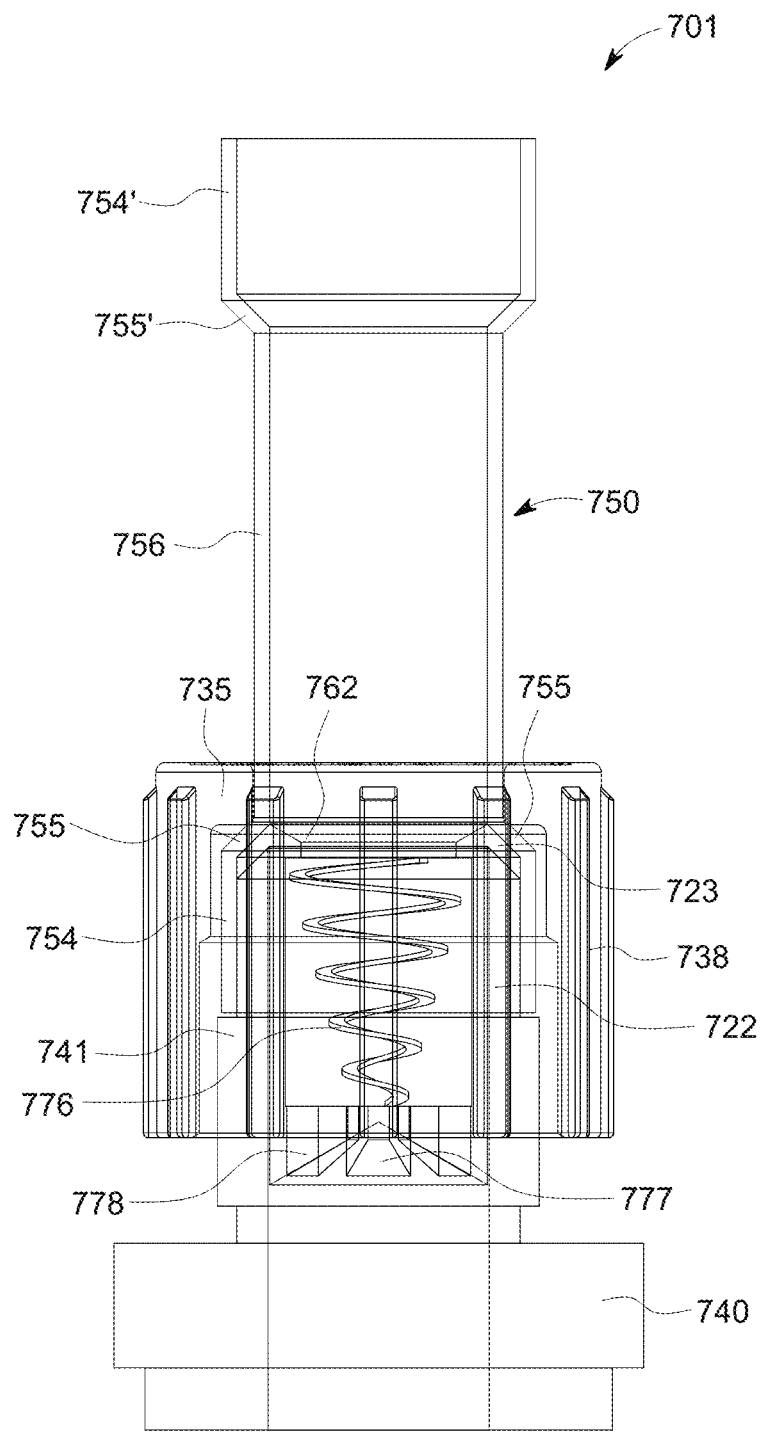
Figure 123:
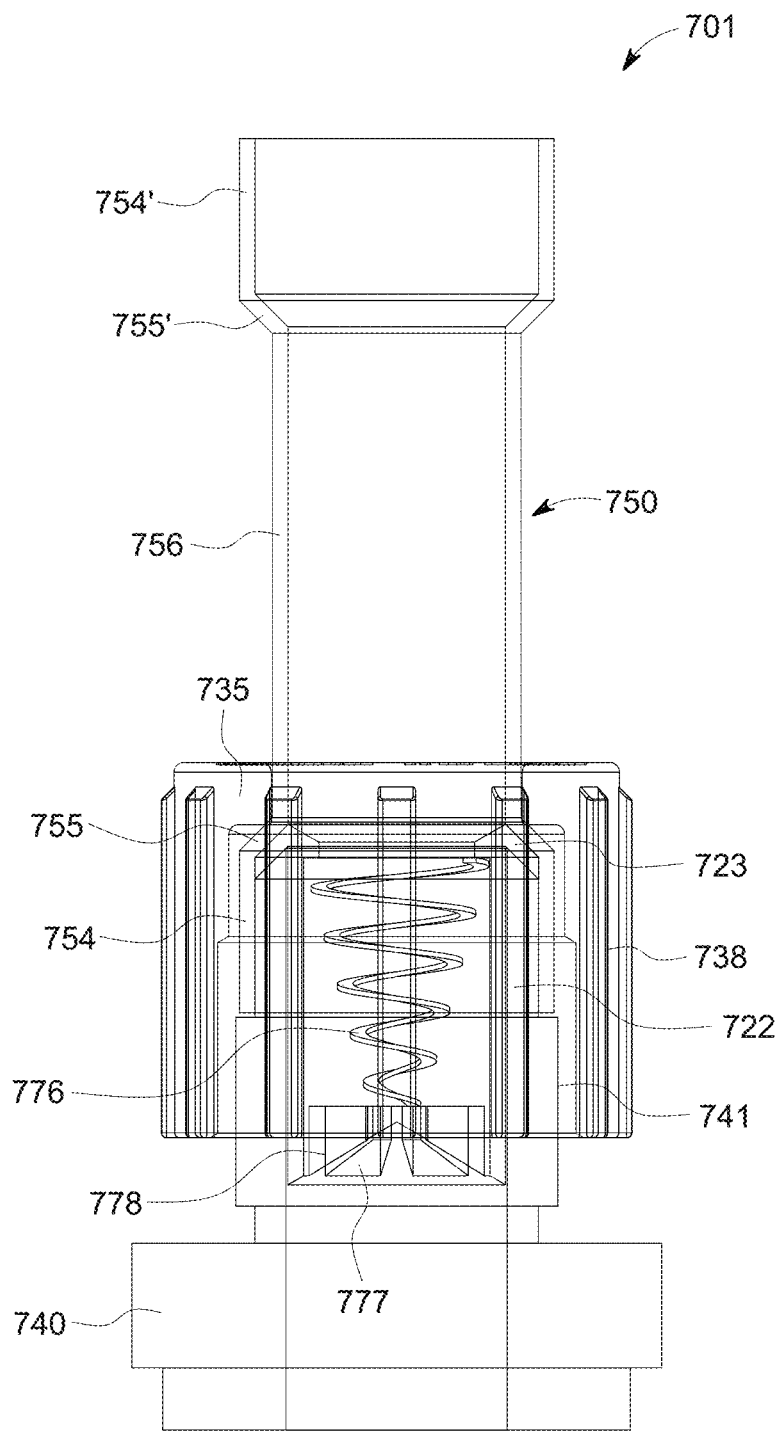
Figure 124:
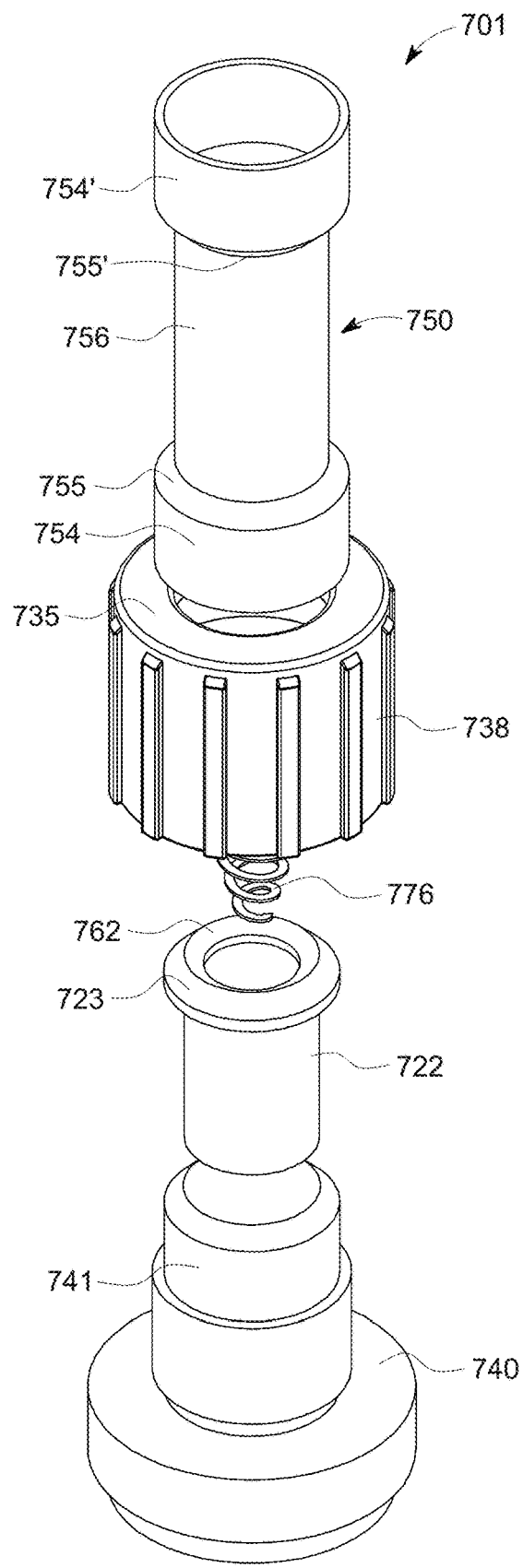
Figure 125:
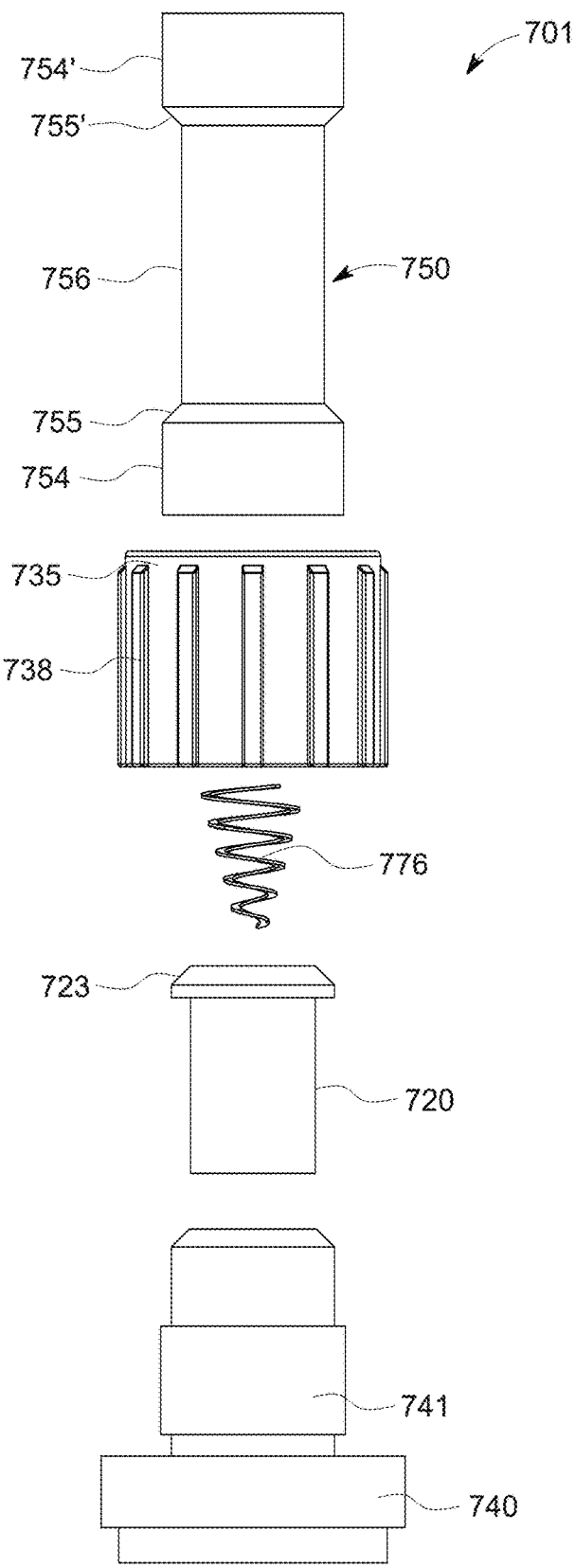
Figure 126:
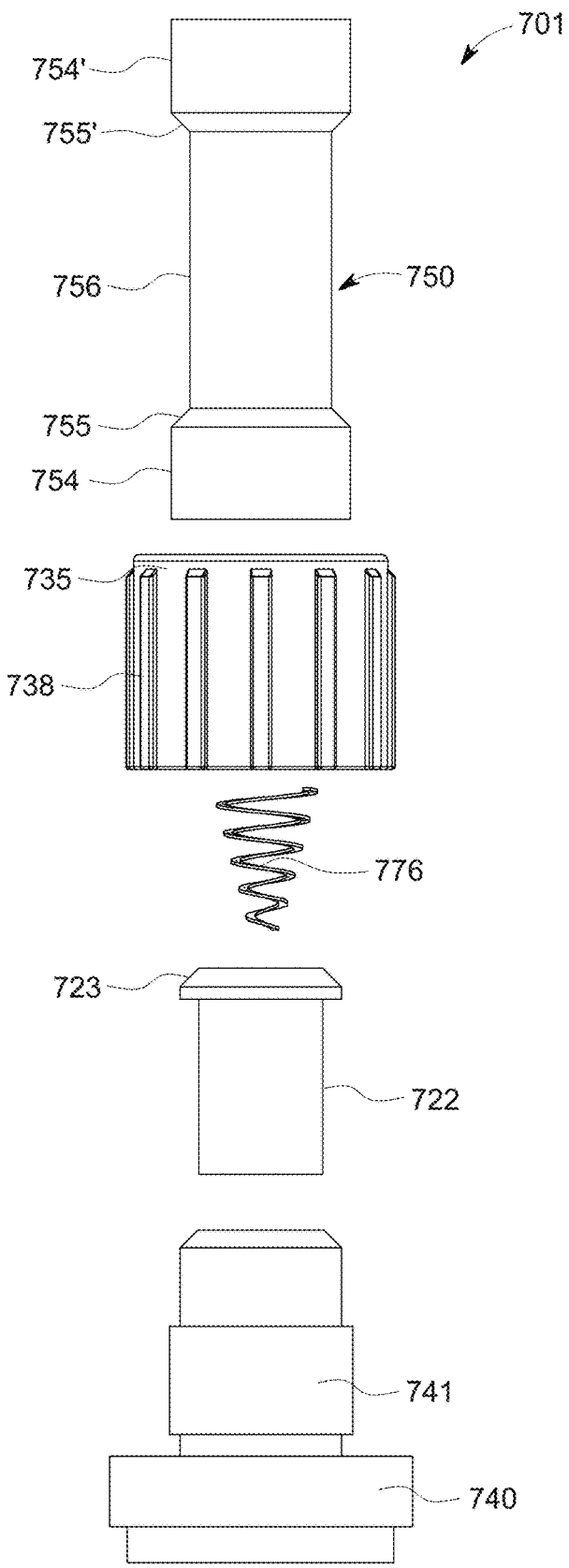
Figure 127:
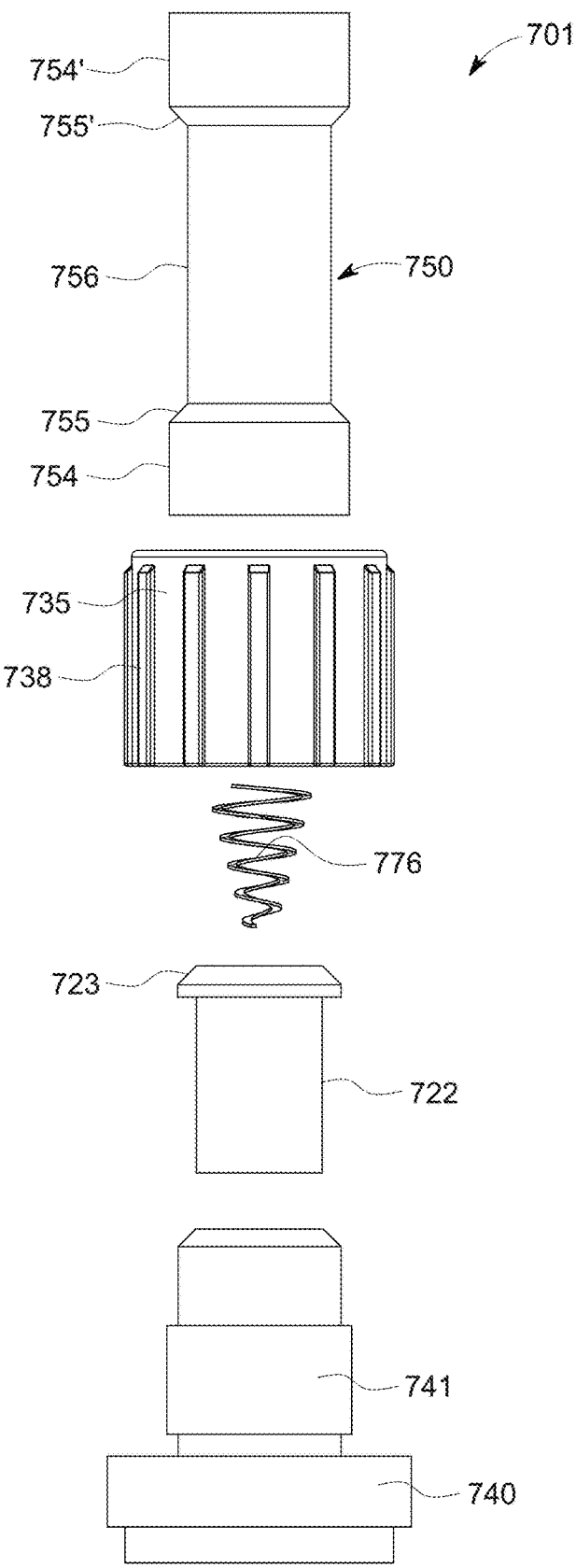
Figure 128:
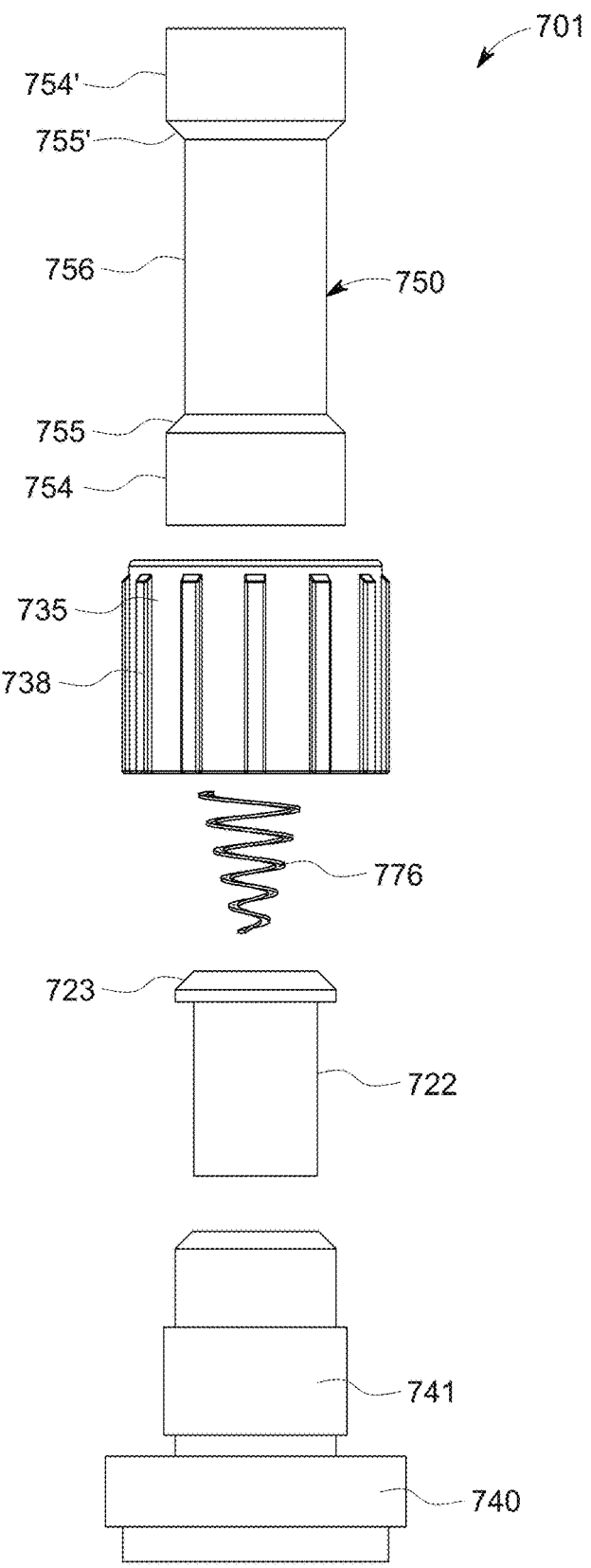

As shown in FIGS. 120-128, the mixing member 776 of the insertion fitting device 701 comprises a spiral conical spring that narrows as it extends distally. The mixing spring 776 is positioned within a cavity or portion of the flowpath of the insert body 722 between the proximal rim 762 and a distal end portion 778 thereof, as shown in FIGS. 120 and 121. In some embodiments, the distal side/surface of the distal end portion 778 of the insert body 722 may at least partially include or define a sloped or conical concave shape that narrows gradually as it extends axially toward the mixing spring 776 (i.e., proximally), as also shown in FIGS. 120-123. The distal end portion 778 of the insert body 722 includes a plurality of through apertures 777 extending axially therethrough from the distal side/surface to the proximal side/surface thereof, as shown in FIGS. 120-123. The plurality of through apertures 777 thereby form part of the flowpath (e.g., to the mixing spring 776) through the insertion fitting 701. The plurality of through apertures 777 may extend radially forma center portion of the distal end portion 778 of the insert body 722, and be angularly spaced about the axis of the flowpath/insertion fitting 701.

Referring now to FIGS. 129-144, an exemplary embodiment of an insertion fitting device 801 is shown. The insertion fitting device 801 is similar to the insertion coupling/fitting device 1, the insertion coupling/fitting device 101, the insertion coupling/fitting device 201, the insertion fitting device 301, the insertion fitting device 401, the insertion fitting device 501, the insertion fitting device 601 and the insertion fitting device 701, and therefore like reference numerals preceded with "8" are used to indicate like components, portions, aspects, features and functions, and the description above directed thereto (including any alternative embodiments thereof) equally applies to the insertion fitting device 801 and is not repeated hereinbelow only for brevity sake.

Insertion fitting device 801 is substantially similar to insertion fitting device 701, but differs in the configuration of the mixing device 876. As shown in FIGS. 134-149, the mixing device 876 is formed via internal threads within the cavity/flowpath of the insert body 822. In some embodiments, the mixing threads 876 of the insert body 822 may extend from the distal end to the proximal end of the insert body 822. In some other embodiments, the mixing threads 876 of the insert body 822 may extend only partially along the axial length of the flowpath/cavity of the insert body 822 between the distal and proximal ends thereof.

Referring now to FIGS. 144-160, an exemplary embodiment of an insertion fitting device 901 is shown. The insertion fitting device 901 is similar to the insertion coupling/fitting device 1, the insertion coupling/fitting device 101, the insertion coupling/fitting device 201, the insertion fitting device 301, the insertion fitting device 401, the insertion fitting device 501, the insertion fitting device 601, the insertion fitting device 601, the insertion fitting device 701 and the insertion fitting device 801, and therefore like reference numerals preceded with "9" are used to indicate like components, portions, aspects, features and functions, and the description above directed thereto (including any alternative embodiments thereof) equally applies to the insertion fitting device 901 and is not repeated hereinbelow only for brevity sake.

Insertion fitting device 901 is substantially similar to insertion fitting device 301 and the insertion fitting device 401, but differs in that it does not include a check member and thereby does not provide a "check" or one-way flow feature provided by the check member. Insertion fitting device 901 is also substantially similar to insertion fitting device 601, but differs in that it does not include a fixed orifice. Insertion fitting device 901 is also substantially similar to insertion fitting device 701 and insertion fitting device 801, but differs in that it does not include a mixing element in the insert body. Rather, as shown in FIGS. 144-160, the insertion fitting device 901 comprises a flare tee insertion fitting device with a venturi feature.

As shown in FIGS. 144-160, the fitting or insert 901 includes a T-shaped coupler that includes a stem portion 941 that is configured to couple with the insert body 922 and the nut 938, and a pair of additional stem portions 982, 984 extending at differing orientations and each including internal through holes that define flowpaths that extend in differing directions. Each of the flowpaths of the additional stem portions 982, 984 are in fluid communication with the flowpath defined by the internal through hole of the stem portion 941 that houses the insert body 922. In this way, the additional stem portions 982, 984 are in fluid communication with the stem portion 941 and the insert body 922. In some embodiments, the additional stem portions 982, 984 may be configured the same or similar as the stem portion 941 to mate with additional insert bodies and nuts (or other fitting components), for example.

As shown in FIGS. 152-160, the body member 922 is configured as a venturi. Specifically, the body member 922 includes an axially extending and elongated through hole 986 that tapers as it extends distally through the body member 922. In some embodiments, the elongated through hole 986 of the venturi body member 922 is conical shaped, however other shapes may be employed. As also shown in FIGS. 152-160, in some embodiments, the proximal side of the venturi body member 922 may define a sloped or conical concave shape that narrows gradually as it extends axially to the through hole 986.

As may be recognized by those of ordinary skill in the art based on the teachings herein, numerous changes and modifications may be made to the above-described and other embodiments of the present disclosure without departing from the scope of the disclosure. The components of the insertion devices as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the insertion devices may include more or fewer components or features than the embodiments as described and illustrated herein. For example, the components and features of fittings of FIGS. 1-16, FIGS. 17-32, FIGS. 33-48, FIGS. 49-64, FIGS. 65-80, FIGS. 81-96, FIGS. 97-112, FIGS. 113-128, FIGS. 129-144, and FIGS. 145-160 may be used interchangeably and in alternative combinations as would be modified or altered by one of skill in the art. Accordingly, this detailed description of the currently-preferred embodiments is to be taken in an illustrative, as opposed to limiting of the disclosure.

As may be recognized by those of ordinary skill in the art based on the teachings herein, numerous changes and modifications may be made to the above-described and other embodiments of the present disclosure without departing from the scope of the disclosure. The components of the fittings and related methods as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the fittings and related methods (and components thereof) may include more or fewer components or features than the embodiments as described and illustrated herein. Accordingly, this detailed description of the currently-preferred embodiments is to be taken in an illustrative, as opposed to limiting of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The disclosure has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the disclosure be construed as including all such modifications and alterations.

We claim:

1. An insertion fitting device for coupling to a flowpath, comprising: a first fitting assembly, comprising: a first coupler that includes a first through hole and a stem portion, the first through hole extending through the stem portion; a first nut that includes a second through hole, a rim portion and a body portion; and a first body member that includes a third through hole and an outer flange, wherein the first body member is positioned at least partially in the first through hole of the first coupler with an end of the stem portion engaging the outer flange, wherein the first body member and the stem portion of the first coupler are positioned at least partially in the second through hole of the body portion of the first nut, wherein an inner side of the body portion of the first nut threadably engages with an outer side of the stem portion of the first coupler such that the outer flange is secured between the rim portion of the first nut and the end of the stem portion of the first coupler, wherein a connection portion of the first body member extends through and past the second through hole of the rim portion of the first nut, wherein the third through hole of the first body member extends through the connection portion, wherein the connection portion of the first body member includes at least one first locking slot extending therethrough from an exterior surface thereof to the third through hole, and wherein the first fitting assembly further comprises a lock clip configured to extend through the at least one first locking slot and into the third through hole; and a second fitting assembly, comprising: a second coupler that includes a fourth through hole and a stem portion; a second nut that includes a fifth through hole, a rim portion and a body portion; and a second body member that includes a sixth through hole and an outer flange, wherein the second body member is positioned at least partially in the fourth through hole of the second coupler with an end of the stem portion engaging the outer flange of the second body member, wherein an inner side of the body portion of the second nut threadably engages with an outer side of the stem portion of the second coupler such that the outer flange of the second body member is secured between the rim portion of the second nut and the end of the stem portion of the second coupler, and wherein a connection portion of the second body member extends through and past the fifth through hole of the rim portion of the second nut, and the sixth through hole of the second body member extends through the connection portion of the second body member.

2. The device according to claim 1, wherein the end of the stem portion of the first coupler directly engages a first side of the outer flange of the first body member, and the rim portion of the first nut directly engages a second side of the flange of the first body member.

3. The device according to claim 1, wherein an outer surface of the connection portion of the second body member includes at least one locking groove therein, and wherein the third through hole of the first body member is configured to accept the connection portion of the second body member therein such that the at least one locking groove is aligned with the at least one first locking slot of the connection portion of the first body member, the lock clip being configured to extend through the at least one first locking slot and into the at least one locking groove to couple the first and second assemblies together.

4. The device according to claim 1, wherein the end of the stem portion of the second coupler directly engages a first side of the outer flange of the second body member, and the rim portion of the second nut directly engages a second side of the flange of the second body member.

5. The device according to claim 1, wherein the connection portion of the second body member extends from a reducer portion of the second body member, wherein the sixth through hole of the second body member extends through the reducer portion of the second body member, and wherein the sixth through hole includes a first diameter in the connection portion of the second body and a second diameter that is less than the first diameter in the reducer portion of the second body.

6. The device according to claim 1, wherein the connection portion of the second body member extends into the third through hole of the first body, wherein the first body member includes an inner narrow portion in the third through hole that defines an annular groove, and wherein an end of the connection portion of the second body member includes an annular protrusion that mates within the annular groove of the first body member.

7. The device according to claim 1, wherein the first fitting assembly further comprises a first check member positioned within the third through hole of the first body member that is naturally resiliently biased into engagement with a first seat portion within the third through hole of the first body member, and wherein the third through hole is closed off by the first check member and the first seat portion when the first check member engages the first seat portion.

8. The device according to claim 7, wherein the second fitting assembly further comprises a second check member positioned within the sixth through hole of the second body member that is naturally resiliently biased into engagement with a second seat portion within the sixth through hole of the second body member, and wherein the sixth through hole is closed off by the second check member and the second seat portion when the second check member engages the second seat portion.

9. The device according to claim 8, wherein the first check member extends past the first seat portion and an end of the first body member, and wherein the first check member engages with the second check member when the connection portion of the second body member is positioned into the third through hole of the first body such the first check member is moved into a spaced arrangement from the first seat portion and the second check member is moved into a spaced arrangement from the second seat portion.

10. The device according to claim 1, wherein the outer flange of the first body member extends angularly outward from an exterior surface portion of the first body member.

11. A method of coupling an insertion fitting device to a flowpath, comprising:
obtaining an insertion fitting device according to claim 1; and
coupling the first through hole of the first coupler into fluid communication with a flowpath of a device.

12. An insertion fitting device for coupling to a flowpath, comprising:
a first fitting assembly, comprising:
a first coupler that includes a first through hole and a stem portion, the first through hole extending through the stem portion;
a first nut that includes a second through hole, a rim portion and a body portion; and
a first body member that includes a third through hole and an outer flange,
wherein the first body member is positioned at least partially in the first through hole of the first coupler with an end of the stem portion engaging the outer flange,
wherein the first body member and the stem portion of the first coupler are positioned at least partially in the second through hole of the body portion of the first nut,
wherein an inner side of the body portion of the first nut threadably engages with an outer side of the stem portion of the first coupler such that the outer flange is secured between the rim portion of the first nut and the end of the stem portion of the first coupler,
wherein a connection portion of the first body member extends through and past the second through hole of the rim portion of the first nut,
wherein the third through hole of the first body member extends through the connection portion,
wherein the connection portion of the first body member includes at least one first locking slot extending therethrough from an exterior surface thereof to the third through hole,
wherein the first fitting assembly further comprises a lock clip configured to extend through the at least one first locking slot and into the third through hole, and
wherein the first fitting assembly further comprises a lock grip member extending at least partially about the connection portion of the first body member and including at least one second locking slot extending therethrough, wherein the lock clip extends through first and second at least one locking slots in a first position of the lock grip member with respect to the connection portion, and wherein the lock clip extends through at least one second locking slot but not the at least one first locking slot in a second position of the lock grip member with respect to the connection portion that differs from the first position thereof.

13. A method of coupling an insertion fitting device to a flowpath, comprising:
obtaining an insertion fitting device according to claim 12; and
coupling the first through hole of the first coupler into fluid communication with a flowpath of a device.

* * * * *